(12) United States Patent
Beshai

(10) Patent No.: US 9,148,370 B2
(45) Date of Patent: Sep. 29, 2015

(54) PACKET-SWITCHING NODE WITH INNER FLOW EQUALIZATION

(71) Applicant: Maged E. Beshai, Maberly, CA (US)

(72) Inventor: Maged E. Beshai, Maberly, CA (US)

(*) Notice: Subject to any disclaimer, the term of this patent is extended or adjusted under 35 U.S.C. 154(b) by 325 days.

(21) Appl. No.: 13/862,480

(22) Filed: Apr. 15, 2013

(65) Prior Publication Data

US 2013/0201994 A1     Aug. 8, 2013

Related U.S. Application Data

(63) Continuation-in-part of application No. 12/905,027, filed on Oct. 14, 2010, now Pat. No. 8,422,508.

(51) Int. Cl.
| | |
|---|---|
| *H04L 12/28* | (2006.01) |
| *H04L 12/721* | (2013.01) |
| *H04L 12/933* | (2013.01) |
| *H04L 12/931* | (2013.01) |
| *H04L 12/937* | (2013.01) |

(52) U.S. Cl.
CPC ............... *H04L 45/44* (2013.01); *H04L 49/15* (2013.01); *H04L 49/254* (2013.01); *H04L 49/45* (2013.01)

(58) Field of Classification Search
CPC .... H04L 49/10–49/103; H04L 49/15–49/1523
See application file for complete search history.

(56) References Cited

U.S. PATENT DOCUMENTS

| | | | |
|---|---|---|---|
| 7,489,625 B2* | 2/2009 | Varma | 370/217 |
| 2002/0083195 A1* | 6/2002 | Beshai et al. | 709/238 |
| 2008/0075071 A1* | 3/2008 | Beshai | 370/386 |
| 2008/0138067 A1* | 6/2008 | Beshai | 398/45 |

* cited by examiner

*Primary Examiner* — Chi H Pham
*Assistant Examiner* — Fahmida Chowdhury

(57) ABSTRACT

Independent switches arranged into multiple switch planes interconnect nodes coupled to data sources and sinks to form a switching node which scales gracefully from a capacity of a fraction of a terabit per second to hundreds of terabits per second. The switches of each switch plane are arranged in a matrix. Each node connects to an inlet of a selected switch in each column and an outlet of a selected switch in each row in each switch plane. A route set for each directed node pair includes simple paths, each traversing one switch, and compound paths, each traversing two switches. The connectivity of nodes to switches ensures that each switch may be selected to handle data flow of any directed node pair and that all simple paths leading to any node traverse switches which receive data from mutually orthogonal sets of nodes. This feature equalizes flow rates through the switches.

28 Claims, 76 Drawing Sheets

| Originating node | 4412 First switch indices (j,k) | 4414 Index of intermediate node | 4416 Second switch indices (x,y) | 4418 Indices of confirming switches | Destination node |
|---|---|---|---|---|---|
| 2312(10) | (0, 2) | (0)<br>(1)<br>(2)<br>(3) | (4, 0)<br>(4, 1)<br>(4, 2)<br>(4, 3) | (2,2)<br>(0,4) | 2318(17) |
| | (1, 0) | (4)<br>(5)<br>(6) | (4, 1)<br>(4, 2)<br>(4, 3) | (2,2)<br>(1,3) | |
| | (2, 3) | (8)<br>(9)<br>(11) | (4, 2)<br>(4, 3)<br>(4, 0) | (2,2) | |
| | (3, 1) | (12)<br>(14)<br>(15) | (4, 3)<br>(4, 0)<br>(4, 1) | (2,2)<br>(3,1) | |

|  | Column 0 | Column 1 | Column 2 | Column 3 | Column 4 |
|---|---|---|---|---|---|
| Row 4 | 16 17 18 19 | 00 05 10 15 | 02 04 11 13 | 01 07 08 14 | 03 06 09 12 |
| Row 3 | 12 13 14 15 | 01 06 11 16 | 00 07 09 18 | 03 04 10 17 | 02 05 08 19 |
| Row 2 | 08 09 10 11 | 02 07 12 17 | 03 05 14 16 | 00 06 13 19 | 01 04 15 18 |
| Row 1 | 04 05 06 07 | 03 08 13 18 | 01 10 12 19 | 02 09 15 16 | 00 11 14 17 |
| Row 0 | 00 01 02 03 | 04 09 14 19 | 06 08 15 17 | 05 11 12 18 | 07 10 13 16 |
|  | | 08 09 10 11 | 16 17 18 19 | 00 01 02 03 | 04 05 06 07 |
|  | | 04 05 06 07 | 12 13 14 15 | 16 17 18 19 | 00 10 02 03 |
|  | | 00 01 02 03 | 08 09 10 11 | 12 13 14 15 | 16 17 18 19 |

4525

4535(1,r,2)

4535 (0,r,0)   4535 (1,r,0)   4535 (2,r,0)   4535 (3,r,0)   4535 (4,r,0)

sink nodes connecting to switch 2740(2, r, 0), 0≤r<4

All rows of plane 2750(2)
All rows of plane 2750(1)
All rows of plane 2750(0)

| Inlet and Outlet indices | Inlet: $\{\eta + \lceil (m \times p)/\Pi \rceil\}_{\text{modulo } m}$ Outlet: $h_{\text{modulo } m}$ | Inlet: $\eta_{\text{modulo } m}$ Outlet: $\{h + \lceil (m \times p)/\Pi \rceil\}_{\text{modulo } m}$ |
|---|---|---|
| Switching Latency — Ascending Input rotator | $\{\eta - h + \lceil (m \times p)/\Pi \rceil\}_{\text{modulo } m}$ — 5432 | $\{\eta - h - \lceil (m \times p)/\Pi \rceil\}_{\text{modulo } m}$ — 5442 |
| Switching Latency — Descending Input rotator | $\{h - \eta - \lceil (m \times p)/\Pi \rceil\}_{\text{modulo } m}$ — 5434 | $\{h - \eta + \lceil (m \times p)/\Pi \rceil\}_{\text{modulo } m}$ — 5444 |

| Switch Configuration | Ascending input rotator | Descending input rotator |
|---|---|---|
| j: inlet of a switch in plane 0<br>k: 0utlet of a switch in plane 0<br>$0 \leq j < m$, $0 \leq k < m$, | $\lceil \lambda \times m/\Pi \rceil <$<br>$(j-k)_{\text{modulo } m}$<br>$\leq \lceil (\lambda+1) \times m/\Pi \rceil$<br>$0 \leq \lambda < \Pi$ | $\lceil \lambda \times m/\Pi \rceil <$<br>$(k-j)_{\text{modulo } m}$<br>$\leq \lceil (\lambda+1) \times m/\Pi \rceil$<br>$0 \leq \lambda < \Pi$ |

*FIG. 55*

PACKET-SWITCHING NODE WITH INNER FLOW EQUALIZATION

CROSS REFERENCE TO RELATED APPLICATIONS

The present application is a continuation-in-part of U.S. patent application Ser. No. 12/905,027 entitled "Large-Scale Packet Switch", filed Oct. 14, 2010, the specification of which is incorporated herein by reference.

FIELD OF THE INVENTION

The present invention relates to telecommunication nodes. In particular, it is directed to a large-scale packet switching node which may serve as a versatile edge router or a core node of a data network.

BACKGROUND

Network complexity increases sharply with the increase of the mean number of hops for connections traversing a network. The mean number of hops is determined by the network structure and the method of route allocation. Deploying switching nodes of large dimension enables the construction of networks of simple structures which in turn result in simplifying the routing function and reduce the mean number of hops. The basic building block of a switching node is a non-blocking switch element. A switching node of large dimension may comprise non-blocking switch elements interconnected in a multi-stage structure and the dimension of the multi-stage switching node is determined by the dimensions of the constituent switch elements and the number of stages. It is well known that the complexity of a multi-stage switching node increases, its efficiency decreases, and its performance deteriorates as the number of stages increases. It is therefore desirable to explore alternative switching-node structures that permit scalability to large dimensions while providing operational simplicity, high performance, and overall efficiency. It is also desirable that a switching node, serving as a packet switch, be versatile with the ability to handle data traffic of different formats, provide multi-granular connections, and handle data of widely varying flow rates. Considering the typical temporal and spatial variation of end-to-end flow rates, it is highly desirable that a packet-switching node distribute its processing load evenly among its constituent switch units.

SUMMARY

The present invention provides a packet-switching node which gracefully scales to a capacity of hundreds of terabits per second and which is structured to automatically distribute the requisite processing load equitably among a large number of independent switches.

In accordance with one aspect, the present invention provides a switching node having a plurality of independent switches interconnecting a plurality of nodes. The switches are arranged into a number of switch planes, each switch plane having a respective set of switches arranged in a matrix. Each node connects to an inlet of a selected switch in each column in each switch plane and an outlet of a selected switch in each row in each switch plane.

The connection pattern of nodes to switches is devised so that all simple paths leading to any node traverse switches which receive data from mutually orthogonal sets of nodes. By definition, any two sets of nodes which have a number of common nodes not exceeding a predefined upper bound are said to be orthogonal sets. A simple path traverses a single switch.

An important inherent property of the disclosed switching node is that a data flow of any directed node pair may traverse any of the independent switches. This property together with the disclosed orthogonal connectivity scheme result in equalizing the flow rates of data routed through the individual switches thus increasing the efficiency of the switching node.

In one embodiment, outlets of switches of a same column connect to a respective set of nodes. The respective set of nodes may be specific to each switch plane. A same set of nodes may connect in the downstream direction to switches of a preselected column where the preselected column is switch-plane specific.

Any two switches which connect to a same set of nodes in the downstream direction connect to different sets of nodes in the upstream direction. Additionally, the different sets are mutually orthogonal. Thus, all switches which connect to a same set of nodes in the downstream direction connect in the upstream direction to mutually orthogonal sets of nodes. Accordingly, data is delivered to any destination node through a number of switches receiving data originating from orthogonal sets of nodes resulting in equalizing the switching loads of all switches even with a large variance of inter-nodal data flow rates. Accordingly, all simple paths leading to any node traverse switches which receive data from mutually orthogonal sets of nodes.

The number of switch planes is denoted $\Pi$, $\Pi>0$, and the switch planes are indexed as 0 to ($\Pi-1$). Each switch has m inlets and n outlets m>1, n>1. The number of columns of each switch plane is denoted $\mu$ and the columns are indexed as 0 to ($\mu-1$), and the number of rows in each switch plane is denoted $\nu$, and the rows are indexed as 0 to ($\nu-1$), $\mu>1$, and $\nu>1$; $\mu$ and $\nu$, are selected so that $\mu \times n = \nu \times m$. The number of nodes is $S=\mu \times n=\nu \times m$, and the nodes being indexed as 0 to (S−1).

The connection pattern of nodes to switches may be devised so that all sets of nodes individually connecting to inlets of respective switches of a specific switch plane are mutually orthogonal. If the number of columns is selected as a prime number, with the number of rows equal to the number of columns, an orthogonality index of $\lceil m/\mu \rceil$ is realizable, m being the number of inlets and $\mu$ being the number of columns, m>2 and $\mu>2$.

The switching node employs a distributed control system having a plurality of node controllers and a plurality of switch controllers. Each node controller is coupled to a respective node and each switch controller is coupled to a respective switch. Route selection within the switching node is determined through communication between the node controllers and the switch controllers through dedicated control paths.

In a first connection pattern, the upstream connectivity of nodes to switches may be identical for each switch plane, so that a set of nodes connects to inlets of switches of identical column indices and identical row indices in different switch planes. The downstream connectivity of switches to nodes may then be devised so that switches of a same column in a switch plane connect to a same set of nodes with switches of columns of a same index in different switch planes connecting to respective disjoint sets of nodes.

According to the first connection pattern, a node of index $\eta$, $0 \le \eta < (\mu \times n) = (\nu \times m)$, connects to an inlet of a switch in each column c, $0 \le c < \mu$, in each switch plane $0 \le \pi < \Pi$, in row r determined as $$r = \{\lfloor \eta/m \rfloor - c - c \times (\eta)_{modulo\ m}\}_{modulo\ \nu}.$$

The same node connects to an outlet of a switch in each row ρ, 0≤ρ<ν, in each switch plane 0≤π<Π, in column κ, determined as $$\kappa = \{\lfloor \eta/n \rfloor + \pi\}_{modulo\ \mu}.$$

Conversely, a switch in column c, 0≤c<μ, row r, 0≤r<ν, and switch plane π, 0≤π<Π connects to upstream channels from a set of m nodes of indices:

$$\{j \times (1 + m \times c) + m \times (r+c)\}_{modulo\ S},\ 0 \le j < m.$$

The same switch connects to downstream channels to a set of n nodes of indices $\{(n \times (c+\pi)+k\}_{modulo\ \mu},\ 0 \le k < n$.

In a second connection pattern, the downstream connectivity of switches to nodes may be identical for each switch plane, so that a set of nodes connects to outlets of switches of identical column indices in different switch planes. The upstream connectivity of switches to nodes may then be devised so that switches of a same column and a same row in different switch planes connect to different sets of nodes; the different sets are preferably mutually orthogonal.

According to the second connection pattern, a node of index η, 0≤η<(μ×n)=(ν×m), connects to an inlet of a switch in each column c, 0≤c<μ, in each switch plane 0≤π<Π, in row r determined as $$r = \{\lfloor \eta/m \rfloor - (c+\pi) \times (1 + (\eta)_{modulo\ m})\}_{modulo\ \nu}.$$

The same node connects to an outlet of a switch in each row ρ, 0≤ρ<ν, in each switch plane 0≤π<Π, in column κ, determined as $\kappa = \lfloor \eta/n \rfloor$.

Conversely, a switch in column c, 0≤c<μ, row r, 0≤r<ν, and switch plane π, 0≤π<Π connects to upstream channels from a set of m nodes of indices:

$$\{j \times (1 + m \times \kappa) + m \times (r + \kappa)\}_{modulo\ S},\ 0 \le j < m,\ \kappa = (c+\pi)_{modulo\ \mu}.$$

The same switch connects to downstream channels to a set of n nodes of indices (n×c+k), 0≤k<n.

Each node has a nodal switching fabric with a number, Q, of input ports and Q output ports, Q>2. With the matrix of switches of each switch plane having a number of columns, μ, equal to the number of rows, ν, the Q input ports may be divided into μ* ingress ports and Π×μ inbound ports, and the Q output ports may be divided into μ* egress ports and Π×μ outbound ports. The ingress ports receive data from external data sources and the egress ports transmit data to external data sinks. Each inbound port connects to an inbound channel from a respective switch and each outbound port connects to an outbound channel to a respective switch.

A switch may be configured as an instantaneous space switch or a latent space switch. A latent space switch is readily scalable to relatively high dimensions.

In one arrangement, each switch may be configured as a latent space switch having m inlets and m outlets, m>2. The latent space switch comprises an input rotator, a bank of m memory devices, and output rotator.

The input rotator cyclically connects each of the m inlets to the m memory devices during a rotation cycle. Likewise, the output rotator cyclically connects each of the m memory devices to the m outlets.

The input rotator may be configured as an ascending rotator with the output rotator configured as a descending rotator, or vice versa.

A rotation cycle includes m time slots, a time slot being a period of time during which an inlet connects to a memory device and a memory device connects to an outlet. A path from an inlet to an outlet of a latent space switch experiences a systematic delay which differs according to the relative indices of the inlet and outlets. The delay varies between 0 and (m−1) time slots of a rotation cycle.

In order to provide simple paths of different delays between each node and each other node through the Π switch planes, each node may connect to switch inlets of different indices in different switch planes and switch outlets of identical indices in all switch planes so that Π simple paths from any node to any other node through the switch planes have switching delays staggered between 0 and (m−1) time slots, Π being a number of switch planes. Thus, a node connects to switch inlets of different indices in different switch planes but connects to a switch outlet of a same index of a respective latent space switch in each switch plane. A node connects to an inlet of index $\{j + \lceil (m \times p)/\Pi \rceil\}_{modulo\ m}$, of a respective latent space switch in a switch plane of index p, 0≤j<m, 0≤η<S, 0≤p<Π, and S=μ×m.

Alternatively, each node may connect to inlets of identical indices in all switch planes but connect to switch outlets of different indices in different switch planes. Thus, a node connects to switch inlets of a same index in different switch planes but connects to switch outlets of different indices in different switch planes. A node connects to outlets of an index $\{k + \lceil (m \times p)/\Pi \rceil\}_{modulo\ m}$, of a respective latent space switch in a switch plane of index p, 0≤k<n, 0≤η<S, 0≤p<Π, and S=μ×m.

The systematic switching delay from a specific inlet to a specific outlet of the latent space switch is determined according to the total number of inlets, the index of the specific inlet, the index of the specific outlet, and the directions of rotation of the input and output rotators. With an ascending input rotator (hence a descending output rotator), the systematic delay is determined as $\Delta_{jk} = (j-k)_{modulo\ m}$. With a descending input rotator (hence an ascending output rotator), the systematic delay is determined as $\Delta_{jk} = (k-j)_{modulo\ m}$.

A further method to provide paths of different delays from an inlet to an outlet is to configure each switch of at least one switch plane to have an ascending input rotator and to configure each switch of at least one other switch plane to have a descending input rotator. Each node may then connect to likewise-indexed inlets and likewise-indexed outlets of respective switches in both the upstream and downstream directions. A simple path from a first node connecting to an inlet of index j to a second node connecting to an outlet of index k, is preferably established through a switch having an ascending input rotator, if $(j-k)_{modulo\ m} \le (m/2)$, 0≤j<m, 0≤k<m. Otherwise, the simple path is preferably established through a switch having a descending input rotator.

In accordance with another aspect, the present invention provides a switching node having a plurality of independent switches interconnecting a plurality of nodes. The independent switches are arranged into a number of switch planes each switch plane having a respective set of switches arranged in a matrix. Each node connects to an inlet of a selected switch in each row in each switch plane and an outlet of a selected switch in each column in each switch plane. The connection pattern of nodes to switches is devised so that all simple paths originating from any node traverse switches which transmit data to mutually orthogonal sets of nodes.

In one embodiment, a same set of nodes may connect to inlets of switches of a preselected column where the preselected column is switch-plane specific. Inlets of switches of a same column connect to a respective set of nodes. The respective set of nodes may be switch-plane specific.

Any two switches which connect to a same set of nodes in the upstream direction connect to different sets of nodes in the downstream direction; the different sets are preferably mutually orthogonal. Thus, all switches which connect to a same set of nodes in the upstream direction connect in the downstream direction to mutually orthogonal sets of nodes. Accordingly, data is delivered from any originating node through a number of switches transmitting data destined for orthogonal sets of nodes resulting in equalizing the switching loads of all switches even with a large variance of inter-nodal data flow rates.

In accordance with a further aspect, the present invention provides a switching node having a plurality of independent switches connecting a plurality of source nodes to a plurality of sink nodes.

The connection pattern of source nodes and sink nodes to switches is devised so that each source node connects to each switch of a respective row in each switch plane while each sink node connects to a respective switch in each row in each switch plane.

Furthermore, a first set of sink nodes connecting to any switch in a specific switch plane is orthogonal to each other set of sink nodes connecting to any other switch in the specific switch plane; the first set of sink nodes and the each other set of sink nodes have a number of sink nodes in common not exceeding a predefined upper bound, herein called an orthogonality index.

With the number of columns, $\mu$, selected to be equal to the number of rows, $\nu$, with $\nu$ selected as a prime number, the orthogonality index equals $\lceil n/\nu \rceil$, n being a number of outlets of each switch. The orthogonality index may be larger than $\lceil n/\nu \rceil$ if $\nu$ is not a prime number.

With each switch having m inlets and n outlets, the total number, S, of source nodes is determined as $\mu \times n$, and the total number of sink nodes is determined as $\nu \times m$. In order to integrate each source node with a respective sink node to form an integrated nodes, the values of $\mu$, $\nu$, m, and n, each being an integer greater than 2, are selected so that $\nu \times m = \mu \times n$. The S source nodes are indexed as 0 to $\{(\mu \times n)-1\}$ and. the S sink nodes are indexed as 0 to $\{(\mu \times n)-1\}$.

In one connection pattern, a same set of source nodes connects to switches of a same row in a switch plane with switches of rows of a same index in different switch planes connecting to respective disjoint sets of sources nodes. The connectivity of switches to sink nodes may be identical for each switch plane, so that a set of sink nodes connects to outlets of switches of identical column indices and identical row indices in different switch planes.

According to the above connection pattern, a source node of index $\eta$, $0 \leq \eta < S$, $S = \nu \times m = \mu \times n$, connects to a switch in a row of index $\{\lfloor \mu/m \rfloor + \pi\}_{modulo\ \nu}$, in switch plane $\pi$, $0 \leq \pi < \Pi$, while a sink node of index h, $0 \leq h < S$, connects to a switch in each row r, $0 \leq r < \nu$, in each switch plane, in a column c determined as:

$c = \{\lfloor h/n \rfloor - r - r \times (h_{modulo\ n})\}_{modulo\ \mu}$, $0 \leq r < \nu$.

Conversely, a switch in column c, $0 \leq c < \mu$, row r, $0 \leq r < \nu$, and switch plane $\pi$, $0 \leq \pi < \Pi$ connects to a set of m source nodes of indices $(m \times (r+\pi)+j)_{modulo\ S}$, $0 \leq j < m$, and connects to a set of n sink nodes of indices $\{j \times (1+n \times r)+n \times (r+c)\}_{modulo\ S}$, $0 \leq j < \Pi$.

In an alternative connection pattern, a same set of source nodes connects to switches of a same row in each switch plane while switches of identical column indices and identical row indices in different switch planes connect to different sets of sink nodes.

According to the alternative connection pattern, a source node of index $\eta$, connects to a switch in a row of index $\lfloor \eta/m \rfloor$ in each switch plane while a sink node of index h, $0 \leq h < S$, connects to a switch in each row r, $0 \leq r < \nu$, in switch plane, $\pi$, $0 \leq \pi < \Pi$, in a column c determined as:

$c = \{\lfloor h/n \rfloor - (r+\pi) \times (1+(h_{modulo\ n}))\}_{modulo\ \mu}$, $0 \leq r \leq \nu$.

Conversely, a switch in column c, $0 \leq c < \mu$, row r, $0 \leq r < \nu$, and switch plane $\pi$, $0 \leq \pi < \Pi$ connects to a set of m source nodes of indices $(m \times r+j)$, $0 \leq j < m$, and connects to a set of n sink nodes of indices $\{j \times (1+n \times \rho)+n \times (\rho+c)\}_{modulo\ S}$, $0 \leq j < n$, $\rho = (r+\pi)_{modulo\ \nu}$.

BRIEF DESCRIPTION OF THE DRAWINGS

Embodiments of the present invention will be further described with reference to the accompanying exemplary drawings, in which:

FIG. 25 illustrates a second connectivity pattern of the matrix of switches of FIG. 23 in accordance with an embodiment of the present invention;

FIG. 29, FIG. 30, FIG. 31, and FIG. 32 illustrate connectivity patterns of parallel matrices of switches in the switching node of FIG. 27 in accordance with an embodiment of the present invention;

FIG. 44 lists a multiplicity of compound paths for a given originating node and destination node through the switching node of FIG. 23 or FIG. 27 in accordance with an embodiment of the present invention;

FIG. 45 illustrates orthogonal connectivity of nodes to inlets of switches of multiple switch planes in accordance with an embodiment of the present invention;

FIG. 50 illustrates disjoint sets of nodes connecting to switches of a same row of a switch plane having switches arranged in a matrix, in accordance with an embodiment of the present invention;

FIG. 54 illustrates, in a tabular form, connectivity of nodes to latent space switches of different switch planes in accordance with an embodiment of the present invention;

FIG. 55 illustrates selection of a switch plane according to indices of the end nodes of a simple path in accordance with an embodiment of the present invention;

DETAILED DESCRIPTION

Terminology

Figure 1:
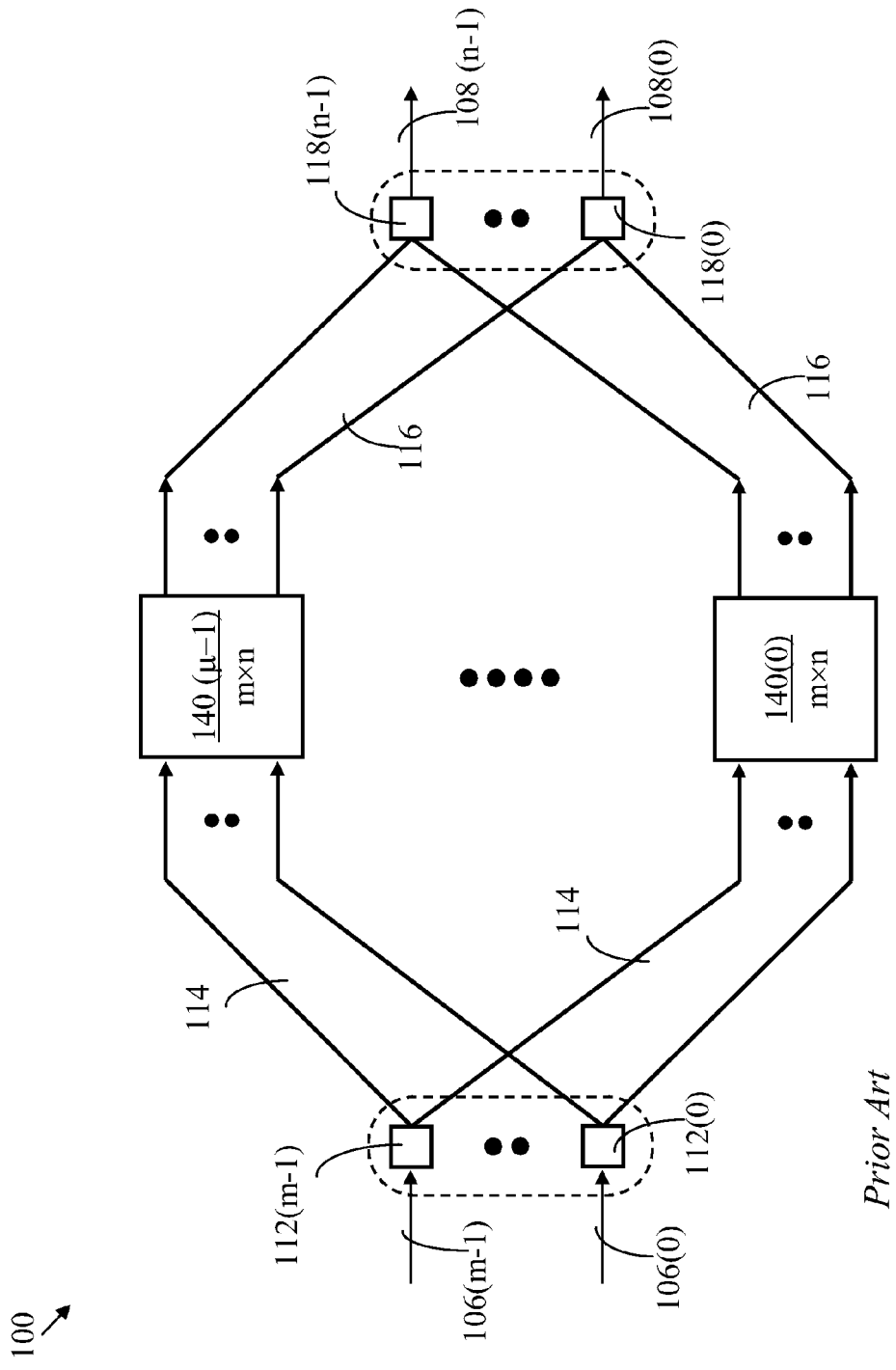
FIG. 1 illustrates a prior-art switching node comprising source nodes connecting to sink nodes through independent switches where each source node connects to each switch and each switch connects to each sink node.

First-Order matching process: A first-order matching process, for a connection requesting a single time slot or multiple time slots, requires that two ports traversed by the connection be free during a sufficient number of time slots in a predefined time frame.

$N^{th}$-Order matching process: An $N^{th}$-order matching process, for a connection requesting a single time slot or multiple time slots, requires that (N+1) corresponding ports traversed by the connection be simultaneously free during a sufficient number of time slots, where N≥1.

Allocable resource: A resource, such as a channel, that is available (free or not currently reserved) for allocation to a connection is an "allocable resource"—where a resource is available during specific time slots in a slotted time frame, each of the specific time slots is herein called an "allocable time slot".

Switching node: The switching node of the present invention comprises source nodes, sink nodes, and at least one switch plane that comprises independent switches. The switching node may serve as a packet switch. The switching node may synonymously be referenced as a switching system.

Switch unit or switch: In the present application, the term "switch unit" refers to a space switch connecting source nodes to sink nodes. A switch unit is synonymously called a "switch" for brevity.

Switch plane: A switch plane, according to the present invention, comprises a matrix of independent switches.

Source node: A source node receives data from data sources and sends the data to a switch plane for delivery to sink nodes.

Sink node: A sink node receives data from a switch plane and delivers the data to data sinks.

Integrated node: An integrated node comprises a source node and a sink node which may be integrated to share memory and control. Thus, an integrated node has inputs for receiving data from data sources and from switches of a switch plane, and has outputs for sending data to data sinks and switches of the switch plane. An integrated node is herein referenced as a node for brevity.

Node element: A node may comprise a number of node elements, where each node element is a non-blocking, contention-free, switching device.

Ingress port: An input port of a source node is called an ingress port. In an integrated node, the term applies to an input port that receives data from data sources.

Egress port: An output port of a sink node is called an egress port. In an integrated node, an output port that connects to data sinks is also called an egress port.

Inbound port: An input port of a sink node is called an inbound port. In an integrated node, the term applies to an input port that receives data from a switch.

Outbound port: An output port of a source node is called an outbound port. In an integrated node, the term applies to an output port that connects to a switch.

Inlet: An input port, of a switch, which receives data from a source node, is identified as an 'inlet'.

Outlet: An output port, of a switch, which transmits data to a sink node, is identified as an 'outlet'.

Outbound/Inward Channel: A communication channel from an outbound port of a source node to an inlet of a switch is an "outbound channel" from the source node and an "inward channel" to the switch.

Inbound/Outward channel: A communication channel from an outlet of a switch to an inbound port of a sink node is an "outward channel" from the switch and an "inbound channel" to the sink node.

Simple path: A path from a source node to a sink node (from a node to another node) which traverses only one switch is herein called a "simple path".

Compound path: A path from a first node to a second node which traverses a first switch, an intermediate node, and a second switch is herein called a "compound path". A compound path comprises two joined simple paths.

Flow: The term refers to a data stream originating at one node and terminating in another node, or a collection of inter-nodal data streams Inner flow: The term refers to data routed through individual switches of the switching node Temporal multiplexer: A temporal multiplexer is a device for time interleaving data from multiple inputs onto a common output.

Temporal demultiplexer: A temporal demultiplexer is a device for separating time-interleaved data received from a common input.

Rotator: The term "rotator" refers to a device having multiple inlets and multiple outlets where each inlet cyclically connects to each outlet in a predefined order. A rotator is a simple device that scales easily to a very high dimension, i.e., a large number of inlets and a large number of outlets.

Ascending rotator: A rotator having a plurality of inlets and a plurality of sequentially indexed outlets, where each inlet cyclically accesses the outlets in an ascending index order, is called an ascending rotator. An ascending rotator having N inlets, indexed as 0 to (N−1), and N outlets indexed as 0 to (N−1), connects an inlet of index j to an outlet of index $\{j+t\}_{modulo\ N}$ during time slot t of a repetitive time frame organized into N time slots, $0 \le j < N$, $0 \le t < N$.

Descending rotator: A rotator having a plurality of inlets and a plurality of sequentially indexed outlets, where each inlet cyclically accesses the outlets in a descending index order, is called a descending rotator. A descending rotator having N inlets, indexed as 0 to (N−1), and N outlets indexed as 0 to (N−1), connects an inlet of index j to an outlet of index $\{j-t\}_{modulo\ N}$ during time slot t of a repetitive time frame organized into N time slots, $0 \le j < N$, $0 \le t < N$.

Inward control signal: A signal containing control data from a node controller to a switch controller is herein called an inward control signal Outward control signal: A signal containing control data from a switch controller to a node controller is herein called an outward control signal Inward control time slot: A time slot, within a slotted time frame, reserved for transferring an inward control signal is herein called an inward control time slot.

Outward control time slot: A time slot, within a slotted time frame, reserved for transferring an outward control signal is herein called an outward control time slot.

Upstream connections: Connections from nodes (from source nodes) to switches, are identified as "upstream connections.

Downstream connections: Connections from switches to nodes (to sink nodes are identified as "downstream connections.

Orthogonal sets: Any two sets of nodes are said to be orthogonal if the two sets have a number of common nodes not exceeding a predefined upper bound.

Orthogonality Index: A number of common nodes in any two sets of nodes defines an orthogonality index; an orthogonality index preferably equals 1.

Modulo operation: The operation X modulo W, herein denoted $X_{modulo\ W}$, where X is any integer, which may be a positive integer or a negative integer, and W is a positive integer is a remainder determined as: $X_{modulo\ W} = X - W \times \lfloor X/W \rfloor$, where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

Thus, $7_{modulo\ 8} = 7$, $(-7)_{modulo\ 8} = \{-7-(-1) \times 8\} = 1$, $8_{modulo\ 8} = 0$, $(-8)_{modulo\ 8} = 0$, $9_{modulo\ 8} = 1$, and $(-9)_{modulo\ 8} = 7$.

$\lceil R \rceil$: Nearest integer that is greater than R, or equal to R if R is an integer A reference numeral may refer to items of a same type individually or collectively. A reference numeral may further be indexed to distinguish individual items of a same type.

LIST OF REFERENCE NUMERALS

100: A prior-art switching node comprising source nodes, sink node, and switches
106: Ingress channel in switching node 100
108: Egress channel in switching node 100
112: Source node in switching node 100
114: Channel from a source node 112 to a switch 140 in switching node 100
116: Channel from a switch 140 to a sink node 118
118: Sink node in switching node 100
140: Switch in switching node 100
200: A switching node according to the present invention comprising source nodes, sink nodes, and independent switches arranged in a matrix structure
210: Matrix of switches in switching node 200
212: Source node in switching node 200
214: Channel from a source node 212 to a switch 240 in switching node 200
216: Channel from a switch 240 to a sink node 218 in switching node 200
218: Sink node in switching node 200
225: Group of source nodes 212
235: Group of sink nodes 218
240: Switch in switching node 200
300: A switching node according to the present invention similar to switching node 200 having a larger number of rows and columns of switches
306: Ingress channel in switching node 300
308: Egress channel in switching node 300
310: Matrix of switches in switching node 300
312: Source node in switching node 300
314: Outbound channel of source node 312, which is also an inward channel to a switch 340
316: An inbound channel to sink node 318, which is also called an outward channel from a switch 340 to sink node 318
314(1): First channel from a source node 312 to a switch 340 in a simple path (FIG. 6)
316(1): Second channel from a switch 340 to a destination node 318 in a simple path (FIG. 6)
314(2): First channel in a compound path from a source node 312 to an intermediate switch 340 (FIG. 6)
316(2): Second channel in a compound path from an intermediate switch 340 to an intermediate node 312/318 (FIG. 6)
314(3): Third channel in a compound path from an intermediate node 312/318 to a switch 340 (FIG. 6)
316(3): Fourth channel in a compound path from a switch 340 to a destination node 318 (FIG. 6)
318: Sink node in switching node 300
325: Group of source nodes 312
335: Group of sink nodes 318
340: Switch in switching node 300
653: Internal path within an intermediate node 312/318
800: Integrated node
900: Node combining a source node 312 and a sink node 318
920: Node switching fabric
925: Configuration controller (a slave controller) for establishing connections within the switching fabric 920
926: An input port, also called an ingress port, of a node receiving data from data sources, 928: An output port, also called an egress port, of a node transmitting data to data sinks
936: An input port, also called an inbound port, of a node receiving data from a switch 340
938: An output port, also called an outbound port of a node transmitting data to a switch 340
950: Node controller of node 900
951: Internal switched path from an ingress port 926 to an egress port 928 within switching fabric 920
952: Internal switched path within switching fabric 920 from an ingress port 926 to an outbound port 938 connecting node 900 to a switch 340
953: Internal switched path within switching fabric 920 from an inbound port 936 of node 900 to an egress port 928 of node 900
954: Internal switched path within switching fabric 920 from an inbound port 936 to an outbound port 938 of node 900
955: Control channel from an input port 926 or 936 to a temporal multiplexer 957
957: Temporal multiplexer combining control signals from input ports 926 and 936 for delivery to node controller 950
958: Temporal demultiplexer separating time-interleaved control signals received from node controller 950 for delivery to individual input ports 926 and 936
962: Channel connecting temporal multiplexer 957 to node controller 950
964: Channel connecting node controller 950 to temporal demultiplexer 958
965: Control channel from temporal demultiplexer 958 to an input port 926 or 936
982: Channel connecting node controller 950 to temporal demultiplexer 987
985: Control channel from temporal demultiplexer 987 to an output port 928 or 938
987: Temporal demultiplexer separating time-interleaved control signals received from node controller 950 for delivery to individual output ports 928 and 938
1020: Data block comprising a number of data segments 1022
1021: Data block comprising a number of packets 1023 of arbitrary sizes
1022: Data segment
1023: Data packet of arbitrary size
1124: Input memory placed at an input port of node 900
1125: Logical queue in input memory 1124 associated with an outbound port 938 of node 900
1126: Logical queue in input memory 1124 associated with egress ports 928
1127: Logical queue in input memory 1124 associated with node controller 950
1134: Output memory placed at an outbound port of node 900
1138: Logical queue in output memory 1134 associated with an outlet of a switch 340 (or equivalently to a corresponding destination node 318)
1139: Logical queue in output memory 1134 associated with a controller of a switch 340 to which the outbound port connects
1200: A shared-memory node handling data segments and/or data blocks
1211: Ingress channel to node 1200
1212: Inbound channel to node 1200
1220: Input ports of node 1200 comprising both ingress ports 926 and inbound ports 936
1223: Internal channel connecting an input port 1220 to a temporal multiplexer 1224
1224: A temporal multiplexer for providing cyclical access of input ports 1220 to shared memory 1230 through bus 1225
1225: Bus connecting temporal multiplexer 1224 to shared memory 1230
1230: Shared memory for holding data segments 1233 and/or entire data blocks 1234
1231: A logical section of shared memory 1230 used for competitive data-segment switching
1232: A logical section of shared memory 1230 used for contention-free data-block switching
1233: A data segment held in logical-section 1231 of shared memory 1230
1234: A data block held in logical-section 1232 of shared memory 1230.
1240: Output ports of node 1200 comprising both egress ports 928 and outbound ports 938
1243: Internal channel connecting a temporal demultiplexer unit 1244 to an output port 1240
1244: A temporal demultiplexer for providing cyclical access of output ports 1240 to shared memory 1230 through bus 1245
1245: Bus connecting shared memory 1230 to temporal demultiplexer 1244
1251: Egress channel from node 1200
1252: Outbound channel from node 1200
1304: Ascending rotator (clockwise rotator)
1306: Descending rotator (counterclockwise rotator)
1320: Node element—a switching element of a node
1325: Integrated node comprising node elements 1320, ascending rotator 1304, and descending rotator 1306
1326: Access input port of node element 1320 (ingress port 926 or inbound port 936)
1327: First internal input port of node element 1320
1328: Second internal input port of node element 1320
1336: Access output port of node element 1320 (egress port 928 or outbound port 938)
1337: First internal output port of node element 1320
1338: Second internal output port of node element 1320
1346: Input channel to switch-element 1320
1347: Internal channel from ascending rotator 1304 to input port 1327
1348: Internal channel from descending rotator 1306 to input port 1328
1356: Output channel from switch-element 1320
1357: Internal channel from output port 1337 to ascending rotator 1304
1358: Internal channel from output port 1338 to descending rotator 1306
1420: Memory device
1421: Temporal multiplexer
1422: Temporal demultiplexer
1441: Unprocessed data segment from source at input of a source node element 1320
1442: Data segment, at input of an intermediate node element 1320, sent from a source node element 1320
1443: Data segment, at input of a sink node element 1320, sent from an intermediate switch
1452: Output data segment at a source node element 1320
1453: Output data segment at an intermediate node element 1320
1461: Delivered data segment originating and terminating within same node element 1320
1462: Delivered data segment traversing one rotator
1463: Delivered data segment traversing two rotators
1602: Set of fresh data segments received from data sources
1604: Set of data segments ready for transfer from memory devices 1420 to data sinks 1606: Set of data segments to be transferred independently from a memory device 1420 to another memory device 1420

1608: Set of data segments forming data blocks where the data segments of each data block are to be transferred consecutively to another memory device 1420

1622: A data segment in set 1602

1624: A data segment in set 1604

1626: A data segment in set 1606

1628: A data segment in set 1608

1629: A null data segment for completing a data block

1630: Array representing organization of a memory device 1420

1632: A data block comprising data segments 1628 and possibly complemented with a number of null data segments 1629

1714: Inward channel to a switch

1715: Internal path in a switching fabric

1716: Outward channel from a switch

1740: Instantaneous space switch

1742: Switching fabric of a latent space switch 1750

1745: Systematic delay component in a latent space switch 1750

1750: Latent space switch

1800: Latent space switch comprising a primary rotator, a bank of transit memory devices, a secondary rotator, and a controller 1812: Inward channel to a latent space switch 1800

1814: Inlet of latent space switch 1800

1816: Outlet of latent space switch 1800

1818: Outward channel from latent space switch 1800

1824: Inlet connecting to controller 1845

1826: Outlet connecting to controller 1845

1837: Primary (input) rotator of latent space switch 1800

1838: Transit memory device in latent space switch 1800

1839: Secondary (output) rotator in latent space switch 1800

1845: Controller of latent space switch 1800

1850: Rotating-access latent space switch

2200: Arrangement of latent space switches of opposite rotation phases

2300: Exemplary switching node having switches arranged in a matrix of five rows and five columns 2306: Ingress channel in switching node 2300

2308: Egress channel in switching node 2300

2310: Matrix of switches in switching node 2300

2312: Source node in switching node 2300

2314: Channel from source node 2312 to a switch 2340

2316: Channel from a switch 3240 to a sink node 2318 in switching node 2300

2318: Sink node in switching node 2300

2320: A node combining a source node 2312 and a sink node 2318 (the reference numerals 2320 and 2312/2318 may be used interchangeably)

2340: Switch in switching node 2300

2420: Group of source nodes 2312 connecting to a switch 2340

2430: Group of sink nodes 2318 connecting to a switch 2340 in switching node 2300

2520: Orthogonal groups of source nodes 2312 connecting to switches 2340

2600: Matrix identifying source nodes connecting to switches in a switching node 2300

2610: Sub-matrix of matrix 2600

2620: Index of a source node 2312

2621: An indicator of a channel connecting a source node 2312 to a switch 2340

2700: A switching node comprising having switches arranged in multiple switch planes 2706: Ingress channel in switching node 2700

2708: Egress channel in switching node 2700

2712: Source node in switching node 2700

2714: Channel from a source node 2712 to a switch 2740 in switching node 2700

2716: Channel from a switch 2740 to a sink node 2718 in switching node 2700

2718: Sink node in switching node 2700

2720: A node combining a source node 2712 and a sink node 2718 (the reference numerals 2720 and 2712/2718 may be used interchangeably)

2740: Switch in multi-plane switching node 2700

2750: Switch planes individually identified as 2750($p$), $0 \leq p < \Pi$

2920: Group of source nodes 2712 in switch plane 2750(1)

3020: Group of source nodes 2712 in switch plane 2750(2)

3120: Group of source nodes 2712 in switch plane 2750(3)

3220: Group of source nodes 2712 in switch plane 2750(4)

3400: Switching node, similar to exemplary switching node 2300, having 20 nodes 2320 (2312/2318) interconnected by 25 switches 2740 each of dimension 4×4, used for illustrating setup of a connection through a simple path 3450: Channel from a node 2320(18) to switch 2340(1,4)

3451: Channel from switch 2340(1,4) to node 2320(7)

3452: Channel from a node 2320(7) to switch 2340(4,1)

3453: Channel from switch 2340(4,1) to node 2320(18)

3550: Channel from a node 2320(18) to switch 2340(2,4)

3551: Channel from switch 2340(2,4) to node 2320(8)

3552: Channel from a node 2320(8) to switch 2340(1,2)

3553: Channel from switch 2340(1,2) to node 2320(7)

3554: Channel from a node 2320(7) to switch 2340(4,1)

3555: Channel from switch 2340(4,1) to node 2320(18)

3556: Channel from a node 2320(7) to switch 2340(2,1)

3557: Channel from switch 2340(2,1) to node 2320(8)

3602: Array indexed by destination sink-node numbers used by a node controller for determining a column number corresponding to a destination sink-node in a switching node 300 (2300, 2750) having 5100 nodes (integrated source/sink nodes)

3604: An array used by a node controller and indexed by column numbers of a matrix of switches 340 for identifying an outbound port number corresponding to a column number in a switching node 300 having switches arranged in 20 columns 3616: Column index 3880: Control time slot associated with an input port of a switch 2340 using an instantaneous space switch 3890: Control time slot associated with an output port of a switch 2340 using an instantaneous space switch 3980: Control time slot associated with an input port of a switch 2340 using a latent space switch 3990: Control time slot associated with an output port of a switch 2340 using a latent space switch 4020: A first message sent by a source node to establish a direct connection to a sink node 4022: A field in message 4020 identifying a source node of a connection 4024: A field in message 4020 identifying a sink node of a connection 4026: A field in message 4020 indicating a specified number σ of time slots per time frame for a connection 4028: A field in message 4020 used by a switch 2340 to indicate the availability or otherwise of a simple path.

4030: A list in message 4020 of identifiers of allocated time slots for a simple path

4040: A second message sent by a source node to establish a compound path to a sink node

4042: A field in message 4040 identifying a source node of a connection

4044: A field in message 4040 identifying a sink node of a connection

4046: A field in message 4040 indicating a specified number σ of time slots per time frame for a connection

4048: A field in message 4040 to be used by a first switch 2340 to indicate the availability or otherwise of a path to an intermediate node.

4050: A list in message 4040 of identifiers of allocable time slots for an initial first segment of a compound path

4052: A field in message 4040 identifying an intermediate node

4054: A field used by a second switch 2340 to indicate availability or otherwise of a complementing second part of a compound path

4060: A list in message 4040 of identifiers of allocated time slots for a complementing second part of a compound path

4110: Inlet occupancy matrix used by a controller of a switch in a switch of the type of switching node 300 (2300, 2700)

4120: Outlet occupancy matrix used in conjunction with inlet-occupancy matrix 4110

4252, 4255, 4352, 4353, 4354, 4355: Paths from switches to sink nodes

4400: Table of compound paths from a source node to a sink node in an exemplary switching node

4412: Column in table 4400 identifying candidate switches for setting up a first part of a compound path

4414: Column in table 4400 identifying candidate intermediate nodes in a compound path

4416: Column in table 4400 identifying candidate switches for setting up a second part of a compound path

4418: Column in table 4400 identifying switches which may be used for communicating a result of setting up a compound path

4525: A set of nodes 2720 connecting to inlets of a switch 2740 (a set of source nodes 2712 connecting to a switch 2740), the sets 4525 are mutually orthogonal with an orthogonality index of 1

4535: A set of nodes 2720 connecting to outlets of a switch 2740 (a set of sink nodes 2718 connecting to a switch 2740)—sets 4535 of nodes 2720 connecting to switches 2740 of different columns of a same switch plane 2750 are mutually disjoint and sets 4535 of nodes 2720 connecting to switches 2740 of columns of a same index in different switch planes 2750 are mutually disjoint

4625: A set of nodes 2720 connecting to inlets of a switch 2740 (a set of source nodes 2712 connecting to a switch 2740)—sets 4625 of nodes 2720 connecting to switches 2740 of different columns of a same switch plane 2750 are mutually disjoint and sets 4625 of nodes 2720 connecting to switches 2740 of columns of a same index in different switch planes 2750 are mutually disjoint

4635: A set of nodes 2720 connecting to outlets of a switch 2740 (a set of sink nodes 2718 connecting to a switch 2740), the sets 4635 are mutually orthogonal with an orthogonality index of 1

4725: indices of nodes 2720 connecting to inlets of a switch 2740

4735: Indices of nodes connecting to outlets of a switch 2740

4920: Indices of nodes 2720

5180: Switch controller

5225: An exemplary set of nodes 2720 connecting to inlets of a switch 2740 (a set of source nodes 2712 connecting to a switch 2740), the sets 5125 are mutually orthogonal with an orthogonality index of 2

5235: An exemplary set of nodes 2720 connecting to outlets of a switch 2740 (a set of sink nodes 2712 connecting to a switch 2740)

5340: Latent space switch (5340A or 5340B)

5340A: Latent space switch with an ascending input rotator

5340B: Latent space switch with a descending input rotator

5342: Inlet of a latent space switch

5347: Input rotator

5348: Transit memory

5349: Output rotator

5358: outlet of a latent space switch 5340

5410: Inlet-outlet pair of a latent space switch

5420: switching latency

5430: A first connection scheme where a node connects to inlets of different indices of switches 2740 of different switch planes 2750 and connects to outlets of a same index of different switches 2740 of different switch planes 2750

5432: Latency under the first scheme if the input rotator 5347 is an ascending rotator

5434: Latency under the first scheme if the input rotator 5347 is a descending rotator

5440: A second connection scheme where a node connects to inlets of a same index of different switches 2740 of different switch planes 2750 and connects to outlets of different indices of switches 2740 of different switch planes 2750

5442: Latency under the second scheme if the input rotator 5347 is an ascending rotator

5444: Latency under the second scheme if the input rotator 5347 is a descending rotator

5610: Upstream channels from nodes 2720 to a latent space switch 5340A or 5340B

5611: Inlets of a latent space switch 5340A or 5340B

5620: Downstream channels from a latent space switch 5340A or 5340B to nodes 2720

5621: Outlets of a latent space switch 5340A or 5340B

5782: Internal ports for communicating with a node controller

5784: Internal traffic from ingress ports to outbound ports in a symmetrical node

5786: Internal traffic from inbound ports to egress ports in a symmetrical node

5788: Transit traffic from inbound ports to outbound ports in a symmetrical node

5794: Internal traffic from ingress ports to outbound ports in an asymmetrical node

5796: Internal traffic from inbound ports to egress ports in an asymmetrical node

5798: Transit traffic from inbound ports to outbound ports in an asymmetrical node

5809: Ingress ports of a node 2720

5810: Input ports, of a node 2720, connecting to a first switch plane 2750

5811: Input ports, of a node 2720, connecting to a second switch plane 2750

5812: Input ports, of a node 2720, connecting to a third switch plane 2750

5819: Egress ports of a node 2720

5820: Output ports, of a node 2720, connecting to a first switch plane 2750

5821: Output ports, of a node 2720, connecting to a second switch plane 2750

5822: Output ports, of a node 2720, connecting to a second switch plane 2750

5849: Switched path within a node 2720 from an ingress port to an egress port
5850: Switched path within a node 2720 from an ingress port to an output port 5820
5851: Switched path within a node 2720 from an ingress port to an output port 5821
5852: Switched path within a node 2720 from an ingress port to an output port 5822
5859: Switched path within a node 2720 from an input port 5810 to an egress port
5860: Switched path within a node 2720 from an input port 5810 to an output port 5820
5861: Switched path within a node 2720 from an input port 5810 to an output port 5821
5862: Switched path within a node 2720 from an input port 5810 to an output port 5822
5869: Switched path within a node 2720 from an input port 5811 to an egress port
5870: Switched path within a node 2720 from an input port 5811 to an output port 5820
5871: Switched path within a node 2720 from an input port 5811 to an output port 5821
5872: Switched path within a node 2720 from an input port 5811 to an output port 5822
5879: Switched path within a node 2720 from an input port 5812 to an egress port
5880: Switched path within a node 2720 from an input port 5812 to an output port 5820
5881: Switched path within a node 2720 from an input port 5812 to an output port 5821
5882: Switched path within a node 2720 from an input port 5812 to an output port 5822
5921: First channel of a simple path
5922: Second channel of a simple path
5941: First channel of a compound path
5942: Second channel of a compound path
5943: Third channel of a compound path
5944: Fourth channel of a compound path
6021: Any switched path 5850, 5851, 5852
6022: Any switched path 5860, 5861, 5862, 5870, 5871, 5872, 5880, 5881, 5882
6023: Any switched path 5859, 5869, 5879
6121: Any switched path 5850, 5851, 5852
6122: Any switched path 5859, 5869, 5879
6421: Index of an originating node 2720 (source node 2712)
6422: Index of a row of a matrix of switches of a switch plane 2750
6423: Index of a destination node 2720 (sink node 2718)
6720: Intermediate nodes 2720
6745: Group of switches 2740 of a switch plane 2750

The following reference numerals refer to steps of path setup processes in a switching node 2300 as described in FIGS. 68, 69, 70, and 71:
  6820, 6822, 6824, 6826, 6828, 6830, 6832, 6834, 6836, 6837, 6838, 6840, 6842 6920, 6922, 6924, 6926, 6928, 6930,
  7020, 7030, 7040,
  7120, 7122, 7124, 7126, 7128, 7130, 7132, 7134, and 7140.

Figure 72:
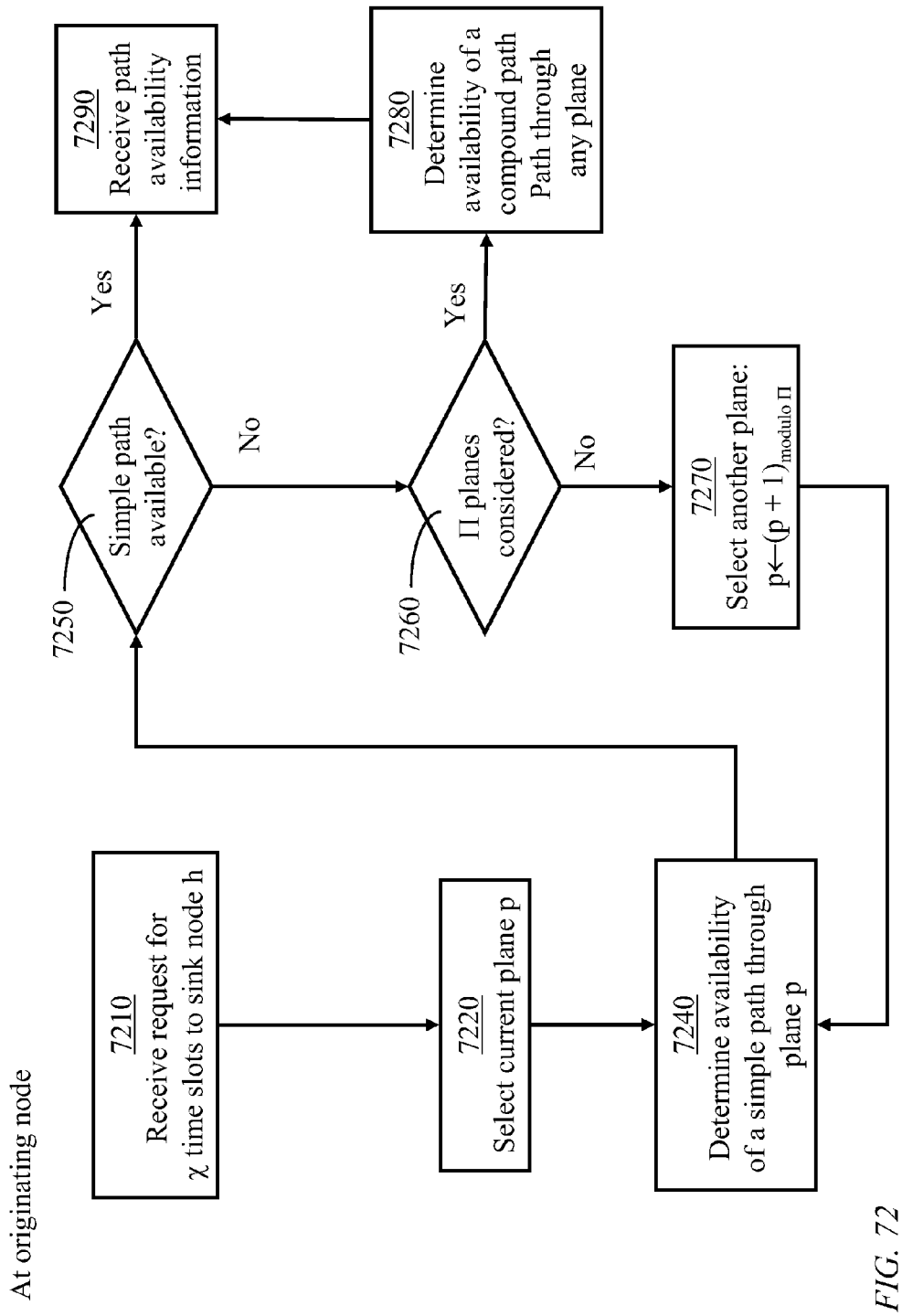
FIG. 72 illustrates a process of selecting simple paths and compound paths in a switching node having multiple switch planes, each switch plane comprising independent switches arranged in a matrix, in accordance with an embodiment of the present invention.
Figure 73:
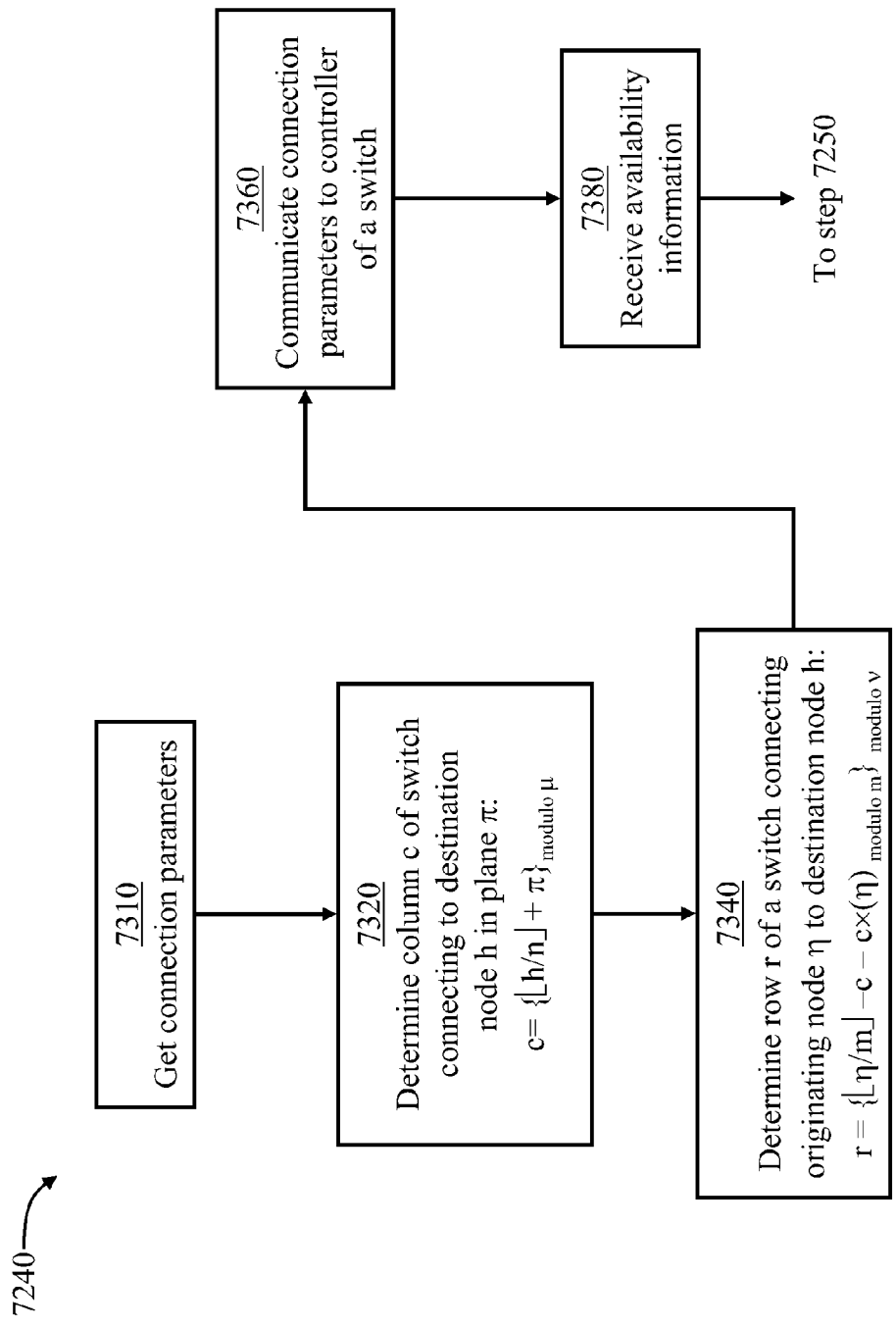
FIG. 73 details a step finding simple paths within the process of FIG. 72.
Figure 74:
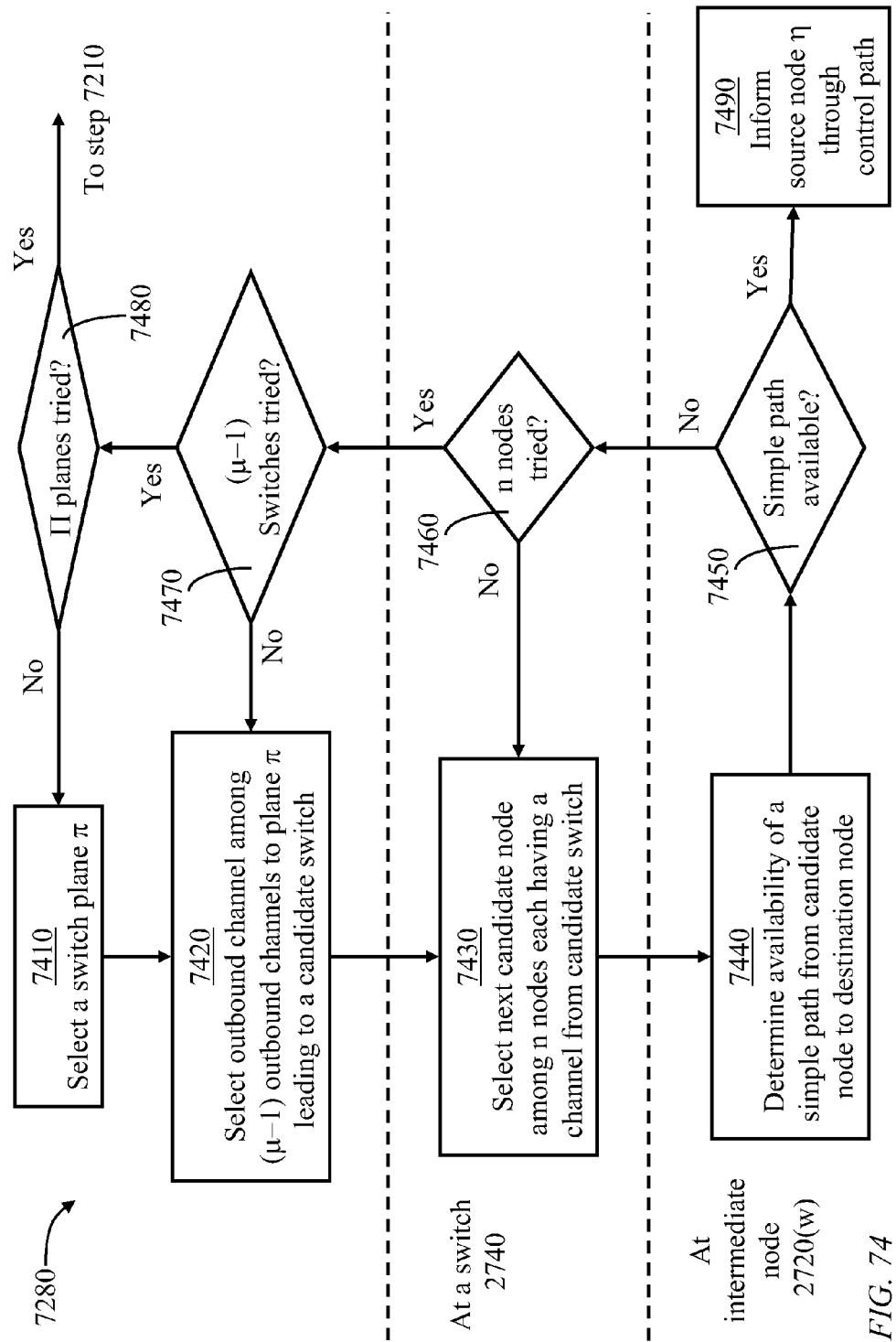
FIG. 74 details a step finding compound paths within the process of FIG. 72.

The following reference numerals refer to steps of path setup processes in a switching node 2700 as described in FIGS. 72, 73, and 74:
  7210, 7220, 7240, 7250, 7260, 7270, 7280, 7290, 7310, 7320, 7340, 7350, 7390, 7410, 7420, 7430, 7440, 7450, 7460, 7470, 7480, and 7490.
7500: Controller of a switch 2740
7510: Input-output interface between controller 7500 and components of switch 2740
7520: Processor (generally an assembly of processors which may be pipelined) of controller 7500
7530: Scheduling module
7532: Instructions memory device
7534: Processor-executable instructions (software/firmware)
7550: Occupancy-state memory
7614: A channel from a node 2320 to a switch 2340 in an arrangement where orthogonal sets of nodes 2320 connect to inlets of switches 2340 of a matrix 2310
7616: A channel from a switch 2340 to a node where a set of nodes connects to outlets of all switches 2340 of one column of matrix 2310

Switch Architecture

FIG. 1 illustrates a known switching node 100 comprising a plurality of switches 140, individually identified as 140(0) to 140($\mu$−1), a plurality of source nodes 112, individually identified as 112(0) to 112($m$−1), and a plurality of sink nodes 118 individually identified as 118(0) to 118($n$−1), where $\mu > 1$, $m > 1$, and $n > 1$. Each switch 140 is of dimension m×n, having m inlets and n outlets. Each source node 112 has a channel 106 from data sources and a channel 114 to each switch 140. Each sink node 118 has a channel 116 from each switch 140 and a channel 108 to data sinks. Thus, the number of source nodes 112 is limited by the number m of inlets of a switch 140 and the number of sink nodes is limited by the number n of outlets of a switch 140. If m=64, for example, the number of source nodes 112 would be limited to 64.

Figure 2:
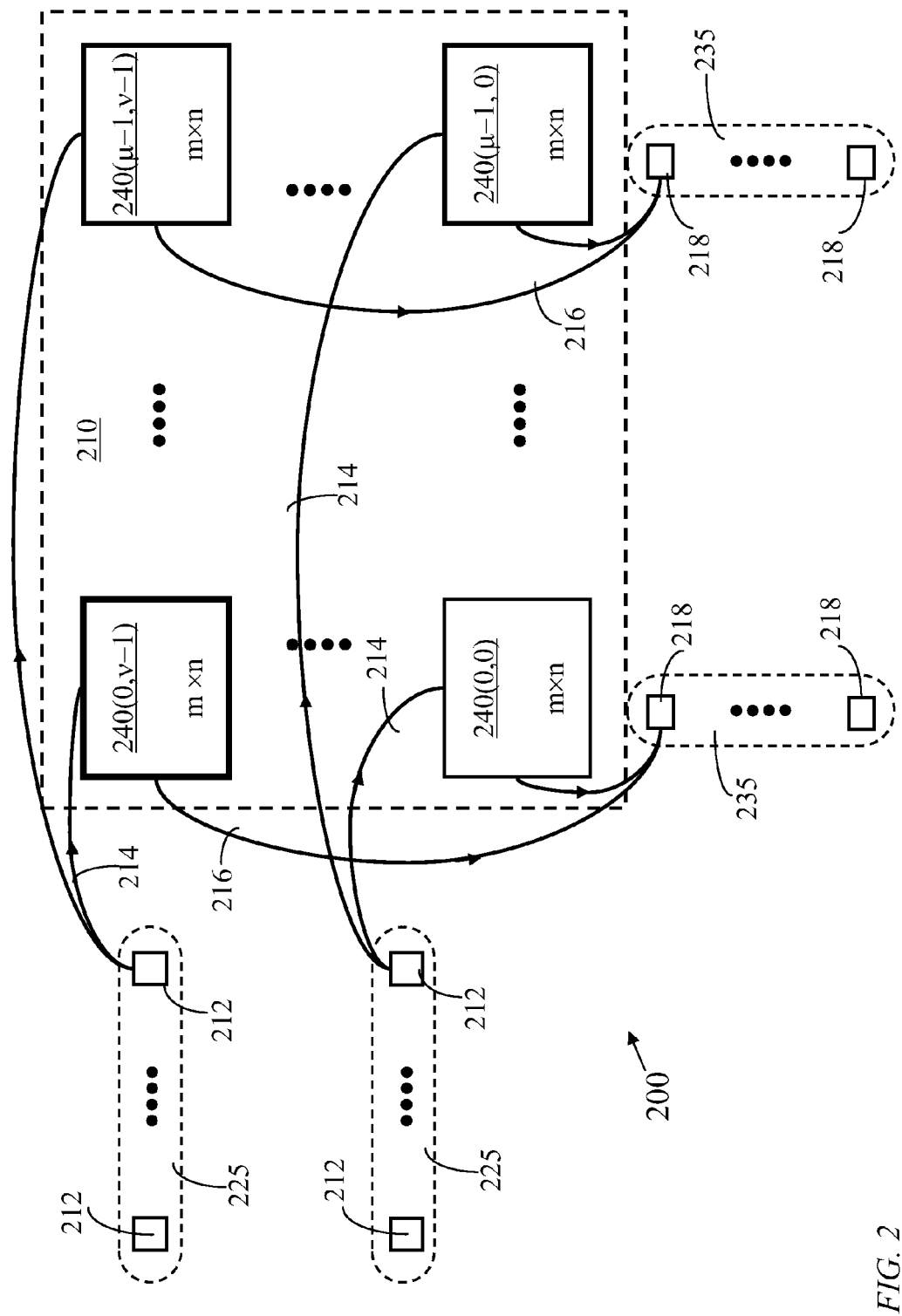
FIG. 2 illustrates a switching node comprising source nodes connecting to sink nodes through independent switches where each source node connects to a respective primary set of switches and each sink node connects to a respective secondary set of switches in accordance with an embodiment of the present invention.

FIG. 2 illustrates a switching node 200 in accordance with the present invention comprising a plurality of switches 240 each of dimension m×n (having m inlets and n outlets) arranged in a matrix 210 having $\mu > 1$ columns and $\nu > 1$ rows, a plurality of source nodes 212 each source node 212 having a channel 214 to an input port of each switch 240 in one of the $\mu$ columns, and a plurality of sink nodes 218 each sink node 218 associated exclusively with a column of the $\mu$ columns and having a channel 216 from an outlet of each switch 240 in the column. The maximum number of source nodes in a group 225 of source nodes connecting to a row in matrix 210 is m and the maximum number of sink nodes in a group 235 of sink nodes connecting to a column in matrix 210 is n. With $\mu$ columns and $\nu$ rows, the maximum total number of source nodes in switching node 200 is m×$\nu$ and the maximum total number of sink nodes is n×$\mu$. As will be described below, each source node 212 is preferably paired with a sink node 218 to form an integrated node. Thus, the values of m, n, $\mu$ and $\nu$ are preferably selected so that m×$\nu$=n×$\mu$.

With separate source nodes 212 and sink nodes 218, switching node 200 would be a rigid switch which would function properly only under spatial traffic balance where the traffic from each source node is directed equitably to sink-node groups connecting to the $\mu$ columns. A basic requirement of any telecommunications switch is that it provides internal paths from input to output regardless of the spatial distribution of traffic, i.e., the switch must be agile.

To render switching node 200 agile, each source node 212 may be integrated with a sink node 218 to form a node 212/218 which may then perform a transit function where needed. Additionally, each node may provide appropriate internal expansion to compensate for the capacity consumed in performing the transit function. With integrated source nodes and sink nodes, m×$\nu$=n×$\mu$. With m=n=256, for example, and μ=ν=32, the number of integrated nodes would be limited to 8192 and the total number of inlets of all switches would be 262144.

Figure 3:
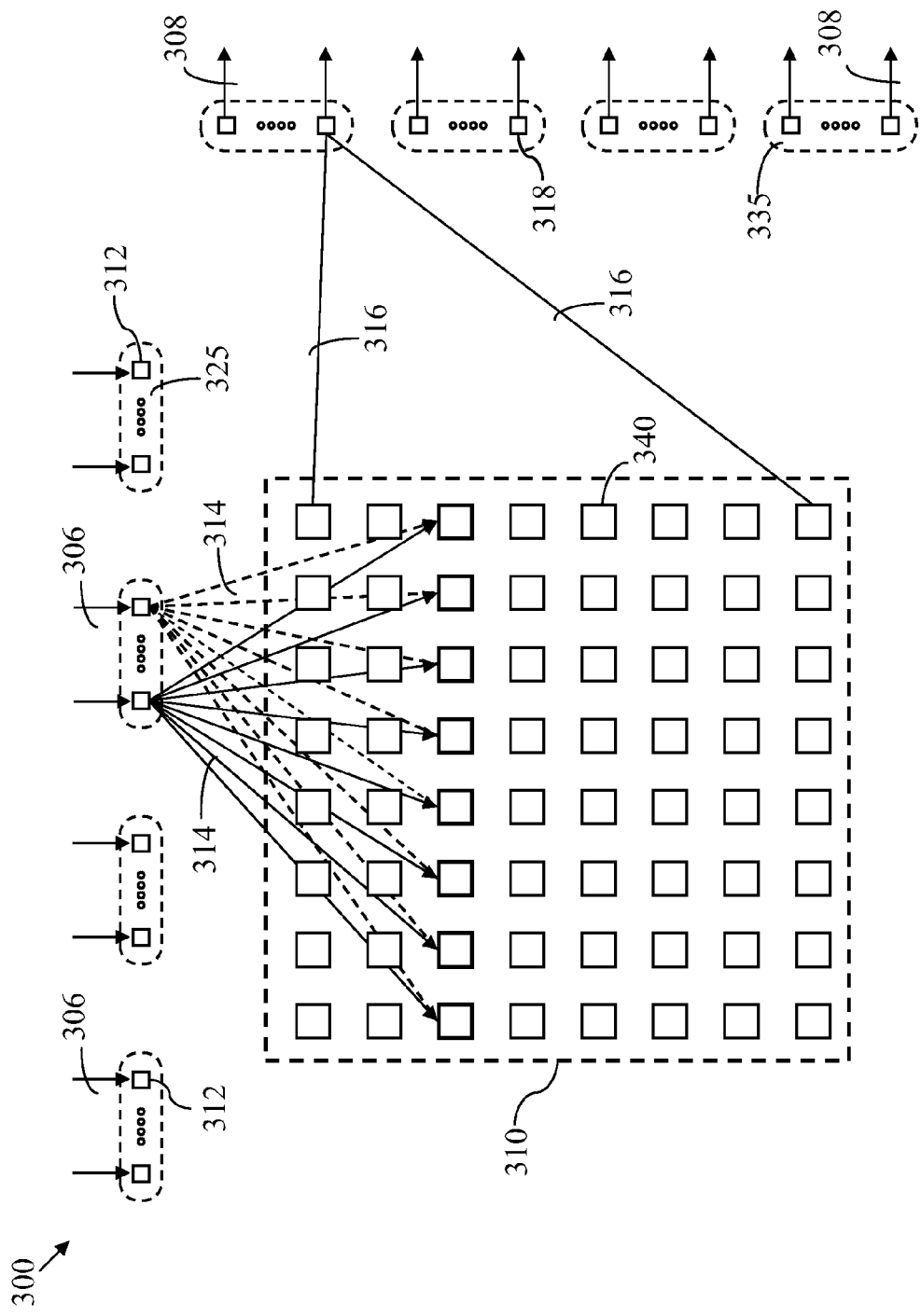
FIG. 3 illustrates grouping of nodes in a switching node and connectivity of a node group to a row in a matrix of switches in accordance with an embodiment of the present invention.
Figure 4:
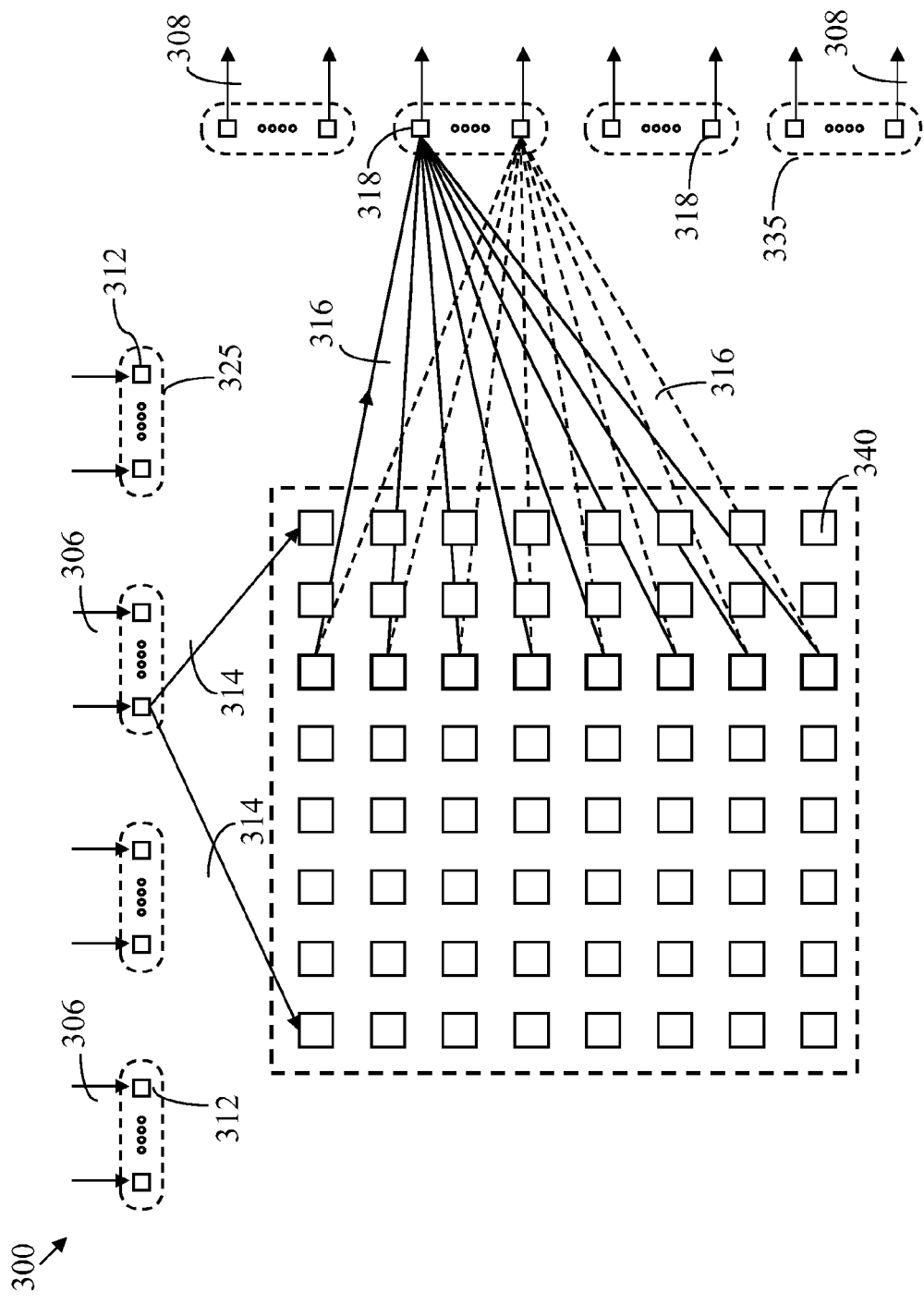
FIG. 4 illustrates a node group receiving data through switches of a column in the matrix of switches in the switching node of FIG. 3 in accordance with an embodiment of the present invention.

FIG. 3 illustrates a switching node 300 comprising a plurality of source nodes 312 arranged in groups 325 of source nodes, a plurality of independent switches 340 logically arranged into a matrix 310 having ν rows and μ columns, and a plurality of sink nodes 318 arranged in groups 335. None of the switches 340 is directly connected to any other switch 340. Each source node 312 directly connects to one switch in each column of switches 340. A source node 312 has an outbound channel 314 to each switch in a selected row of switches 340 in matrix 310 as indicated in FIG. 3. A sink node 318 has an inbound channel 316 from each switch in a selected column of switches 340 in matrix 310 as indicated in FIG. 4.

Figure 5:
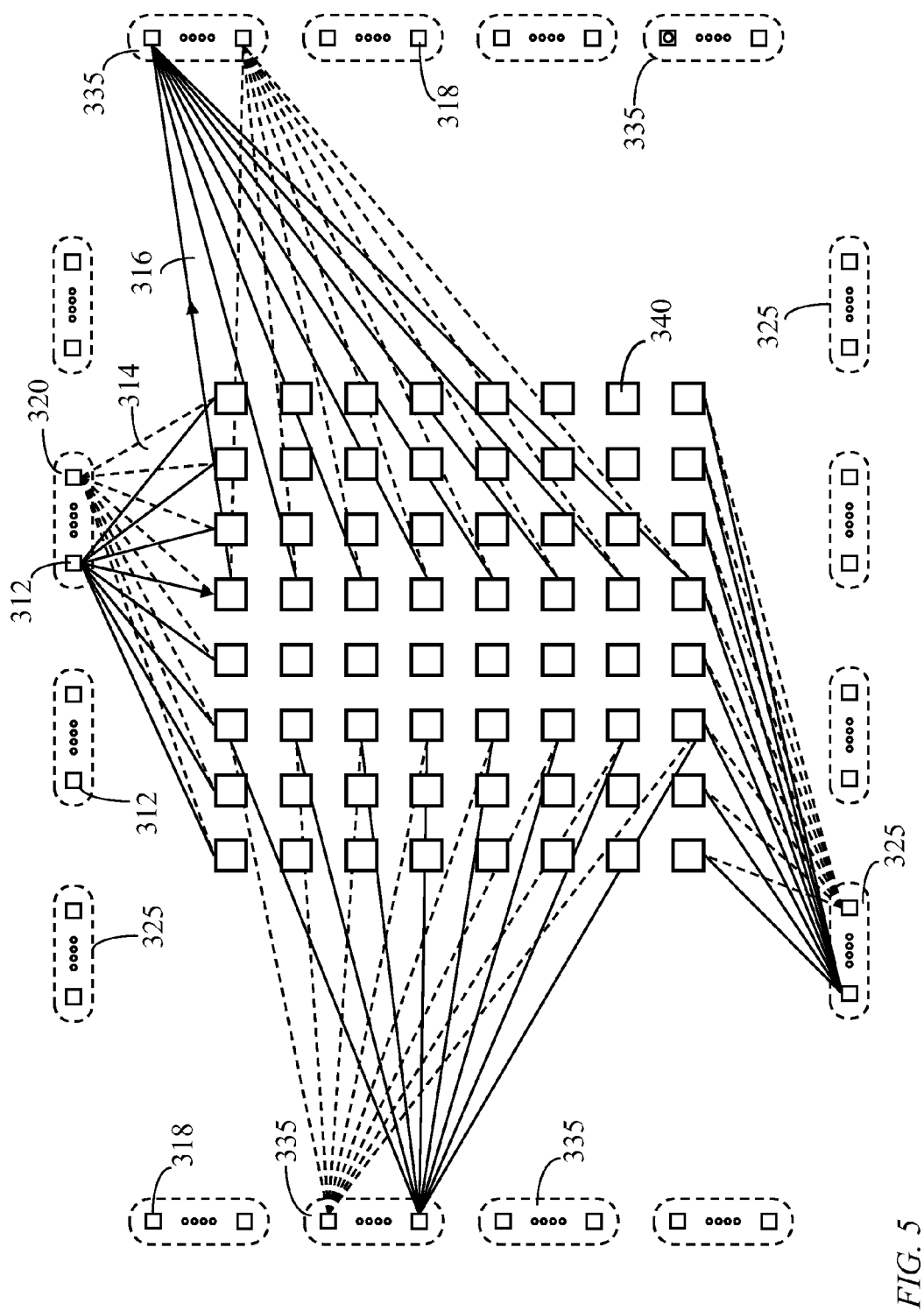
FIG. 5 illustrates a connectivity pattern of nodes to the switch matrix of the switching node of FIG. 3.

FIG. 5 illustrates connections from source nodes 312 of selected source-node groups 325 to switches 340 in respective rows and connections to sink nodes 318 of selected sink-node groups 335 from switches in respective columns. A simple path from a source node 312 to a sink node 318 traverses one switch 340. A compound path from a source node 312 to a sink node 318 traverses two switches 340 and an intermediate integrated node 312/318. With a typical spatial traffic-distribution imbalance, a proportion of traffic may be internally routed through compound paths each traversing two switches 340. There are (Ω−1) non-intersecting compound path from any source node to any sink node (from any node to any other node), where Ω is the lesser of μ and ν: Ω=min(μ,ν). Preferably μ=ν, hence Ω=μ.

Figure 6:
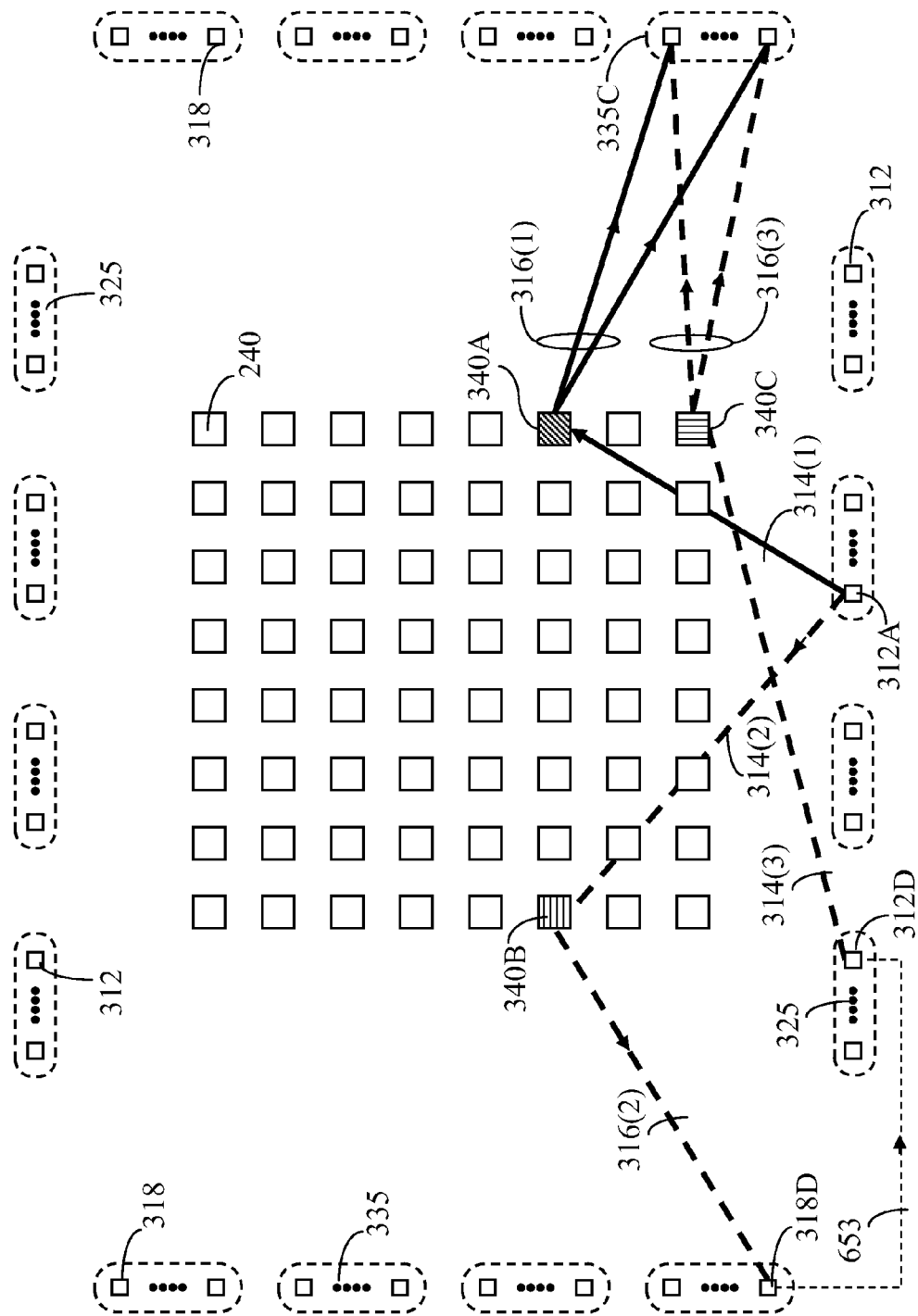
FIG. 6 illustrates a simple path and a compound path in the switching node of FIG. 3 in accordance with an embodiment of the present invention.

FIG. 6 illustrates a simple path from source-node 312A to any sink node 318 in sink-node group 335C traversing one switch 340A. The path traverses a channel 314(1) from source-node 312A to switch 340A and one of channels 316(1) from switch 340A to a sink node 318 in sink-node group 335C. A compound path from source node 312A to any sink node in sink-node group 335C traversing two switches 340B and 340C is illustrated. The compound path includes a channel 314(2) from source-node 312A to switch 340B, a channel 316(2) from switch 340B to node 312D/318D, a channel 314(3) from node 312D/318D to switch 340C, and a channel 316(3) to a destination node 318 in sink-node group 335C. Although source node 312D and sink node 318D are illustrated as separate entities, it is understood that they form an integrated node 312D/318D which provides an internal path 653 from channel 316(2) to channel 314(3). To enable the use of a compound path comprising two direct paths, each source node may be integrated with a sink node to form a node which provides a transit function. To compensate for the capacity consumed in providing the transit function each node may provide appropriate internal expansion.

Figure 7:
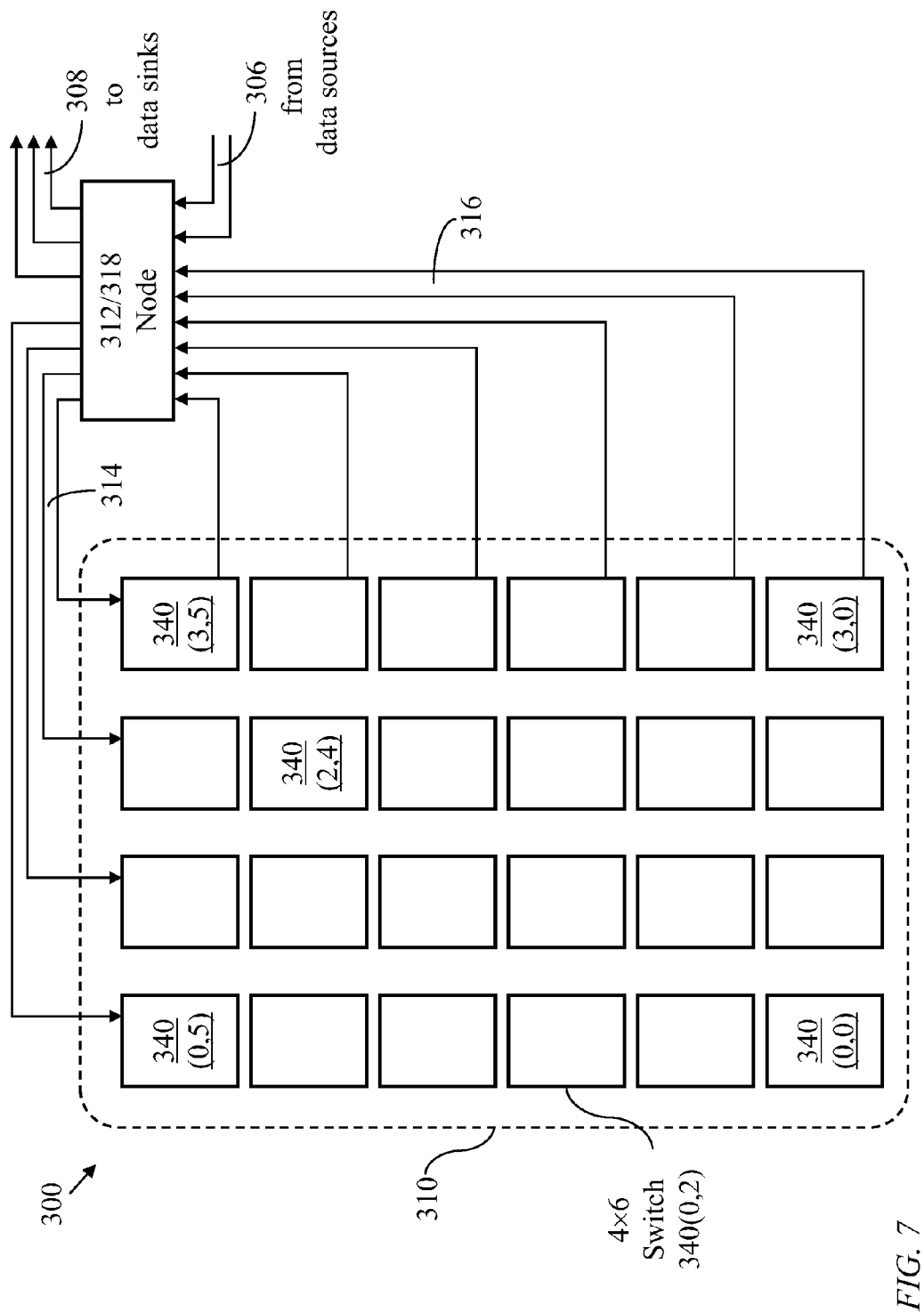
FIG. 7 illustrates a switching node having asymmetrical nodes in accordance with an embodiment of the present invention.

FIG. 7 illustrates a switching node 300 having asymmetrical nodes 312/318 (of which only one is illustrated) and switches 340 arranged in a core matrix 310 of four columns and six rows (μ=4, ν=6). Each switch 340 has 4 inlets and six outlets (m=4, n=6). Each node 312/318 supports four outbound channels 314, one to each switch 340 in a row of switches, six inbound channels 316, one from each switch in a column of switches 340, a number of ingress channels 306 from data sources, and a number of egress channels 308 to data sinks. A total of 24 nodes (μ×n nodes) may be interconnected through the core matrix 310.

Figure 8:
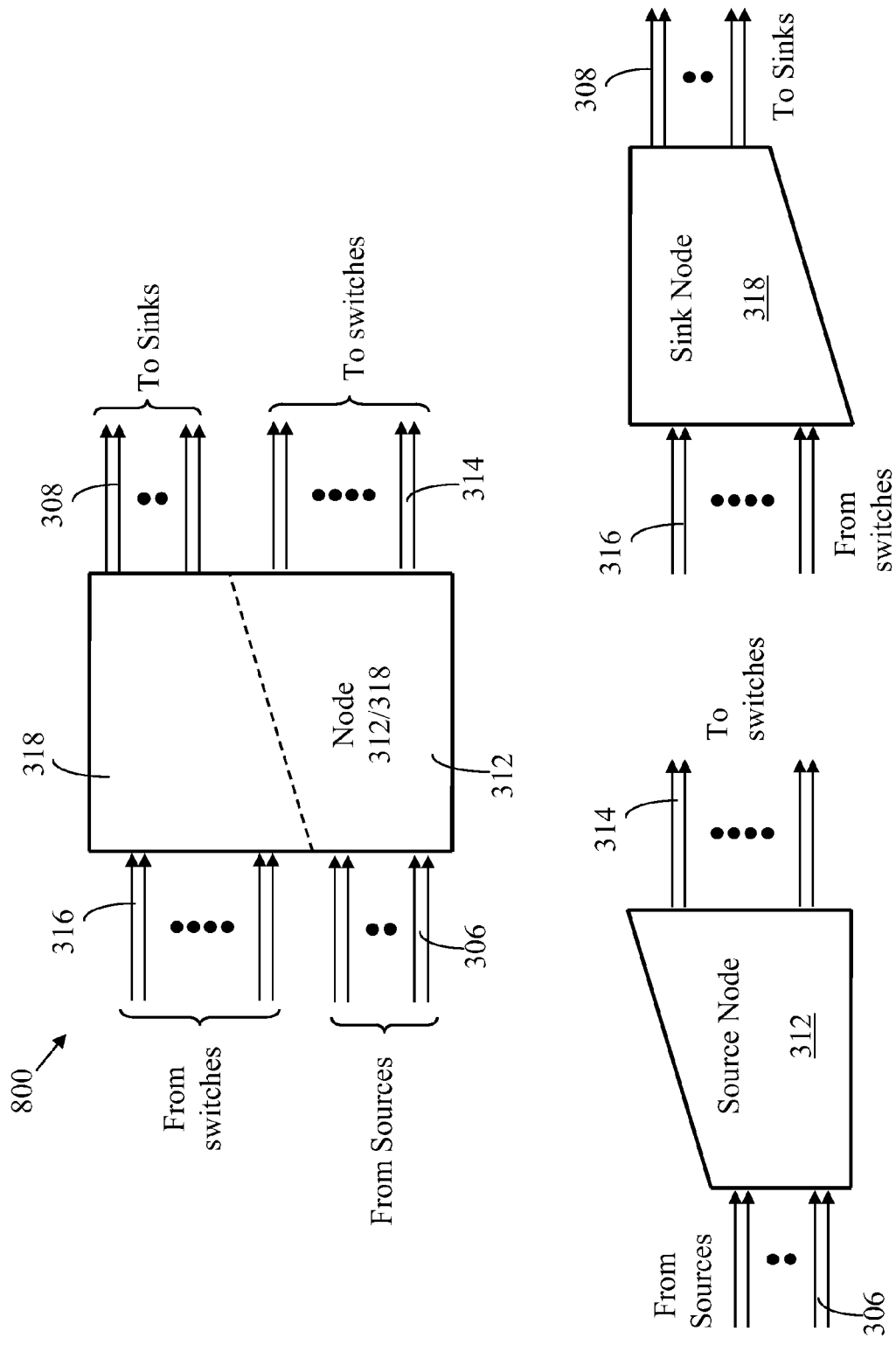
FIG. 8 illustrates an integrated source node and sink node with additional internal expansion to compensate for the potential use of compound paths in the switching node of FIG. 3 in accordance with an embodiment of the present invention.

FIG. 8 illustrates an integrated node 800 combining a source node 312 and a sink node 318, where individual channels 306, 308, 314, and 316 are of equal capacity; each operating at 10 Gigabits-per-second (Gb/s) for example. Source-node component 312 has more outbound channels 314 than ingress channels 306 and sink-node component 318 has more inbound channels 316 than egress channels 308. An internal-expansion ratio is defined herein as the ratio of inner capacity to outer capacity of the node. With channels 306, 308, 316, and 318 of equal capacity, the internal expansion ratio is the ratio of the total number of inner channels (314 and 316) to the total number of outer channels (306 and 308). With well-balanced spatial distribution, an additional internal expansion (i.e., an expansion ratio exceeding 1.0) may not be needed. In an extreme case, where the entire traffic from each source node 312 is directed to only one corresponding target sink node 318, most of the traffic would be routed through compound paths and the needed expansion in each node would be almost 2:1.

Preferably, the nodes are non-blocking in order to simplify the connection-setup process through the switching node 300. Furthermore, it is preferable that each non-blocking node be also contention-free. A node fabric satisfying this requirement may be based on a conventional shared-memory device where a number of input ports take turns in cyclically accessing the shared memory to write data blocks and a number of output ports cyclically access the shared memory to read data blocks. A data block written in the shared memory device by an input port may comprise data segments destined to different nodes. Thus, data blocks at each output of a node may be disassembled for switching to different outlets of the switch 340 leading to different destination nodes.

Figure 9:
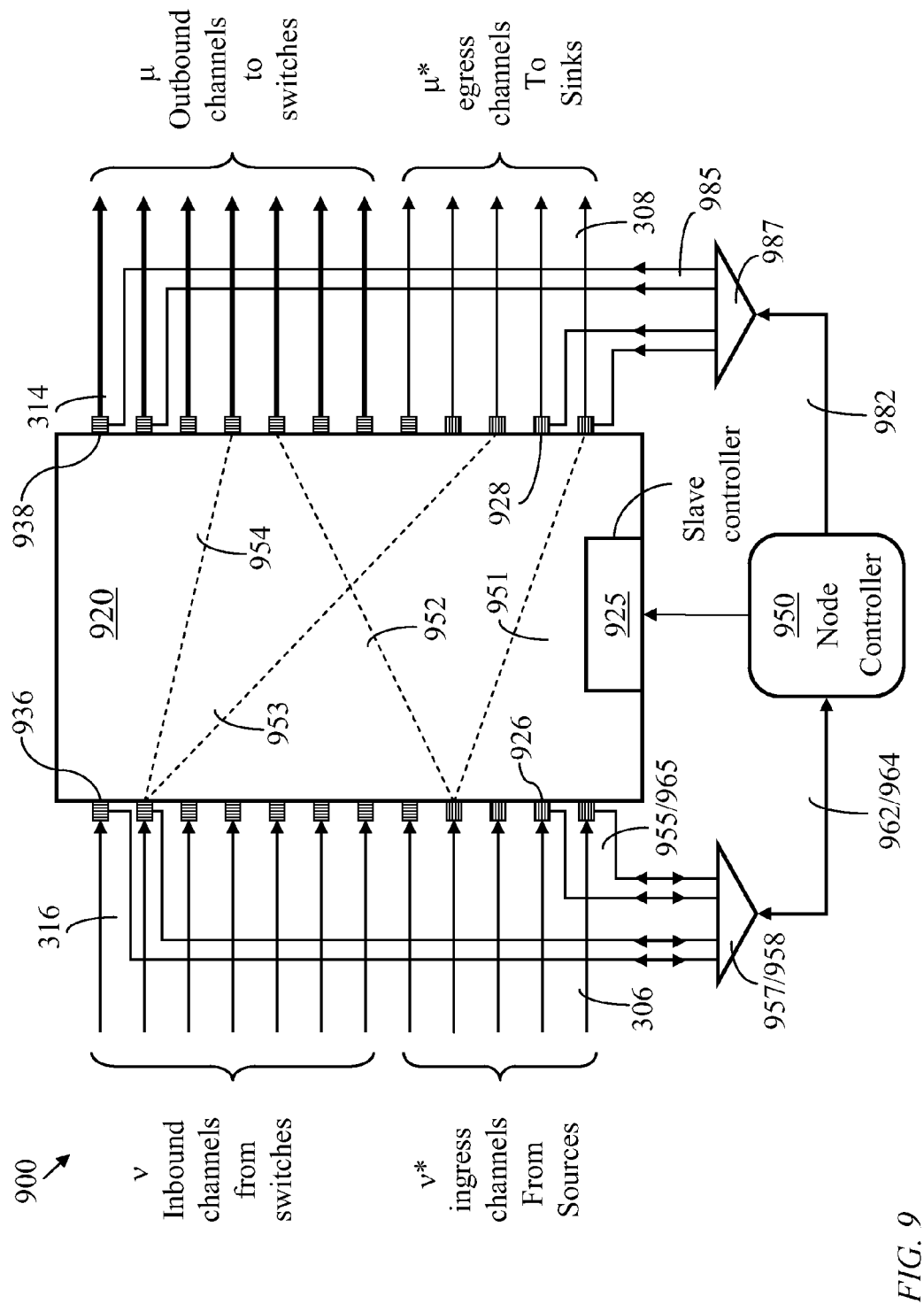
FIG. 9 illustrates internal connectivity of an integrated node having a node controller.

FIG. 9 illustrates a node 900 having a switching fabric 920 and a node controller 950. Node 900 has (ν*+ν) input ports and (μ*+μ) output ports. The input ports include ν* ingress ports 926 for receiving data from data sources through ingress channels 306 and ν inbound ports 936 for receiving data from switches through input channels 316. The output ports include μ* egress ports 928 for transmitting data to data sinks through egress channels 308 and μ outbound ports 938 for transmitting data to switches through output channels 314. Partitioning of input ports and output ports of a node connecting to multiple switch planes is described below with reference to FIG. 57.

Preferably, individual data segments may be switched from ingress ports 926 and inbound ports 936 to egress ports 928 (internal switched paths 951 and 953) while data blocks, each comprising a number of data segments may be switched from ingress ports 926 and inbound ports 936 to outbound ports 938 (internal switched paths 952 and 954).

Control signals from input ports 926 and 936 sent on control channels 955 are time multiplexed in temporal multiplexer 957 onto a channel 962 connecting to node controller 950. Control signals from node controller 950 to egress ports 928 and outbound ports 938 are transferred through a channel 982, a temporal demultiplexer 987 and channels 985. An outbound port 938 may insert control data received from node controller 950 in data blocks transferred to an inlet of a switch 340. The positions of control signals within data blocks transmitted by outbound ports 938 are selected to ensure contention-free transfer of control signals through corresponding switches 340 as will be described with reference to FIGS. 37-39.

Control signals from node controller 950 to an ingress port 926 or an inbound port 936 may be carried on a reverse path traversing a channel 964, temporal demultiplexer 958, and a channel 965. If each egress port 928 is paired with an ingress port 926, and each outbound port 938 is paired with an inbound port 936, control signals from the node controller 950 to the ingress ports 926 and inbound ports 936 may be transferred through corresponding paired output ports (egress ports and outbound ports) and the reverse paths traversing channel 964, demultiplexer 958, and channels 965 would not be needed.

Other arrangements for exchanging control signals between the node controller 950 and the input or output ports may be devised; for example the control signals may be transferred through the switching fabric instead of channels 955, 965, and 985.

Node controller 950 schedules connections from input ports (ingress and inbound ports) to output ports (egress and outbound ports) and instructs a configuration controller (slave controller) 925 associated with the switching fabric 920 to establish scheduled connections. Configuration controllers associated with switching fabrics are well known in the art.

Control Time Slots

The time domain is organized into time frames each divided into a number T, T>m, T>n, of time slots of equal duration. Each connection is allocated a respective number v of time slots per time frame, $0<\sigma<T$. A connection is preferably confined to a single outbound channel from a source node 312, which is also an inward channel to a switch 340. Control time slots from a node controller to a switch controller and vice versa may be transferred through dedicated control channels. Alternatively, a number $\Lambda_1$ of inward control time slots per time frame may be reserved in each outbound channel from a source node 312 (inward channel to a switch 340) and a number $\Lambda_2$ of outward control time slots per time frame may be reserved in each outward channel from a switch 340 (inbound channel to a sink node 318). Although the flow rate of control signals generated by a node controller may differ from the flow rate of control signals generated by a switch controller, it is preferable to set $\Lambda_1=\Lambda_2$. The number $\Lambda=\Lambda_1=\Lambda_2$ of inward (or outward) control time slots per time frame is determined as: $0<\Lambda \le \lfloor T/m \rfloor$, where $\lfloor a \rfloor$, denotes the integer part of real number "a". For example, with m=491 and T=1024, the number $\Lambda$ of inward control time slots per outbound channel (inward channel) from a node to a switch 340 need not exceed $\lfloor 1024/491 \rfloor=2$. A switch controller receives inward control signals during 491 time slots per time frame if $\Lambda=1$, or during 982 time slots per time frame if $\Lambda=2$. A switch controller transmits outward control signals during 491 time slots per time frame if $\Lambda=1$, or during 982 time slots per time frame if $\Lambda=2$.

Node Structure

In order to simplify the connection setup process, node 900 is preferably constructed as a contention-free shared memory switching device. In a shared memory switching device, however implemented, having a multiplicity of input ports and a multiplicity of output ports, the input ports cyclically gain WRITE-access to the shared memory and the output ports cyclically gain READ-access to the shared memory during successive time slots. During a WRITE-access time interval, an input port writes a data block containing data directed to one of the output ports of the node and during a READ-access time interval, an output port reads a data block containing data written by one of the input ports of the node. During a memory-access period each input port and each output port gains access to the shared memory.

To realize high efficiency, each input port may include an input memory organized into a number of logical queues where each logical queue is associated with one of the output ports of the node. During each time slot allocated to an input port, a data block may be transferred to the shared memory from a logical queue having sufficient data to fill a data block. With high variation of spatial traffic distribution, a logical queue, corresponding to a data stream of low flow rate, may take an excessive period of time to form a data block. It is therefore preferable that a logical queue be eligible for memory access if it meets one of two conditions (1) having sufficient waiting data to form a data block or (2) having a data segment that has been queued for a period of time that exceeds a predefined permissible waiting time.

Dual Granularity

Figure 10:
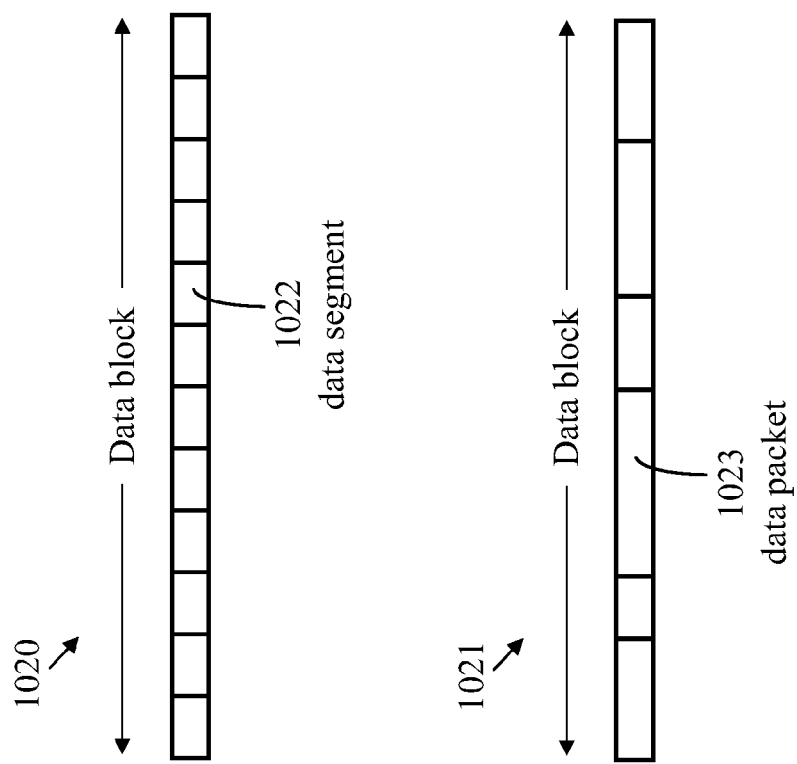
FIG. 10 illustrates a first data block comprising data segments of equal size, and a second data block comprising data packets of arbitrary sizes for use in an embodiment of the present invention.

FIG. 10 illustrates two forms, 1020 and 1021, of a data block. Each data block has a predefined size and may comprise data segments 1022 of equal size (data block 1020) or data packets 1023 of arbitrary sizes (data block 1021). Data block 1020 may include a NULL data segment and data block 1021 may include a NULL packet. It is preferable that each node be devised to permit switching both data blocks 1020 and finer data segments 1022 so that: data blocks 1020, each of which comprising a number of data segments 1022, may be switched from any input port 926, 936 to outbound ports 938 (internal switched paths 952 and 954 of FIG. 9) connecting to switches; and individual data segments may be transferred from any input port 926, 936 to egress ports 928 connecting to data sinks (internal switched paths 951 and 953 of FIG. 9). The node may also be adapted to form data blocks 1021 comprising data packets 1023 of arbitrary sizes.

Contention-free switching in a node is facilitated by switching entire data blocks 1020. Contention-free switching is highly desirable in establishing connections between nodes. Contention-free data-block switching is used for connections directed to an outbound port 938. However, data received at an ingress port 926 (from data sources) or at an inbound port 936 (from a switch 340) and directed to an egress port 928 may be switched as individual data segments. Therefore, switching node 300 preferably uses nodes providing both contention-free data-block switching and contention-based data-segment switching.

In accordance with an embodiment, an ingress port 926 receives data packets from data sources and organizes the packets in data segments 1022 of equal size. The ingress port 926 assembles data segments destined to sink nodes of a selected column in matrix 310 into data blocks 1020. An inbound port 936 receives data blocks 1020 from a switch 340 where a received data block 1020 may comprise data segments 1022 destined to different nodes. Data received at any input port 926, 936 of a node 900 may be directed to egress ports 928 of the node or to outbound ports 938 connecting to switches 340 for delivery to other nodes 900 (312/318).

Figure 11:
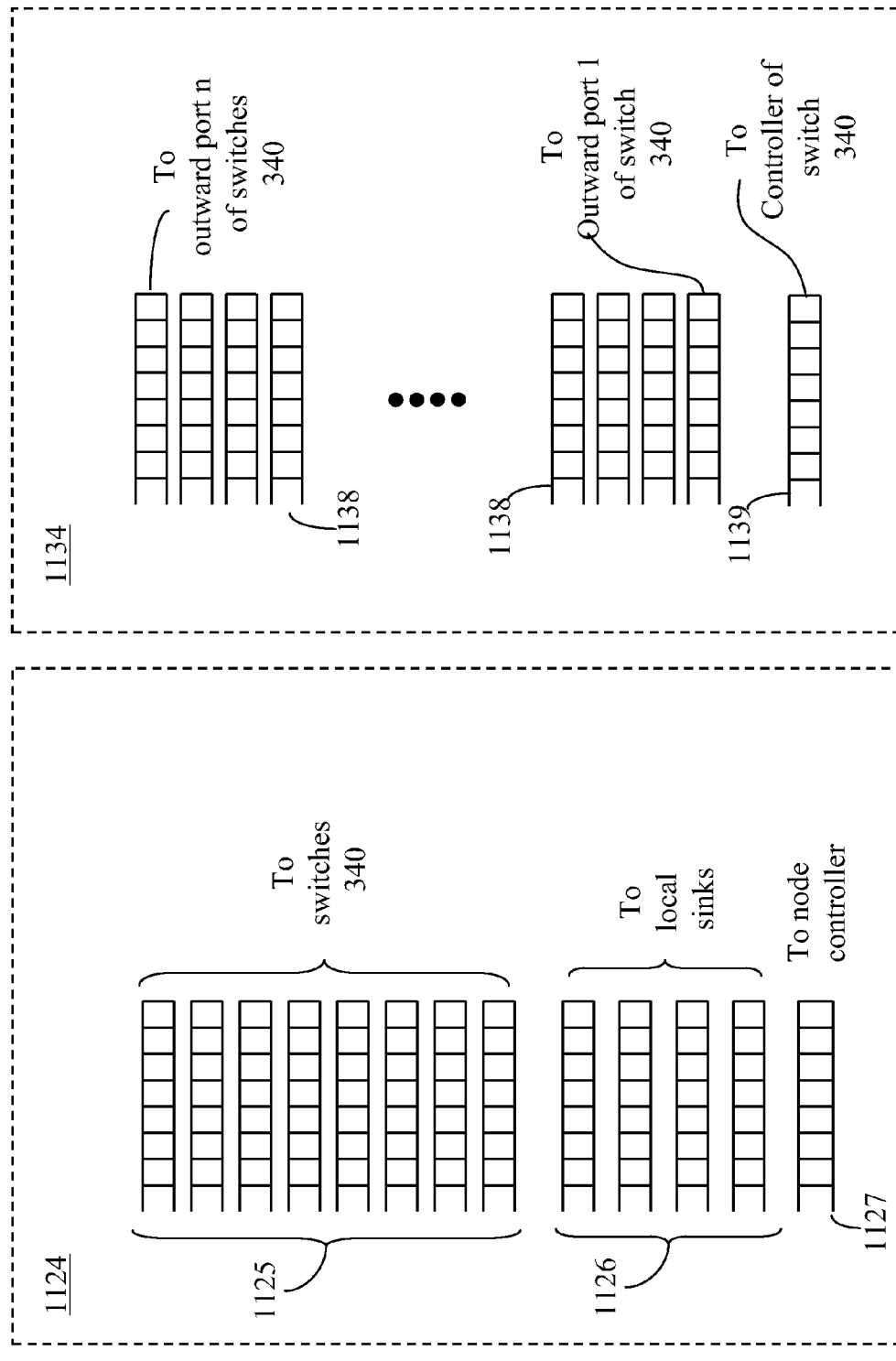
FIG. 11 illustrates logical input queues in an input memory at an input port of the node of FIG. 9, each logical input queue corresponding to an output port of the node, and logical output queues in an output memory at an outbound port of the node of FIG. 9, each logical output queue corresponding to an outlet of a switch to which the outbound port of the node connects, in accordance with an embodiment of the present invention.

FIG. 11 illustrates organization of a memory 1124 at each input port 926 or 936 of a node 900 into a plurality of logical queues with each logical queue corresponding to an output port of the node 900. Logical queues 1125 correspond to outbound ports 938 connecting to switches 340. Logical queues 1126 correspond to egress ports 928 connecting to data sinks. A logical queue 1127 corresponds to node controller 950.

An ingress port 926 receives data packets from data sources and forms data segments of equal size to facilitate switching through node 900. Each data segment received at an ingress port 926 is placed in a logical queue 1125/1126/1127 according to a destination of the data segment. Data segments destined to controller 950 are placed in logical queue 1127. Data segments destined to an egress port 928 are placed in a logical queue 1126 corresponding to the egress port and may be switched individually. Data segments destined to an outbound port 938 are placed in a logical queue 1125 corresponding to the outbound port and may be aggregated into data blocks 1020 each comprising a number of data segments 1022 not exceeding a predefined limit. The predefined limit is preferably equal to the number of output ports of the node.

An inbound port 936 of a specific node 900 receives data blocks 1020 from outbound ports 938 of other nodes 900 through switches 340. A data block 1020 received at an inbound port 936 and destined to another node 900 may be placed in a logical queue 1125 corresponding to the destination node. Data segments 1022 of a data block 1020 received at an inbound port 936 and destined to more than one node 900 may be placed in logical queues 1125 corresponding to the destination nodes. If the data block also contains data segments destined to local egress ports 928 of the specific node 900, the data segments are placed in corresponding logical queues 1126. Data segments of a data block received at an inbound port 936 and destined exclusively to egress ports 928 of the specific node 900 may be placed in logical queues 1126 corresponding to egress ports 928 of the specific node 900.

The node switching fabric 920 may be a conventional shared-memory fabric or, preferably, a versatile rotating-access fabric as will be described with reference to FIG. 13. With a conventional shared-memory fabric, the data segments 1022 of a data block 1020 may be switched simultaneously, without contention, to an outbound port 938. With a rotating-access fabric, the data segments 1022 of a data block 1020 may be switched consecutively, and without contention, to an outbound port 938.

Data segments received at any input port 926, 936 of a node and destined to egress ports 928 (hence to data sinks) of the node are preferably switched competitively, hence requiring a scheduling process for potential contention resolution.

A specific outbound port 938 of a specific node 900 has a channel 314 to a specific switch 340. The specific switch 340 has outward channels to a number of sink nodes 318 in a specific sink-node group 335. An output memory 1134 provided at the specific outbound port 938 is organized into a number of logical queues 1138, each corresponding to an outlet of the specific switch 340, and a logical queue 1139 corresponding to a controller of the specific switch 340. Data segments 1022 of a data block 1020 transmitted from the specific outbound port 938 to the specific switch 340 are switched through the specific switch 340 to the sink nodes 318 of the specific sink-node group 335 according to a temporal matching process and data segments may be delayed at the output memory 1134 due to contention.

As described earlier, a source node 312 and a sink node 318 are preferably integrated into a node 900. A data segment received at a specific sink node 318, associated with a specific node 900, may be directed to an egress port 928 of the specific node 900 or to an outbound port 938 of the specific node 900 to be directed to a switch 340.

Figure 12:
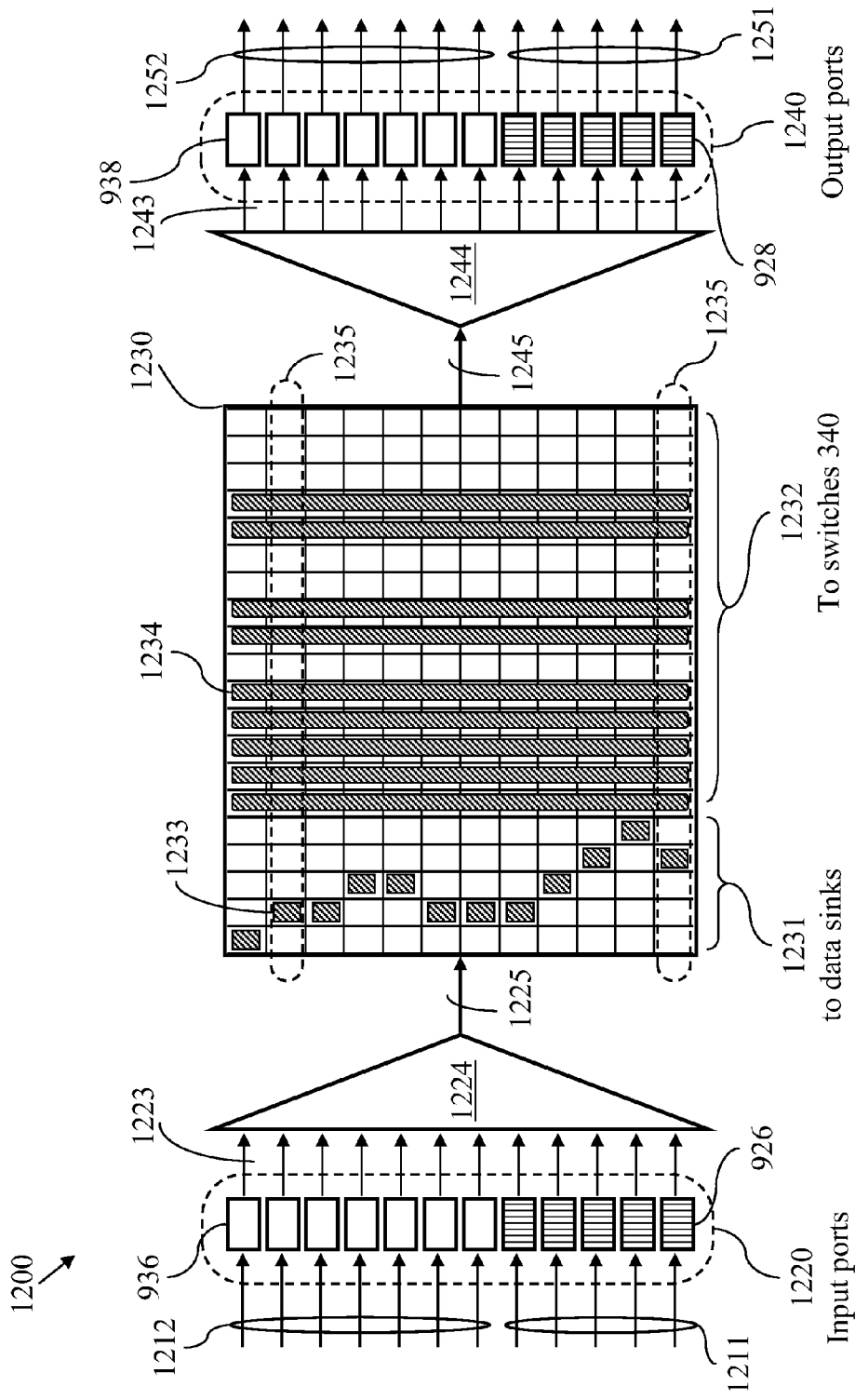
FIG. 12 illustrates a structure of a node providing both contention-free switching of data-blocks and contention-based switching of finer data segments in accordance with an embodiment of the present invention.

FIG. 12 illustrates a node 1200 comprising a plurality of input ports 1220, a temporal multiplexer 1224, a shared memory 1230, a temporal demultiplexer 1244, and a plurality of output ports 1240. The input ports 1220 may be functionally divided into ingress ports 926 receiving data from data sources through ingress channels 1211 and inbound ports 936 receiving data, directly or indirectly, from other nodes through inbound channels 1212. The output ports 1240 may be functionally divided into egress ports 928 transmitting data to data sinks through egress channels 1251 and outbound ports 938 transmitting data, directly or indirectly, to other nodes through outbound channels 1252. There are five ingress ports 926, seven inbound ports 936, five egress ports 928, and seven outbound ports 938 in the exemplary structure of FIG. 12.

Shared memory 1230 is organized into two sections 1231 and 1232. Shared memory 1230 is a wide memory comprising a plurality of memory devices 1235. Each memory device 1235 is organized into a number of memory cells, associated with section 1231, equal to the number of egress ports 928 and a number of memory cells, associated with section 1232, determined by the capacity (depth) of the memory device 1235. With identically organized memory devices 1235, a column of cells, having one cell from each memory device 1235, holds data segments destined to a common output port 1240. However, there are two major differences between a column in section 1231 and a column in section 1232. The first difference is that a column in section 1231 may hold data segments written by different input ports 1220 while a column in section 1232 holds data segments written by a single input port 1220 and forming a data block. The second difference is that data segments in a specific column in section 1231 are directed to a specific output port corresponding to the specific column, i.e., there is one-to-one correspondence between a column in section 1231 and an output port, while data segments in a given column in section 1232 may be directed to any output port 1240; the destination of a data block in a column in section 1232 is unrelated to the position of the column in memory device 1230. Consequently, there may be several columns in section 1232 holding data directed to a specific output port 1240, but only one column in section 1231 holding data directed to the specific output port 1240. There are 12 output ports 1240 and, therefore, section 1231 may include 12 columns. It is preferable however to limit data-segment switching through section 1231 to data directed to egress ports 928 only, in which case only five columns in section 1231 need be dedicated to the egress ports 928 on a one-to-one basis.

In the exemplary arrangement of FIG. 12, the number of columns in section 1231 is selected to be five. Each column in section 1231 may hold 12 data segments. FIG. 12 illustrates 12 data segments 1233 which may be written by a single input port 1220 and directed to the five egress ports, with one data segment directed to a first egress port, five data segments directed to a second egress port, three data segments directed to a third egress port, two data segment directed to a fourth egress port, and one data segment directed to a fifth egress port.

Temporal multiplexer 1224 cyclically connects each channel 1223 from an input port 1220 (926/936) to shared memory 1230, through bus 1225, to write data segments 1233 in different rows, but arbitrary columns, in section 1231 or a data block 1234 in one column in section 1232. Temporal demultiplexer 1244 cyclically connects each output port 1240 (928/938) to shared memory 1230, through bus 1245 and a channel 1243, to read data segments in a column in section 1231 corresponding to the output port, or a data block 1234, in section 1232, directed to the output port.

It is noted that, because each column in section 1231 is dedicated to a corresponding output port (egress port in the illustrated example), output contention may take place and, hence, data segments may experience variable queueing delay in input ports 1220. A data block 1234, may be written by any input port in any available (unoccupied) column position in section 1232 of memory device 1230. Thus, Shared-memory node 1200 provides contention-free switching for data blocks 1234 and contention-based switching for finer data segments 1233.

Figure 13:
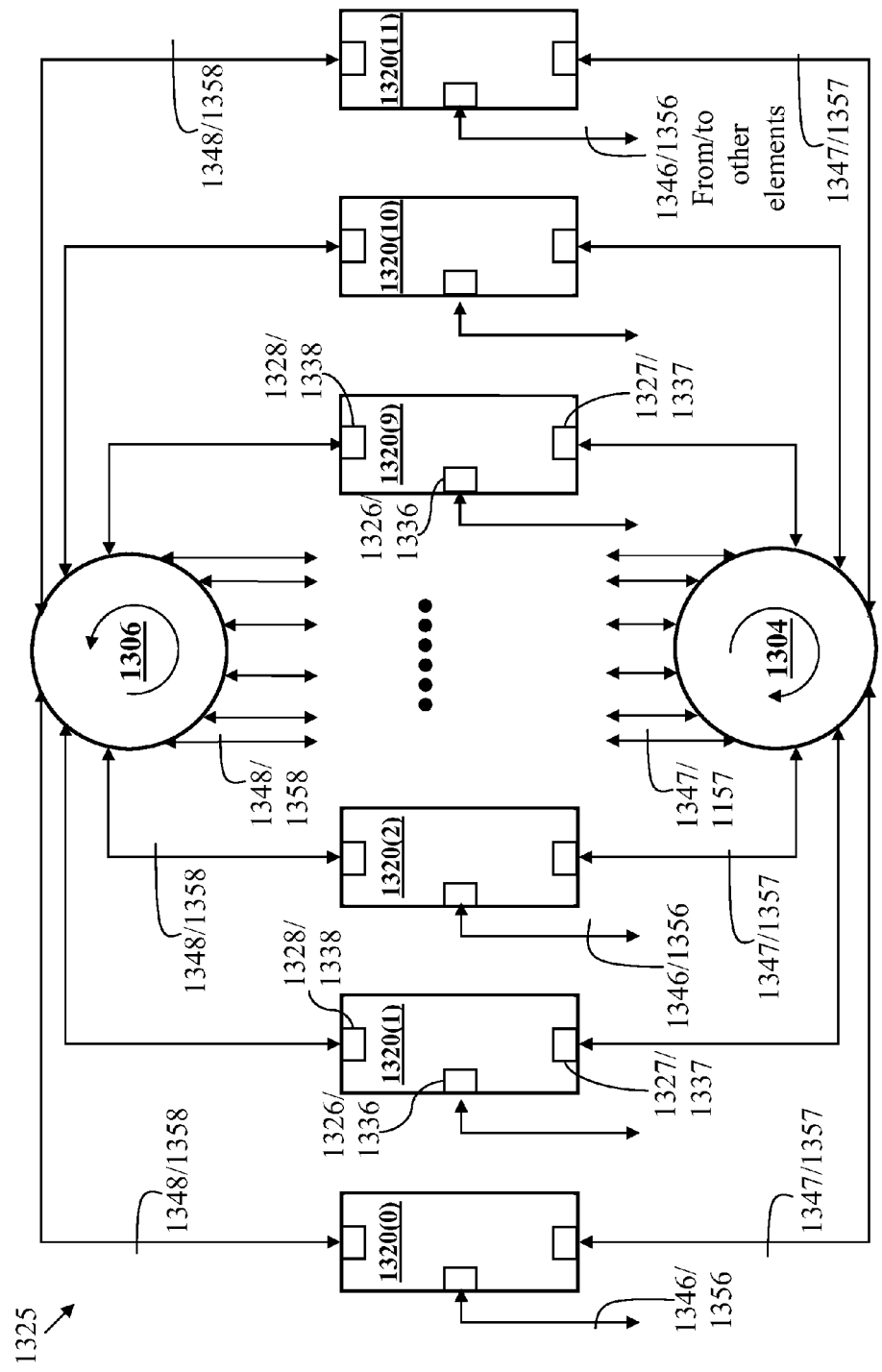
FIG. 13 illustrates an exemplary node comprising an array of node elements connecting to a rotator pair and providing both contention-free and contention-based switching in accordance with an embodiment of the present invention.

FIG. 13 illustrates an exemplary node 1325 for use as an integrated node 312/318 in switching node 300. Node 1325 comprises a bank of node elements 1320, a clockwise rotator (ascending rotator) 1304 and a counterclockwise rotator (descending rotator) 1306. The number of node elements 1320 may be limited due to certain design consideration to 64 or so. The exemplary node 1325 has 12 node elements 1320 individually identified as 1320(0), 1320(1), . . . , 1320(11). Each of the two rotators 1304 or 1306 has a number of rotator input ports at least equal to the number of node elements 1320 and a number of rotator output ports at least equal to the number of node elements 1320. Each node element 1320 has three input ports (1326, 1327, and 1328) and three output ports (1336, 1337, and 1338). FIG. 13 illustrates combined input-output ports 1326/1336, 1327/1337, and 1328/1338 with corresponding dual channels 1346/1356, 1347/1357, and 1348/1358 respectively; the ports and channels are illustrated individually in FIG. 14. Input port 1326 is an access port connecting to a channel 1346 from data sources or other nodes. Input port 1327 is an internal port connecting to a channel 1347 from ascending (clockwise) rotator 1304 and input port 1328 is an internal port connecting to a channel 1348 from descending (counterclockwise) rotator 1306. An access output port 1336 connects to a channel 1356 to data sinks or other nodes, an internal output port 1337 connects to channel 1357 to ascending rotator 1304, and an internal output port 1338 connects to a channel 1358 to descending rotator 1306. Input ports 1326 may be divided into ingress ports 926 and inbound ports 936 (FIG. 9). Output ports 1336 may be divided into egress ports 928 and outbound ports 938. Node 1325 may provide contention-free switching, contention-based switching, or a combined contention-free and contention-based switching. A node 1325 operated as a contention-based switching device is disclosed in U.S. Pat. No. 7,567,556 entitled "Circulating Switch" (European Patent EP1450524).

Figure 14:
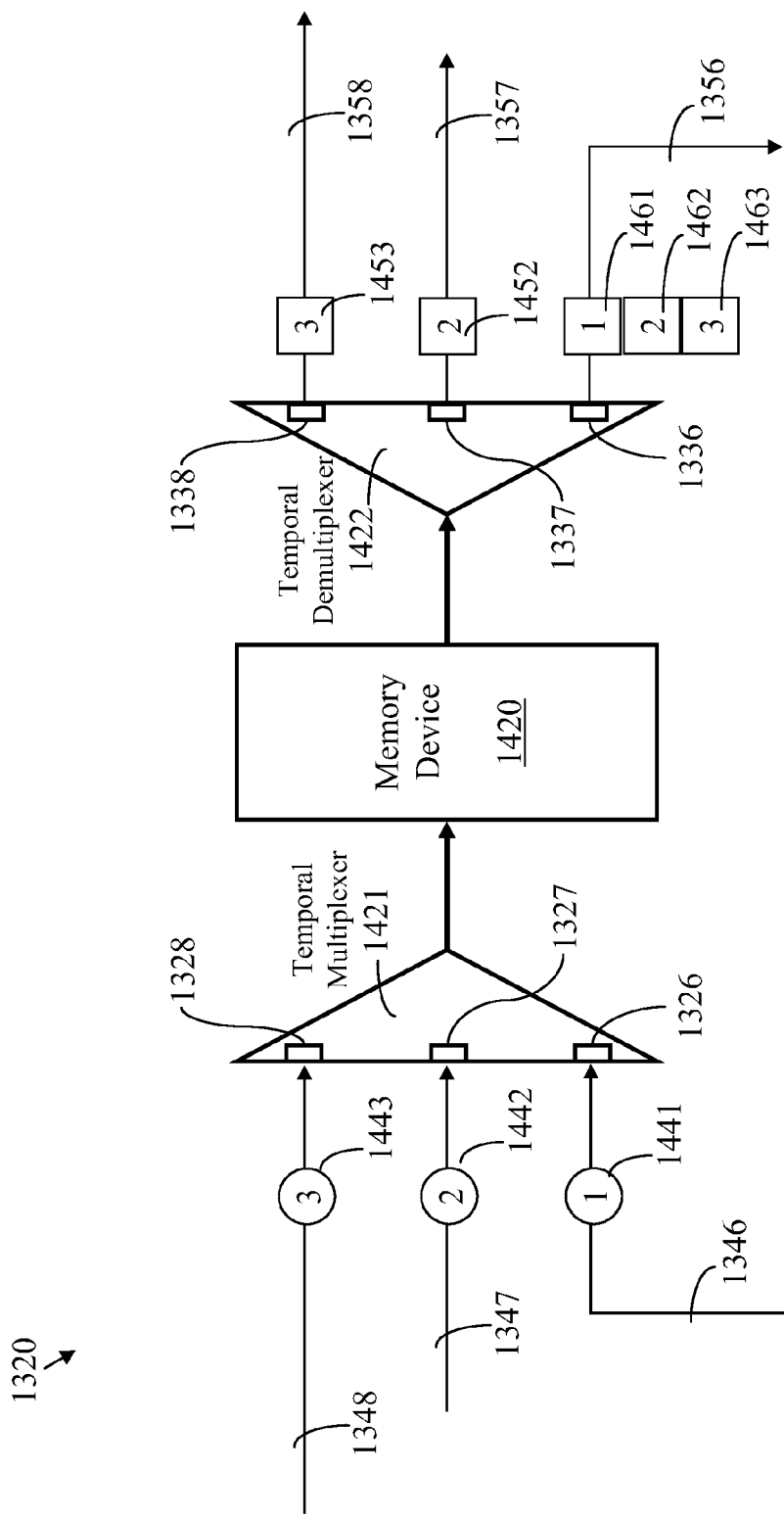
FIG. 14 illustrates a node element in the node of FIG. 13, the node element having a temporal multiplexer, a memory device, and a temporal demultiplexer.

FIG. 14 further illustrates a node element 1320 comprising a memory device 1420 connecting to a temporal multiplexer 1421 and a temporal demultiplexer 1422. Temporal multiplexer 1421 connects to input ports 1326, 1327, and 1328. An input channel 1346 from data sources connects to input port 1326, an internal input channel 1347 from the ascending rotator 1304 connects to input port 1327, and an internal input channel 1348 from the descending rotator 1306 connects to input port 1328. Data segments from channels 1346, 1347, and 1348 are cyclically transferred through multiplexer 1421 to the memory device 1420. Temporal demultiplexer 1422 connects to output ports 1336, 1337, and 1338. An output channel 1356 connects to output port 1336, an internal output channel 1357 connects output port 1337 to the ascending rotator 1304, and an internal output channel 1358 connects output port 1338 to descending rotator 1306. Demultiplexer 1422 cyclically transfers data from the memory device 1420 to channels 1356, 1357, and 1358.

A fresh data segment 1441 received from a data source at a specific node element is marked as being in state "1", a data segment 1442 received from a data source connecting to a different node element through one of the two rotators, 1304 and 1306, is marked as being in state "2", and a data segment 1443 received from a data source connecting to another node element through an intermediate node element is marked as being in state "3". The data segment state ("1", "2", or "3") is indicated in a circle at input and in a square at output of node element 1320 of FIG. 14. An input data segment 1441 directed to a data sink connecting to the specific node element may be directly transferred to output channel 1356 and is referenced as output data segment 1461 in FIG. 14. An input data segment 1441 directed to a data sink connected to a destination node element 1320 is transferred through internal output channel 1357 leading to the ascending rotator 1304 or internal output channel 1358 leading to the descending rotator 1306, and is referenced as output data segment 1452. Either of the two rotators 1304 or 1306 may transfer the data segment directly to the destination node element or deliver the data segment to an intermediate node element.

An input data segment 1442 may be directed to a local data sink connected to the specific node element (indicated as output data segment 1462) or directed to one of the two rotators (referenced as output data segment 1453) for delivery to the node element connecting to the destination data sink. An input data segment 1443 may only be directed to a local data sink connected to the specific node element (referenced as output data segment 1463) and is transferred through output channel 1356.

Figure 15:
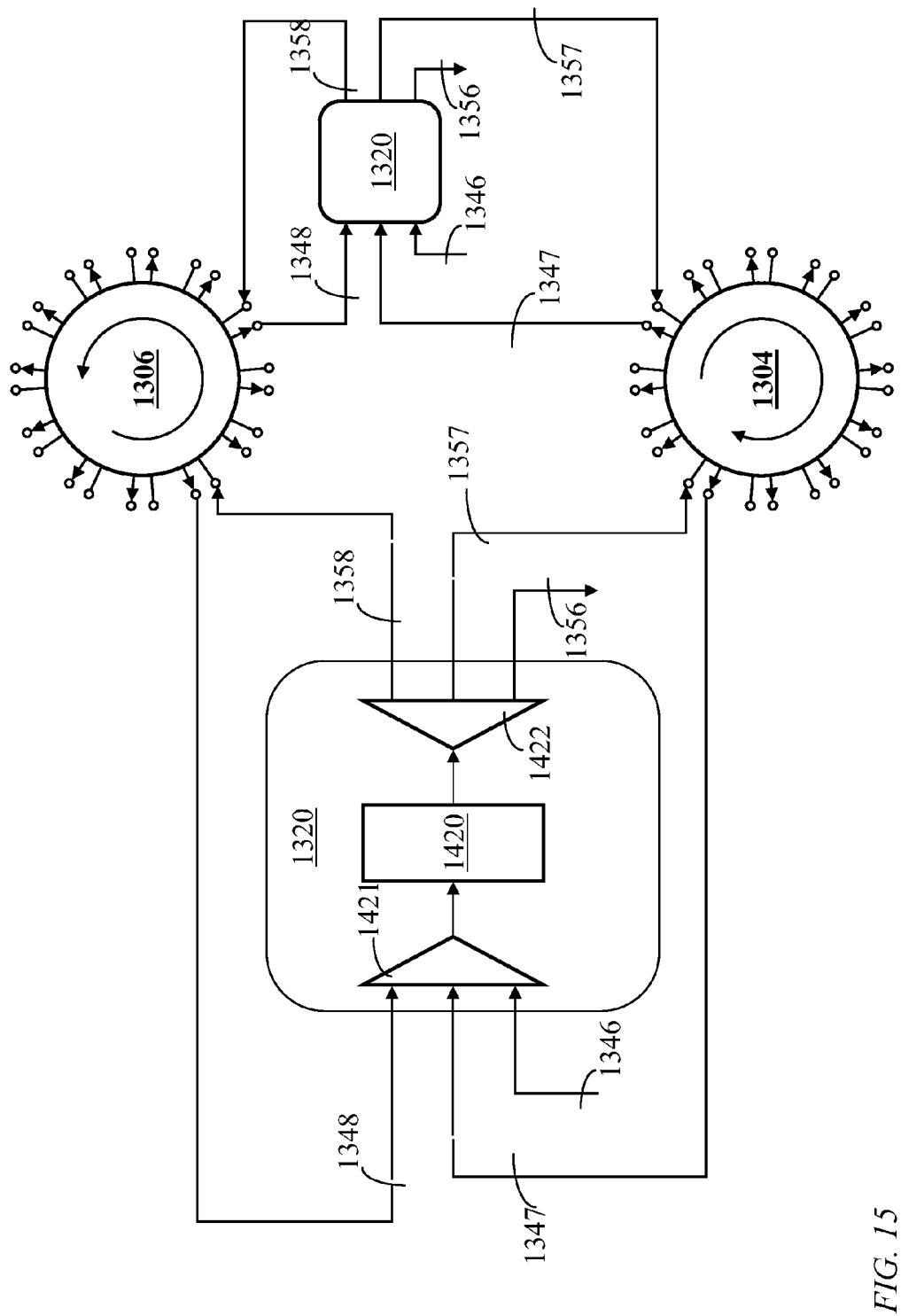
FIG. 15 further details the exemplary node of FIG. 13 using the node element of FIG. 14.

FIG. 15 further details the interconnection of node elements 1320 through the two rotators 1304 and 1306 using the exemplary node element of FIG. 14. Each node element 1320 includes a memory device 1420 which stores fresh data segments received from data sources, transit data segments, and data segments to be transmitted to data sinks.

Figure 16:
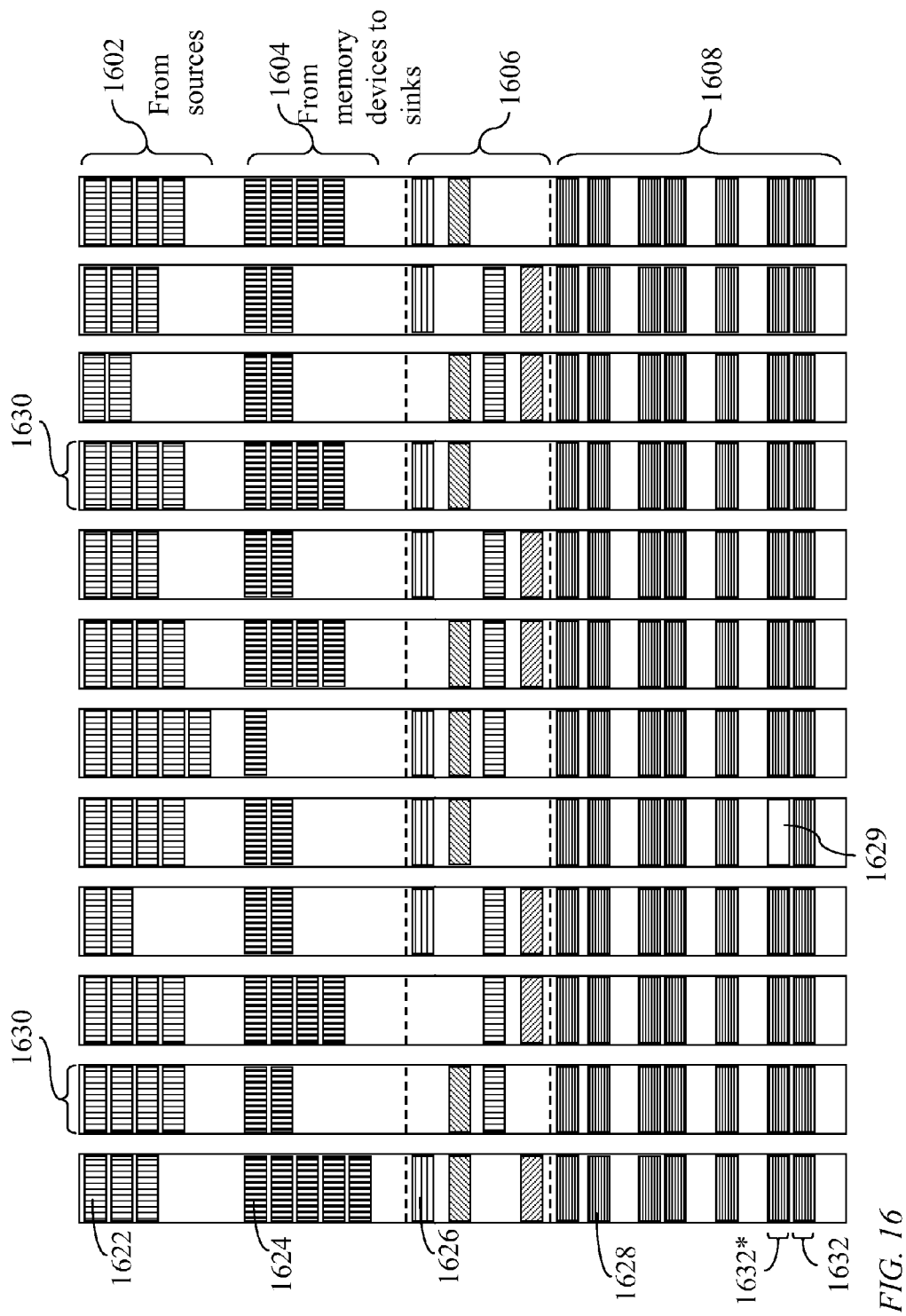
FIG. 16 illustrates data organization in the memory device of the node element of FIG. 14.

FIG. 16 illustrates memory organization in exemplary node 1325 in which four of the twelve node elements 1320 interface with data sources and sinks, and are herein called "outer node elements". The remaining eight node elements 1320 are "inner node elements". Fresh data received from data sources are arranged into data segments of a moderate size; 512 to 1024 bits each, for example.

Each column 1630 represents a memory device 1420 of a node element 1320. The memory device 1420 of a node element 1320 is logically divided into four sections. A first section 1602 contains data segments 1622 received from data sources connecting to the node element 1320. A second section 1604 contains data segments 1624 for delivery to respective data sinks connecting to the node element 1320. A third section 1606 contains data segments 1626 waiting for transfer through one of the rotators 1304 and 1306 to any of the outer node elements 1320. A fourth section 1608 contains data segments 1628 waiting for transfer through one of the rotators 1304 and 1306 to an inner node element 1320. A data segment 1628 belongs to a data block 1632 and the data segments of the data block occupy corresponding cells in the twelve columns 1630. A data block may include a null segment 1629. For example data block 1632* has 11 data segments 1628 and one null segment 1629.

Switch Structure

Figure 17:
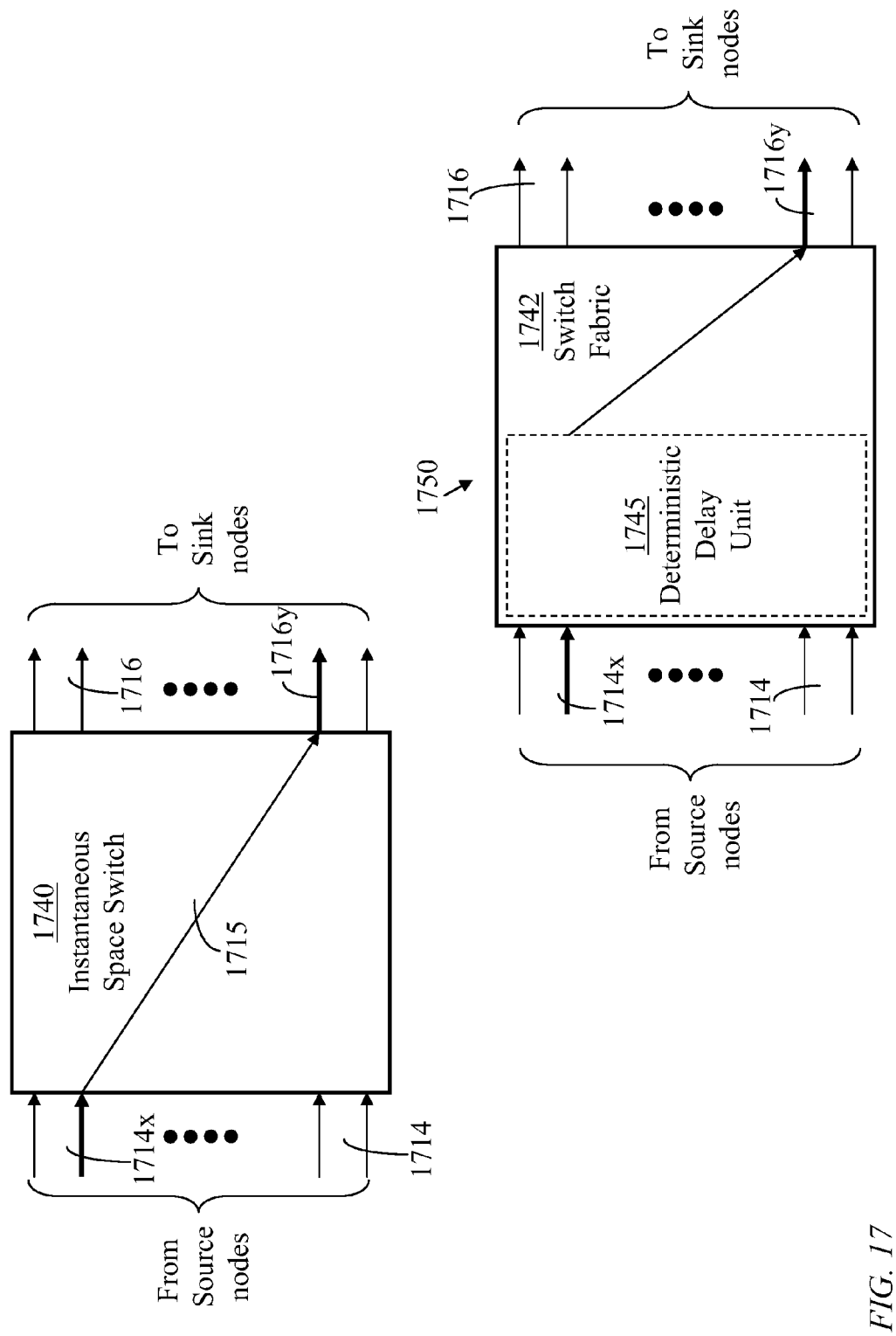
FIG. 17 illustrates an instantaneous space switch and a latent space switch for use in a switch in the switching node of FIG. 3.

FIG. 17 illustrates two implementations of a switch 340 having a time-multiplexed switching fabric. The first is based on an instantaneous space switch 1740 and the second is based on a latent space switch 1750. A single-stage instantaneous space switch 1740 has a bufferless switching fabric. A data segment received at an inlet from an inward channel 1714 during a time interval may be "instantaneously" switched to any outlet of the space switch to be transmitted over an outward channel 1716. An internal path 1715 held for a duration of a time slot from an inward channel 1714x to an outward channel 1716y is illustrated. A single-stage latent space switch 1750 holds a data segment received at an inlet in a deterministic-delay unit 1745 for a deterministic period of time and switches the data segment through a switching fabric 1742 to a destined outlet after a delay determined by the relative positions of the inlet and outlet. The purpose of introducing deterministic delay is to avoid contention of multiple inlets attempting to send data simultaneously to an outlet. With the time domain organized into time frames each having a number of time slots, the deterministic delay encountered by a data segment within the deterministic-delay unit 1745 is an integer multiple of time slots determined by the positions of the respective inlet and outlet.

In order to simplify the operation of the switching node 300, the switches 340 are preferably devised as single-stage space switches. An instantaneous single-stage space switch 1740 is difficult to scale to large dimensions while a single-stage latent-space switch scales to high dimensions. A switch 340 is preferably implemented as a latent space switch.

Figure 18:
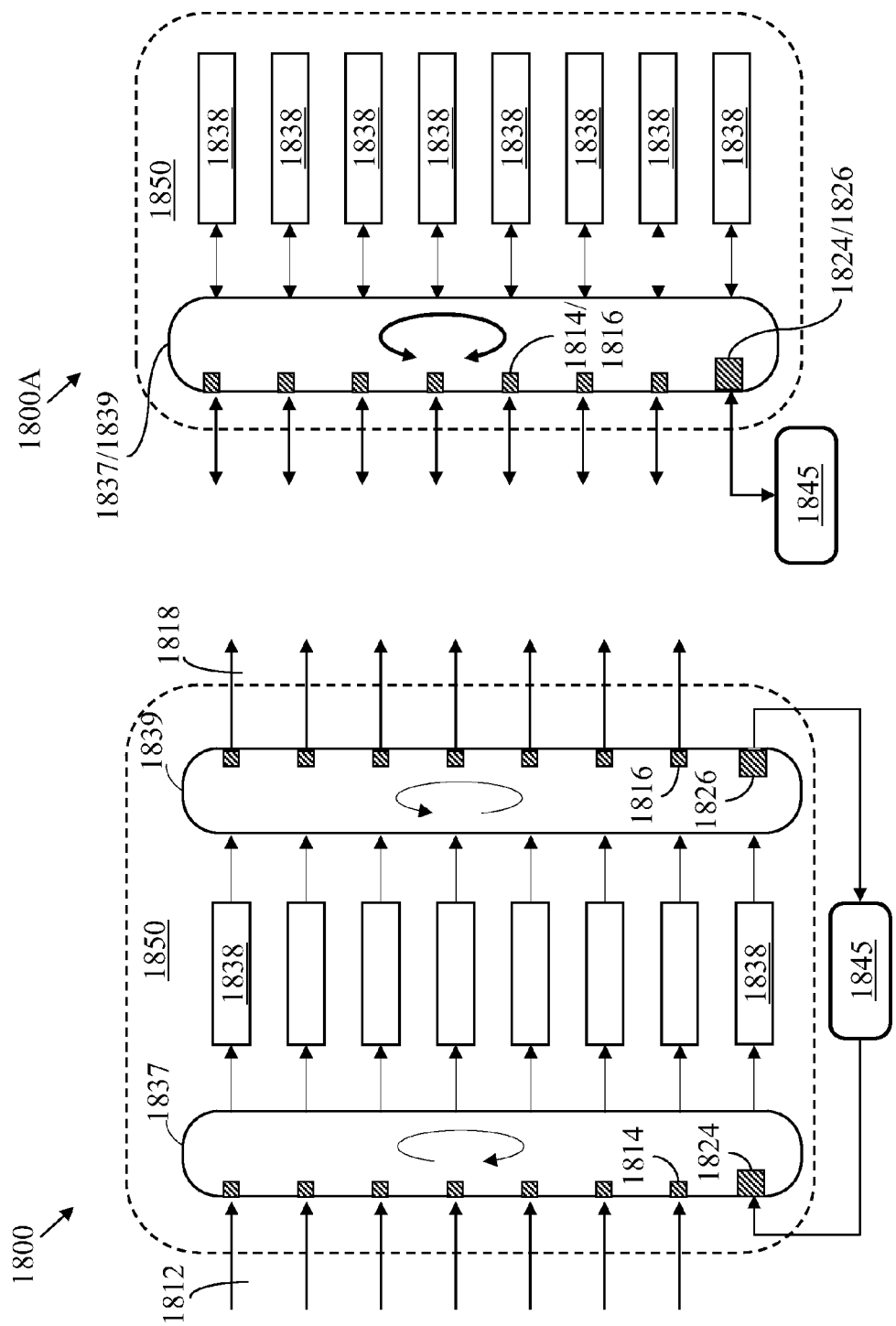
FIG. 18 illustrates a scalable latent space switch for use as a switch in the switching node of FIG. 3.

FIG. 18 illustrates a latent single-stage space switch 1800 comprising a switching fabric 1850 and a controller 1845. The switching fabric 1850 is a rotating-access space switch which comprises an input rotator 1837, an array of transit memory devices 1838, and an output rotator 1839. Inlets 1814 of the input rotator 1837, connecting to inward channels 1812, as well as inlet 1824 connecting to an internal channel from controller 1845 constitute the input ports of switch 1800. Outlets 1816 of the output rotator 1839, connecting to outward channels 1818, as well as output port 1826 connecting to controller 1845, constitute the output ports of switch 1800. Each inlet 1814 or 1824 has cyclic access to each of the transit memory devices 1838 and each transit memory device 1838 has cyclic access to each outlet 1816 and 1826. An input port, 1814 or 1824, accesses a transit memory device 1838 during a time-slot of predefined duration. During a rotation cycle, each inlet, 1814 or 1824, gains access to each transit memory device 1838 and each outlet 1816 or 1826 gains access to each transit memory device 1838. The rotation period, which is the duration of a rotation cycle, equals the number of input ports multiplied by the duration of a time-slot. A data segment is first transferred from an input port to one of the transit memory devices 1838 then transferred, after a deterministic delay, from the transit memory device 1838 to a destined outlet 1816 or 1826. The deterministic delay is a function of the relative positions of the input port receiving the data segment and the destined output port. The maximum deterministic delay equals the rotation period minus one time-slot. The dimension of the rotator-based single-stage space switch is limited primary by a deterministic-delay tolerance. With a time-slot duration of 100 nanoseconds, for example, the maximum deterministic latency of a 256×256 switch is less than 26 microseconds. A controller 1845, connecting to an output port 1826 of the output rotator 1839 and connecting to an inlet 1824 of the input rotator 1837, schedules the transfer times of data segments.

With rotators 1837 and 1839 having L input ports and L output ports each, the duration of a rotation cycle is L×δ, where δ is the access interval of a transit memory device 1838. In the latent space switch of FIG. 18, with clockwise (ascending) input rotator 1837 and counterclockwise (descending) output rotator 1839, a data segment transferred from an inlet 1814(j) to a transit memory device 1838 is transferred from the transit memory 1838 to a target outlet 1816(k) after a delay of $\delta \times [j-k]_{modulo\ T}$, where T is the number of time slots per rotation period. For example, with T=8, j=0, and k=1, the delay is $\delta \times [0-1]_{modulo\ 8} = 7\delta$. With j=0 and k=7, the delay is $\delta \times [0-7]_{modulo\ 8} = \delta$. The number T of time slots per rotation period preferably equals L. Latent space switch 1800 may also be represented in the form 1800A where the input rotator 1837 and the output rotator 1839 are combined in a dual rotator 1837/1839 which may be implemented in a single fabric.

Core Matrix Connecting to Asymmetrical Nodes

Figure 19:
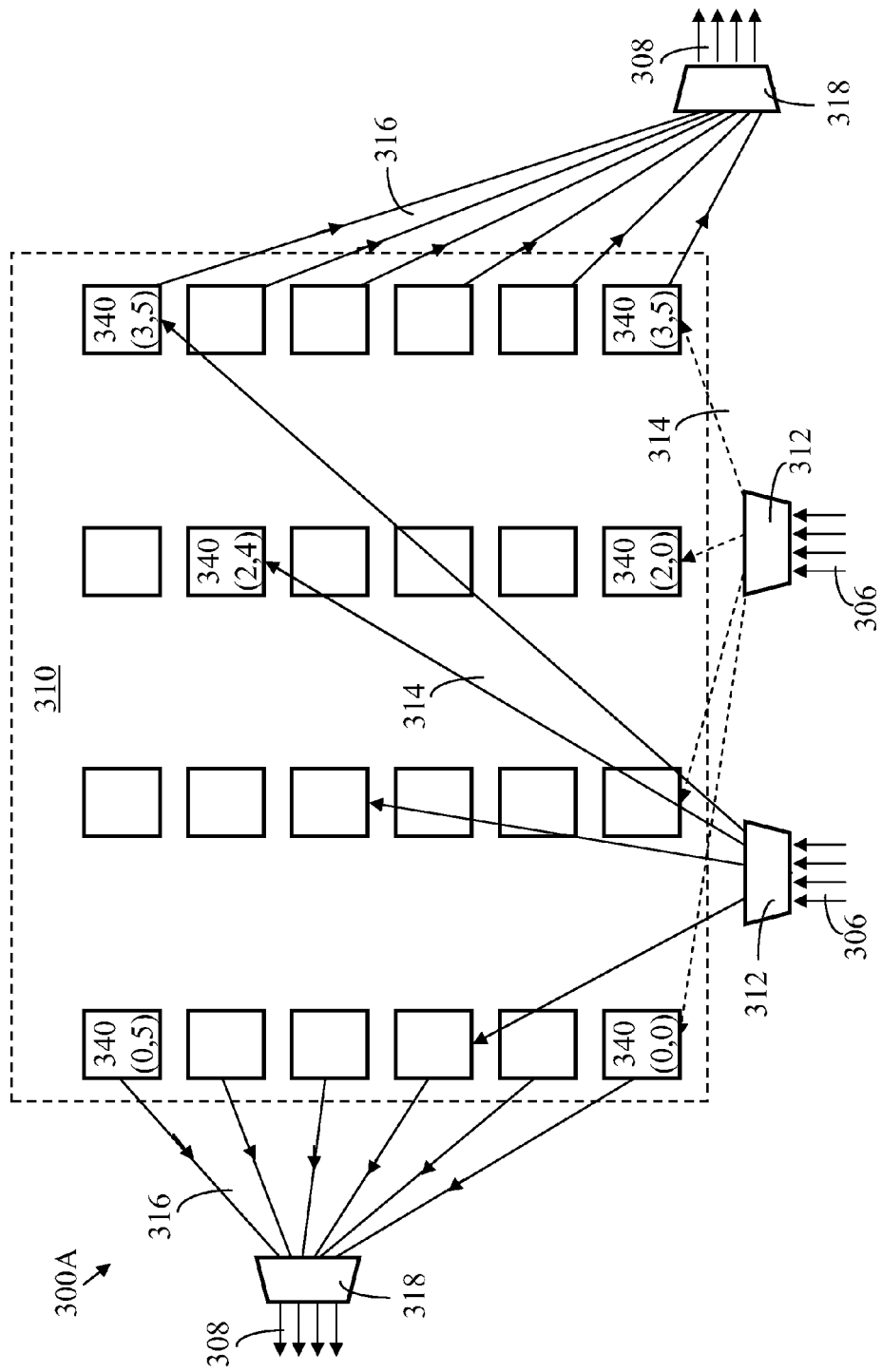
FIG. 19 illustrates an asymmetrical switching node in accordance with an embodiment of the present invention comprising a plurality of source nodes, a plurality of switches and a plurality of sink nodes where the switches are logically arranged into rows and columns and none of the switches is directly connected to any other switch—each source node directly connects to one switch in each column and each sink node directly connects to each switch in a selected column.

FIG. 19 illustrates an asymmetrical switching node 300A, comprising a plurality of source nodes 312, a plurality of independent switches 340, logically arranged into a rectangular matrix 310 of six rows and four columns and a plurality of sink nodes 318, where none of the switches 340 is directly connected to any other switch. Each source node 312 receives data from data sources through ingress channels 306 and has outbound channels 314 connecting to switches 340 of different rows. Each sink node 318 has inbound channels 316 from switches 340 of different rows but belonging to the same column of matrix 310. A sink node 318 transmits data to data sinks through egress channels 308. In the switching node 300 of FIG. 3, a source node connects to switches 340 in different columns but in the same row. In the switching node 300A of FIG. 19, a source node connects to switches 340 in different columns and also in different rows.

Figure 20:
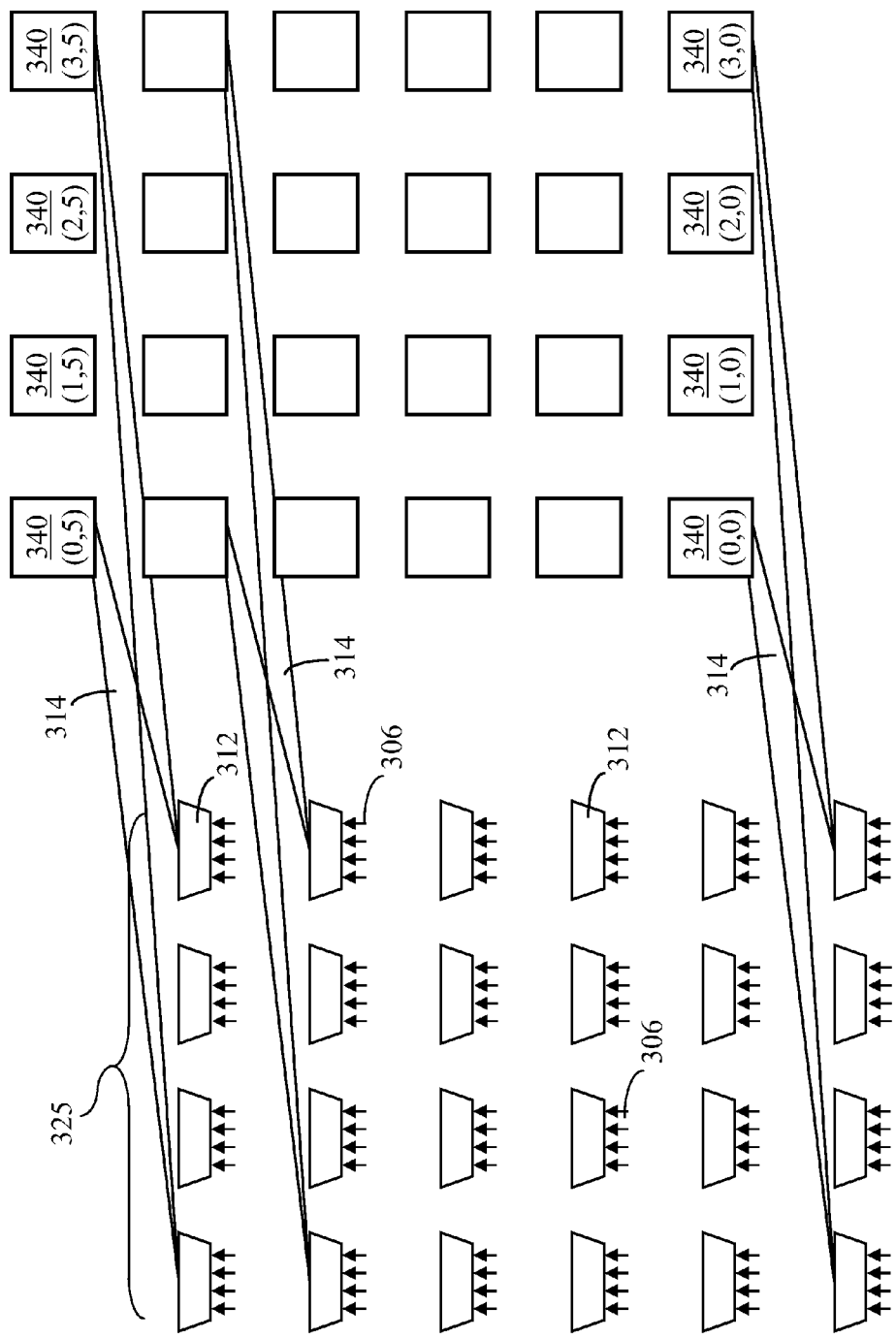
FIG. 20 illustrates source node connectivity in the switching node of FIG. 19.

FIG. 20 illustrates an arrangement of the switching node 300A of FIG. 19 where the source nodes 312 are arranged in groups 325 each group comprising four source nodes 312. Each source-node group 325 is optionally associated with a corresponding row and each source node 312 in a source-node group 325 connects to each switch 340 of a corresponding row.

Figure 21:
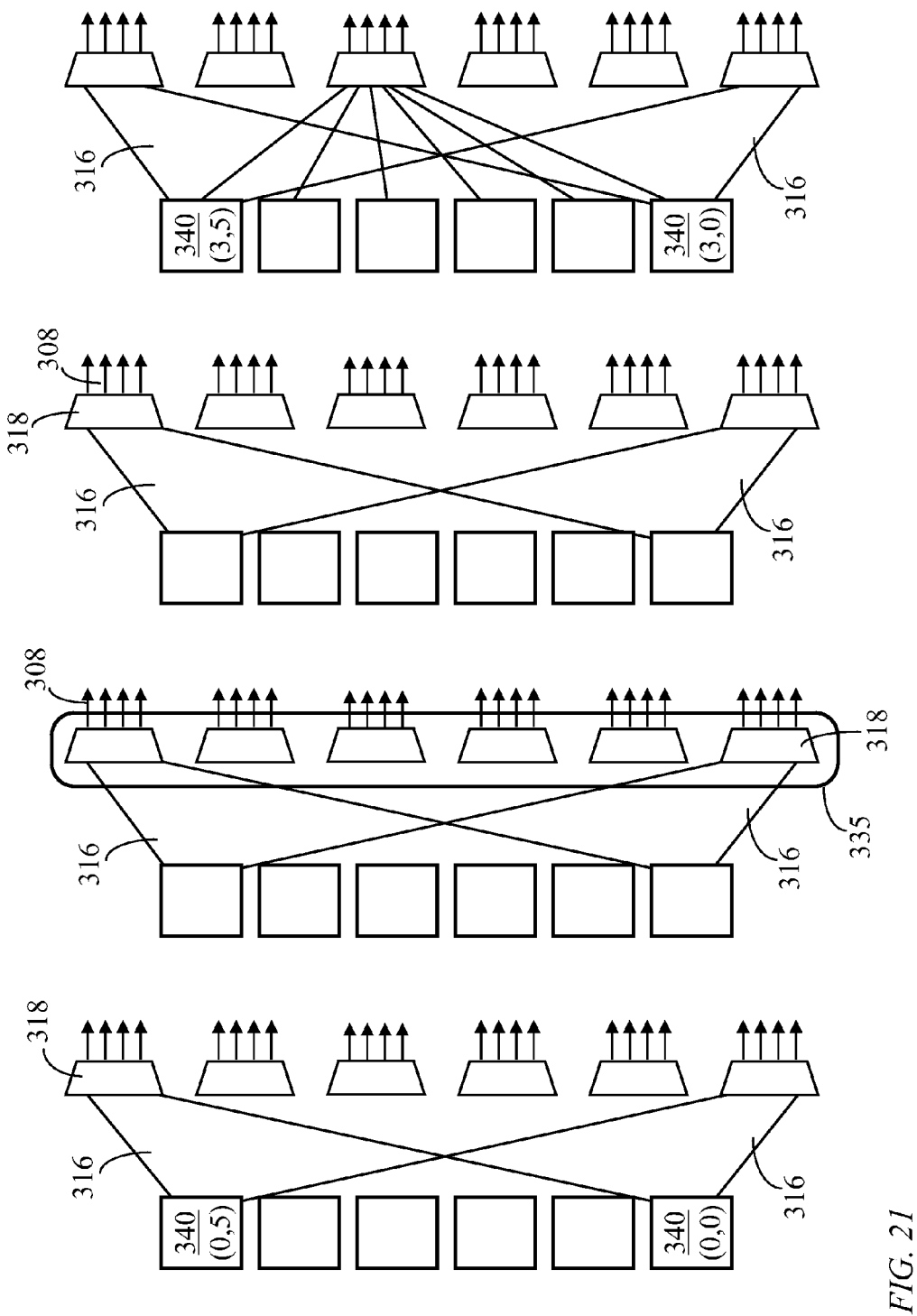
FIG. 21 illustrates sink-node connectivity in the switching node of FIG. 19.

FIG. 21 illustrates an arrangement of the switching node 300A of FIG. 19 where the sink nodes 318 are arranged in groups 335 each comprising six sink nodes 318. Each sink-node group 335 is associated with a corresponding column and each sink node 318 in a sink-node group 335 connects to each switch 340 of a corresponding column.

Figure 22:
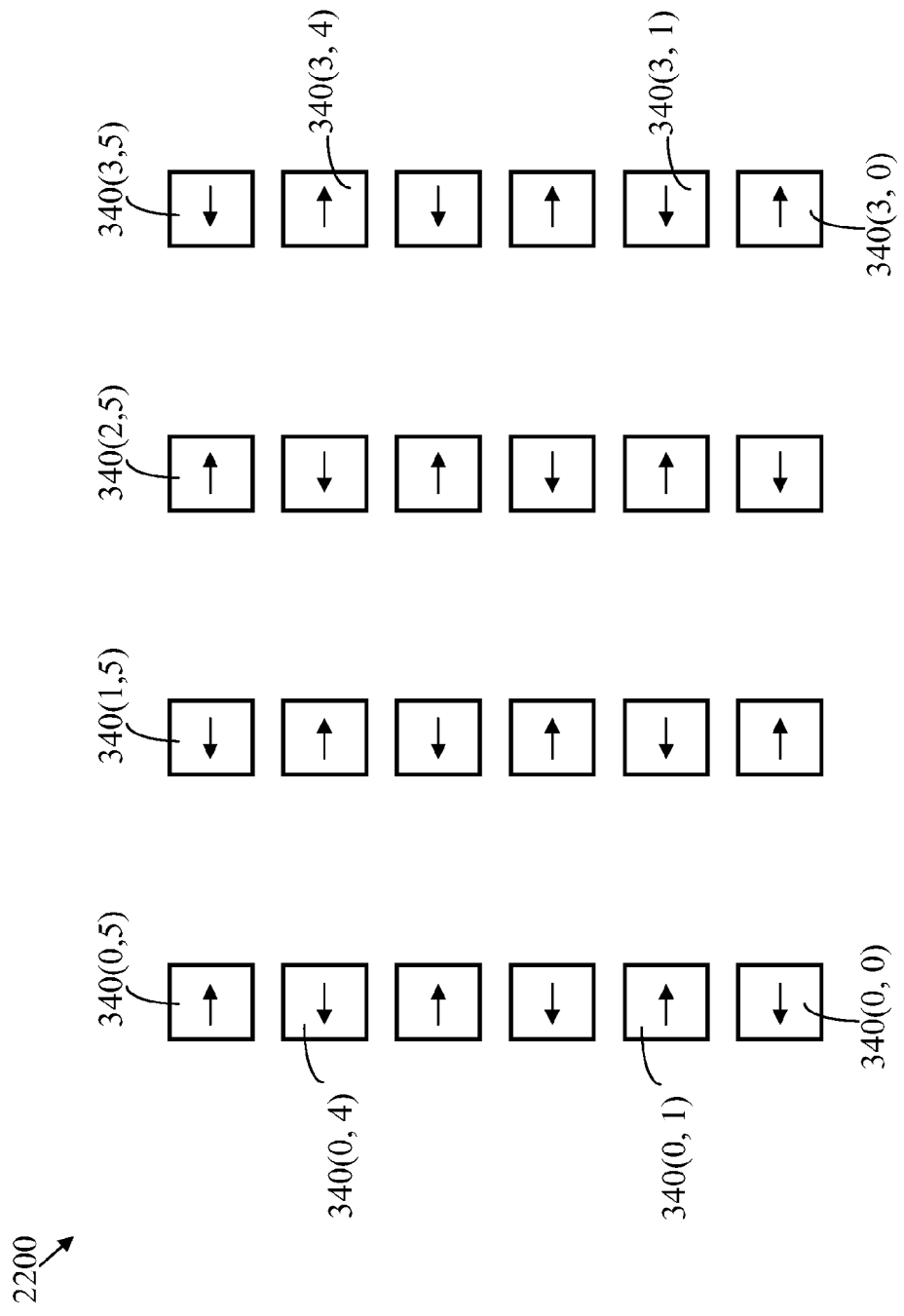
FIG. 22 illustrates the use of latent space switches of opposite phases in accordance with an embodiment of the present invention.

FIG. 22 illustrates an arrangement 2200 of the switches 340 of switching node 300A where each of the switches 340 is a rotator-based latent space switch 1800 as described with reference to FIG. 18 but the rotation directions of the rotators 1837 and 1839 may differ. In a switch of a first type, such as switches 340(0, 1) or 340(3, 4), the input rotator 1837 and the output rotator 1839 may rotate in the clockwise and counter-clockwise directions, respectively. In a switch of a second type, such as switch 340(0,0) or 340(3,1), input rotator 1837 and the output rotator 1839 may rotate in the counterclockwise and clockwise directions, respectively. In a rotator-based switch 1800 (FIG. 18) of dimension (m+1)×(m+1), there is a systematic switching delay ranging from 0 to m×δ, δ being the access time of a transit memory device 1838. The value of the delay depends on the relative positions of the input and output ports in the switch 340. A source node 312 has one direct path and, with μ=ν, (μ−1) non-intersecting compound paths to each sink node 318 (excluding a sink node integrated with the source node). Each compound path traverses two switches 340 and the (μ−1) non-intersecting compound paths may have unequal systematic delays. This property may be exploited to select a compound path of minimum systematic delay, which is the sum of the systematic delays of the two traversed switches 340. A node controller of a node may maintain descriptors of non-intersecting compound paths to each other node and determine a switching latency of each of the compound paths based on provided information on the connectivity of switching node 300A. The compound paths from a source node 312 to the sink nodes 318 may be sorted in an ascending order according to their systematic delays and the first available compound path having a sufficient vacancy may be selected for a connection. The use of the arrangement of FIG. 22, with switches of the first type interleaved with switches of the second type, may increase the opportunity to reduce compound-path systematic delay. The rotator pairs 1837/1839 of the rotator-based latent space switches 1800 used as switches 340 may be operated at a gradual phase differential to further reduce the minimum compound-path systematic delay.

Square Core Matrix

Figure 23:
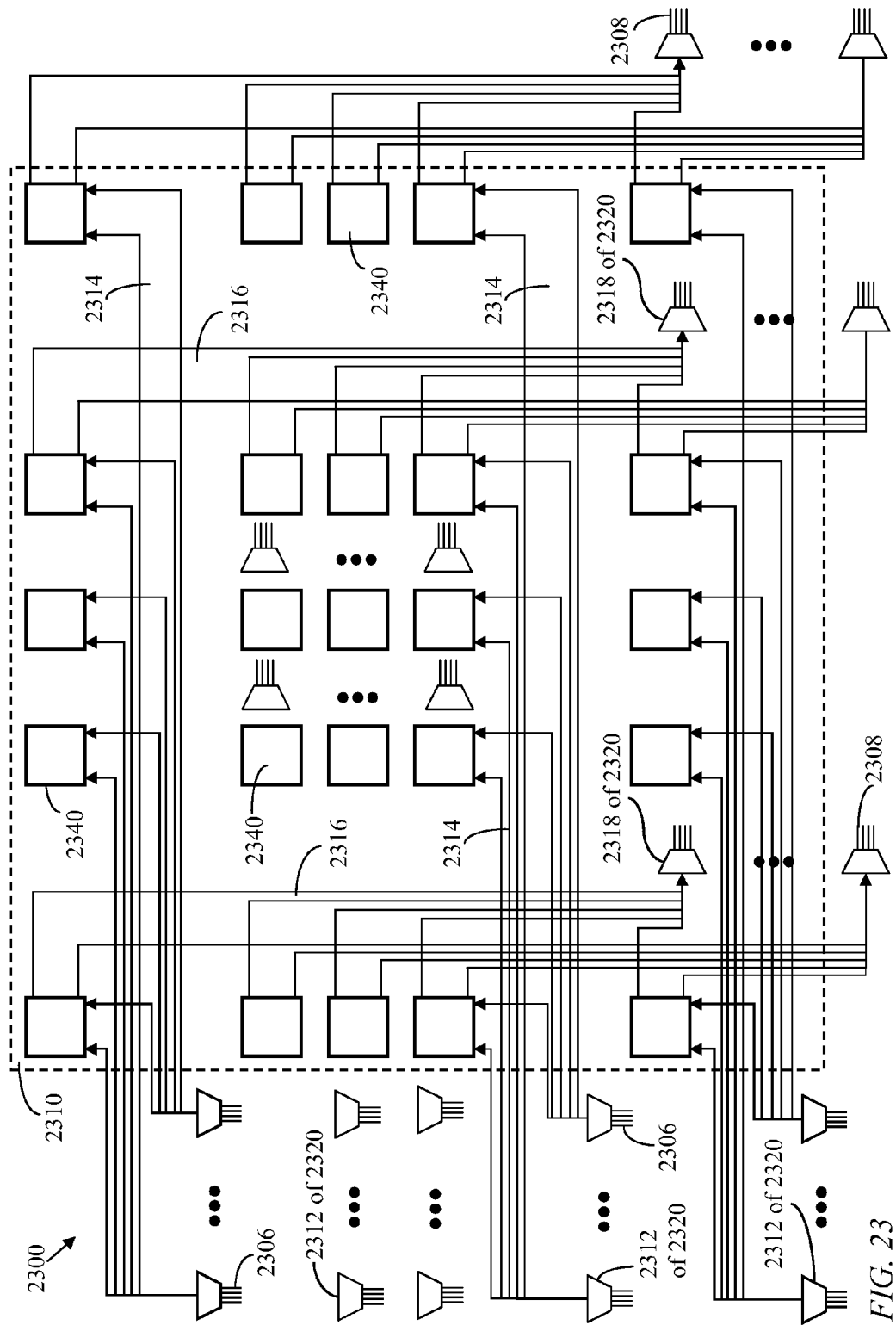
FIG. 23 illustrates an exemplary switching node of the type illustrated in FIG. 3 and FIG. 4 comprising a matrix of switches with five rows and five columns in accordance with an embodiment of the present invention.

FIG. 23 illustrates a switching node 2300 having 25 switches 2340 (similar to switches 340) arranged in a matrix 2310 of five rows (v=5) and five columns (μ=v=5). Each switch 2340 is of dimension 5×5 (m=n=5). The maximum number of source nodes 2312 (corresponding to source nodes 312) is therefore 25 and the maximum number of sink nodes 2318 (corresponding to sink nodes 318) is also 25. Each source node 2312 has five outbound channels 2314 connecting to switches 2340 in different columns. Each sink node 2318 has five inbound channels 2316 from switches 2340 in different rows. In this example, the outbound channels 2314 of each source node 2312 connect to switches 2340 of the same row and each sink node 2318 connects to switches 2340 of the same column. With each source node 2312 connecting to each switch 2340 in a row and each sink node 2318 connecting to each switch 2340 in a column, each source node has a simple path, traversing one of the switches 2340, to each sink node.

Figure 24:
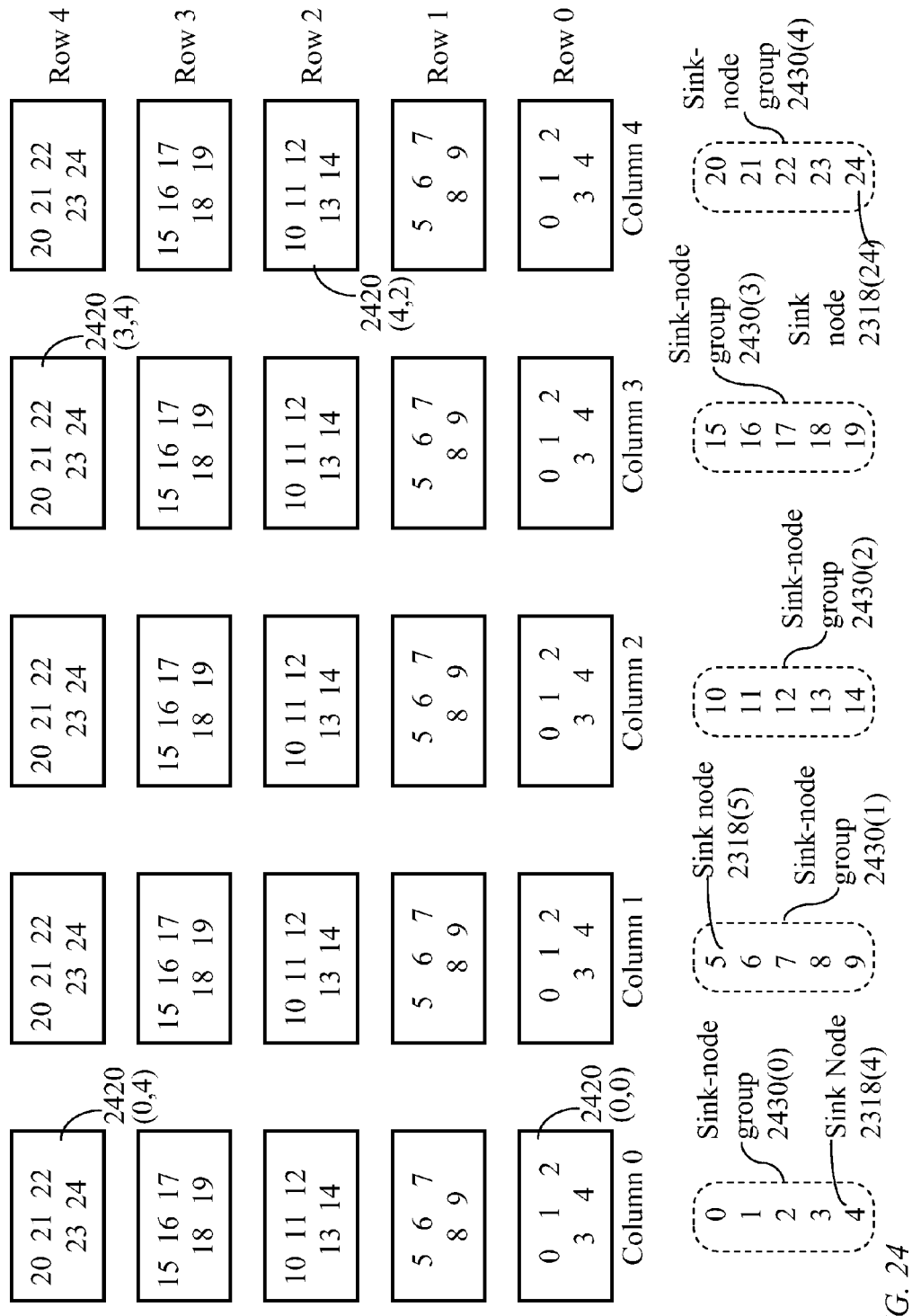
FIG. 24 illustrates a first connectivity pattern of the matrix of switches of FIG. 23 in accordance with an embodiment of the present invention.

FIG. 24 illustrates a connection pattern of source nodes 2312 and sink nodes 2318 to the switches 2340 in the switch of FIG. 23 where each switch 2340 is of dimension 5×5 (m=n=5) and the maximum number of source nodes or sink nodes is μ×m=25. The 25 source nodes 2312 are individually identified as 2312(0), 2312(1), . . . , 2312(24) and the 25 sink nodes 2318 are individually identified as 2318(0), 2318(1), . . . , 2318(24). For clarity of FIG. 24 (and FIGS. 25, 29, 30, 31, 32, and 33), only the indices 0, 1, . . . , 24 are used for individually identifying a source node 2312 or a sink node 2318. The source nodes 2312 are arranged into groups 2420, individually identified as 2420($c,r$), 0≤c<μ, 0≤r<v. The sink nodes 2318 are arranged in μ groups 2430, individually identified as 2430($c$), 0≤c<μ, i.e., 2430(0), 2430(1), . . . , 2430(4). Each source node 2312 in a source-node group 2420($c,r$) connects to each switch 2340 in a row r, 0≤r<v. Each sink node 2318 in a group 2430($c$) of five sink nodes 2318 connects to each switch 2340 in a column c, 0≤c<5. For example, each switch 2340 in the row 0 connects to source nodes 2312(0), 2312(1), 2312(2), 2312(3), and 2312(4) as indicated in group 2420(0) and each switch 2340 in the column 2 connects to sink nodes 2318(10), 2318(11), 2318(12), 2430 (13), and 2318(14) as indicated in group 2430(2). The source nodes 2312 and sink nodes 2318 are paired so that each source node is integrated with a sink node with which it shares memory and control.

Figure 25:
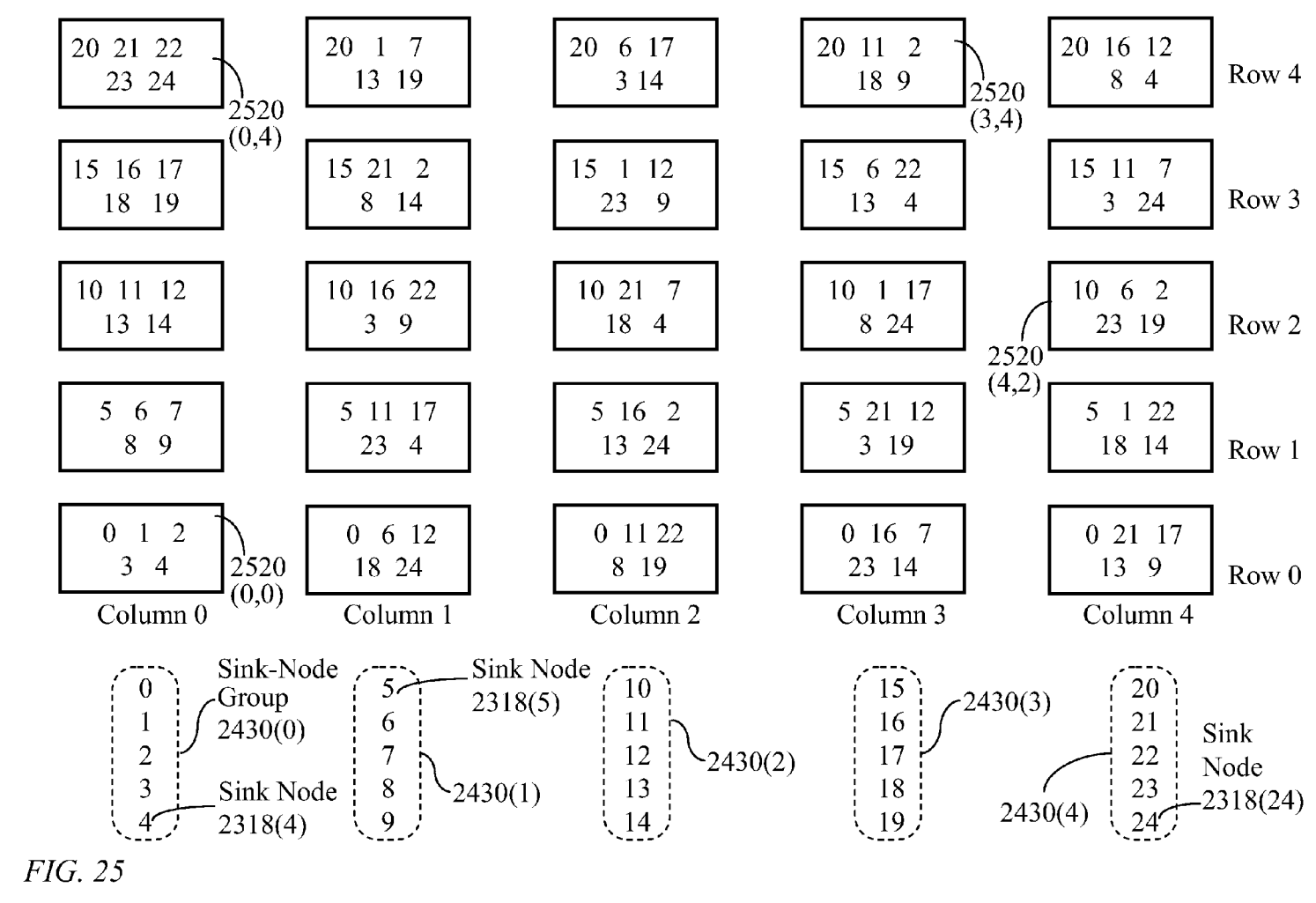

With widely varying spatial distribution of traffic, it is beneficial to let each source node 2312 connect to switches 2340 in different columns and different rows. FIG. 25 illustrates an alternative connection pattern of source nodes 2312 and sink nodes 2318 to the switches 2340 in the switch of FIG. 23. Each sink node 2318 is connected to a switch 2340 in a same column as in the connection pattern of FIG. 24. A source node 2312, however, connects to switches in different columns but not necessarily of the same row. For example, the first switch 2340(0,0) in row 0 connects to source nodes 2312(0), 2312(1), 2312(2), 2312(3), and 2312(4), while the second switch 2340(1,0) in the row 0 connects to source nodes 2312(0), 2312(6), 2312(12), 2312(18), and 2312(24). The source nodes 2312 are arranged into groups 2520, individually identified by the rows and columns of switches, so that a group of source nodes connecting to a switch 2340($c, r$) in column c and row r is identified as 2520($c,r$), 0≤c<5, and 0≤r<5.

With the switches 2340 arranged in μ>1 columns and v=μ rows, and with each switch 2340 having m inlets and n=m outlets, m>1, n>1, the maximum number S of source nodes 2312 is S=μ×m. The μ columns may be indexed sequentially from 0 to (μ−1) and the v rows may be indexed sequentially from 0 to (v−1). The source nodes 2312 may be indexed sequentially as 2312(0), 2312(1), . . . , 2312(S−1). Selecting μ to be a prime number, orthogonal sets, Θ(c, r), 0≤c<μ, 0≤r<v, of source nodes, where the orthogonal sets have an orthogonality index of 1, may be formed so that set Θ(c, r) comprises source nodes 2312 of indices: {j×(1+m×c)+m×r}$_{modulo\ S}$, 0≤j<m. The source nodes of a set Θ(c, r) connect to a switch in column c, 0≤c<μ, and row r, 0≤r<v. For general values of m, n, μ, and v numerical methods may be used to select μ×v orthogonal sets of source nodes connecting to switches 2340, each set comprising at most m switches 2340.

Figure 26:
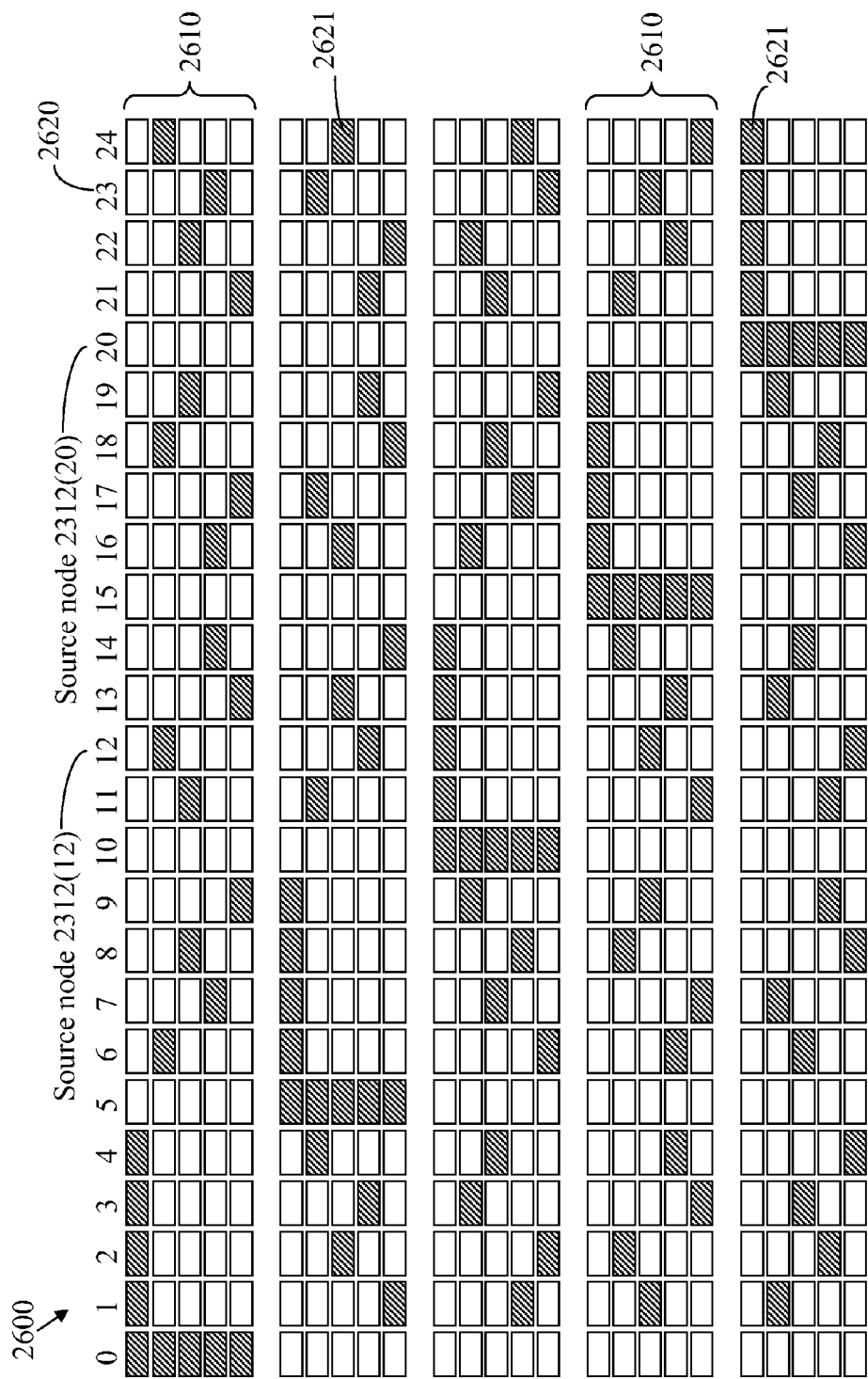
FIG. 26 illustrates orthogonal connectivity of source nodes to the matrix of switches of FIG. 23 in accordance with an embodiment of the present invention.

The assignment of source nodes 2312 to the switches 2340 is determined in a manner which ensures that a group 2520 of source nodes 2312 connecting to any switch 2340 has a small number (preferably at most one where m≤μ) of source nodes in common with a group of source nodes connecting to any other switch 2340. This property is illustrated in FIG. 26 which depicts a matrix 2600 divided into five sub-matrices 2610 each having 5 rows and 25 columns. Each sub-matrix 2610 corresponds to a row of switches 2340 in switching node 2300 of FIG. 23. Each row in a matrix 2600 corresponds to one of the switches 2340, and each column corresponds to a source node 2312($x$) identified by the index "x" (reference numeral 2620). A connection of a source node 2312 to a switch 2340 according to the connection pattern of FIG. 25 is indicated by a marked cell 2621 in a matrix 2600. It is observed that each column in matrix 2600 includes exactly five marked cells 2621, and each row includes exactly five marked cells 2621. Furthermore, any two rows in a matrix 2600 have at most one marked cell 2621 in a same column. The source-node groups thus formed are called "orthogonal source-node groups". Any two source-node groups are said to be orthogonal if they contain at most a predefined number of common source nodes 2312 which defines an orthogonality index; in the example of FIG. 26, the orthogonality index is 1. The source-node groups may also be formed according to a more relaxed requirement, where a pair of source-node groups may have more than one source node, but less than m source nodes, in common.

Parallel Switch Planes

Figure 27:
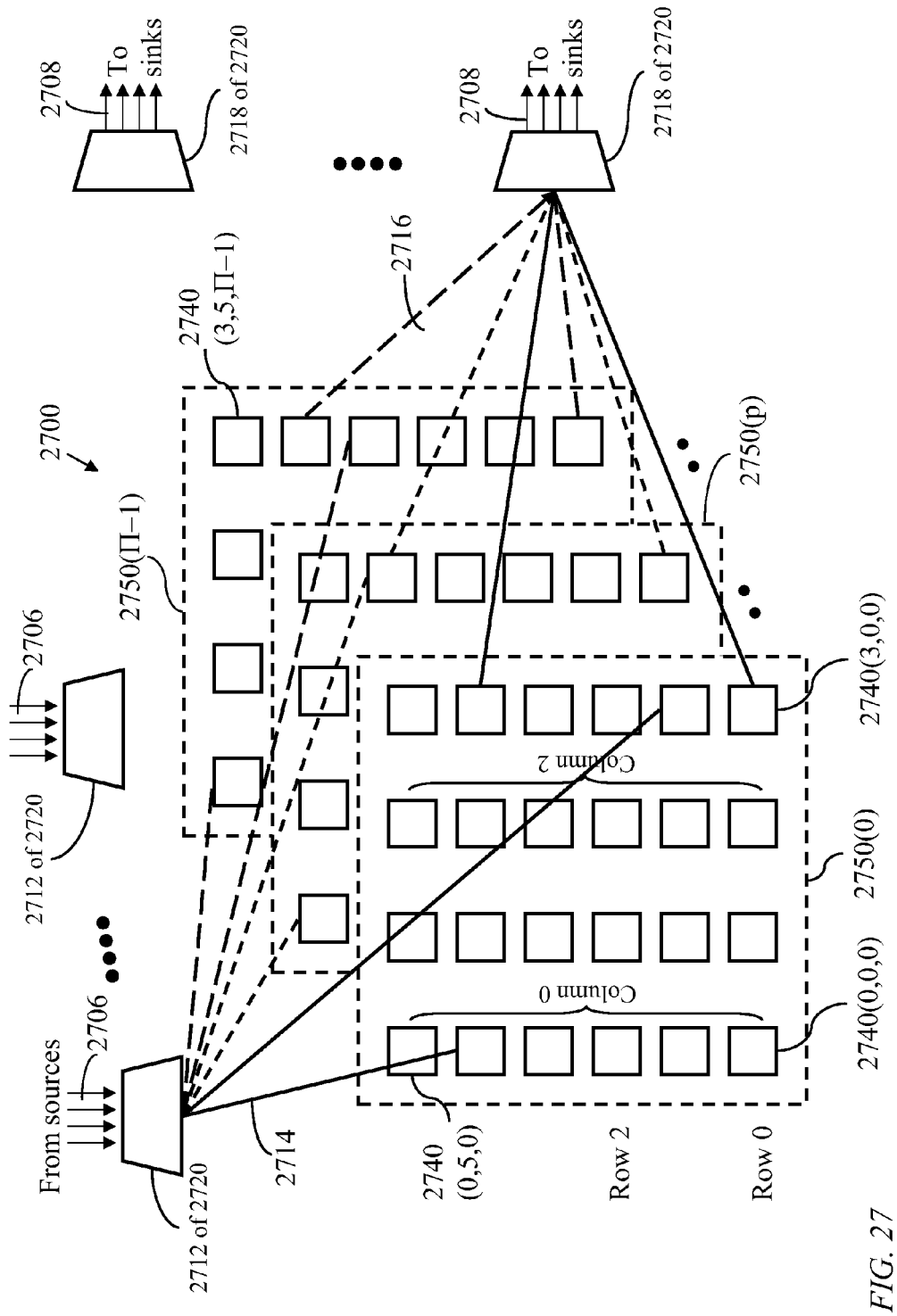
FIG. 27 illustrates a switching node having multiple switch planes, each switch plane comprising switches arranged in a matrix in accordance with an embodiment of the present invention.

FIG. 27 illustrates a switching node 2700 having nodes 2720 and switches 2740. The nodes 2720 connect to data sources and sinks. The switches 2740 are arranged, into a number, Π, of switch planes 2750, Π>0, each switch plane containing a respective set of switches 2740 arranged in a matrix of a number, μ, of columns, and a number, v, of rows, μ>1, v>1. Each switch 2740 has a number, m, of inlets and a number, n, of outlets, m>1, and n>1. Each node 2720 connects to an inlet of a selected switch 2740 in each column in each switch plane and an outlet of a selected switch in each row in each switch plane.

Switching node 2700 is similar to switching node 2300 but has multiple switch planes 2750, individually identified as 2750($p$), 0≤p<Π, where Π is the number of switch planes. Each switch plane 2750 comprises switches 2740 arranged in a matrix of μ columns and v rows. Each node 2720 connects to an inlet of a switch 2740 in each column in each switch plane 2750 through an outbound channel 2714 and each node 2720 connects to an outlet of each switch of one column in each switch plane through an inbound channel 2716. With μ columns and ν rows per switch plane 2750, the number of outbound channels 2714 from a node 2720 is μ×Π and the number of inbound channels 2716 to a node 2720 is ν×Π. A switch 2740, in column c and row r in a switch plane 2750(p) is herein identified as 2740(c,r,p).

Figure 28:
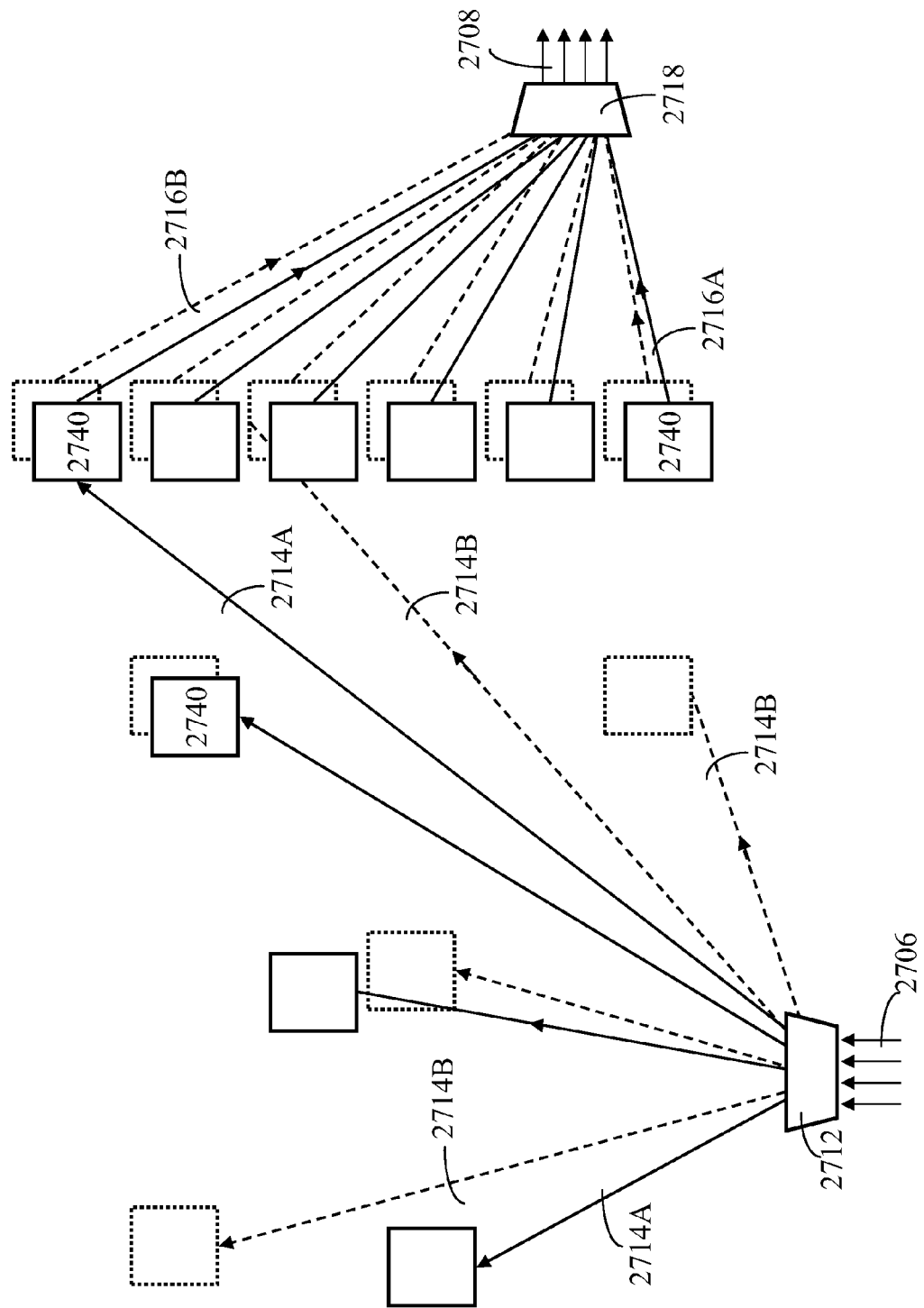
FIG. 28 illustrates the use of two parallel matrices of switches in accordance with an embodiment of the present invention.

FIG. 28 illustrates upstream connections from a node 2720 to switches 2740 and downstream connections from switches 2740 to the node 2720 in a switching node 2700 comprising two switch planes (Π=2). The node 2720 receives data from data sources (not illustrated) through ingress channels 2706, and has four channels 2714A to switches 2740 in a first switch plane 2750 and four channels 2714B to switches 2740 in a second switch plane 2750. The node 2720 has six channels 2716A from switches 2740 of the first switch plane 2750 and six channels 27168 from switches 2740 of the second switch plane 2750, and transmits data to data sinks (not illustrated) through egress channels 2708.

Orthogonal Connectivity within a Switch Plane

Within each switch plane p, 0≤p<Π, the upstream connectivity of nodes 2720 to switches 2740(c,r,p), 0≤c<μ, 0≤r<ν, may be selected so that the node sets (source-node sets) connecting in the upstream direction to all switches are mutually orthogonal as illustrated in FIG. 25.

Cross-Plane Orthogonality

With the switches 2740 arranged in μ>1 columns and ν=μ rows, and with each switch 2740 having m inlets and n=m outlets, m>1, n>1, the maximum number S of nodes 2720 is S=μ×m. The nodes 2720 may be indexed sequentially as 2720(0), 2720(1), ..., 2720(S−1). Selecting μ to be a prime number, with ν=μ, orthogonal sets of nodes, with an orthogonality index of $\lceil m/\mu \rceil$, connecting to switches 2740(c, r, p) in switch plane 2750(p), 0≤p<Π, row r, 0≤r<ν, and any column c, may be formed so that each set comprises m nodes 2720 of indices determined according to the expression:

$$\{j\times(1+m\times p)+m\times r\}_{modulo\ S},\ 0\leq j<m.$$

For general values of μ, and ν numerical methods may be used to select orthogonal sets of source nodes connecting to switches 2740 of different rows in different switch planes.

FIGS. 29-32 illustrate upstream connection patterns of nodes 2720 to switches 2740 and downstream connection patterns, in four switch planes 2750 of a five-plane (Π=5) switching node 2700 where a first switch plane uses the same connectivity pattern of FIG. 24. Each node group (source-node group) 2920, 3020, 3120, or 3220 corresponds to a switch 2740(c,r,p) in column c and row r of a respective switch plane 2750(p), p=1, 2, 3, and 4. A node group in switch plane 2750(1) may be identified by indices (c, r) of a switch 2740 to which the node group connects in the upstream direction. Likewise, each of node groups 3020 in switch plane 2750(2), node groups 3120 in switch plane 2750(3), and node group 3220 in switch plane 2750(4) may be individually identified by a respective column c and row r. The indices (c,r,p) are appended to each node group in FIGS. 29-32. The sink nodes are grouped in a pattern similar to that of FIG. 24. Upstream connectivity (source-node connectivity) to the switches 2740 differ among the five arrangements of FIG. 24 and FIGS. 29-32. For example, the node groups 2420 and 2920 connecting to switches 2740(0,0,p) and to switches 2740(0,2,p), for 0≤p<5 (Π=5) are listed below to illustrate cross-plane orthogonality.

Figure 29:
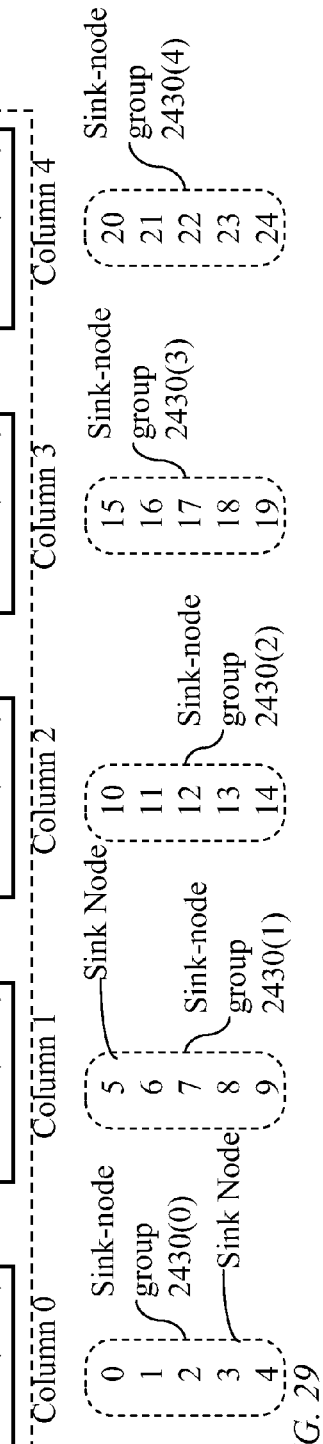
Figure 30:
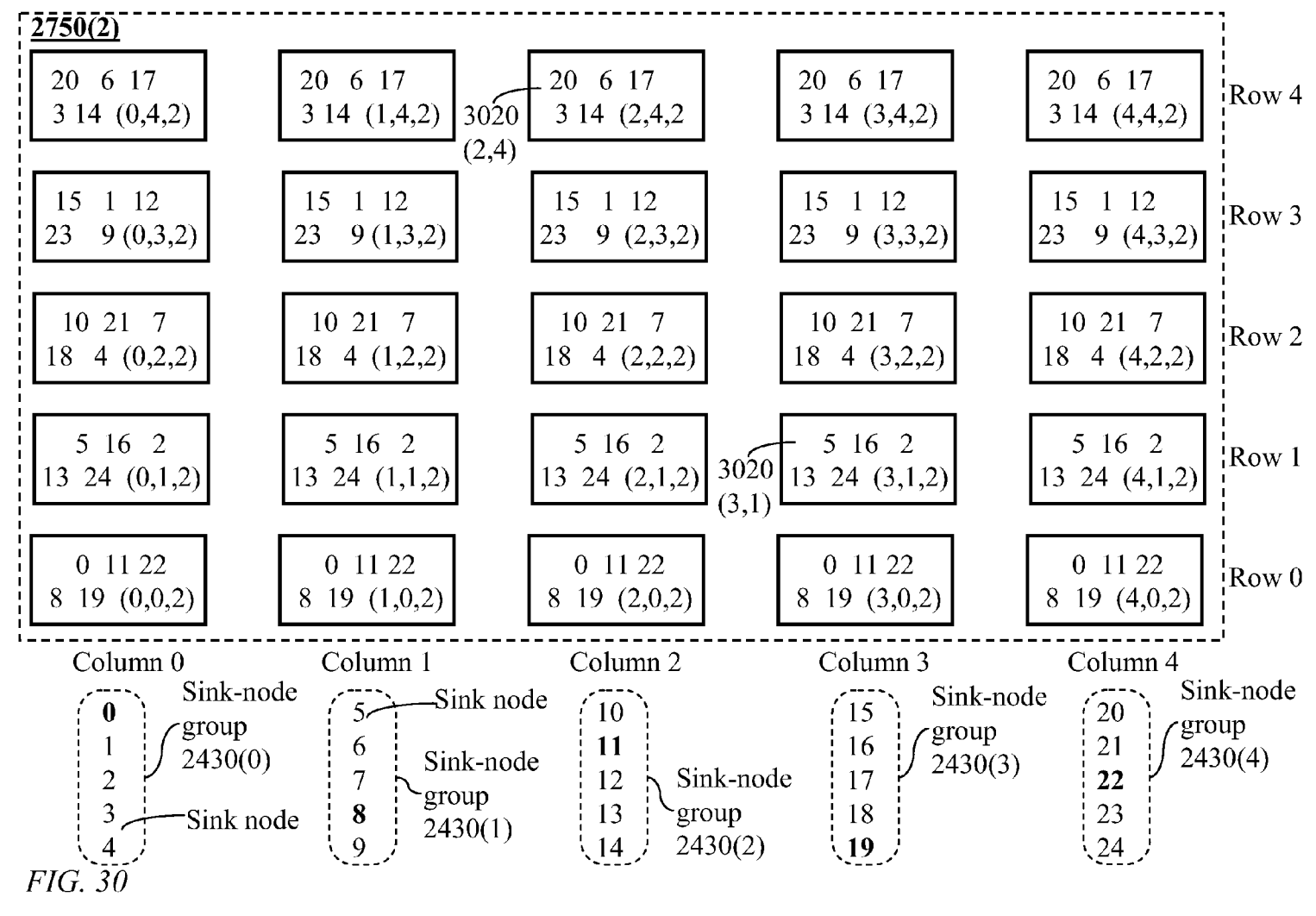
Figure 31:
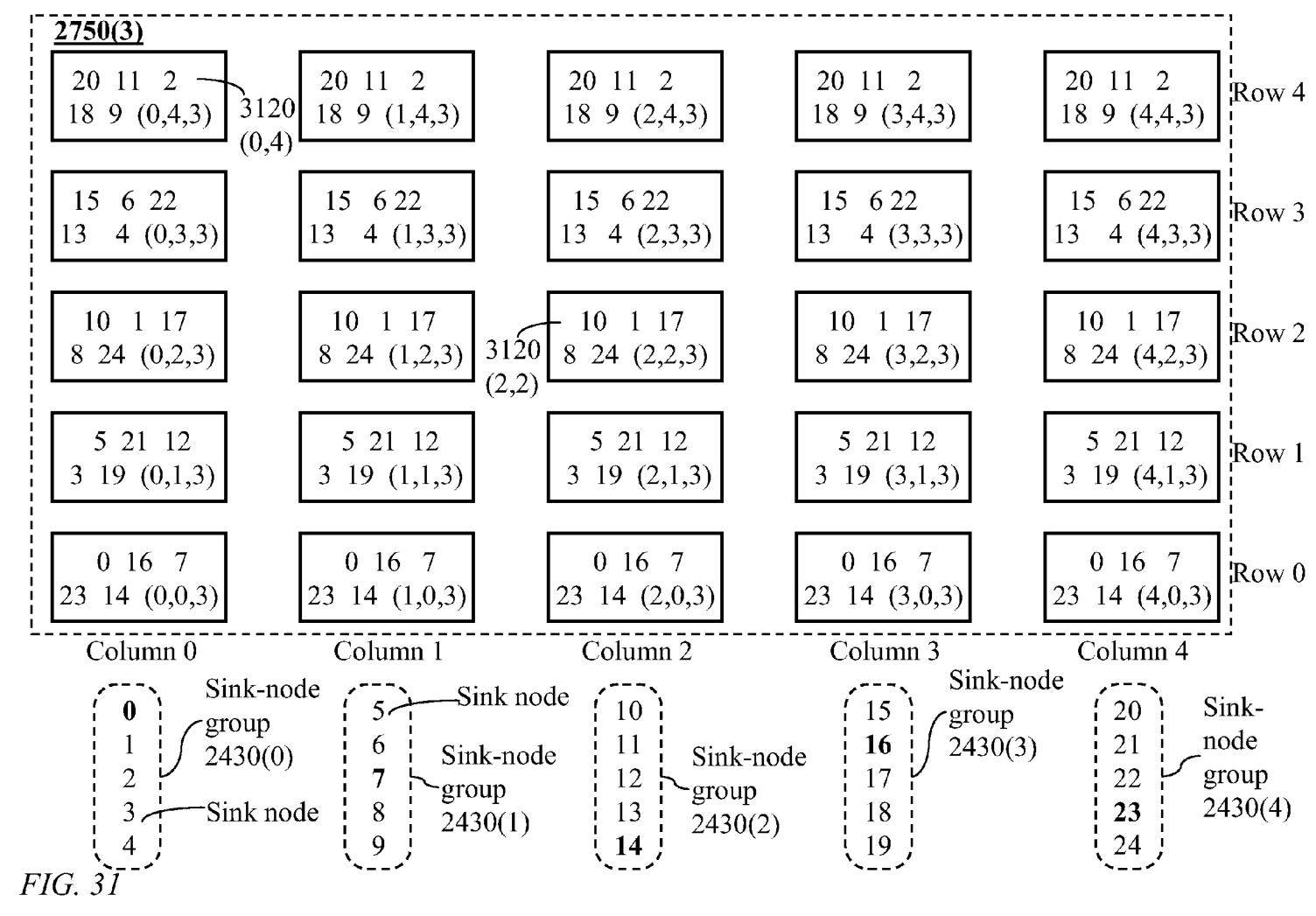
Figure 32:
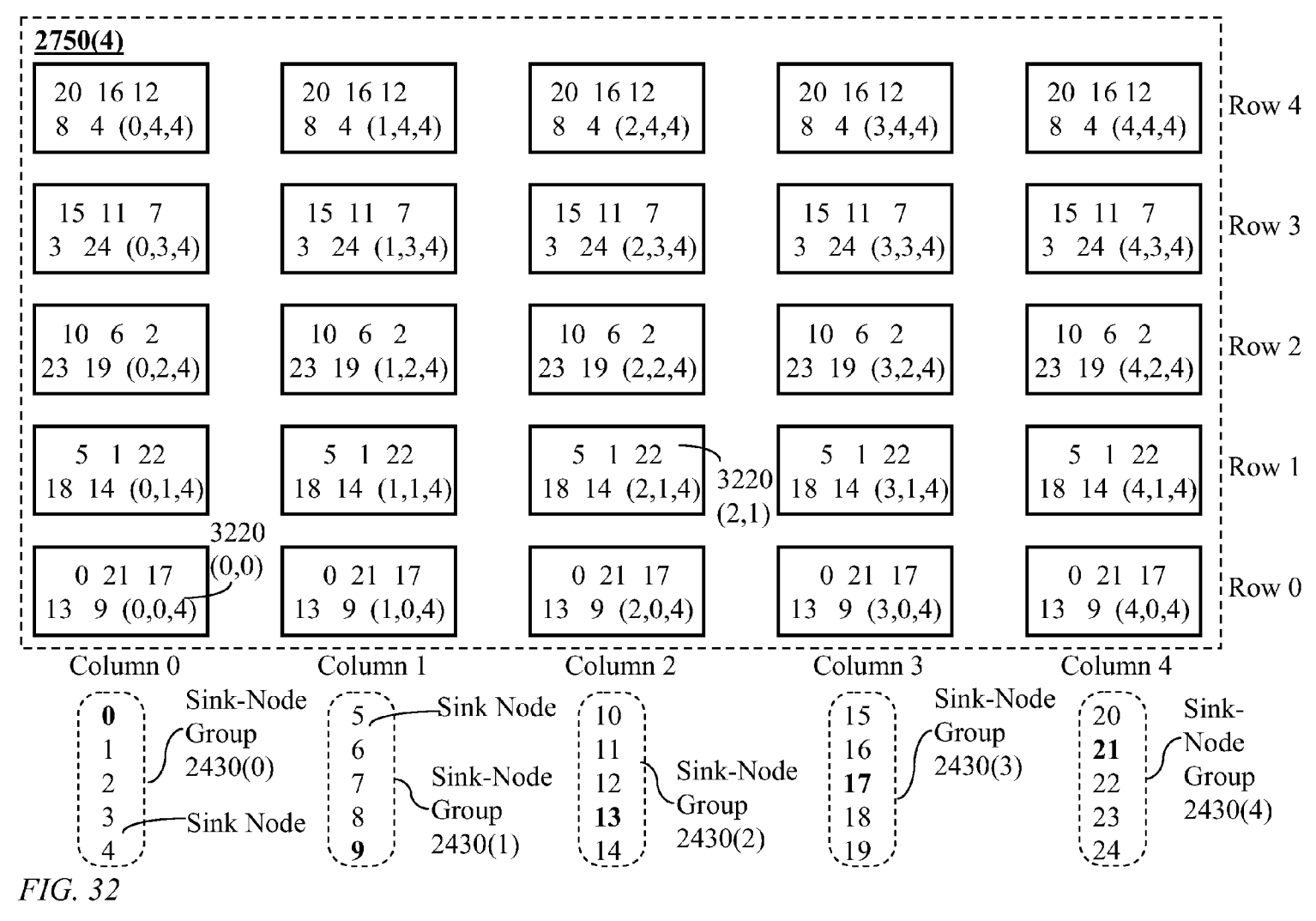

It is noted that source nodes 2712 connecting to a switch 2740(c,r,p) are listed in FIGS. 24, 29, 30, 31, and 32 in an order determined by the above expression for generating orthogonal sets. In the exemplary listing below, the source nodes 2712 connecting to a switch 2740 are listed according to an ascending order of their identifiers for ease of illustrating the mutual orthogonality of the sets of source nodes connecting to different switches 2740. For example, the source nodes connecting to switch 2740 of column 0, row 2 of switch plane 1 are determined in the order 2712(10), 2712(16), 2712(22), 2712(3), and 2712(9) as indicated in FIG. 29 but are listed below in the order source nodes 2712(3), 2712(9), 2712(10), 2712(16), and 2712(22). A source-node group connecting to a switch 2740 in one switch plane has at most one source node in common with a source-node group connecting to any other switch 2740 in any other switch plane. For example, switches 2740 in row 0 of all five switch planes have one common source node 2712(0), and switches 2740 in row 2 of all five switch planes have one common source node 2712(10):

| Switch | node index | Switch | Node index |
|---|---|---|---|
| 2740(0, 0, 0) | 0, 1, 2, 3, 4 | 2740(0, 2, 0) | 10, 11, 12, 13, 14 |
| 2740(0, 0, 1) | 0, 6, 12, 18, 24 | 2740(0, 2, 1) | 3, 9, 10, 16, 22 |
| 2740(0, 0, 2) | 0, 8, 11, 19, 22 | 2740(0, 2, 2) | 4, 7, 10, 18, 21 |
| 2740(0, 0, 3) | 0, 7, 14, 16, 23 | 2740(0, 2, 3) | 1, 8, 10, 17, 24 |
| 2740(0, 0, 4) | 0, 9, 13, 17, 21 | 2740(0, 2, 4) | 2, 6, 10, 19, 23 |

Figure 33:
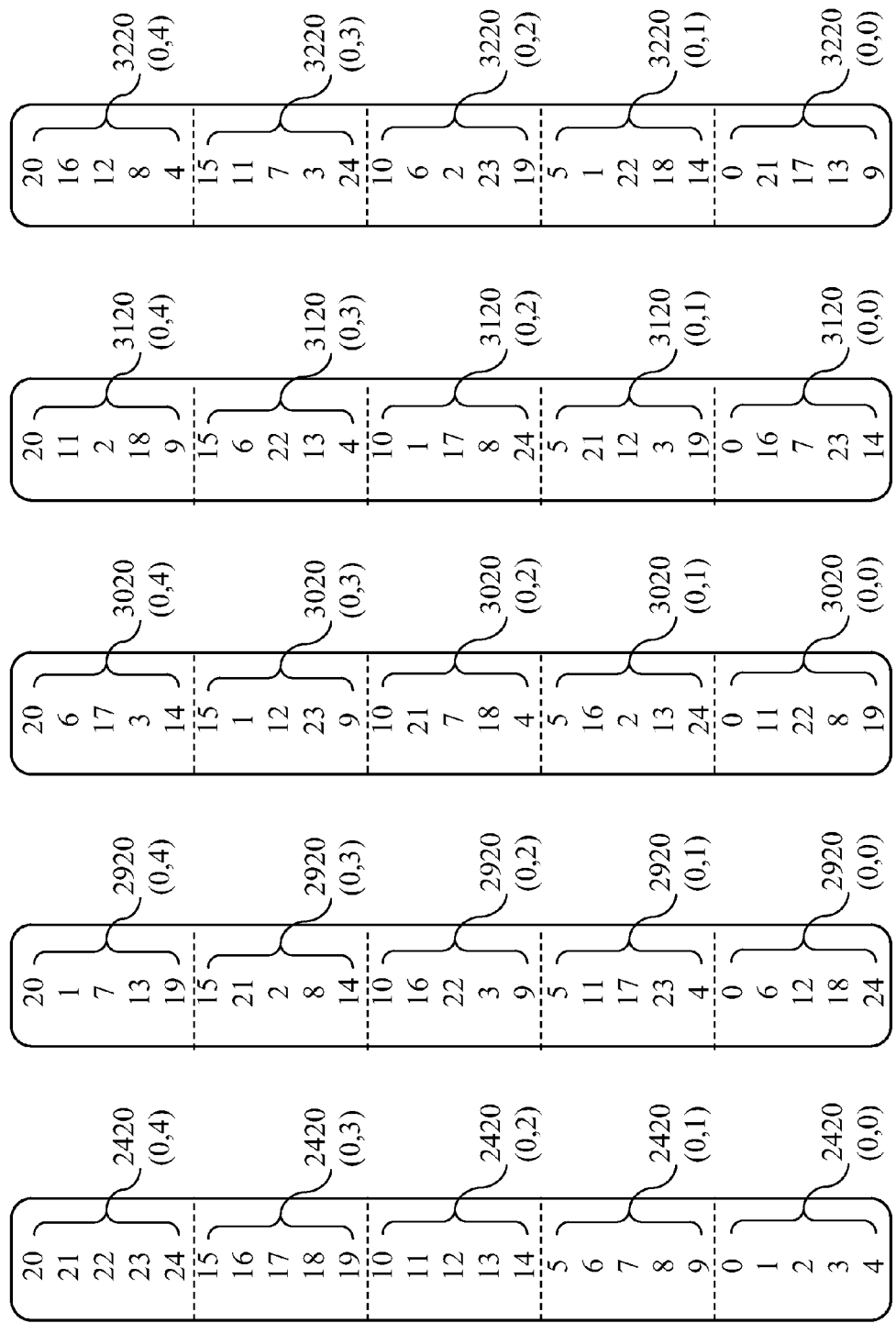
FIG. 33 concisely illustrates the connectivity patterns of the five parallel switch planes of FIGS. 24 and 29-32.

FIG. 33 summarizes the upstream connection patterns of nodes 2720 (source nodes 2712) to switches 2740 in the five switch planes 2750(0), 2750(1), 2750(2), 2750(3), and 2750(4) having the connectivity patterns of FIGS. 24, 29, 30, 31, and 32, respectively. Each source-node group connects to one of the switches 2740 in a row r of a matrix in switch plane 2750(p), 0≤r<ν, 0≤p<Π. Notably any two node groups have at most one node 2720 in common since $\lceil m/\mu \rceil = \lceil 5/5 \rceil = 1$, i.e., the node groups are mutually orthogonal with an orthogonality index of 1.

Control System for a Single-Plane Switching Node

Figure 34:
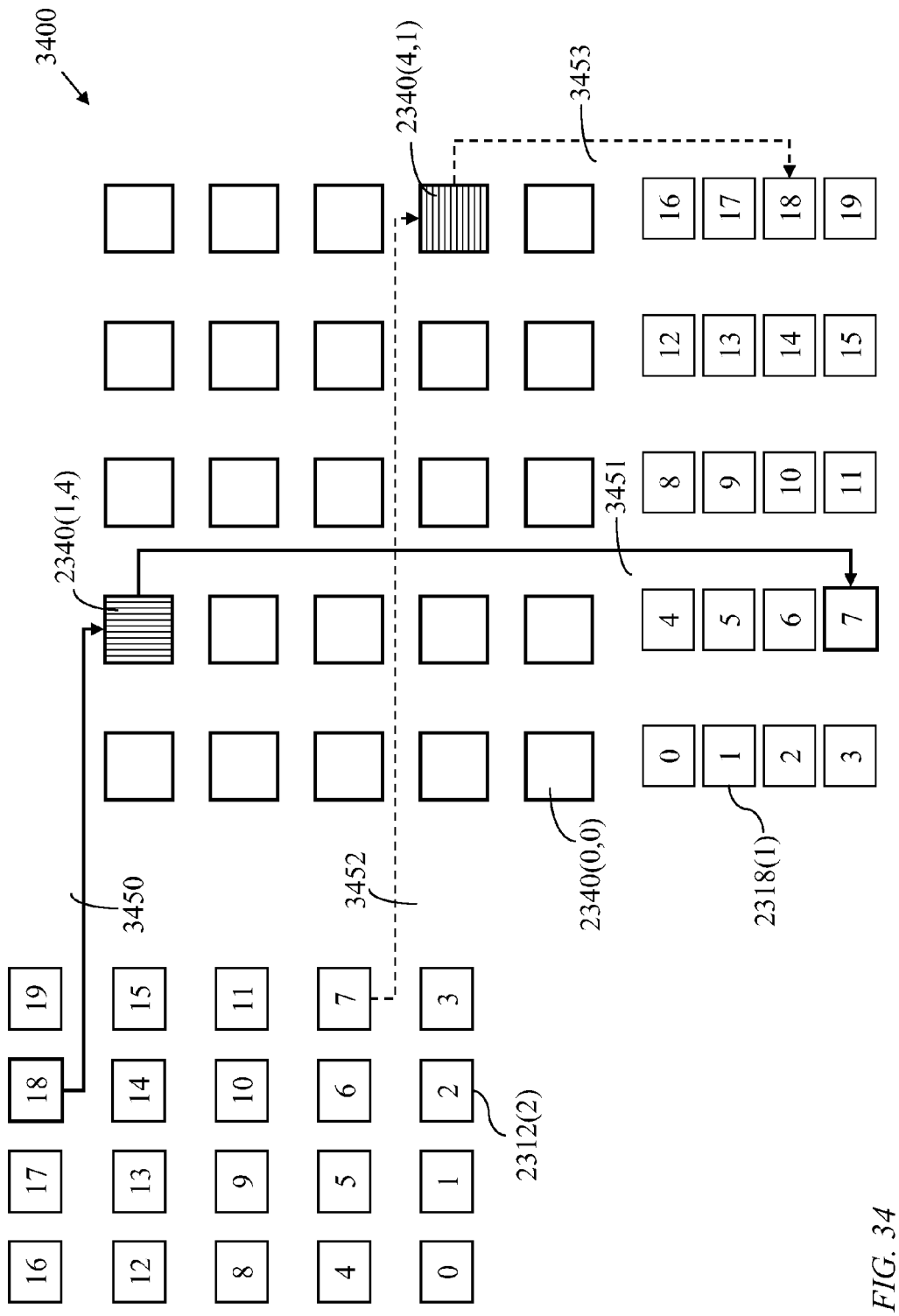
FIG. 34 illustrates a control path for setting up a direct connection from a source node to a sink node in accordance with an embodiment of the present invention.

FIG. 34 illustrates simple control paths according to the present invention for a switching node 3400, similar to exemplary switching node 2300 of FIG. 23, comprising 25 switches 2340 arranged in five rows and five columns. Each switch 2340 in FIG. 34 is of dimension 4×4 (m=n=4), thus 20 source nodes 2312 and 20 sink nodes 2318 may be accommodated. The source nodes 2312 are individually identified as 2312(0), 2312(1), ..., 2312(19), and the sink nodes 2318 individually identified as 2318(0), 2318(1), ..., 2318(19). For brevity, only the indices 0, 1, ..., 19 are used in FIG. 34 to identify the source nodes and sink nodes.

A control path 3450/3451 from a source node 2312(18) to a sink node 2318(7) is illustrated. The control path traverses one switch 2340(1,4) in column 1 and row 4. A reverse path 3452/3453 from source node 2312(7) to sink node 2318(18) traverses switch 2340(4,1) in column 4 and row 1; source node 2312(7) is integrated with sink node 2318(7) and sink node 2318(18) is integrated with source node 2312(18). The availability of a sufficient number of matching time slots for a connection from source node 2312(18) to sink node 2318(7) is determined by a controller of switch 2340(1,4) which communicates the result to a controller of node 2312(7)/2318(7). The controller of node 2320(7) uses the reverse path 3452/3453 to communicate the result to a controller of node 2320 (18).

Each source node 2312 has a path to each sink node 2318 through a switch 2340 and, hence, a controller of any originating node, comprising a source node 2312 and a sink node 2318, can communicate with a controller of any destination node through a reserved control path traversing a single switch 2340 during a dedicated time slot in a slotted time frame. In establishing an indirect connection in a compound path traversing two switches 2340, a controller of the originating node 2312 may communicate with a controller of an intermediate node 2320 as well as a controller of the destination node.

Figure 35:
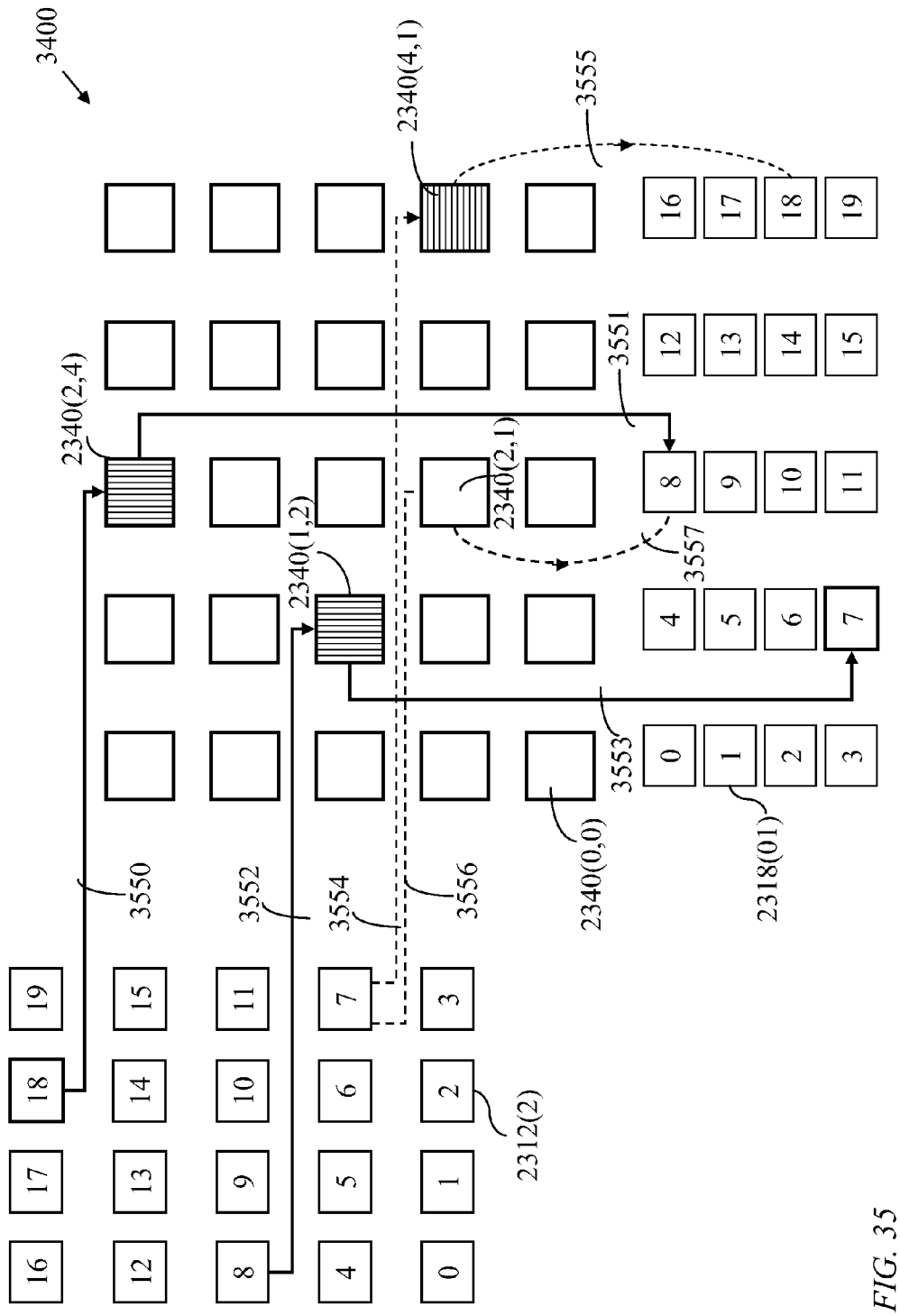
FIG. 35 illustrates allocation of a compound path from a source node to a sink node in a switching node in accordance with an embodiment of the present invention.

FIG. 35 illustrates compound control paths in switching node 3400 of FIG. 34. A control path 3550/3551 from a source node 2312(18) to an intermediate sink node 2318(8) and a control path 3552/3553 from intermediate source node 2318(8) to sink node 2318(7) are used to setup a connection specifying parameters including an identifier of the destination node 2318(7) and a number of time slots per time frame. Intermediate sink node 2318(8) and intermediate source node 2312(8) are integrated and, hence, the two control paths 3550/3551 and 3552/3553 are joined.

A controller of switch 2340(2,4) determines the availability of sufficient matching time slots for a requested connection. If availability is ascertained, the controller of switch 2340(2,4) communicates the parameters of the requested connection to a controller of sink node 2318(8) which is also the controller of source node 2312(8) integrated with sink node 2318(8). The controller of intermediate node 2312(8)/2318(8) communicates the connection requirement to a controller of switch 2340(1,2) which determines the availability of sufficient matching time slots. The result is communicated to the originating node 2312(18)/2318(18) through reverse path 3554/3555. The result may also be communicated to intermediate node 2312(8)/2318(8) through reverse path 3556/3557.

Connection Routing

A switching node 2300, comprising a single switch plane, may be treated as a special case of a multi-plane switching node 2700. As described above, a node comprises a source node and a sink node. The node has asymmetrical transmitting and receiving connections to switches 2740 of a switch plane 2750 in switching node 2700. A node may transmit to a set of switches 2740 but receive from a different set of switches 2740. The connection routing process is first described for a switching node 2700 comprising a single switch plane 2750 having a matrix of switches 2740.

Time sharing of the switches 2740 may be based on a slotted time frame having a predefined number T of time slots each time slot having a predefined duration. A connection request initiated at a source node 2712($u$) specifies a destination node 2718($v$) and a number $\sigma$ of time slots in the slotted time frame. A controller of the originating node 2712($u$) identifies the column of switches 2740 to which the destination node 2718($v$) connects and identifies the output port of the originating node 2712($u$) which has a channel to a switch 2740, in the identified column of switches 2740, having an outward channel to sink node 2718($v$). A temporal matching process is then performed between the channel from the originating node 2712($u$) to the connecting switch 2740 and an outward channel from the connecting switch 2740 to the destination node 2718($v$). If the temporal-matching process determines that less than $\sigma$ time slots can be allocated in the direct path, a compound path is sought through an intermediate switch 2740 and an intermediate node 2712/2718. Several such compound paths may be sought. The $\sigma$ time slots per time frame may be reserved in a single path or multiple paths. However, it is preferable that all the $\sigma$ time slots of a connection be reserved within a single path.

As described above, inbound channels of each sink node 2718 preferably connects to switches of one column in a given switch plane 2750. To simplify the internal routing process, the sink nodes 2718 may be numbered sequentially so that a switch node identifier may be directly associated with a column number in a matrix of switches 2740 in a switch plane 2750($p$). The maximum number of sink nodes 2718 that may connect to a switch 2740 of dimension m×n is n. The sink nodes connecting to a column c, $0 \le c < \mu$ in a switch plane 2750($p$), may be numbered as $\{c \times n\}$ to $\{c \times n + n - 1\}$. This numbering scheme would apply even if a switch 2740 is not fully populated, i.e., if there are less than n sink nodes 2718 connecting to the switch. A sink node 2718($v$) is then easily determined to be in column $\lfloor v/n \rfloor$, where v is the serial number of sink node 2718($v$) the symbol $\lfloor y \rfloor$ denotes the integer part of a real number y. For example, in FIG. 23, or FIG. 27, n=5 and the sink nodes connecting to column 0 may be numbered as 0 to 4, the sink nodes connecting to column 1 may be numbered 5 to 9, and so on. Thus, a sink node 14 for example is easily associated with column $\lfloor 14/5 \rfloor = 2$.

If it is desired, however, to number the sink nodes in an arbitrary fashion, then an array 3602 (FIG. 36) may be used to indicate the column number (reference 3616) to which each sink node is assigned. Exemplary array 3602 corresponds to a switch plane 2750 having a matrix of 20 rows (v=20) and 20 columns (μ=20) of switches 2740 each switch having 256 input ports and 256 output ports, of which one input port and one output port connect to a switch controller and 255 integrated input-output ports (m=n=255) connect to nodes (each node comprising a source node 2712 and a sink node 2718). The maximum number of nodes would then be 20×255=5100 arbitrarily numbered as 0 to 5099. Array 3602 is indexed by a serial number (0, 1, . . . , 5009) of a sink node.

An outbound port number of a source node (in an integrated node) may be conveniently determined according to the column to which the outbound port connects. However, if another numbering system is applied, an array 3604 (FIG. 36), indexed by a column serial number (0, 1, . . . , 19), may be devised and used by a controller of a node to identify the outbound port of the node connecting to each column in the matrix of switches 2740 of a switch plane 2750.

Control Paths

Figure 37:
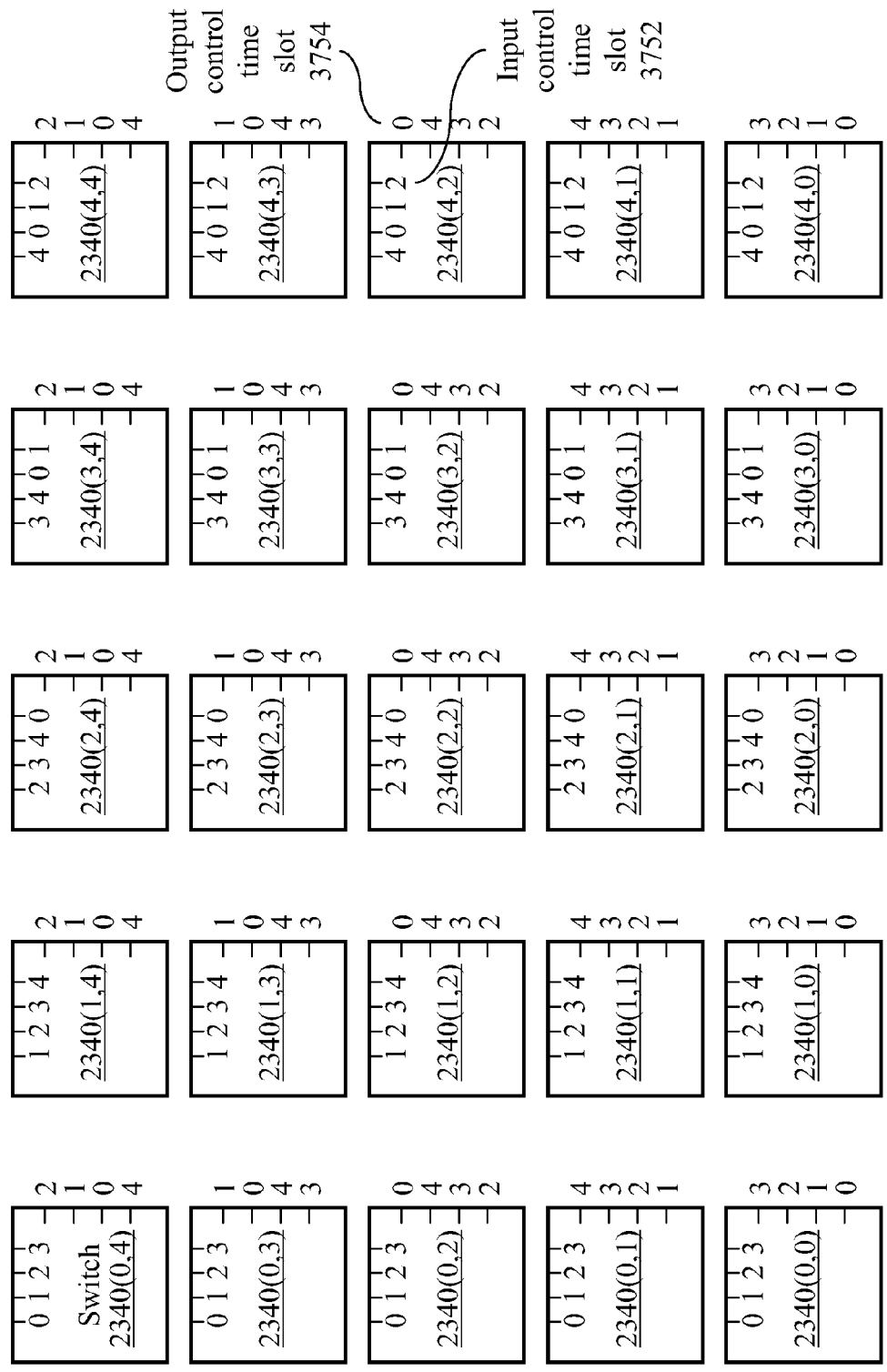
FIG. 37 illustrates an allocation of control time slots within a slotted time frame in accordance with an embodiment of the present invention.
Figure 38:
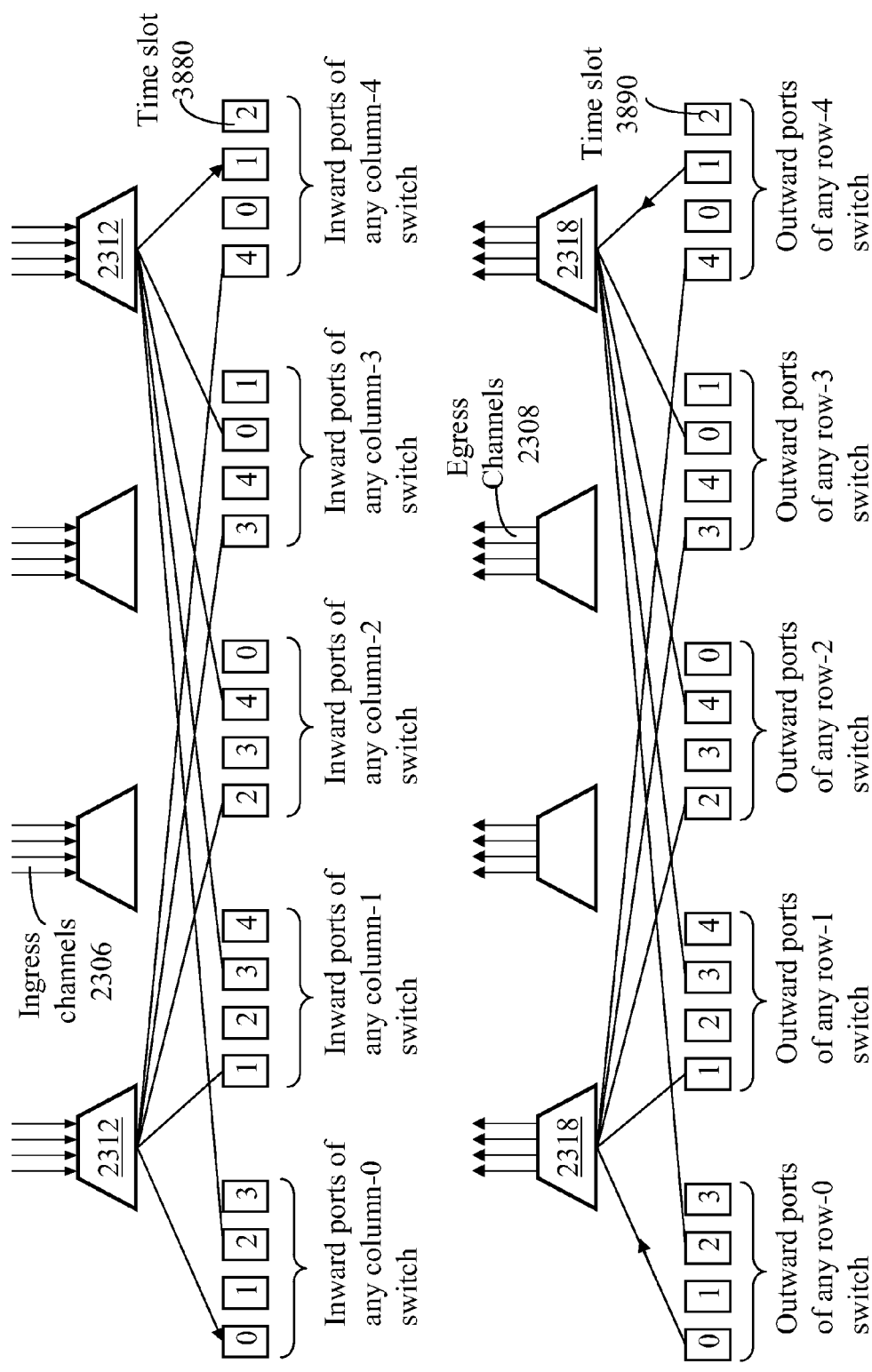
FIG. 38 illustrates a scheme of control-time-slot assignments in the switch of FIG. 23 where the switches use instantaneous space switches in accordance with an embodiment of the present invention.
Figure 39:
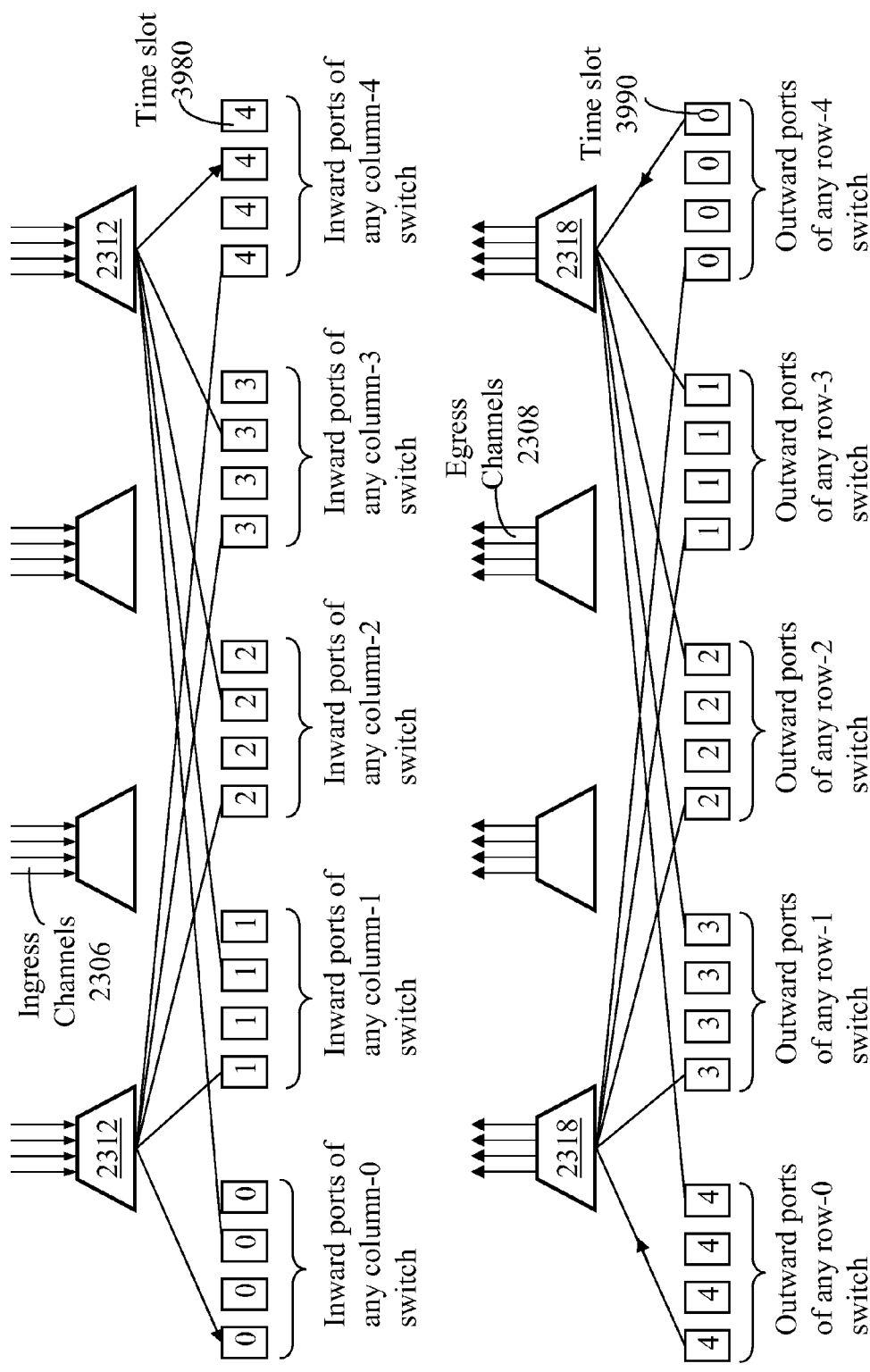
FIG. 39 illustrates a scheme of control-time-slot assignments where the switches are latent space switches in accordance with an embodiment of the present invention.

A scheme for allocating control time slots is illustrated in FIG. 37, FIG. 38, and FIG. 39 for the case where one inward control time slot is allocated per inward channel and one outward control time slot is allocated per outward channel of a switch 340 (2340, 2740).

FIG. 37 illustrates an allocation of control time slots at inlets and outlets of switch 2340 in a switching node 3400 where m=n=4, and where the switches 2340 are instantaneous space switches described above with reference to FIG. 17. The inward control time slots at inlets of a switch 2340 are consecutive (or generally non-coincident) to allow successive access to a controller of the switch 2340. Likewise, the outward control time slots allocated to outlets of a given switch 2340 are consecutive to allow successive transmission of control signals from the controller of the switch 2340 to sink nodes 2318 connecting to the outlets. The control time slots assigned to inlets of switches 2340 of the same column are preferably identical. For example, control time slots 2, 3, 4, and 1 are assigned to inlets of switches 2340(2,0), 2340(2,1), 2340(2,2), 2340(2,3), and 2340(2,4) of column 2. Control time slots assigned to outlets of switches 2340 of the same row are preferably identical. For example, control time slots 0, 2, 3, and 4 are assigned to outlets of switches 2340(0,2), 2340(1,2), 2340(2,2), 2340(3,2), and 2340(4,2) of row 2.

Channels from a source node 2312 to switches 2340 of different columns may be allocated consecutive control time slots so that the source node 2312 may transmit successive control signals to controllers of switches 2340. This is realized with the control-time-slot allocation scheme of FIG. 37 if each source node 2312 connects to likewise-numbered inlets of switches 2340 of different columns.

With the assignment of outward control time slots illustrated in FIG. 37, a sink node 2318 may receive successive control time slots from the switches 2340 of a column if the sink node connects to likewise-numbered outlets of switches in different rows. The use of consecutive control time slots from a source node to switches or from switches to a sink node is desirable but not necessary; the outbound ports and inbound ports of a node (integrated source node and sink node) have buffers which may hold control signals for timing purposes. The control-time-slot assignment of FIG. 37 also applies to switches 2740 of each switch plane 2750 in multi-plane switching node 2700.

FIG. 38 concisely presents the scheme of control time-slot assignments of FIG. 37 where the switches 2340 are instantaneous space switches as described with reference to FIG. 17. The control time slots 3880 associated with the inlets of a switch 2340 are spread over the time frame in order to permit sharing an output port of the switch connecting to a controller of the switch. The control time slots 3890 associated with the outlets of the switch are also spread over the time frame in order to permit transmission of control data from a single input port connecting to the controller of the switch to the outlets of the switch. As described above with reference to FIG. 37, it is desirable, though not necessary, that the control time slots from each source node be non-coincident and the control time slots to each sink node be non-coincident. As indicated in FIG. 38, the control time-slot assignments for the inlets of a switch differ from one column to another but are identical for switches of the same column. The control time-slot assignments for the outlets of a switch differ from one row to another, but are identical for switches of the same row.

FIG. 39 illustrates a scheme of control time-slot assignments in a switching node 3400 (where m=n=4) using switches 2340 which employ latent space switches. Preferably, the exemplary latent space switch of FIG. 18, having m inlets 1814, m outlets 1816, a control inlet 1824, and a control outlet 1826, is used as a latent space switch for each switch 2340. Control inlet 1824 directs control data from the controller 1845 to outlets 1816. Control outlet 1826, receives control data from inlets 1814 for delivery to switch controller 1845. The rotation cycle has a duration of (m+1) time slots. The inlets may be indexed as 0 to m, with control inlet 1824 given index 0 and inlets 1814 given indices 1 to m. Likewise, the outlets may be indexed as 0 to m, with control outlet 1826 given index 0 and outlets 1816 given indices 1 to m.

If input rotator 1837 is an ascending rotator and output rotator 1839 is a descending rotator, a data segment transferred from an inlet j, 0≤j≤m to an outlet k, 0≤k≤m encounters a systematic delay $\Delta_{jk} = \{j-k\}_{modulo\ (m+1)}$. Thus, inward control signals presented to inlets of indices j=1 to j=m at time slot 0, are received at control outlet 1826 (of index k=0) during time slots 1 to m. With m=4, for example, data segments presented to inlets of indices j=1 to j=4 at time slot 2, are received at outlet 1826 (of index k=0) during m consecutive time slots 3, 4, 5, and 6 (cyclic time slots 3, 4, 0, and 1). Outward control signals transmitted from control inlet 1824 (j=0) during consecutive time slots {0, 1, ..., (m−1)} and directed to outlets of indices k=1 to k=m encounter systematic delays of {m, (m−1), ..., 1} time slots, respectively, and are received simultaneously during time slot m at the outlets 1816 of indices k=1 to k=m.

If input rotator 1837 is a descending rotator and output rotator 1839 is an ascending rotator, a data segment transferred from an inlet j, 0≤j≤m to an outlet k, 0≤k≤m encounters a systematic delay $\Delta_{jk} = \{k-j\}_{modulo\ (m+1)}$. Thus, inward control signals presented to inlets of indices j=1 to j=m at time slot 0, are received at outlet 1826 (of index k=0) connecting to the input of switch controller 1845 during time slots {m, (m−1), ..., 1}. With m=4, for example, data segments presented to inlets of indices j=4, 3, 2, and 1 at time slot 0, are received at outlet 1826 (of index k=0) during m consecutive time slots 1, 2, 3, and 4. With m=4, data segments presented to inlets of j=4, 3, 2, and 1 at time slot 2, are received at outlet 1826 (of index k=0) during m consecutive time slots 3, 4, 5, and 6 (cyclic time slots 3, 4, 0, and 1). Outward control signals transmitted from inlet 1824 (j=0) during consecutive time slots {0, 1, 2, 3} and directed to outlets of indices k=4, 3, 2, and 1, respectively, encounter systematic delays of {4, 3, 2, 1} time slots, respectively, and are received simultaneously during time slot m at the outlets of indices k=m to k=1. Thus, during successive time slots, inlet 1824 transmits control signals to outlets selected in an order which leads to concurrent transfer of control signals from the transit memory devices 1838 to the outlets. In the above example, successive control signals are sent to outlets 1816(4), 1816(3), 1816(2), and 1816(1).

The example of FIG. 39, considers five input ports indexed as 0 to 4, and five output ports indexed as 0 to 4. As indicated in FIG. 39, the control time slots 3980 for the inlets of a switch 2340 are selected to be coincident. Thus, control data segments received at coincident time slots at the inlets of the latent space switch of FIG. 18 are delivered, through the rotators 1837 and 1839, to the controller 1845 at consecutive time slots. Control data segments from controller 1845 directed to the outlets of a switch 2340, are transmitted from control inlet 1824 during consecutive control time slots to be read by outlets 1816 during a common time slot 3990. The inward control time slots 3980 may differ from one column to another but may be identical for switches of the same column. As illustrated, each inlet of each switch 2340 in column c is assigned control time slot c, where 0≤c<5. The control-time-slot assignment of FIG. 39 also applies to a switch plane 2750.

Figure 40:
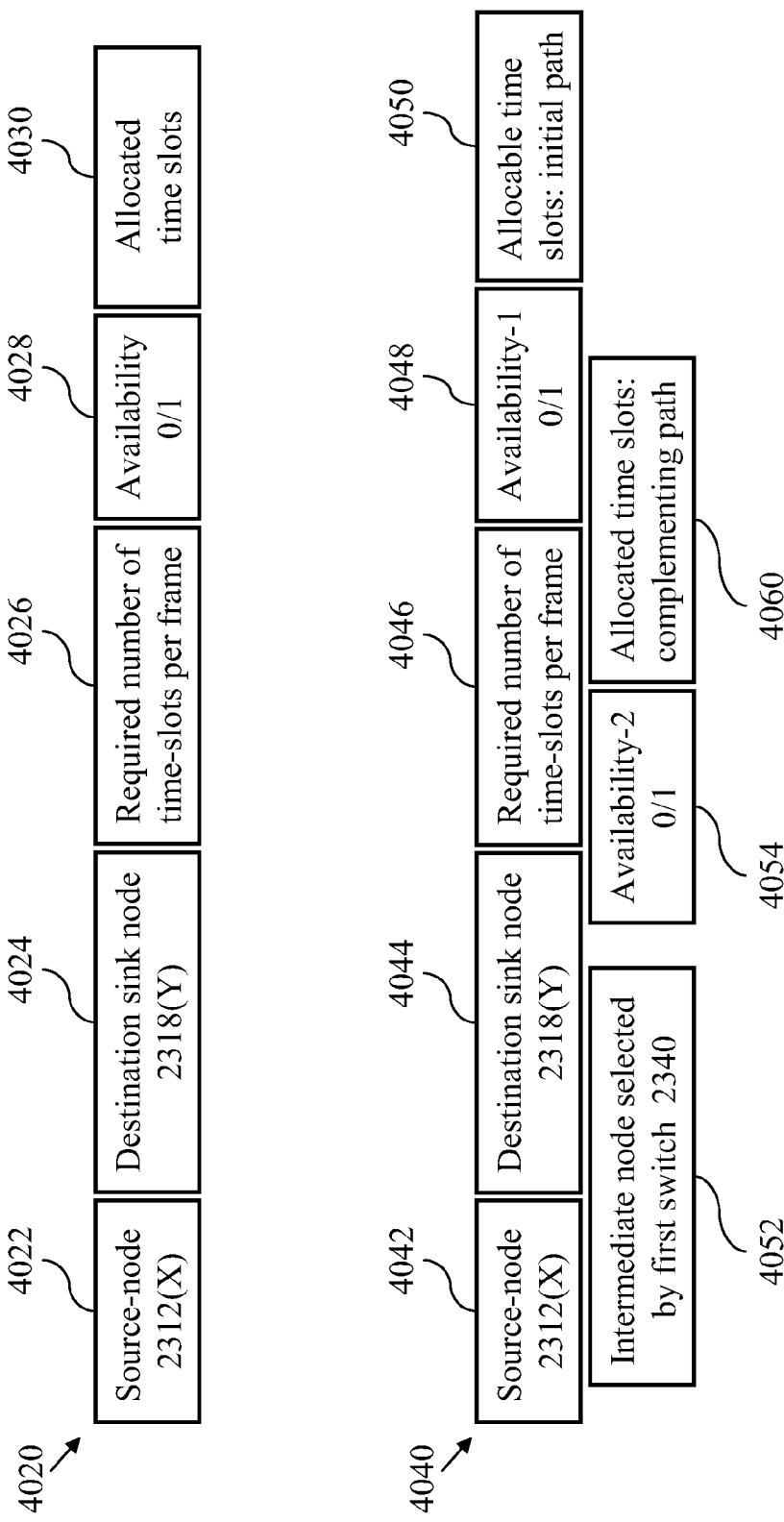
FIG. 40 illustrates a connection request formulated at a source node in accordance with an embodiment of the present invention.

FIG. 40 illustrates a first message 4020 sent by an originating node 2320(X) to establish a simple path to a destination node 2320(Y) and a second message 4040 sent by the originating node 2312(X) to establish a compound path to the destination node 2320(Y). The originating node 2312(X) has a channel to a switch 2340 in each column in matrix 2310. The originating node identifies a switch 2340 which has an outward channel to a target (destination) sink node 2318(Y) and sends a message 4020 to the identified switch 2340. The message includes a field 4022 identifying the originating node 2312(X), a field 4024 identifying the target sink node 2318(Y), a field 4026 indicating a specified number σ of time slots per time frame for the connection, and a field 4028 to be used by the specific switch 2340 to indicate the availability or otherwise of a direct path. Field 4028 is initialized to binary "0". If a controller of the specific switch 2340 determines the availability of σ matching time slots, field 4028 is set to binary "1". Field 4030 identifies the allocated σ time slots. The message is sent to a controller of the destination node 2320(Y). The controller of node 2320(Y) sends availability information to the originating node 2320(X) so that the originating node starts to send data along the allocated path during the allocated time slots if the availability indicator is "1", or starts to seek a compound path if the availability indicator is "0".

If the availability indicator in field 4028 is "0", originating node 2320(X), which has a channel to each of μ>1 switches 2340 in different columns of matrix 2310 selects one of the switches 2340 to establish a first part of a connection to an intermediate node. Any of the μ switches, including the specific switch which has failed to establish a simple path, may be selected as a first switch 2340 for the compound path and any of the sink nodes connecting to the first switch may be used as an intermediate sink node. A compound path may be established through the specific switch which has failed to establish a simple path through one of the (n−1) outlets which connect to nodes 2320 other than the destination node.

The source node 2312(X) forwards a message 4040 to a controller of a switch 2340 selected to be the first switch 2340, of μ candidate switches, in a compound path. The message include a field 4042 identifying the originating node 2312(X), a field 4044 identifying the destination node 2318(Y), a field 4046 indicating a required number σ of time slots to be allocated per time frame, a field 4048 to be used by a first switch 2340 to indicate availability of a first part of a compound path, a field 4052 to identify an intermediate node 2320(W), and a field 4054 to be used by a second switch 2340 to indicate availability of a second part of the compound path. Fields 4048 and 4054 are initialized to "0". A controller of the first switch 2340 performs a time-slot-matching process to allocate σ matching time slots. If the controller of the first switch 2340 determines that a path, of σ time slots, is available to the intermediate node 2320(W), field 4048 is set to "1" and message 4040 is forwarded to a controller of the intermediate node which, in turn, identifies a second switch 2340 to which the destination node 2320(Y) connects. Identifiers of σ allocable time slots for a candidate first segment of a compound path through the first switch are written in field 4050. The controller of the intermediate node forwards message 4040 to a controller of the second switch 2340 which performs a time-slot-matching process to allocate σ matching time slots. If successful, the controller of the second switch 2340 sets the availability field 4054 to "1" and forwards the message 4040 to a controller of the node 2320(Y) which includes the target sink node 2320(Y). Identifiers of σ allocable time slots through the second switch are written in field 4060. The controller of node 2320(Y) then informs the controller of the intermediate node 2320(W) and the controller of the source node 2320(X) to use the respective allocated time slots. If the controller of the first switch 2340 determines that a path with sufficient vacancy to the intermediate node 2320(W) is not available, the controller selects another intermediate node. If a path with sufficient vacancy is not available to any node connecting to the first switch 2340, the controller of the first switch forwards message 4040 through any intermediate node to the controller of node 2320(X) which repeats the entire process of setting up a compound path starting with another first switch 2340.

Temporal Matching

Each controller of an m×n switch 2340 or 2740 maintains an inlet-occupancy state matrix having m columns and T rows, and an outlet-occupancy state matrix having n columns and T rows, where T is the number of time slots in the predefined slotted time frame. To determine the availability of a path, occupying σ time slots, from a specific inlet of a switch 2340 to a specific outlet of the same switch 2340, the controller looks for 'matching time slots" during each of which the specific inlet and the specific outlet are unoccupied (or not reserved). If a sufficient number (σ) of matching time slot is found, a path through the switch is considered available. If the specific outlet connects to the destination node (either in a simple path or in the second part of a compound path), the connection is considered available. If the specific outlet connects to an intermediate sink node (of an intermediate node), then a successful path through the switch 2740 only permits continued processing to determine the second part of a compound path.

Figure 41:
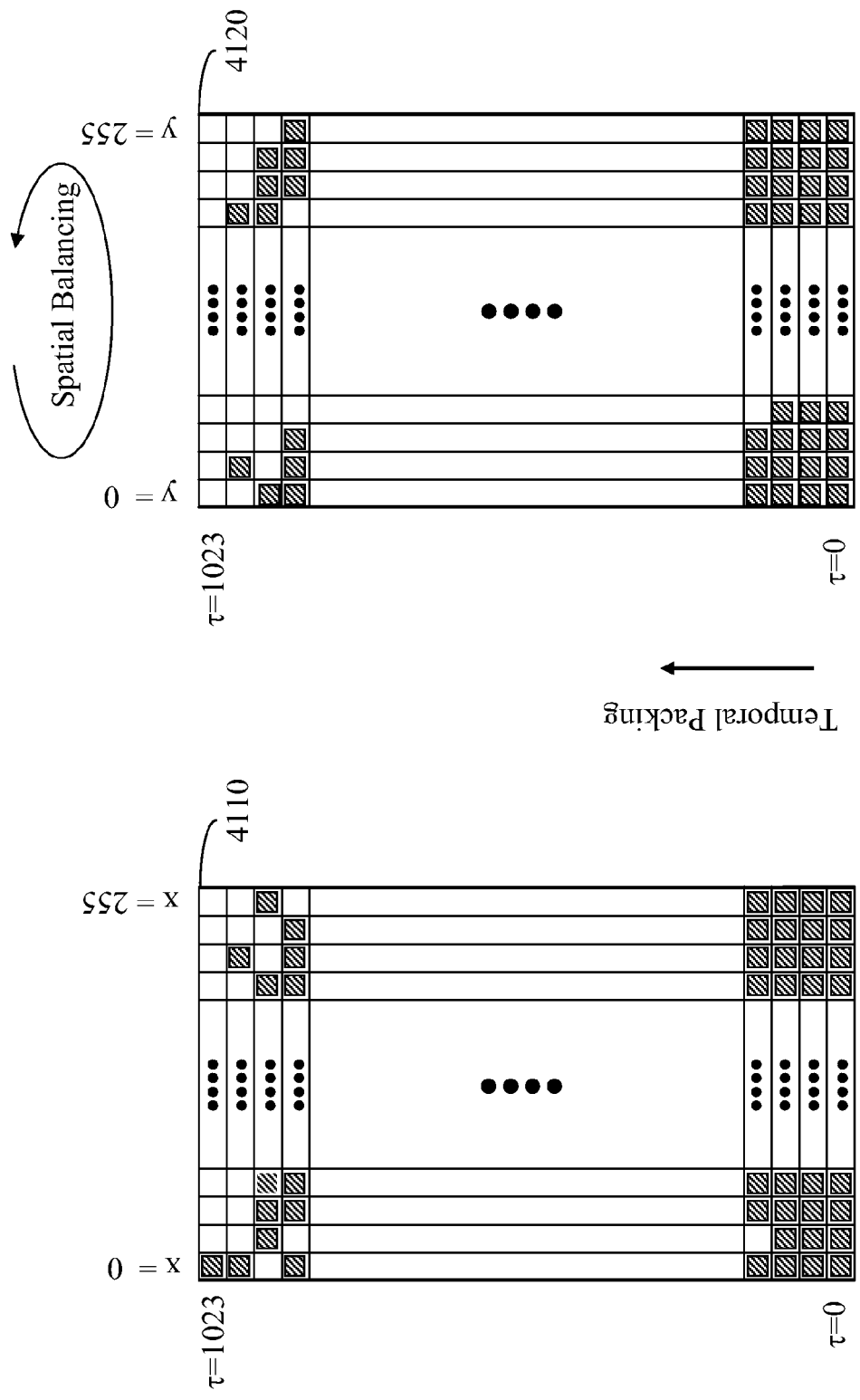
FIG. 41 illustrates data structures for use at a switch for scheduling connections in the switching node of FIG. 23 or FIG. 27 in accordance with an embodiment of the present invention.

FIG. 41 illustrates a data structure used by a controller of a switch 2340 to perform a temporal matching process for a simple path. The illustrated data structure comprises an inlet occupancy matrix 4110 and an outlet occupancy matrix 4120 of a 256×256 switch 2340 using a slotted time frame having 1024 time slots (T=1024) identified as time slots 0 to 1023. The input ports are identified by indices 0 to 255 and the output ports are identified by indices 0 to 255. An input port of index 0 and an output port of index 0 may connect to a controller of the switch, with input ports of indices 1 to 255 being inlets and output ports of indices 1 to 255 being outlets.

In a simple path, or the second part of a compound path, both the inlet and outlet are specified and the search for matching time slots proceeds along one column corresponding to the specified inlet in inlet-occupancy matrix 4110 and one column corresponding to the specified outlet in outlet-occupancy matrix 4120. In the first part of a compound path, only the inlet of the switch 2340 is specified and any outlet of the same switch 2340 may be a candidate for establishing the first part of the compound path. It may be desirable that sink nodes of the entire switching node 2300 equitably share the extra transit loading of the compound paths. Therefore, in establishing the first part of the compound path, a column in the outlet occupancy matrix is preferably selected in a cyclic fashion. Thus, the controller of a switch 2340 of dimension m×n may maintain an identifier of a "last considered" outlet of the switch and increases the identifier by one (with a modulo-n operation) each time an outlet has been considered for transit (i.e., for a first part of a compound path). When an outlet is considered as a candidate for transit, a temporal matching process is performed between a column in occupancy matrix 4110 corresponding to the specified inlet of the switch 2340 and a column in occupancy matrix 4120 corresponding to the candidate outlet of the switch 2340.

Temporal Packing and Transit-Memory Packing

The structural capacity of a switch 340 (or either of corresponding switches 2340 or 2740) is determined by the capacity of its switching fabric, the combined capacity of the inlets, and the combined capacity of the outlets. There are many ways of defining a "traffic capacity" of a switch. The simplest is to view the traffic capacity as the highest occupancy of a switch at which the probability of unavailability of a free path through the switch does not exceed a predefined value traditionally called a "grade of service". A typical grade of service is of the order of 0.01 with a typical corresponding occupancy of 0.9. In the switching node 300, 2300, or 2700 of the present invention, there are numerous non-intersecting paths from any node to any other node and the probability of rejecting a connection is infinitesimally small, even with a switch grade of service substantially exceeding 0.01.

The traffic capacity of a switch having a contention-free switching fabric is determined by the structural capacity of the switch and the traffic characteristics. The traffic capacity of a switch having a contention-based switching fabric is determined by the structural capacity of the switch, the traffic characteristics, and the method used for establishing a path through the switching fabric. A switch 340 of a relatively small dimension, such as 64×64, may be based on a contention-free switching fabric. Practically, a switch 340 of moderate dimension, such as 256×256, would be based on a contention-based switching fabric.

In a switch 340 where the switching fabric is an instantaneous space switch, it is well known that establishing a path according to a temporal-packing policy increases the traffic capacity. In a temporal-packing process, the search for a free path within the space switch for each connection request starts from a common reference time slot in a time-slotted frame. For example, the search may start from time-slot 0, in a time-slotted frame having T time slots indexed as 0 to (T−1), regardless of the originating node, the destination node, or the specified number of time slot per frame for a connection.

In a switch 340 where the switching fabric is a latent space switch of the type described with reference to FIG. 18, the traffic capacity can be increased to approach the structural capacity by using a transit-memory-packing process where the search for a free path within the latent space switch for each connection request starts from a common transit memory 1838. For example, the search may start from a first transit memory in the array of transit memories 1838 regardless of the originating node, the destination node, or the specified number of time slot per frame for a connection.

Path Setup

Figure 42:
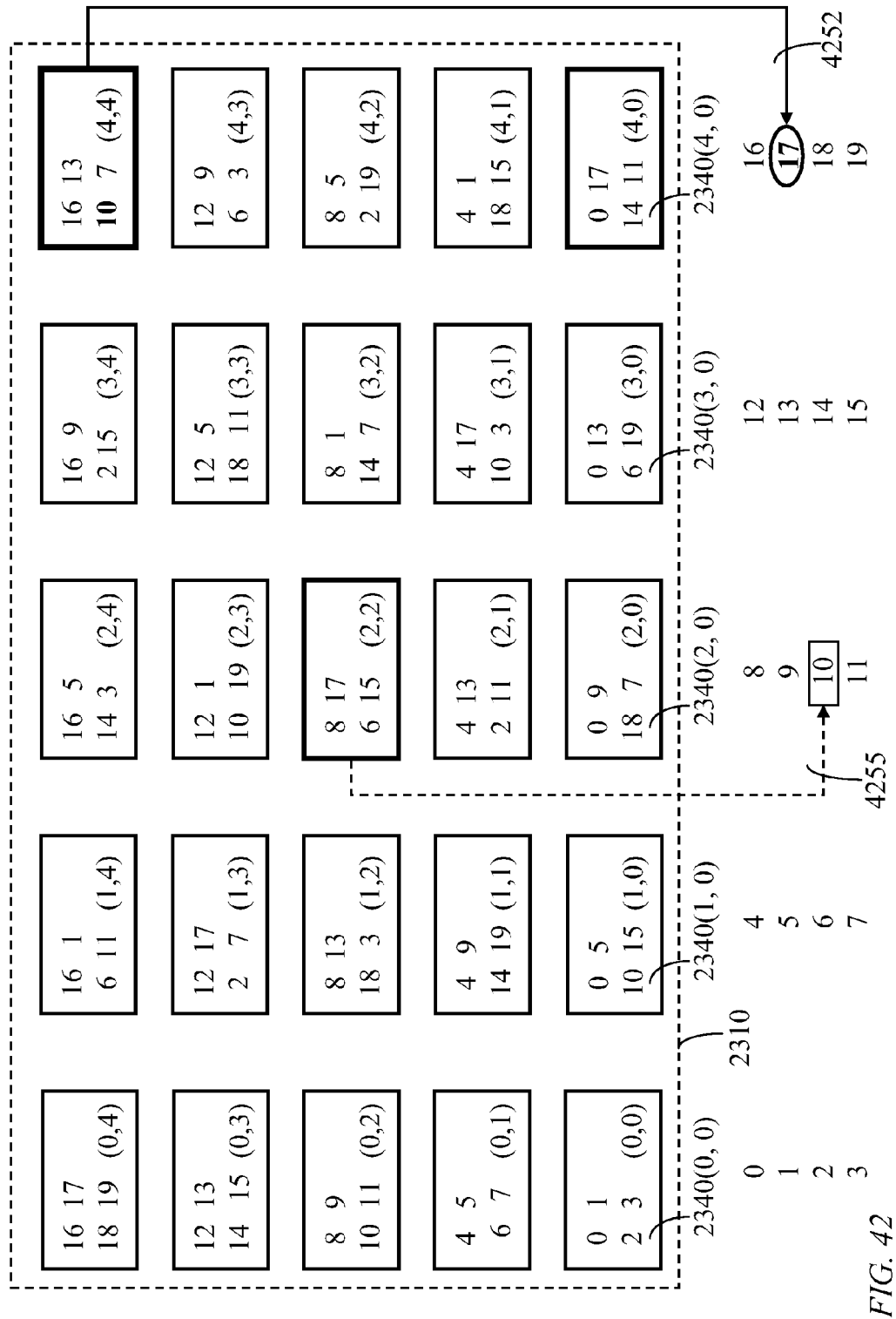
FIG. 42 illustrates a simple path through the switching node of FIG. 23 or FIG. 27 in accordance with an embodiment of the present invention.

FIG. 42 illustrates a simple path through a switching node 3400 where each switch 2340 is of dimension 4×4. A simple path 4252 from any of source nodes 2312(x) of indices x=7, 10, 13, or 16 to any of sink nodes 2318(y) of indices y=16, 17, 18, or 19 traverses only switch 2340(4,4). With integrated source nodes 2312 and sink nodes 2318 of similar indices, an internal path from source-node 2312(16) to destination sink-node 2318(16) is set within the integrated node 2312(16)/ 2318(16) and need not traverse switch 2340(4,4). To establish a connection specifying a flow rate expressed as σ time slots per time frame along a simple path 4252, the controller of switch 2340(4,4) performs a time-slot matching process to allocate σ time slots. If successful, the request is accepted and source node 2312(17), which is integrated with destination node 2318(17), communicates to the originating node 2312 (10), through a path 4255, acceptance of the connection-request and identifiers of allocated time slots.

Figure 43:
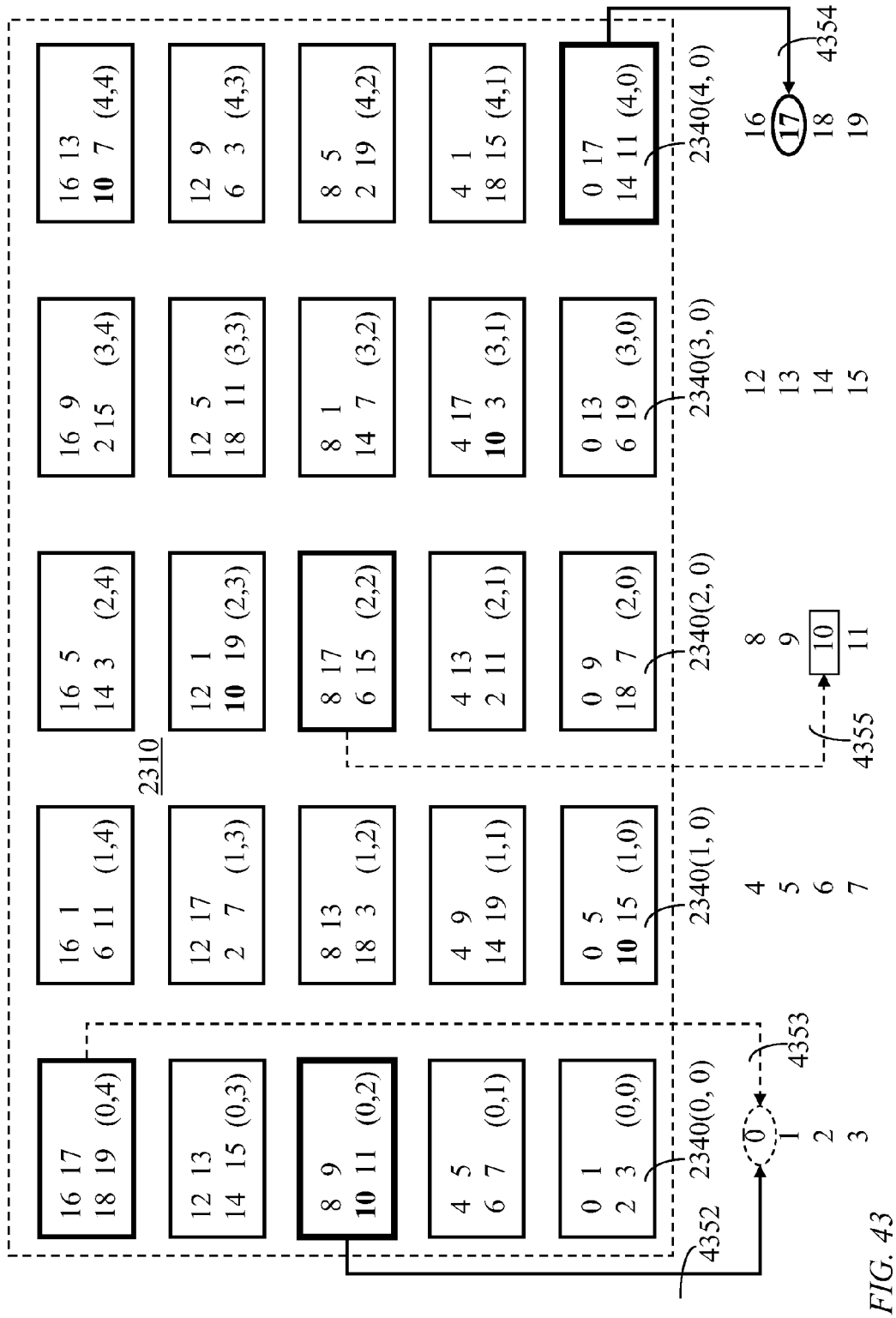
FIG. 43 illustrates a compound path through the switching node of FIG. 23 or FIG. 27 in accordance with an embodiment of the present invention.

FIG. 43 illustrates a compound path from originating node 2312(10) to destination node 2318(17). Such a path is needed if the simple path 4252 illustrated in FIG. 42 is not available. The compound path illustrated in FIG. 43 traverses switches 2340(0,2) and 2340(4,0). Switch 2340(0,2) connects to source nodes 2312 of indices 8, 9, 10, and 11, and to sink nodes 2318 of indices 0, 1, 2, and 3. A path 4352 from source node 2312(10) to any sink node 2318(y) of index y=0, 1, 2, or 3 may constitute a first part of the compound path. The selected first path in FIG. 43 traverses switch 2340(0,2) to sink node 2318(0) through path 4352. A controller of switch 2340(0,2) performs a time-slot matching process to allocate σ time slots. If successful, a corresponding second path 4354 from source node 2312(0), which is integrated with sink node 2318(0), to sink node 2318(17) through switch 2340(4,0) is examined. A controller of switch 2340(4,0) performs a time-slot matching process to allocate σ time slots. If successful, source node 2312(17), which is integrated with sink node 2318(17) confirms acceptance of the connection request to both the intermediate node 2320(0), and the source node 2320(10) through paths 4353 and 4355, respectively.

FIG. 44 illustrates a table 4400 of compound paths in a switching node 2300, or a switch-plane 2750 of a multi-plane switching node 2700, based on the connectivity pattern of FIG. 42 (and FIG. 43). The illustrated paths include compound paths from source node 2312(10) to sink node 2318 (17). Each compound path traverses a first switch 2340(j,k) and a second switch 2340(x,y) in switch matrix 2310, where j, k are column and row indices of the first switch and (x,y) are column and row indices of the second switch. As illustrated in FIG. 42, source node 2312(10) and sink node 2318(17) connect to a common switch 2340(4,4) which may be used for a simple path from source node 2312(10) to sink node 2318(17) and is, therefore, excluded from the list of compound paths. Consequently, switch 2340(4,4) may not be used as a second switch in a compound path. As indicated in column 4412 of table 4400, a first subset of compound paths traverses a first switch 2340(0,2) which connects to candidate intermediate sink nodes 2318 of indices 0, 1, 2, and 3 as indicated in column 4414 of table 4400. Source nodes 2312(0), 2312(1), 2312(2), and 2312(3) connect to switches 2340 of indices (4,0), (4,1), (4,2), and (4,3), respectively as indicated in column 4416 of table 4400, each of which having a channel to the target sink node 2318(17); for example, path 4354 from switch 2340(4,0) to target sink node 2318(17). The result, regarding the acceptance or otherwise, of path reservation is communicated to the source node 2312(10) and to an intermediate node 2320, of index 0 for example, selected to complete the connection through a respective switch 2340. A controller of switch 2340(2,2) which has a channel from source node 2312(17), integrated with the target sink node 2318 (17), communicates the result to sink node 2318(10) integrated with source node 2312(10). The result is communicated by a controller of switch 2340(0,4) to a controller of intermediate node 2320(0).

Likewise, a second subset, a third subset, and a fourth subset of compound paths from source node 2312(10) to sink node 2318(17) traverse first switches 2340(1,0), 2340(2,3), and 2340(3,1), respectively, as indicated in column 4412 of table 4400, with corresponding intermediate nodes as indicated in column 4414 and second switches as indicated in column 4416. Column 4418 of table 4400 indicates, for each of the four subsets of compound paths, the switches 2340 which communicate the path-search result to the source node 2312(10) and to any of selected intermediate nodes. In the third subset of compound paths, the same switch 2340(2,2) communicates the result to both the source node and the intermediate node. In the second subset of compound paths traversing switch 2340(1,0), a path from source node 2312 (10) to sink node 2318(7) is not a candidate for a compound path because a compound path is attempted only after it is established in the process of FIG. 42 that a path from switch 2340(4,4), which connects to source nodes 2312 of indices 7, 10, 13, and 16, to sink node 2318(17) does not have sufficient vacancy to accommodate a requested connection. For the same reason, the fourth subset of compound paths traversing switch 2340(3,1) excludes a path from source node 2312(10) to sink node 2318(13).

Orthogonality

FIGS. 24 and 29-32 illustrate an upstream connectivity pattern characterized by cross-plane orthogonality but no intra-plane orthogonality. FIG. 45 illustrates an alternate upstream-connectivity pattern of nodes 2720 to switches 2740 of each of three switch planes 2750 where all sets 4525 of nodes 2720 connecting to inlets of switches 2740 of a switch plane 2750 are mutually orthogonal. Each set 4535 of nodes 2720 (sink nodes 2718) connects to outlets of switches 2740 of a respective column. Sets 4535 of nodes connecting to switches 2740 of different columns of a same switch plane 2750 are mutually disjoint and sets 4535 of nodes connecting to switches 2740 of columns of a same index in different switch planes 2750 are mutually disjoint.

The connectivity pattern of FIG. 45 ensures that any two switches 2740 which connect to a same set of nodes in the downstream direction connect to different sets of nodes in the upstream direction. Preferably, the different sets are selected to be mutually orthogonal. Thus, all switches 2740 which connect to a same set of nodes in the downstream direction connect in the upstream direction to mutually orthogonal sets of nodes. Thus, data is delivered to any destination node through a number of switches which receive data originating from orthogonal sets of nodes. This property of the switching node results in equalizing the switching loads of all switches 2740, even with a large variance of inter-nodal data flow rates, and increasing the proportion of data routed through simple paths. For example, referring to FIG. 45, simple paths leading to node 2720(0) and originating from all nodes 2720(0) to 2720(19) traverse switches (0, r, j), (4, r, 1), and (3, r, 2), $0 \leq r < 5$, of switch planes 2750(0), 2750(1), and 2750(2), respectively. The 15 switches receive data from orthogonal sets of nodes as illustrated in Table I below, which is derived from FIG. 45. The node sets are represented by indices of constituent nodes 2720.

TABLE I

Node sets connecting to inlets of 15 switches each having a channel to node 2720(0)

| Switch plane 2750(0) | Switch plane 2750(1) | Switch plane 2750(2) |
|---|---|---|
| 16, 17, 18, 19 | 3, 06, 09, 12 | 1, 07, 08, 14 |
| 12, 13, 14, 15 | 02, 05, 08, 19 | 03, 04, 10, 17 |
| 08, 09, 10, 11 | 01, 04, 15, 18 | 00, 06, 13, 19 |
| 4, 05, 06, 07 | 00, 11, 14, 17 | 2, 09, 15, 16 |
| 00, 01, 02, 03 | 07, 10, 13, 16 | 5, 11, 12, 18 |

The connectivity pattern of FIG. 45 further ensures that switches 2740 of a same row of a matrix of switches of any switch plane 2750 are mutually disjoint and all switches of a same column of a matrix of any switch plane 2750 are mutually disjoint. Thus, the switches of a same row collectively switch data received from all $\mu \times n$ nodes 2720 of the switching node 2700 and the switches of a same column collectively switch data received from all $\mu \times n$ nodes 2720 of the switching node 2700.

The connectivity pattern of FIG. 45 further ensures that all sets of nodes 2720 individually connecting to inlets of respective switches of a specific switch plane are mutually orthogonal. Thus, any set of nodes 2720 connecting to inlets of any switch 2740 of a specific switch plane and any other set of nodes 2720 connecting to inlets of any other switch 2740 of the specific switch plane have a number of nodes in common not exceeding a predefined upper bound.

Selecting the number of columns, $\mu$, to be a prime number, with $v=\mu$, input orthogonality with an orthogonality index of $\lfloor m/\mu \rfloor$ may be realized by connecting a node 2720 of index $\eta$, $0 \leq \eta < (\mu \times n) = (v \times m)$, to inlets of a first set of $\mu$ switches and outlets of a second set of $v$ switches selected as follows.

The first set includes a switch in each column c, $0 \leq c < \mu$, in each switch plane $0 \leq \pi < \Pi$, in row r determined as $r=\{\lfloor \eta/m \rfloor - c - c \times (\eta)_{modulo\ m}\}_{modulo\ \mu}$, The second set includes a switch in each row $\rho$, $0 \leq \rho < v$, in each switch plane $0 \leq \pi < \Pi$, in column $\kappa$, determined as $\kappa = \{\lfloor \eta/n \rfloor + \pi\}_{modulo\ \mu}$.

In another arrangement, the first set includes a switch in each column c, $0 \leq c < \mu$, in each switch plane $0 \leq \pi < \Pi$, in row r determined as $r = \{\lfloor \eta/m \rfloor - (c+\pi) \times (1+(\eta)_{modulo\ m})\}_{modulo\ \mu}$, while the second set includes a switch in each row $\rho$, $0 \leq \rho < v$, in each switch plane $0 \leq \pi < \Pi$, in column $\kappa$, determined as $\kappa = \lfloor \eta/n \rfloor$.

Figure 49:
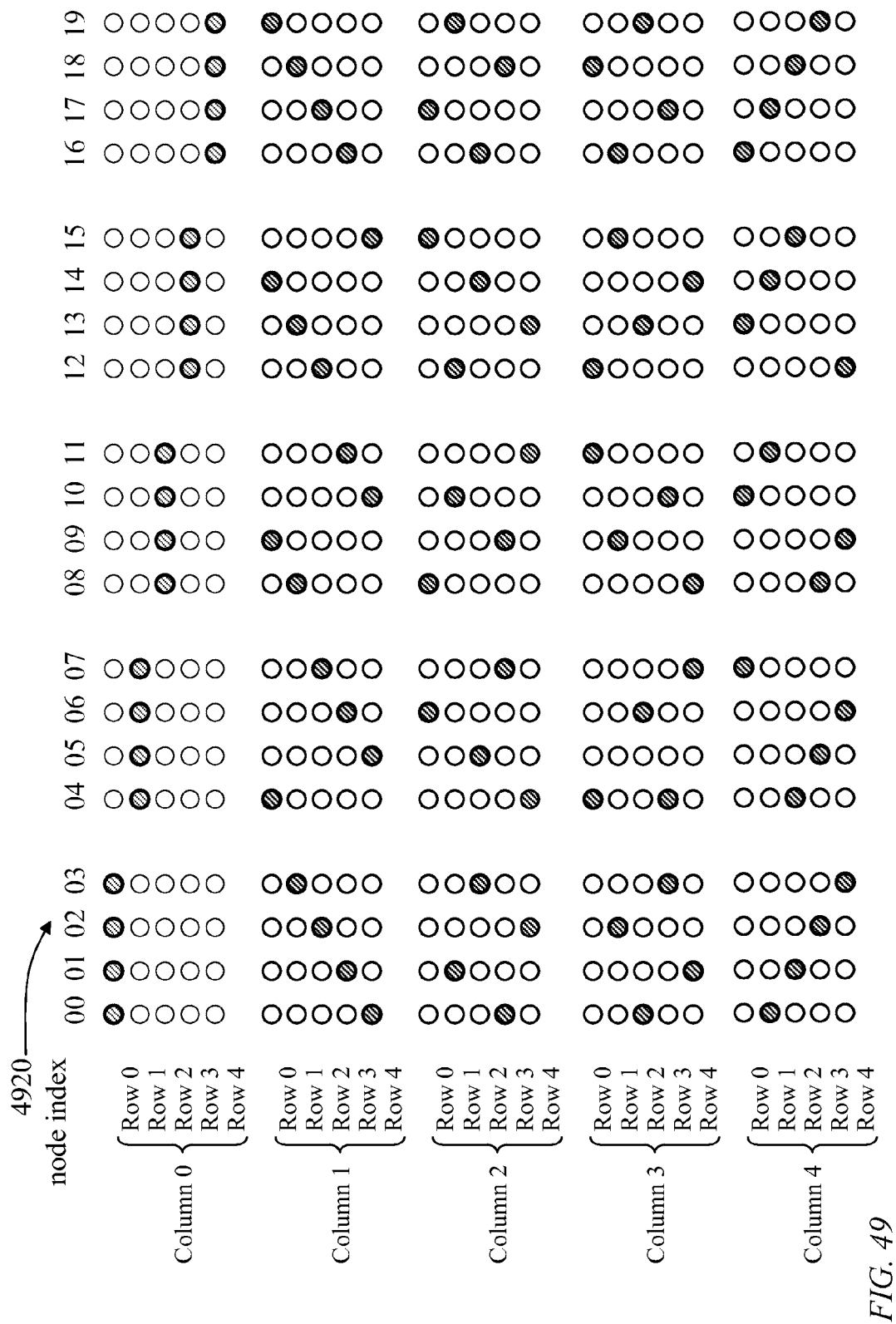
FIG. 49 illustrates disjoint sets of nodes connecting to switches of a same column of a switch plane having switches arranged in a matrix, in accordance with an embodiment of the present invention.

A switch 2740 in column c, $0 \leq c < \mu$, row r, $0 \leq r < v$, and switch plane $\pi$, $0 \leq \pi < \Pi$ connects to upstream channels from a set of m nodes 2720 of indices:

$$\{j \times (1+m \times c) + m \times (r+c)\}_{modulo\ S},\ 0 \leq j < m,$$

and downstream channels to a set of n nodes 2720 of indices $(n \times (c+\pi)+k)_{modulo\ \mu}$, $0 \leq k < n$. Thus, the upstream connectivity pattern is the same for all switch planes 2750 where $\Pi$ switches of a same column index and a same row index connect to a same set of nodes. For example, a set of nodes 2720 of indices {01, 10, 12, 19} connects to inlets of three switches 2740 of indices {(2, 1, 0), (2, 1, 1), and (2, 1, 2)}. However, the three switches connect in the downstream direction to different sets of nodes 2720 of indices {08, 09, 10, 11}, {12, 13, 14, 15}, and {16, 17, 18, 19}, respectively, as illustrated in FIGS. 45 and 49.

If $\mu$ is selected as a prime number and $v=\mu$, the orthogonality index of node sets with upstream channels to respective switches 2740 is $\lceil m/\mu \rceil$.

Alternatively, a switch 2740 in column c, $0 \leq c < \mu$, row r, $0 \leq r < v$, and switch plane $\pi$, $0 \leq \pi < \Pi$ connects to upstream channels from a set of m nodes 2720 of indices:

$$\{j \times (1+m \times \kappa)+m \times (r+\kappa)\}_{modulo\ S},\ 0 \leq j < m,\ \kappa = (c+\pi)_{modulo\ \mu};$$

and downstream channels to a set of n nodes 2720 of indices $(n \times c+k)_{modulo\ \mu}$, $0 \leq k < n$.

Thus, according to the connectivity pattern of FIG. 45, $\Pi$ switches 2740 of a same column and row indices in $\Pi$ switch planes 2750 connect at inlet to a same set 4525 of nodes 2720 (i.e., a same set of source nodes 2712). For example, a set 4525 of nodes {01, 10, 12, 19} connects to inlets of switches 2740(2,1,0), 2740(2,1,1), and 2740(2,1,2) of switch planes 2750(0), 2750(1), and 2750(2), respectively.

A set 4535 of nodes 2720 (a set of sink nodes 2718) connects to outlets of switches 2740 of a respective column within each switch plane 2750. However, the index of the respective column is switch-plane specific. For example, a set 4535 of nodes 2720 (sink nodes 2718) of indices {00, 01, 02, 03} connects to all switches 2740 of column 0 in switch plane 2750(0), all switches of column 4 of switch plane 2750(1), and all switches of column 3 of switch plane 2750(2).

Figure 46:
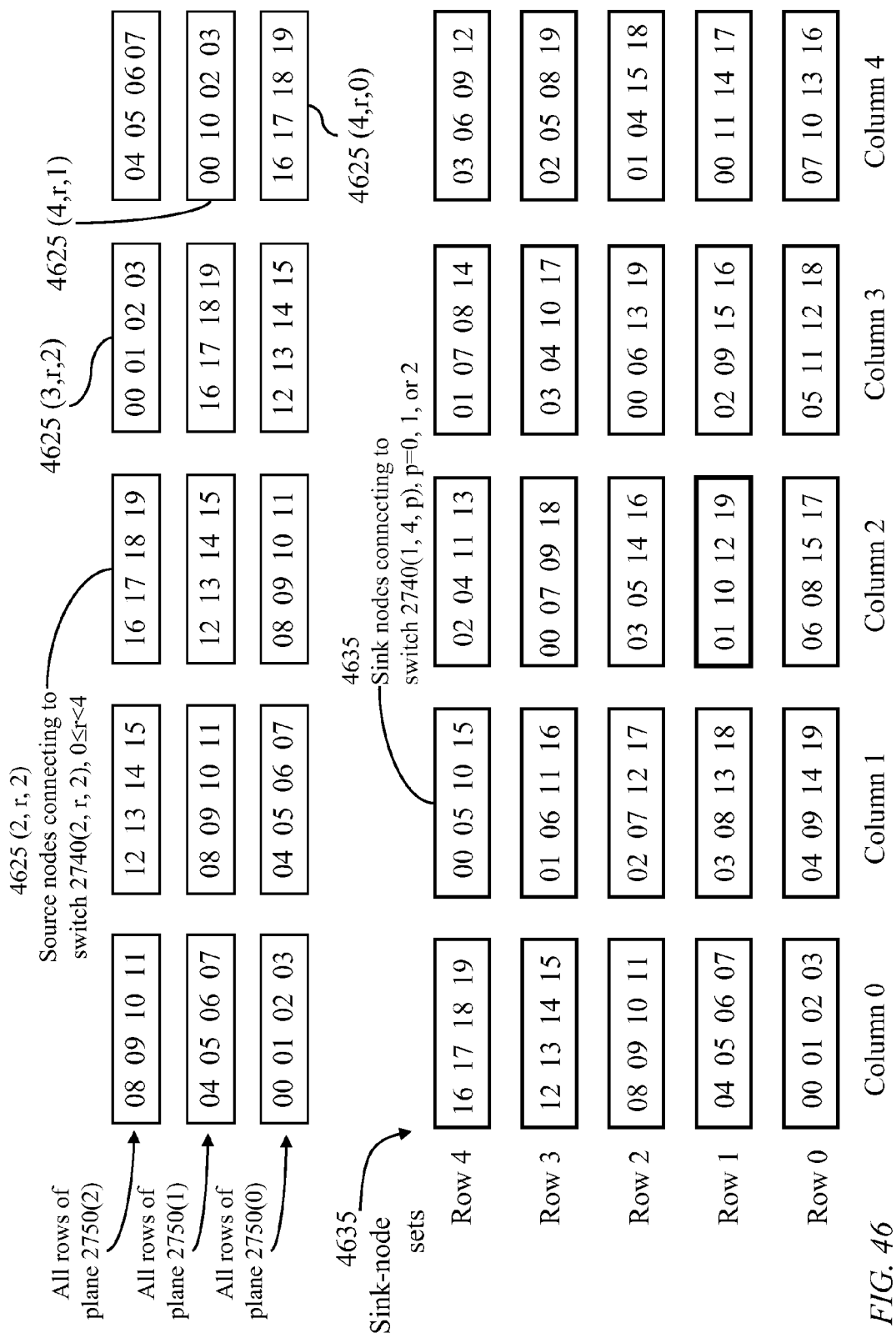
FIG. 46 illustrates a first orthogonal-connectivity pattern of nodes to outlets of switches of multiple switch planes in accordance with an embodiment of the present invention.

FIG. 46 illustrates a downstream-connectivity pattern of nodes 2720 to switches 2740 of each of three switch planes 2750 where all sets 4635 of nodes 2720 (sink nodes 2718) connecting to outlets of switches 2740 of a switch plane 2750 are mutually orthogonal. Sets 4625 of nodes 2720 (source nodes 2712) connecting to switches 2740 of different columns of a same switch plane 2750 are mutually disjoint and sets 4625 of nodes 2720 connecting to switches 2740 of columns of a same index in different switch planes 2750 are mutually disjoint.

The connectivity pattern of FIG. 46 ensures that any two switches 2740 which connect to a same set of nodes in the upstream direction connect to different sets of nodes in the downstream direction. Preferably, the different sets are selected to be mutually orthogonal. Thus, all switches 2740 which connect to a same set of nodes in the upstream direction connect in the downstream direction to mutually orthogonal sets of nodes.

Thus, data is delivered to a node through a number of switches 2740 which switch data terminating in orthogonal sets of nodes. For example, referring to FIG. 46, simple paths from node 2720(0) terminating in other nodes 2720(1) to 2720(19) traverse 15 switches (0, r, 0), (4, r, 1), and (3, r, 2), 0≤r<5, of switch planes 2750(0), 2750(1), and 2750(2), respectively. The 15 switches transmit data to orthogonal sets of receiving nodes 2720 (sets of sink nodes 2718). The orthogonal sets of receiving nodes have indices identical to the indices of the transmitting nodes of Table I above. This property of the switching node results in equalizing the switching loads of all switches 2740, even with a large variance of inter-nodal data flow rates. Consequently, the proportion of data routed through simple paths is increased.

The connectivity pattern of FIG. 46 further ensures that all sets of nodes connecting to outputs of switches 2740 of a same row of a matrix of switches of any switch plane 2750 are mutually disjoint. Likewise, all sets of nodes connecting to outputs of switches 2740 of a same column of a matrix of any switch plane 2750 are mutually disjoint. Thus, the switches of a same row collectively switch data to all $\mu \times n$ nodes 2720 of the switching node 2700 and the switches of a same column collectively switch data to all $\mu \times n$ nodes 2720 of the switching node 2700.

The connectivity pattern of FIG. 46 further ensures that all sets of nodes 2720 individually connecting to outlets of respective switches of a specific switch plane are mutually orthogonal. Thus, any set of nodes 2720 connecting to outlets of any switch 2740 of a specific switch plane 2750 and any other set of nodes 2720 connecting to inlets of any other switch 2740 of the specific switch plane have a number of nodes in common not exceeding a predefined upper bound.

Any two switches 2720 which connect to a same set of nodes in the upstream direction connect to different sets of nodes in the downstream direction. Preferably, the different sets are selected to be mutually orthogonal. Thus, all switches 2740 which connect to a same set of nodes in the upstream direction connect in the downstream direction to mutually orthogonal sets of nodes. Thus, data is sent from any originating node through a number of switches 2740 directing data to orthogonal sets of nodes. This results in equalizing the switching loads of all switches, even with a large variance of inter-nodal data flow rates, and increasing the proportion of data routed through simple paths.

In the connectivity pattern of FIG. 46, the outlets of each switch 2740 of a same column and a same row in each switch plane connect to a same set of (sink) nodes. While switches 2740 of a same column in different switch planes 2750 connect at inlet to mutually disjoint sets of (source) nodes 2712. A first set of (sink) nodes connecting to outlets of any switch in a specific switch plane is orthogonal to a second set of (sink) nodes connecting to outlets of any other switch in the specific switch plane, so that the first set of (sink) nodes and the second set of (sink) nodes have a number of (sink) nodes in common not exceeding a predefined upper bound.

It is desirable to devise a connectivity pattern which realizes an orthogonality index as small as possible. When $v$ is selected as a prime number, the realizable orthogonality index is $\lceil n/v \rceil$, $v$ being the number of rows, $v>1$, and n being a number of outlets of each switch.

In one arrangement, a source node of index $\eta$, $0 \le \eta < S$, $S = v \times m = \mu \times n$, connects to a row of index $\{\lfloor \eta/m \rfloor + \pi\}_{modulo\ v}$, in switch plane $\pi$, $0 \le \pi < \Pi$, and a sink node of index h, $0 \le h < S$, connects to a switch in each row $\rho$, $0 \le \rho < v$, in each switch plane, in a column c determined as $$c = \{\lfloor h/n \rfloor - \rho - \rho \times (h_{modulo\ n})\}_{modulo\ v},\ 0 \le \rho < v,$$

where $v$ is a prime number, $\mu = v$, $\Pi$ being the number of switch planes, $\Pi \ge 1$.

In another arrangement, a source node of index $\eta$, $0 \le \eta < S$, $S = v \times m = \mu \times n$, connects to a row of index $\lfloor \eta/m \rfloor$ in each switch plane; and a sink node of index h, $0 \le h < S$, connects to a switch in each row $\rho$, $0 \le \rho < v$, in switch plane, $\pi$, $0 \le \pi < \Pi$, in a column c determined as $$c = \{\lfloor h/n \rfloor - (\rho + \pi) \times (1 + (h_{modulo\ n}))\}_{modulo\ v},\ 0 \le \rho < v,$$

where $v$ is a prime number, $\Pi$ being the number of switch planes, $\Pi \ge 1$.

With $v$ selected as a prime number, a switch in column c, $0 \le c < \mu$, row r, $0 \le r < v$, and switch plane $\pi$, $0 \le \pi < \Pi$ connects to:
a set of m source nodes of indices q determined as:

$$m \times (r + \pi)_{modulo\ v} \le q < m \times (r + 1 + \pi)_{modulo\ v},$$

a set of n sink nodes of indices:

$$\{j \times (1 + m \times r) + m \times (r + c)\}_{modulo\ S},\ 0 \le j < n.$$

Alternatively, a switch in column c, $0 \le c < \mu$, row r, $0 \le r < v$, and switch plane $\pi$, $0 \le \pi < \Pi$ connects to:
a set of m source nodes of indices q determined as:

$$m \times r \le q < m \times (r+1),$$

and
a set of n sink nodes of indices:

$$\{j \times (1 + n \times \rho) + n \times (\rho + c)\}_{modulo\ S},\ 0 \le j < n,\ \rho = (r + \pi)_{modulo\ v}.$$

Thus, the downstream connectivity pattern is the same for all switch planes 2750 where $\Pi$ switches of a same column index and a same row index connect to a same set of nodes. For example, a set of nodes 2720 of indices {01, 10, 12, 19} connects to outlets of three switches 2740 of indices {(2, 1, 0), (2, 1, 1), and (2, 1, 2)}. However, the three switches connect in the upstream direction to different sets of nodes 2720 of indices {08, 09, 10, 11}, {12, 13, 14, 15}, and {16, 17, 18, 19}, respectively, as illustrated in FIG. 46.

Figure 50:
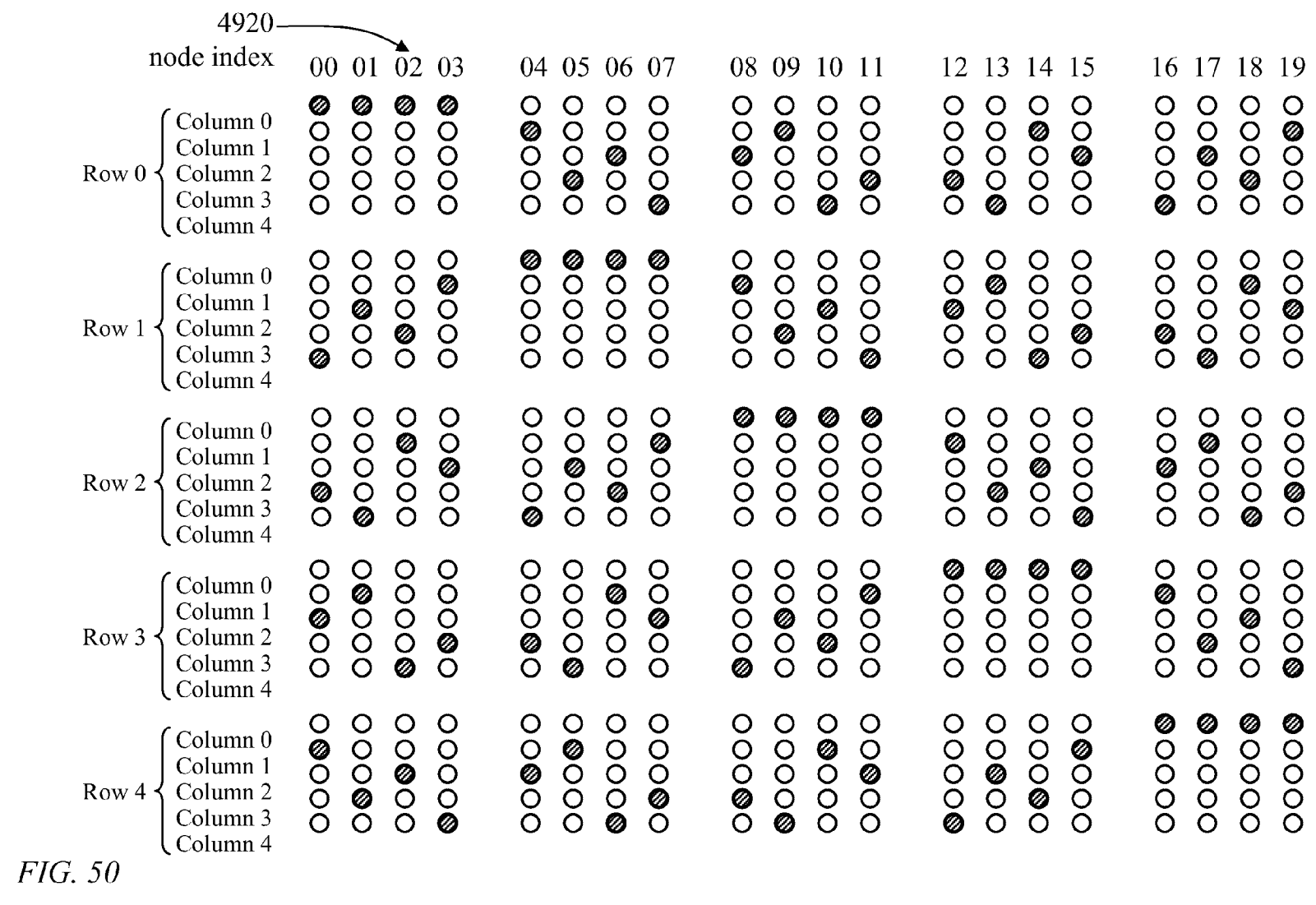

In the upstream connectivity pattern of FIG. 45, which applies to all switch planes, al sets of nodes connecting to switches of a same column are disjoint and all sets of nodes connecting to switches of a same row are disjoint. Thus, all nodes 2720 of the entire switching node connect to $\mu$ switches of each row and $v$ switches of each column; $\mu = v$ in the example of FIG. 45. This property is illustrated in FIG. 49 and FIG. 50.

In summary, according to the connectivity pattern of FIG. 46, $\Pi$ switches 2740 of a same column and row indices in $\Pi$ switch planes 2750 connect at outlet to a same set 4635 of nodes 2720 (i.e., a same set of sink nodes 2718). For example, a set 4635 of nodes {01, 10, 12, 19} connects to outlets of switches 2740(2,1,0), 2740(2,1,1), and 2740(2,1,2) of switch planes 2750(0), 2750(1), and 2750(2), respectively.

A set 4625 of nodes 2720 (a set of source nodes 2712) connects to inlets of switches 2740 of a respective column within each switch plane 2750. However, the index of the respective column is switch-plane specific. For example, a set 4625 of nodes 2720 (source nodes 2712) of indices {00, 01, 02, 03} connects to all switches 2740 of column 0 in switch plane 2750(0), all switches of column 4 of switch plane 2750(1), and all switches of column 3 of switch plane 2750(2).

Figure 47:
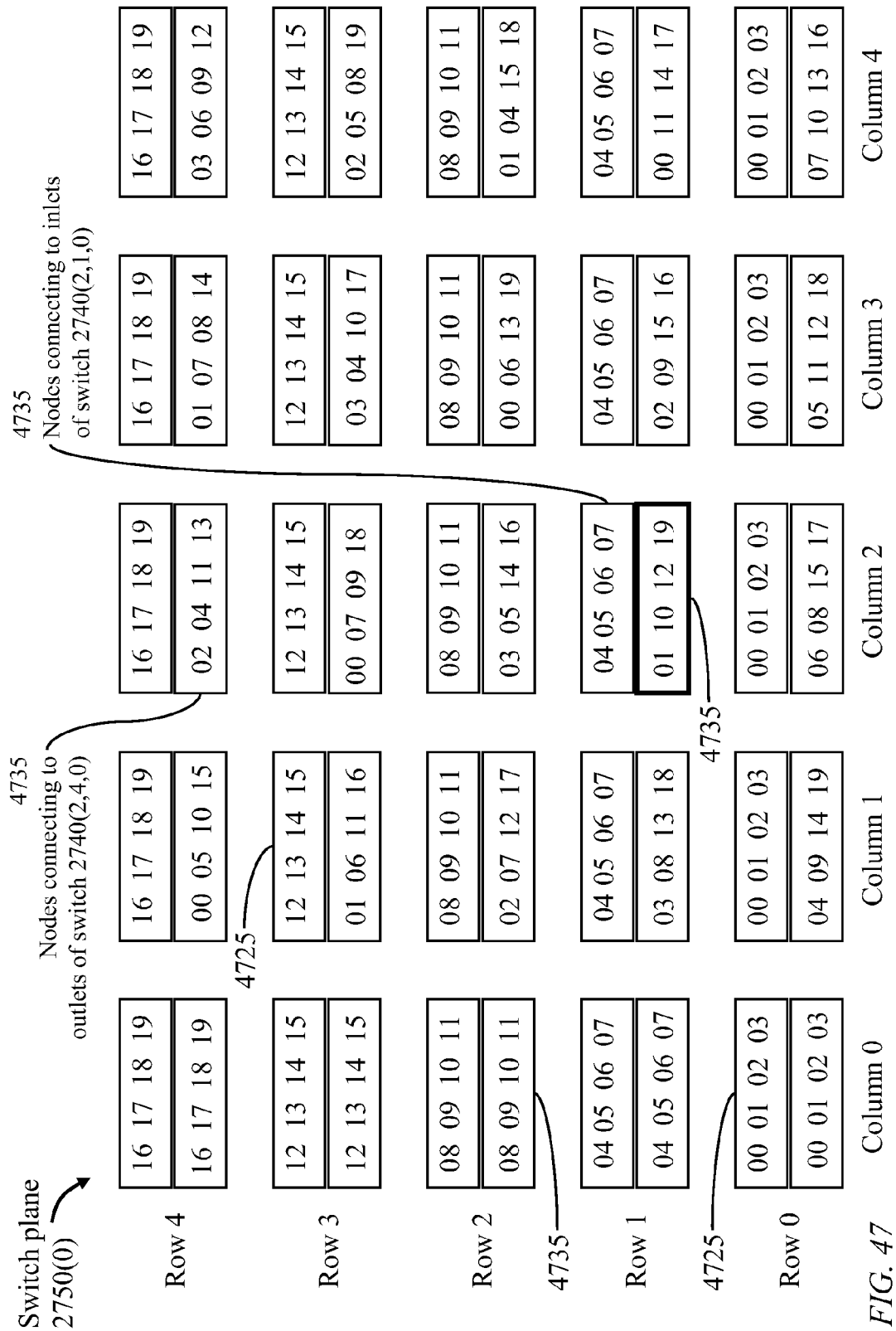
FIG. 47 illustrates a second orthogonal-connectivity pattern of nodes to switches of a switch plane of a switching node of multiple switch planes in accordance with an embodiment of the present invention.
Figure 48:
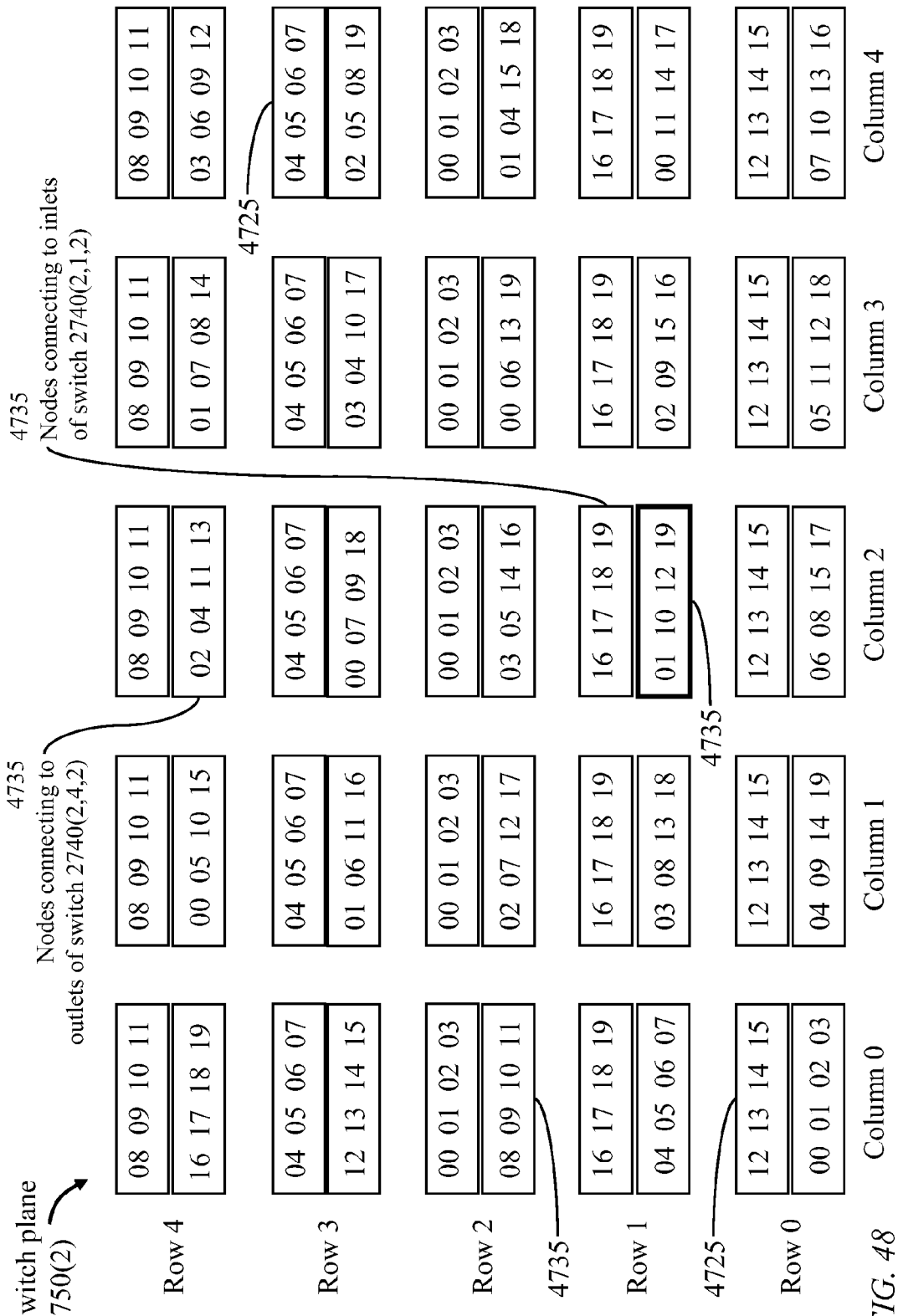
FIG. 48 illustrates the second orthogonal-connectivity pattern of FIG. 47 for another switch plane.

FIG. 47 illustrates disjoint sets 4725 of nodes 2720 (source nodes) connecting to inlets of switches 2740 of a same column of the switch plane 2750 having switches 2740 arranged in a matrix of 5 columns and five rows ($\mu$=$\nu$=5). A set of nodes 4725 connects to inlets of switches 2740 of a same row of a switch plane 2750. The index of the row is switch-plane specific. FIG. 47 illustrates a connectivity pattern of a first switch plane (switch plane 2750(0)) and FIG. 48 illustrates a connectivity pattern of another switch plane (switch plane 2750(2)). A set of nodes 2720 of indices {0, 1, 2, 3} connects to inlets of switches of a row of index 0 in switch plane 2750(0) but would connect to inlets of switches of a row of index 1 (for example) in switch plane 2750(1) and connect to inlets of switches of a row of index 2 (for example) in switch plane 2750).

A set 4735 of nodes 2720 (a set of sink nodes 2718) connects to outlets of a switch 2740. All sets 4735 of nodes 2720 connecting to the outlets of switches 2740 of a same switch plane are mutually orthogonal. The downstream connectivity pattern of switches 2740 to nodes 2720 (to sink nodes 2718) may be applied to all switch planes. Thus, $\Pi$ switches 2740 of indices (c, r, 0), (c, r, 1), . . . , (c, r, $\Pi$−1) connect to a same set 4735 of nodes (same set 2718 of sink nodes), 0≤c<$\mu$, 0≤r<$\nu$.

In summary, according to the connectivity pattern of FIG. 47 and FIG. 48, $\Pi$ switches 2740 of a same column and row indices in $\Pi$ switch planes 2750 connect at outlet to a same set 4735 of nodes 2720 (i.e., a same set of sink nodes 2718). For example, a set 4735 of nodes {01, 10, 12, 19} connects to outlets of switch 2740(2, 1, 0) in switch plane 2750(0) and outlets of switch 2740(2, 1, 2) in switch plane 2750(2).

A set 4725 of nodes 2720 (a set of source nodes 2712) connects to inlets of switches 2740 of a respective row within each switch plane 2750. However, the index of the respective row is switch-plane specific. For example, a set 4725 of nodes 2720 (source nodes 2712) of indices {00, 01, 02, 03} connects to all switches 2740 of row 0 in switch plane 2750(0) as indicated in FIG. 47 and all switches of row 2 of switch plane 2750(2) as indicated in FIG. 48 (only two switch planes are illustrated).

The switching node 2700 considered in FIG. 45 corresponds to parameters $\mu$=$\nu$=5, and m=n=4. Thus, the total number of nodes 2720 is $\mu$×n=20 (indexed as 0 to 19, reference numeral 4920). The upstream connectivity pattern of FIG. 45 is further illustrated in FIG. 49 which indicates the rows and columns of each switch 2740 to which each node is connected in the upstream direction (i.e., connected to an inlet of a switch 2740). The shaded circles identify the relevant switches. As indicated in FIG. 49, sets of nodes 2720 connecting to switches 2740 of a same column of the switch plane 2750 are disjoint. The pattern of FIG. 49 is reorganized in FIG. 50 to illustrate disjoint sets of nodes 2720 connecting to switches 2740 of a same row of the switch plane 2750.

Figure 51:
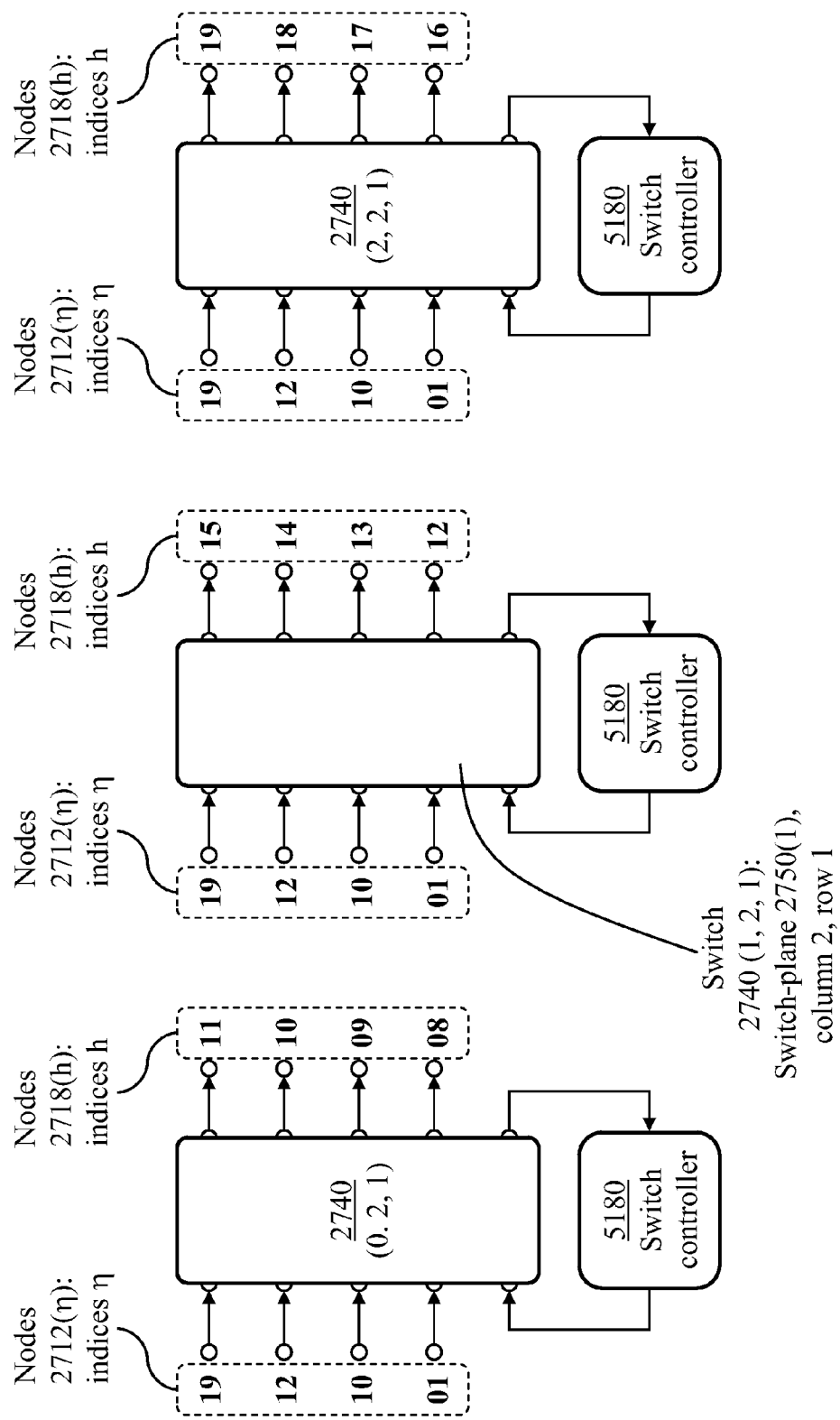
FIG. 51 illustrates orthogonality of a set of nodes connecting to inlets of a switch to sets of nodes connecting to outlets of other switches, in accordance with an embodiment of the present invention.

FIG. 51 illustrates orthogonality of a set of nodes connecting to inlets of a switch to sets of nodes 2720 (sink nodes 2718) connecting to outlets of other switches. As indicated in FIG. 45, a set of nodes 2720 of indices {01, 10, 12, 19} connects to inlets of a switch 2740 of column 2 and row 1 in each switch plane 2750. As indicated in FIG. 45, each of switches 2740(2,1,0), 2740(2,1,1), and 2740(2,1,2) of switch planes 2750(0), 250(1), and 2750(2), respectively, connects at output to disjoint sets of nodes 2720 (sink nodes 2718) of indices {08, 09, 10, 11}, {12, 13, 14, 15}, and {16, 17, 18, 19}, respectively. As illustrated, each of the switches 2740 is coupled to a respective switch controller 5180.

When each switch 2740 has a number, m, of inlets exceeding the number, $\mu$ of columns of the switch plane 2750, the minimum realizable orthogonality index $\lceil m/\mu \rceil$ is greater than 1. The sets of nodes 2720 (sets of source nodes) connecting to inlets of the $\mu$×$\nu$ switches 2740 are mutually orthogonal, where any two sets of nodes have a number of common nodes not exceeding $\lceil m/\mu \rceil$. However, the connectivity pattern may be selected to have an orthogonality index slightly exceeding the realizable orthogonality index. With $\mu$=11, and m=256, for example, the supported number of nodes is 2816 and the realizable orthogonality index is $\lceil 256/111 \rceil$=24. Thus, any two sets of nodes connecting to respective two switches would have 232 different nodes, which is sufficient to significantly offset the effect of potential high spatial variance of traffic loads and increases the proportion of data traffic that is routed through simple paths. In the connectivity pattern of FIG. 24, the switches of each row connect to a same set of m nodes. Thus, when a set of nodes connecting to a switch has a traffic demand of a relatively high level, all the switches connecting to the same set of nodes would experience high occupancy which may increase the proportion of compound paths.

With m=n=8 and $\mu$=$\nu$=5, the sets of nodes connecting to inlets of the $\mu$×$\nu$ switches may be determined according to the above expression:

$$\{j \times (1+m \times c)+m \times (r+c)\}_{modulo\ S},\ 0 \le j < m;\ S=\mu \times n=40.$$

Figure 52:
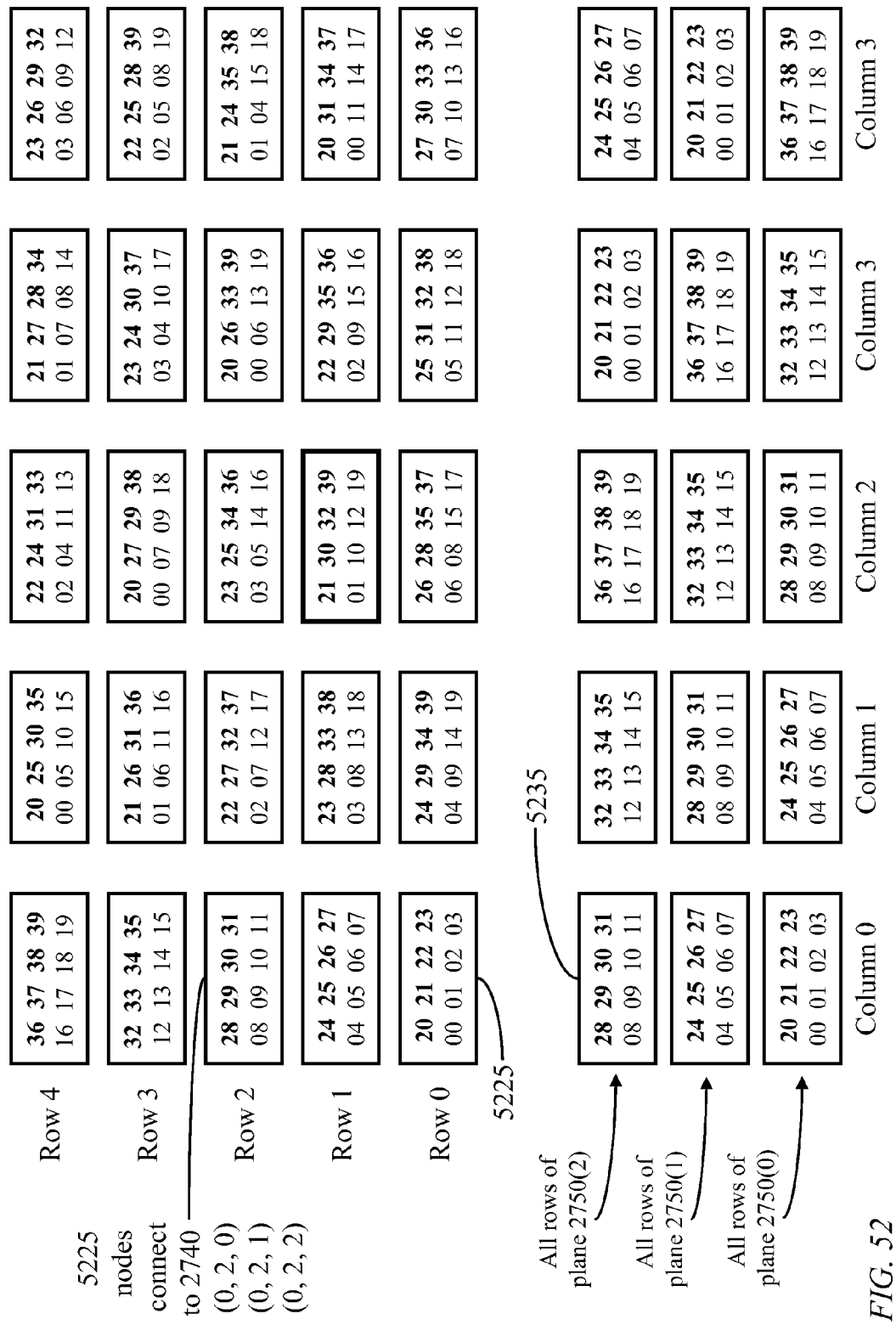
FIG. 52 illustrates an orthogonal-connectivity pattern of nodes to switches of a switch plane, where each switch connects to a number of nodes exceeding the number of columns of the switch plane, in accordance with an embodiment of the present invention.

Alternatively, when m>$\mu$, the m inlets of each switch may be logically partitioned into a number of inlet subsets of $m_1$, $m_2$, . . . , inlets each, with $m_1 \le \mu$, $m_2 \le \mu$, . . . . The S nodes may then be partitioned into node groups $\Sigma_1$, $\Sigma_2$, . . . with $\Sigma_1$=$\mu$× $m_1$, $\Sigma_2$=$\mu$×$m_2$, . . . , so that each node group may be connected to switches 2740 of each switch plane 2750 according to a connectivity pattern of an orthogonality index of 1. The nodes of each group connecting to respective inlets of a specific switch collectively constitute a set 5225 of m different nodes connecting to the specific switch. This alternate connectivity pattern is illustrated in FIG. 52 where the set of m inlets (m=8) of each switch 2740 is divided into two subsets of 4 nodes each. The connectivity pattern of the second group is then simply determined as the connectivity pattern of the first group shifted by $\Sigma_1$=S/2=20.

According to the connectivity pattern of FIG. 52, $\Pi$ switches 2740 of a same column and row indices in $\Pi$ switch planes 2750 connect at inlet to a same set 5225 of nodes 2720 (i.e., a same set of source nodes 2712). For example, a set 5225 of nodes {01, 10, 12, 19, 21, 30, 32, 39} connects to inlets of switches 2740(2,1,0), 2740(2,1,1), and 2740(2,1,2) of switch planes 2750(0), 2750(1), and 2750(2), respectively.

A set 5235 of nodes 2720 (a set of sink nodes 2718) connects to outlets of switches 2740 of a respective column within each switch plane 2750. However, the index of the respective column is switch-plane specific. For example, a set 5235 of nodes 2720 (sink nodes 2718) of indices {08, 09, 10, 11, 28, 29, 30, 31} connects to all switches 2740 of column 2 in switch plane 2750(0), all switches of column 1 of switch plane 2750(1), and all switches of column 0 of switch plane 2750(2).

Latent Space Switch

Figure 53:
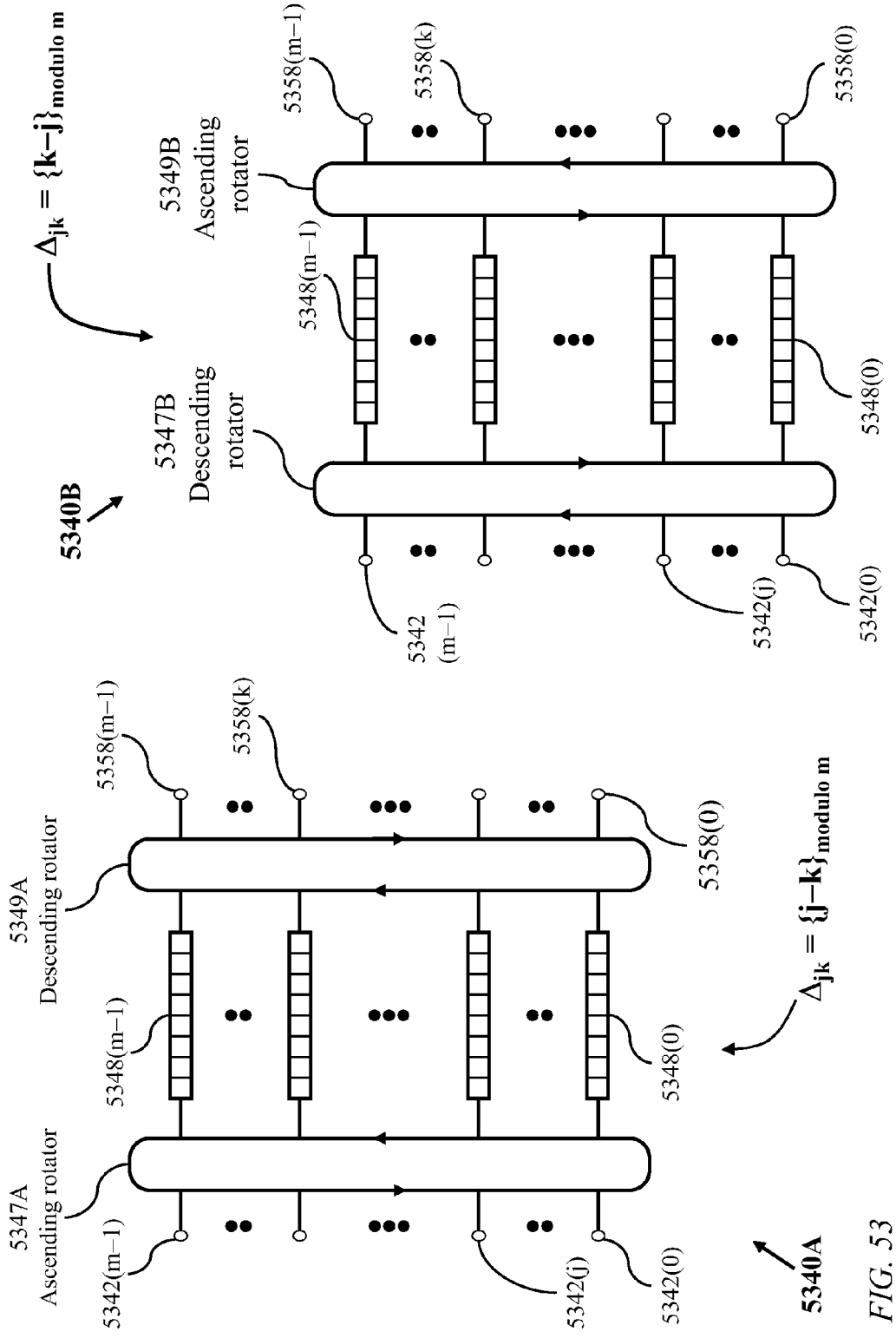
FIG. 53 illustrates prior art latent space switches for use in an embodiment of the present invention.

The switches 2740 may be configured as latent space switches. A prior-art latent space switch 5340 having m input ports and m output ports, is illustrated in FIG. 53. A latent space switch 5340 may be configured as an input rotator 5347, a bank of transit memory devices 5348, and an output rotator 5349.

The input rotator 5347 has m inlets, indexed as 0 to (m−1), and is configured to cyclically connect each inlet to m transit memory devices during a rotation cycle. The output rotator 5349 has m outlets, indexed as 0 to (m−1), and is configured to cyclically connect each transit memory device to each outlet during the rotation cycle. The inlets of the input rotator and the outlets of the output rotator constitute the inlets and outlets of the latent space switch 5340.

Preferably, each node 2720 connects to inlets of different indices in different switch planes and outlets of identical indices in all switch planes so that Π simple paths from any node to any other node through the Π switch planes may have switching delays staggered between 0 and m time slots, Π being the number of switch planes of the switching node. A time slot is a period of time during which an inlet connects to a transit memory device 5348 and a transit memory device 5348 connects to an outlet within the rotation cycle. Alternatively, each node 2720 may connect to inlets of identical indices in all switch planes while each sink node connects to outlets of different indices in different switch planes so that Π simple paths from any source node to any sink node through the Π switch planes may have switching delays staggered between 0 and m time slots.

The nodes 2720 of the switching node may be indexed as 0 to (S−1), S=μ×m. In the following, "p" denotes a switch plane 2750 and "Π" denotes the number of switch planes 2750, 0≤p<Π. The switch planes are indexed sequentially as 0 to (Π−1).

The input rotator 5347 cyclically connects each inlet to the m transit memory devices 5348 in an ascending index order while the output rotator 5349 would be configured as a descending rotator cyclically connecting each of sequentially indexed transit memory devices to sequentially indexed outlets in a descending index order.

As described above, in one connection pattern, the m inlets of a switch in column c and row r, 0≤c<μ, 0≤r<ν, connects to a set of m nodes of indices:

$q_j = \{j \times (1+m \times c) + m \times (r+c)\}_{modulo\ S}$, 0≤j<m, where 0≤$q_j$<S.

It is noted that $\{q_j\}_{modulo\ m} = \{j + m \times (j \times c + r + c)\}_{modulo\ m} = j$. Thus, the inlets of each switch connect to m nodes of indices having a remainder of j, 0≤j<m. This suggests connecting each node of index η, 0≤η<S, to an inlet of index $η_{modulo\ m}$ in a respective switch 2740.

In order to provide simple paths of different delays between each node and each other node through the Π switch planes employing latent space switches, each node may connect to inlets of different indices and outlets of identical indices of different switches, or vice versa. For example, each node may connect to identical outlets of respective switches 5340 of any switch plane, identical inlets of switches 5340 of a same switch plane, and different inlets of switches of different switch planes so that Π simple paths from any node to any other node through the switch planes have switching delays staggered between 0 and m time slots, Π being a number of switch planes. A node 2720 of index η, 0≤η<S, connects to an inlet of index $\{η + \lceil (m \times p)/Π \rceil\}_{modulo\ m}$, of a respective latent space switch in a switch plane of index p, 0≤j<m, 0≤η<S, 0≤p<Π, and S=μ×m. The same node 2720 of index η connects to an outlet of index k of a respective latent space switch in switch plane p, the index k determined as k=$η_{modulo\ m}$.

Alternatively, a node may connect to inlets of identical indices of respective latent space switches 5340 in switch plane p. For example, a node of index η, 0≤η<S, may connect to inlets of a same index determined as $η_{modulo\ m}$. The same node may connect to outlets of different indices of switches of different switch planes. For example, the node of index η may connect to an outlet of index k of a respective latent space switch 5340 in switch plane p, where the index k is determined as k=$\{η + \lceil (m \times p)/Π \rceil\}_{modulo\ m}$.

FIG. 54 illustrates, in a tabular form, connectivity of nodes 2720 to latent space switches of different switch planes 2750. Consider a first node 2720 of index η (a source node 2712 of index η), 0≤η<(μ×n), connecting to an inlet of index j, 0≤j<m, of a latent space switch 2740 of a first switch plane 2750(0) and a second node 2720 of index h, (a sink node 2718 of index h), 0≤h<(μ×n), connecting to an outlet k, 0≤k<n, of the same latent space switch 2740. With the exemplary orthogonal connectivity described above, and with m=n, the indices 5410 of the inlet and outlet are j=$η_{modulo\ m}$, and k=$h_{modulo\ m}$, respectively.

It is desirable to realize Π simple paths of different (and preferably equidistant) switching latencies 5420 from the first node to the second node. In one scheme 5430 the first node may connect to an inlet of index $\{j + \lceil (m \times p)/Π \rceil\}_{modulo\ m}$, in a latent space switch 2740 of a switch plane 2750(p), 0≤p<Π, while the second node connects to the same outlet of index k in Π latent space switches. In another scheme 5440 the first node may connect to an inlet of index j of Π latent space switches of different switch planes while the second node connects to an outlet of index $\{k + \lceil (m \times p)/Π \rceil\}_{modulo\ m}$, of a latent space switch 2740 of switch plane 2750(p), 0≤p<Π.

Notably, with the orthogonal-connectivity pattern described above:

$\{j + \lceil (m \times p)/Π \rceil\}_{modulo\ m} = \{η + \lceil (m \times p)/Π \rceil\}_{modulo\ m}$;

and $\{k + \lceil (m \times p)/Π \rceil\}_{modulo\ m} = \{h + \lceil (m \times p)/Π \rceil\}_{modulo\ m}$.

The switching latency of a switched path from inlet j to outlet k (node 2720(η) to node 2720(h)) is then determined as indicated in FIG. 53. The switching latency 5432 corresponds to the first scheme with the input rotator 5347 configured as an ascending rotator (hence the output rotator 5349 is configured as a descending rotator). The switching latency 5434 corresponds to the first scheme with the input rotator 5347 configured as a descending rotator (hence the output rotator 5349 is configured as an ascending rotator). The switching latency 5442 corresponds to the second scheme with the input rotator 5347 configured as an ascending rotator (hence the output rotator 5349 is configured as a descending rotator). The switching latency 5444 corresponds to the second scheme with the input rotator 5347 configured as a descending rotator (hence the output rotator 5349 is configured as an ascending rotator).

FIG. 55 illustrates selection of a switch plane 2750 according to indices of the end nodes 2720 of a simple path. In configuration 5340A of a latent space switch, the input rotator 5347A may be selected as an ascending and, consequently, output rotator 5349A is a descending rotator. In configuration 5340B of a latent space switch, the input rotator 5347B may be selected as a descending and, consequently, output rotator 5349A is an ascending rotator.

The switching latency (systematic switching delay) of data transfer from an inlet 5342 of index j to an outlet 5358 of index k is $Δ_{jk} = (j−k)_{modulo\ m}$. For each inlet-outlet pair, the switch planes 2750 may be selected in a specific order starting with a switch plane 2750 which provides the least latency of data transfer. The selection is determined according to: (1) the indices j and k of the inlet and outlet, the configuration of the latent space switch (ascending input rotator versus descending input rotator); and (3) the connectivity scheme of nodes to inlets and outlets of a latent space switch.

Considering a latent space switch configuration where the input rotator is an ascending rotator (hence the output rotator is a descending rotator), a first step is to determine a value of an integer λ, 0≤λ<Π, which satisfies the inequality:

⌈λ×m/Π⌉<(j−k)$_{modulo\ m}$≤⌈(λ+1)×m/Π⌉.

The switch planes are selected in an order determined as a function of λ.

Considering a latent space switch configuration where the input rotator is a descending rotator (hence the output rotator is an ascending rotator), a first step is to determine a value of an integer λ, 0≤λ<Π, which satisfies the inequality:

⌈λ×m/Π⌉<(k−j)$_{modulo\ m}$≤⌈(λ+1)×m/Π⌉.

The switch planes are selected in an order determined as a function of λ.

Figure 56:
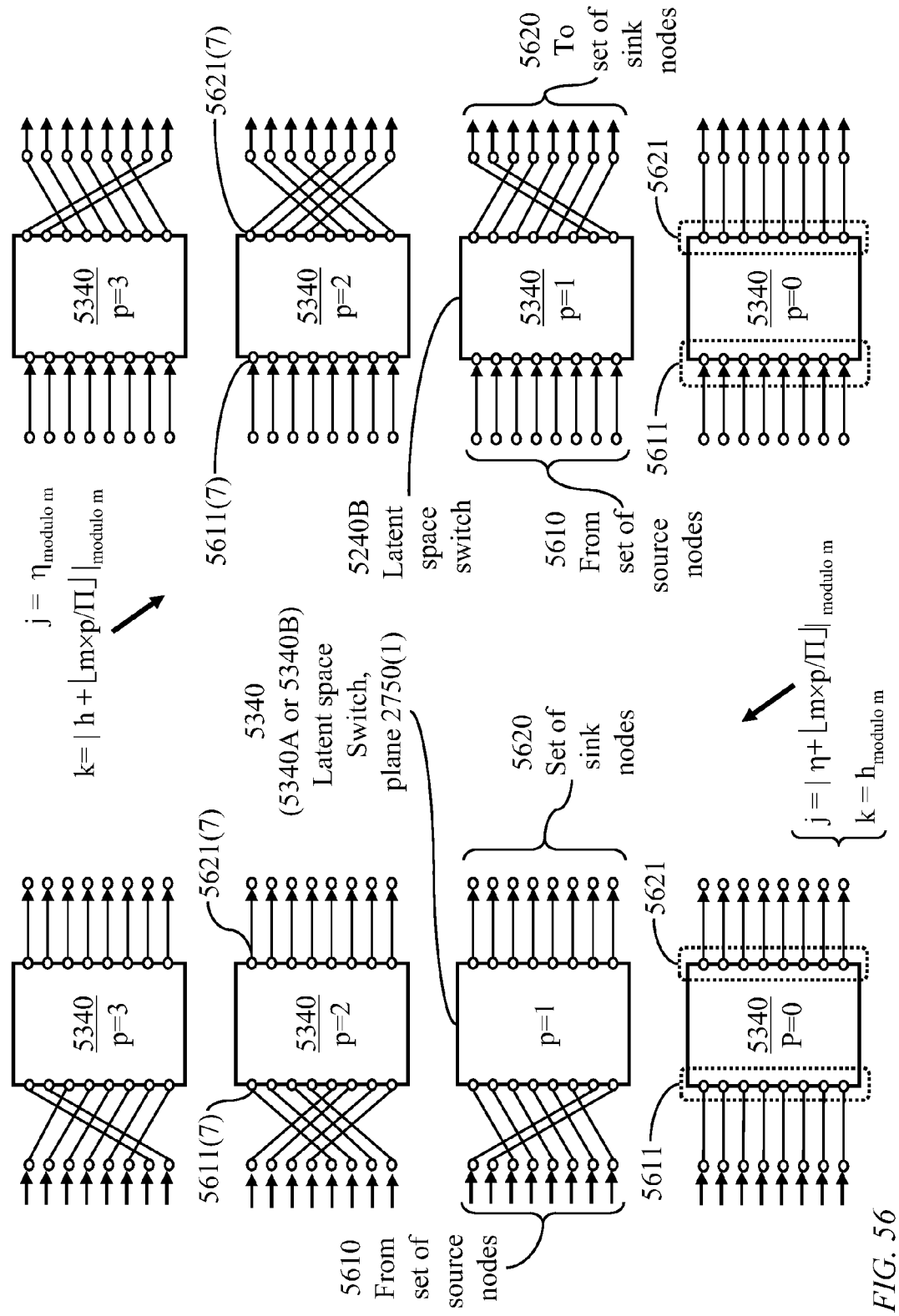
FIG. 56 illustrates exemplary input-side connectivity and output-side connectivity of nodes to latent space switches in accordance with an embodiment of the present invention.

For example, with m=8, and Π=4, ⌈(m×ρ)/Π⌉=0, 2, 4, and 6 for ρ=0, 1, 2, and 3, respectively. FIG. 56 illustrates corresponding input-side connectivity and output-side connectivity of nodes 2720 to latent space switches 5340 (5340A or 5340B). Under the first connectivity scheme, upstream channels 5610 from nodes 2720 (from source nodes 2712) connect to inlets 5611 of latent space switches 5340 of different switch planes according to a sequential order which is gradually shifted in steps of 2. Outlets 5621 of the latent space switch connect to downstream channels 5620 directed to nodes 2720 (to sink nodes 2718) in a same order for all switch planes. Under the second connectivity scheme, upstream channels 5610 from nodes 2720 (from source nodes 2718) connect to inlets 5611 in a same order for all switch planes. Outlets 5621 of the latent space switch connect to downstream channels 5620 directed to nodes 2720 (to sink nodes 2718) of different switch planes according to a sequential order which is gradually shifted in steps of 2.

Switch Dimension and Capacity

Using switches 2340 each of dimension m×m and integrated nodes 2320 where each node has η input ports divided into ν inbound ports connecting to ν switches and (η−ν) ingress ports connecting to data sources, and η output ports divided into ν outbound ports connecting to ν switches and (η−ν) egress ports connecting to data sinks (μ=ν), the maximum number of nodes would be ν×m, and the total number of ingress ports (or egress ports) would be (η−ν)×ν×m. For example, with m=255, ν=20, the maximum number of nodes in the switching node would be 5100. With (η−ν)=12, the maximum number of dual outer ports interfacing with data sources and sinks (each outer port comprising an ingress port and an egress port) would be 12×20×255=61200, i.e., the overall maximum dimension of the switching node is 61200× 61200. With a port capacity of 10 Gb/s in each direction (ingress or egress), the maximum access capacity of the switching node exceeds 600 terabits per second. With η=64, ν=40, and m=511, the overall maximum dimension of the switching node is 490560×490560 and with a port capacity of 10 Gb/s, the maximum access capacity of the switching node exceeds 4900 terabits per second.

Internal Routing

In operation, a source node receives a connection request specifying a destination terminal (a sink). The request includes the address of a destination terminal. In a switching node 2700 having multiple switching planes 2750, the source node first selects a switch plane 2750, based on a preference order, some load balancing strategy, or both. The source node then determines, from the address of the destination terminal, an identifier of the destination node which supports the destination terminal and examines a routing table which directly indicates the relative identifier of the switch, within a selected switch plane, which connects to the destination node. The source node then sends a connection request to the identified switch.

Switch Growth

Using switches of dimension m×n arranged in a μ×ν matrix having μ columns and ν rows, and where each source node has μ channels connecting to switches in different columns and each sink node has ν channels connecting to a switch in each row, the maximum number of source nodes that can be connected to the matrix is m×ν and the maximum number of sink nodes that can be connected to the matrix is n×μ. To grow the switch from an initial dimension and capacity, i.e., to increase the number of installed ingress ports which receive data from data sources and the number of installed egress ports which transmit data to data sinks, two approaches may be adopted. The first approach is to use expandable switches 2340 or 2740 which permit increasing the dimensions m and n without service disruption. The second is to use expandable nodes (integrated source nodes and sink nodes) which permit increasing the number μ of columns and the number ν of rows without service disruption. A third approach to expanding the switch is to add a parallel matrix in the structure of FIG. 27. Each source node may have a channel to one switch 2740 in each column in each switch plane 2750 and each sink node is connected to each switch in a selected column in each switch plane. Preferably, for each sink node, the selected columns in different switch planes 2750 are likewise numbered to simplify the internal routing process. A combination of the three approaches may be employed.

Connectivity Configurations

In the preferred configuration described above with reference to FIG. 23 or FIG. 27, herein called "first configuration", each sink node is connected to each switch of a selected column of switches and each source node connects to any switch in each column of switches. The switches to which a source node connects preferably belong to different rows. The requirement that a sink node connects to each switch in a selected column and that the source node connects to any switch in each column guarantees a simple path, traversing only one switch, from each source node 2312 to each sink node 2318 in switching node 2300, or from each source node 2712 to each sink node 2718 through each switch plane 2750 of switching node 2700. In an alternative configuration, herein called a "second configuration", each source node may connect to each switch in a selected column of switches while each sink node connects to a switch in each column of switches, and it is preferred in such configuration that the switches to which a sink node is connected belong to different rows. This alternate configuration also guarantees a simple path, traversing only one switch, from each source node 2312 to each sink node 2318, or from each source node 2712 to each sink node 2718 through each switch plane 2750 of multi-plane switching node 2700. Both the first configuration and the second configuration yield an agile switch which provides high performance regardless of the spatial distribution of traffic. However, the first configuration significantly simplifies internal routing because each destination node is associated with a single column.

The above first and second configurations yielding an agile switch are only exemplary. Numerous other configurations may be devised to guarantee that each source node has a simple path to each sink node in the entire switch.

The 25 sets of source nodes 2312 connecting to the 25 switches 2340 are mutually orthogonal with any two sets having at most one common source node. Each set of sink nodes 2318 connecting to any switch 2340 is orthogonal to each of the 25 sets of source nodes with an orthogonality index of 1. Orthogonal connectivity induces spatial balance of traffic loads.

Generalized Connectivity Pattern

The arrangement of switches 340 in a matrix structure 310 and the pursuant connectivity of source nodes 312 and sink nodes 318 to the switches simplify path search and setup of a connection. The matrix structure is only exemplary and other structures may be sought. A general connectivity pattern may be devised to provide a simple path, traversing one switch, and a predetermined number of non-intersecting compound paths which may be setup simultaneously from each source node to each sink node. In one realization, each source node may be associated with a respective set of $\mu$ switches, herein called a primary set, and each sink node may be associated with a respective set of $\nu$ switches, herein called a secondary set, where a primary set of any source node intersects a secondary set of any sink node in one common switch. Thus, a source node has an outbound channel to each switch of a respective primary set of $\mu$ switches specific to the source node, and a sink node has an inbound channel from each switch of a respective secondary set of $\nu$ switches specific to the sink node. To enable formation of compound paths, each source node is integrated with a respective sink node to form a node having an integrated switching fabric. Such a structure provides numerous compound paths, each traversing two switches, from any source node to any sink node. The predetermined number of non-intersecting compound paths is the lesser of $(\mu-1)$ and $(\nu-1)$.

Preferably, the primary sets of switches are selected to be mutually orthogonal. Thus, a primary set of $\mu$ switches to which any source node connects and a primary set of $\mu$ switches to which any other source node connects have at most a predefined number, preferably one, of common switches. In the generalized connectivity pattern, as in the matrix-based connectivity pattern, each node (combining a source node and a sink node) has a node controller and each switch has a switch controller. The distribution of inward control signals from node controllers to switch controllers and outward control signals from switch controllers to node controllers is performed in a manner similar to that of the matrix-based structure.

Asymmetrical Switching Node

Figure 57:
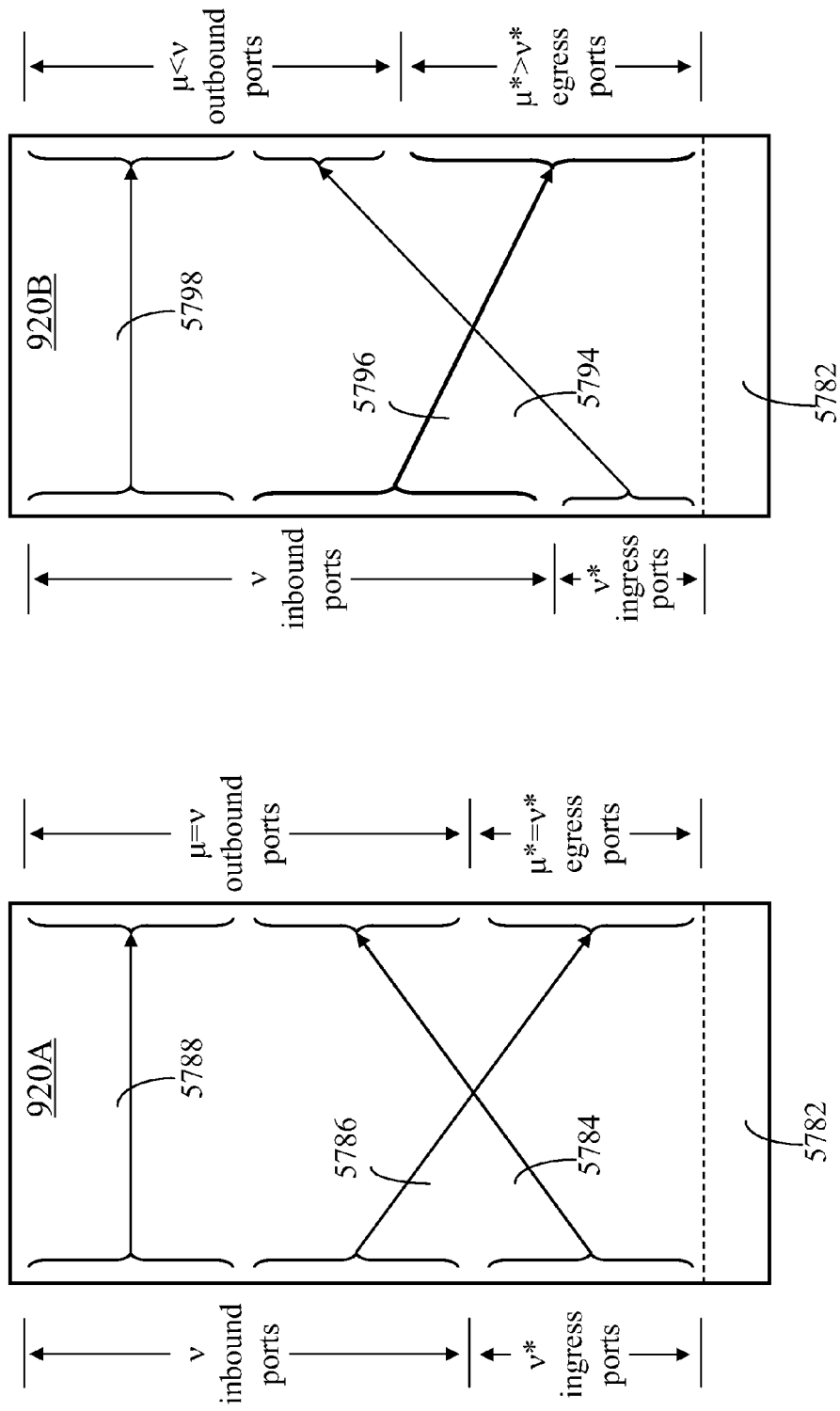
FIG. 57 illustrates internal paths within a node connecting to switches of a switching node having a single switch plane.

As illustrated in FIG. 7, a switching node 300 may be configured to have asymmetrical nodes each having a number $\nu$ of inbound ports that exceeds the number $\mu$ of outbound ports; $\mu$ and $\nu$ respectively represent the number of columns and the number of rows in matrix 310. With $\mu \times n = \nu \times m$, the number n of outlets exceeds the number m of inlets of a switch 340 if $\mu < \nu$. Additionally, node 312/318 has a number $\nu^*$ of ingress ports for receiving data from data sources through ingress channels 306 and a number $\mu^*$ of egress ports for transmitting data to data sinks as illustrated in FIG. 9. A node 312/318 may also have an input port (not illustrated) for receiving control data from an associated node controller and an output port (not illustrated) for transmitting data to the associated node controller. The ingress ports of all nodes collectively constitute the input ports of switching node 300, and the egress ports of all nodes collectively constitute the output ports of switching node 300. FIG. 57 illustrates access-capacity allocations in node 900 of FIG. 9 integrating a source node and a sink node (312/318, 2320, 2712/2718). Two node switching-fabric configurations 920A and 920B, in which the total number of input ports equals the total number of output ports, are considered.

Configuration 920A is suitable where a connection from any source node has a single destination node, and data sources of a node initiate traffic at a flow rate approximately equal to the flow rate of the traffic directed to the sink nodes of the node. With the flow rate of internal traffic 5784 from ingress ports to outbound ports being approximately equal to the flow rate of internal traffic 5786 from inbound ports to egress ports, it would be appropriate to set $\nu^* = \mu^*$ and $\nu = \mu$. The number $\nu$ of inbound ports of node 900 may exceed the number $\nu^*$ of ingress ports, and the number $\mu$ of outbound ports may exceed the number $\mu^*$ of egress ports because a node may switch transit traffic as described above. The flow-rate of transit traffic 5788 depends heavily on the spatial traffic distribution and decreases as more traffic is sent over simple paths.

In a particular switching node 300 (2300, 2700), a connection from an input port may be directed to more than one output port of the switching node and a node may receive more traffic than it sends; hence the number $\mu^*$ of egress ports may exceed the number $\nu^*$ of ingress ports as illustrated in switch-fabric configuration 920B. Thus, the flow rate of internal traffic flow 5794 from ingress ports to outbound ports would be less than the flow rate of internal traffic flow 5796 from inbound ports to egress ports. The flow-rate of transit traffic 5798 depends on the spatial traffic distribution as is the case in configuration 920A. In both configurations, 920A and 920B, control signals, represented by traffic flow 5782, may be switched to and from a node controller.

Routing and Distributed Control

The switching node 2700 employs a distributed control system where each node 2720 has a respective node controller and each switch 2740 has a respective switch controller. Each node controller has at least one processor and at least one memory device. Likewise, each switch controller has at least one processor and at least one memory device. The node controllers and the switch controller are independent of each other. A node controller may be accessed through a switching fabric of the node or through an external bus connecting the node controller to the input ports and output ports of the node. Likewise switch controller may be accessed through the fabric of the switch or through an external bus connecting the switch controller to inlets and outlets of the switch.

Figure 58:
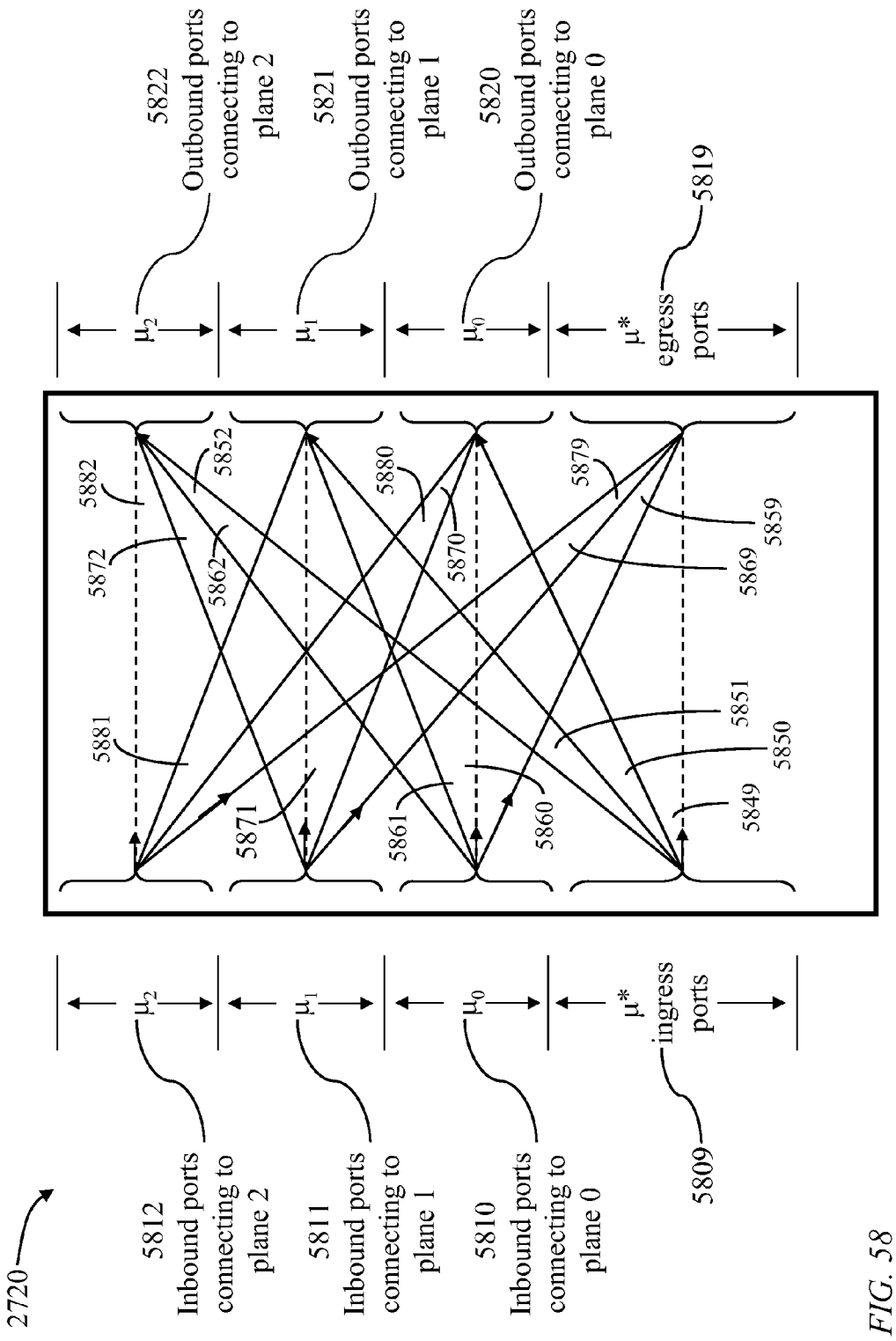
FIG. 58 illustrates internal paths within a node connecting to switches of three switch planes in accordance with an embodiment of the present invention.

FIG. 58 illustrates internal paths within a node connecting to three switch planes. Considering nodes 2720 each having a number of input ports, Q, equal to the number of output ports, and denoting the number of columns of the matrices of switches 2740 of the three switch planes as $\mu_0$, $\mu_1$, and $\mu_2$, with corresponding numbers of rows of $\mu_0$, $\mu_1$, and $\mu_2$, then: $Q \geq (\mu^* + \mu_0 + \mu_1 + \mu_2)$, where $\mu^*$ is the number of ingress ports allocated for receiving data from external data sources, $\mu_0$ is the number of input ports allocated for receiving data switched through a first switch plane, $\mu_0$ is the number of input ports allocated for receiving data switched through a first switch plane, $\mu_1$ is the number of input ports allocated for receiving data switched through a second switch plane, and $\mu_2$ is the number of input ports allocated for receiving data switched through a third switch plane. The number of output ports (called "egress ports") of the node allocated for transmitting data to external data sinks is $\mu_0$, the number of output ports allocated for send data to the first, second, and third switch planes are $\mu_0$, $\mu_1$, and $\mu_2$, respectively.

Selecting $\mu_0$, $\mu_1$, and $\mu_2$ to be equal, with $\mu_0=\mu_1=\mu_2=\mu$, then $Q \geq (\mu^* + \Pi \times \mu)$.

A data segment received at an ingress port 5809 of a node 2720 may be switched to an egress port 5889 (path 5849), an output port 5890 connecting to switch plane 2750(0) (path 5850), an output port 5891 connecting to switch plane 2750(1) (path 5851), or an output port 5892 connecting to switch plane 2750(2) (path 5852).

A data segment received at an input port 5810 of a node 2720 may be switched to an egress port 5889 (path 5859), an output port 5890 connecting to switch plane 2750(0) (path 5860), an output port 5891 connecting to switch plane 2750(1) (path 5861), or an output port 5892 connecting to switch plane 2750(2) (path 5862).

A data segment received at an input port 5811 of a node 2720 may be switched to an egress port 5889 (path 5869), an output port 5890 connecting to switch plane 2750(0) (path 5870), an output port 5891 connecting to switch plane 2750(1) (path 5871), or an output port 5892 connecting to switch plane 2750(2) (path 5872).

A data segment received at an input port 5812 of a node 2720 may be switched to an egress port 5889 (path 5879), an output port 5890 connecting to switch plane 2750(0) (path 5880), an output port 5891 connecting to switch plane 2750(1) (path 5881), or an output port 5892 connecting to switch plane 2750(2) (path 5882).

Figure 59:
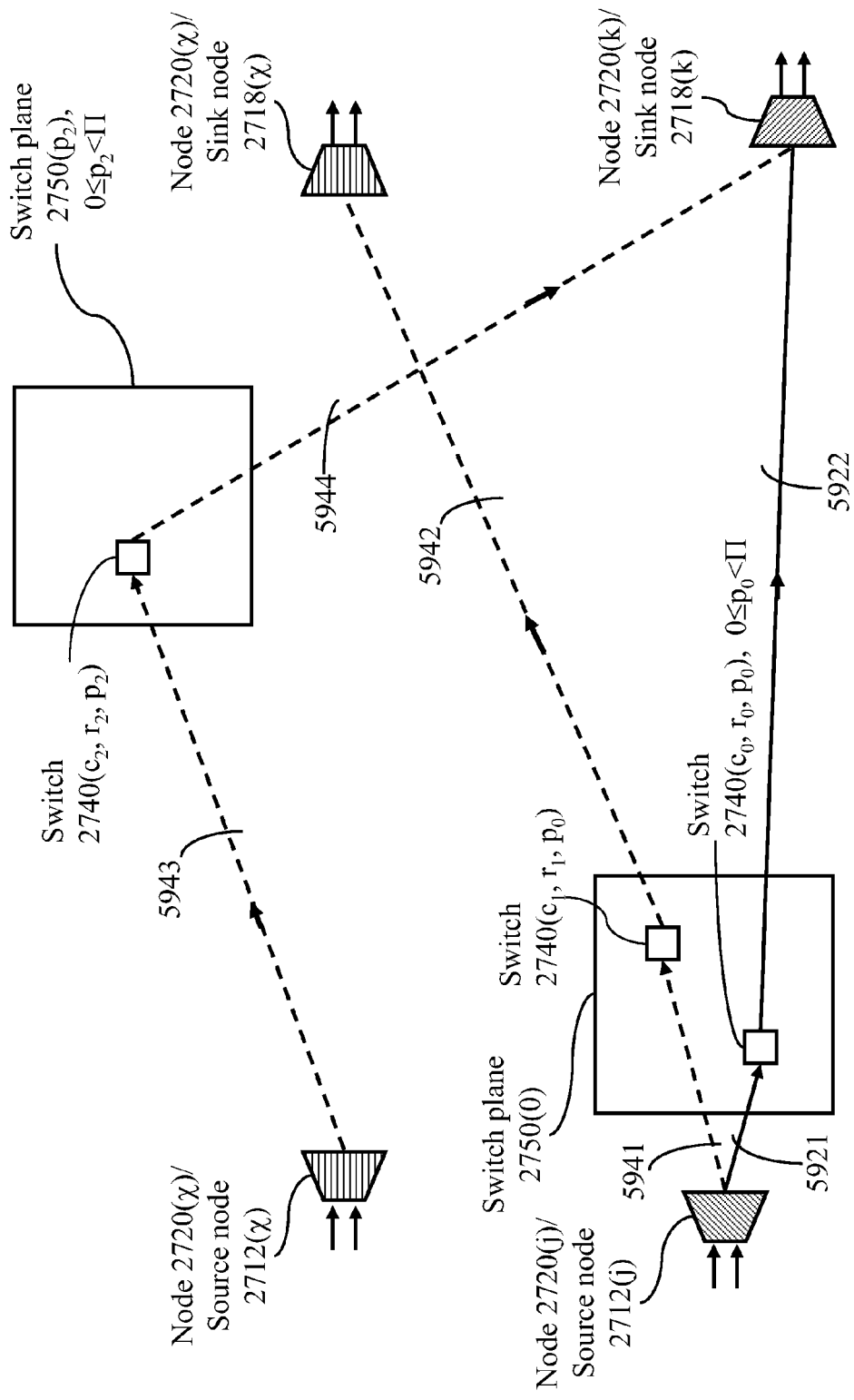
FIG. 59 illustrates a simple path traversing a single switch and a compound path traversing two switches which may belong to different switch planes in a network having multiple switch planes in accordance with an embodiment of the present invention.

FIG. 59 illustrates a simple path and a compound path through switching node 2700. There are $\Pi$ simple paths and $\Pi^2 \times (\mu \times n - 1)$ compound paths from each node 2720 to each other node 2720. The illustrated paths originate from a node 2720(j) (from a source node 2712(j)) and terminate in a node 2720(k) (sink node 2718(k)), $0 \leq j < (\mu \times n)$, $0 \leq k < (\mu \times n)$, $j \neq k$.

The simple path traverses a channel 5921 from the originating node 2720(j) to a switch 2740 and a channel 5922 from the switch 2740 to the destination node 2720(k). The illustrated switch is in column $c_0$ and row $r_0$ of any switch plane 2750(p) of $\Pi$ switch planes, $\Pi > 0$, $0 \leq c_0 < \mu$, $0 \leq r_0 < \nu$, $0 \leq p < \Pi$.

A compound path comprises two simple paths which may be within a same switch plane 2750 or different switch planes. The illustrated compound path comprises a first simple path from originating node 2720(j) to an intermediate node 2720($\chi$) through a first switch plane 2750($p_1$) and a second simple path from intermediate node 2720($\chi$) to the destination node 2720(k) through a second switch plane 2750($p_2$).

The first simple path traverses a channel 5941 to a switch 2740 in column $c_1$ and row $r_1$ of a switch plane $p_1$ and a channel 5942 to the intermediate node. The second simple path traverses channel 5943 to a switch 2740 of column $c_2$ and row $r_2$ of switch plane 2750($p_2$) and channel 5944 to the destination node 2720(k), $0 \leq c_1 < \mu$, $0 \leq r_1 < \nu$, $0 \leq p_1 < \Pi$, $0 \leq c_2 < \mu$, $0 \leq r_2 < \nu$, $0 \leq p_2 < \Pi$.

Figure 60:
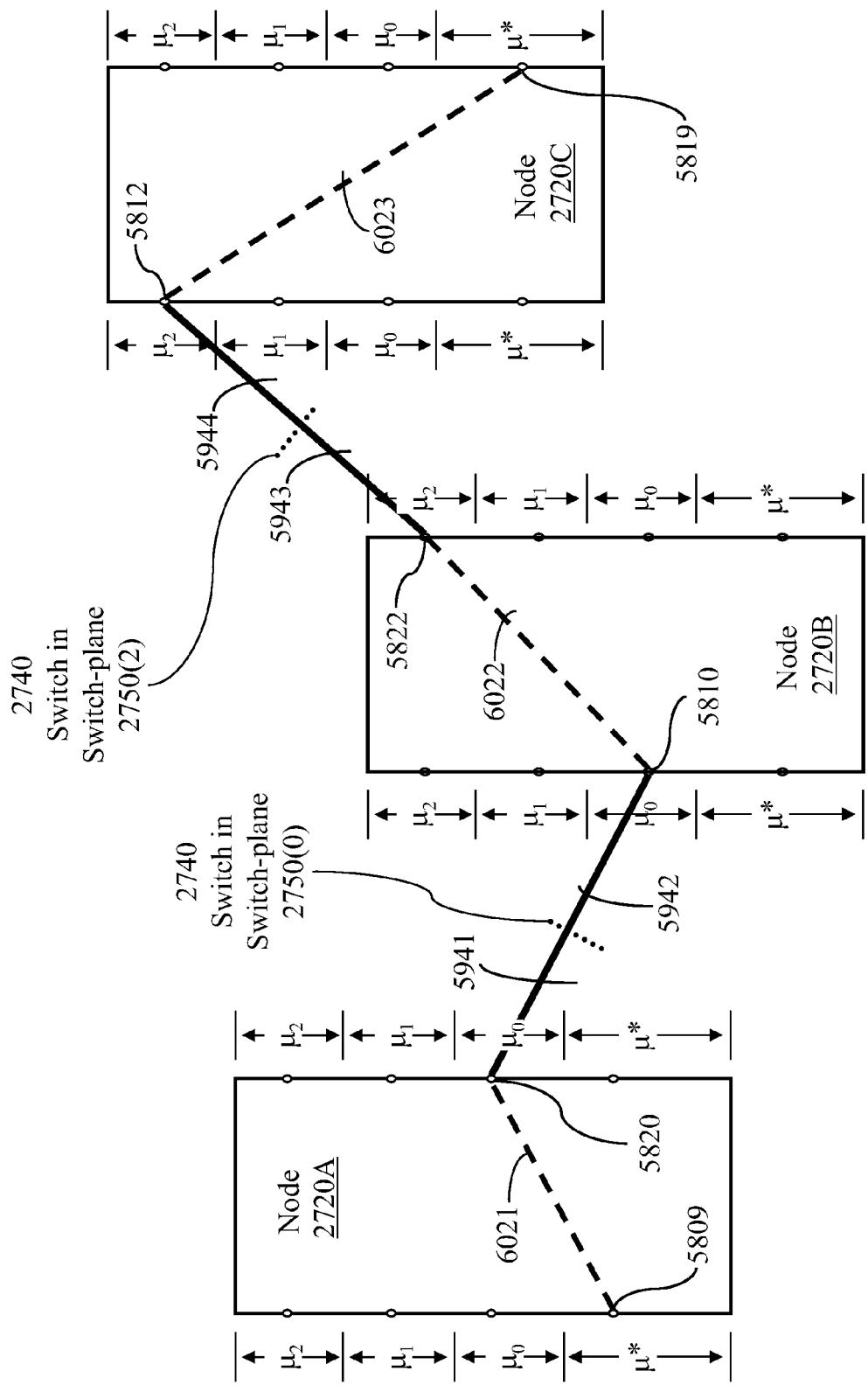
FIG. 60 illustrates an internal path within an originating node and a destination node of a compound path traversing two switch planes in accordance with an embodiment of the present invention.

FIG. 60 illustrates an internal switched path within an originating node and a destination node of a compound path.

A path from an ingress port 5809 of an originating node 2720A to an egress port 5819 of a destination node 2720C an output port 5820 starts with a switched path 6021 (5850) within node 2720A and traverses a channel 5941, a first switch 2740 in switch plane 2750(0), and a channel 5942 to an input port 5810 of an intermediate node 2720B. A switch path 6022 (5862) within intermediate node 2720B connects input port 5810 to an output port 5822. A channel 5943 connects output port 5822 to a second switch 2740 in switch plane 2750(2) to an input port 5812 of a destination node 2720C. A switch path 6023 (5879) within node 2720C connects input port 5812 to an egress port 5819 of the destination node 2720C.

Figure 61:
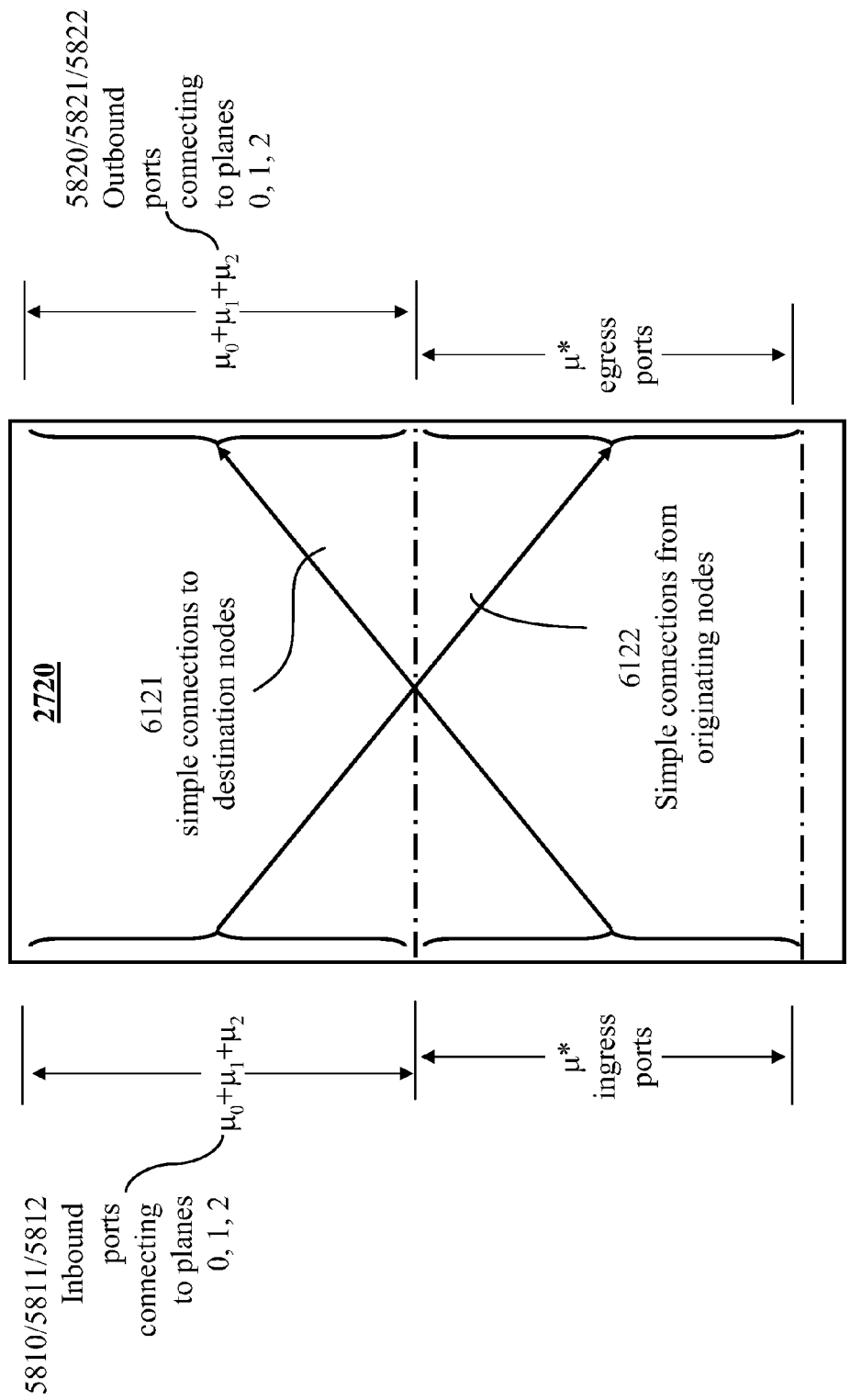
FIG. 61 illustrates partitioning of dual ports of a node into access ports and core ports in a hypothetical network serving spatially equalized data traffic.

FIG. 61 illustrates partitioning of dual ports of a node into access ports and core ports in a hypothetical network serving spatially equalized data traffic.

The Q ports of a node include access ports and core ports. An access port is a dual port including an ingress port receiving data from external sources and an egress port transmitting data to external sinks. A core port includes an input port receiving switched data from an outlet of a switch of one of the switch planes and an output port transmitting data to an inlet of a switch of one of the switch planes. With data traffic of balanced spatial distribution, a large proportion of the traffic would be routed through simple paths each traversing one switch. Thus, the number of access ports $\mu^*$ would be substantially equal to the number $(\mu_0+\mu_1+\mu_2)$ of core ports. Naturally, the combined capacity of the core ports would still be devised to exceed the combined capacity of access ports to account for variance of inter-arrival time intervals of data traffic. However, as well known to those skilled in traffic theory and queueing theory, the requisite extra capacity is dictated by the nature of external traffic loads and is relatively insignificant.

Figure 62:
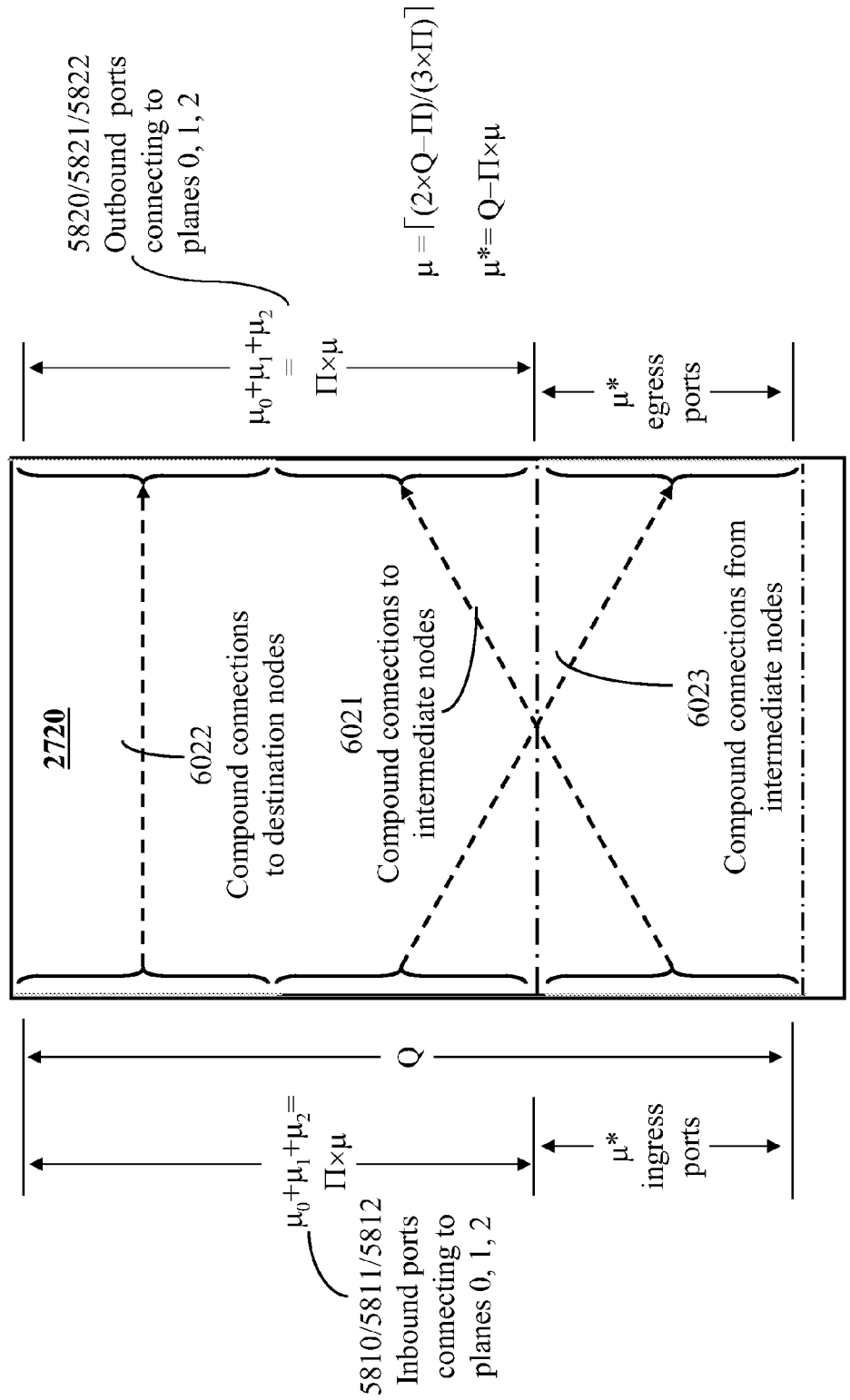
FIG. 62 illustrates partitioning of dual ports of a node into access ports and core ports taking into account discrepancy of spatial distribution of data traffic, in accordance with an embodiment of the present invention.

FIG. 62 illustrates partitioning of dual ports of a node into access ports and core ports taking into account discrepancy of spatial distribution of data traffic. Typical network traffic may have a significant spatial variance of traffic demand and this property may result in a considerable variance of the input-output traffic loads in a switching node of a network unless the network employs some means for balancing the traffic loads among the switching nodes. With unbalanced spatial traffic, the capacity of a node allocated for handling traffic directed to the core switches of a switching node need be larger than the capacity of the node allocated for handling incoming traffic by an amount sufficient to offset the effect of using compound paths. With input ports and output ports of a node of a same capacity, for example each having a capacity of 10 Gigabits per second, the ratio of the number of core ports $(\mu_0+\mu_1+\mu_2)$ to the number $\mu^*$ of access ports may vary between 1.0 and 2.0.

Each node 2720 has a nodal switching fabric having Q input ports and Q output ports, $Q>2$. The switching node 2700 may be configured so that $\nu=\mu$, hence m=n. The Q input ports include $\mu^*$ ingress ports for receiving data from external data sources and $\Pi \times \mu$ inbound ports each connecting to an inbound channel from a respective switch of a column in each switch plane 2750. Likewise, the Q output ports include $\mu^*$ egress ports for transmitting data to external data sinks and $\Pi \times \mu$ outbound ports each connecting to an outbound channel to a switch in each column in each switch plane.

Figure 63:
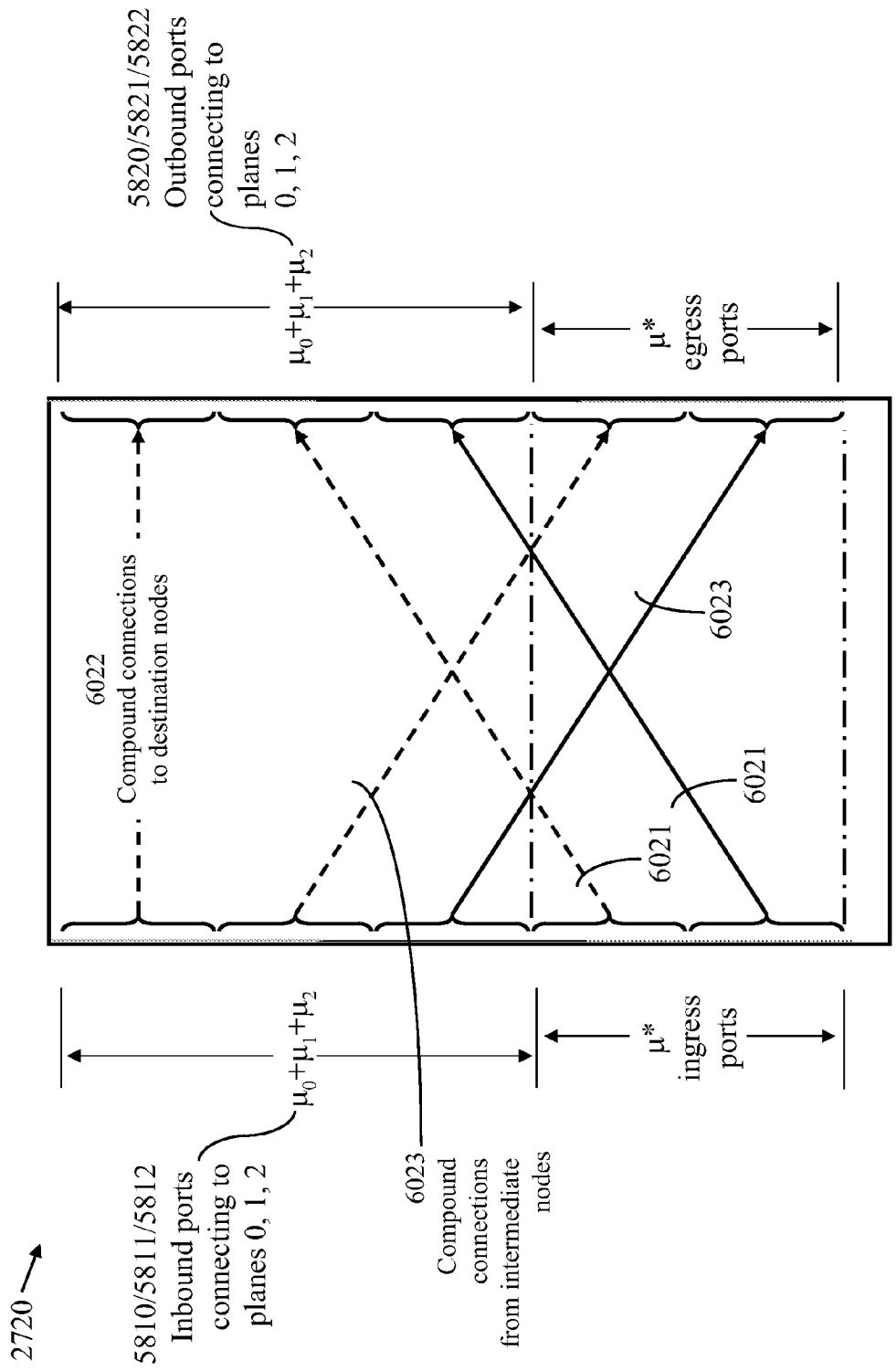
FIG. 63 illustrates exemplary occupancy of simple paths and compound paths of the node of FIG. 62.

FIG. 63 illustrates exemplary occupancy of simple paths and compound paths of the node 2720 of FIG. 62 where the number $(\mu_0+\mu_1+\mu_2)$ of core ports exceeds the number $\mu^*$ of access ports. A simple path traverses one switch 2740 in any switch plane 2750. A compound path traverses two switches 2740 which may belong to different switch planes 2750. If a proportion $\alpha$ of data received at the ingress ports of the node is routed to destination through simple paths, and with the ingress ports operated at respective full loads, then the ratio of the total capacity of outbound ports to the total capacity of ingress ports should be at least equal to $(2-\alpha)$. With $\alpha=0.5$, for example, and a total number of dual ports of 24, $\mu^*$ may be selected to equal 9 and $(\mu_0+\mu_1+\mu_2)$ would be 14.

Figure 64:
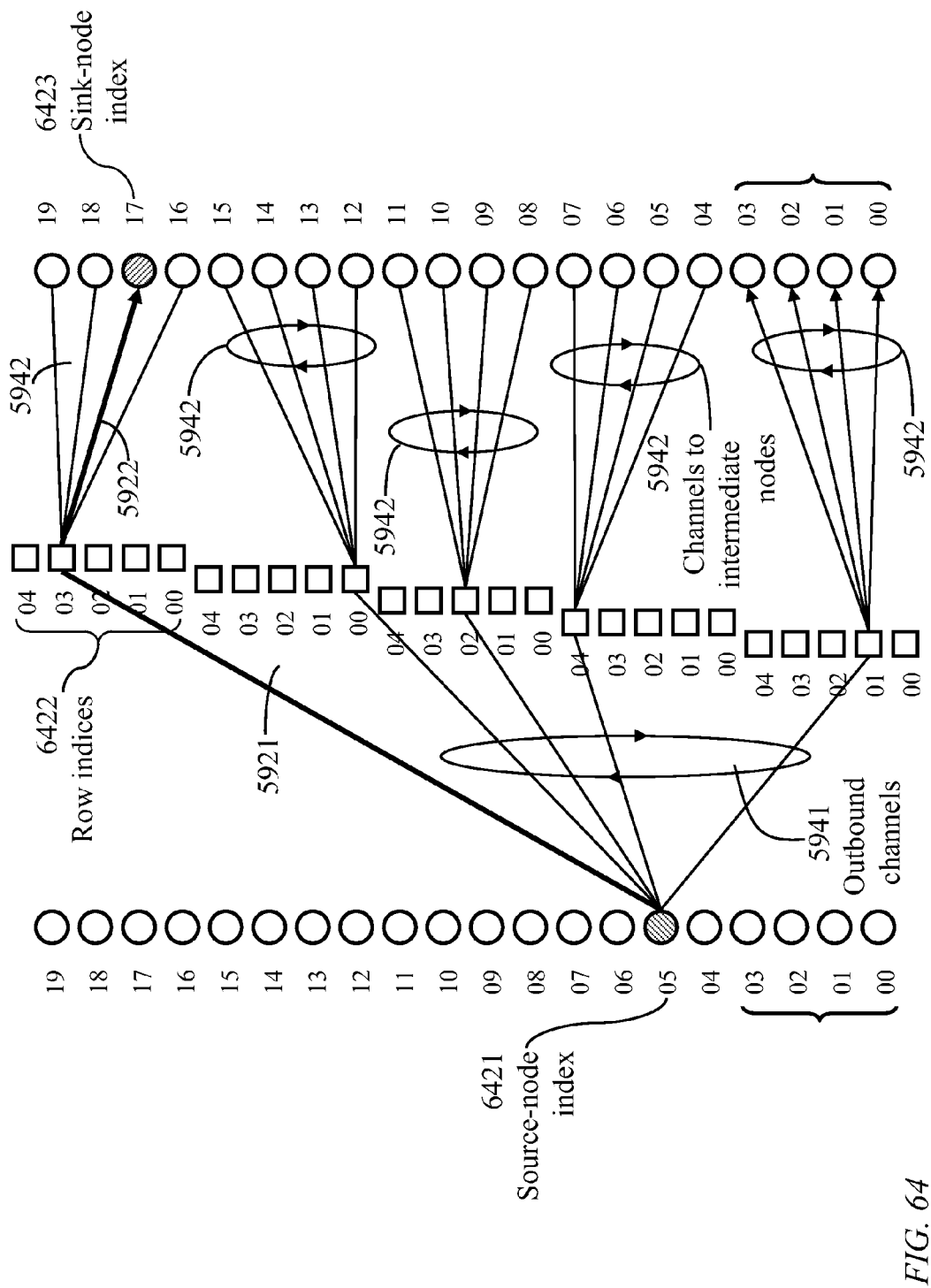
FIG. 64 illustrates a simple path and leading portions of multiple compound paths from an originating node to a destination node in accordance with an embodiment of the present invention.

FIG. 64 illustrates a simple path and leading portions of $(\mu \times n - 1)$ compound paths from an originating node 2720(5) to a destination node 2720(17) for a selected switch plane 2750 (0) of five columns (μ=5) and five rows (ν=5), with each switch 2740 having 4 inlets and 4 outlets (m=n=4). FIG. 64 is derived from FIG. 45. There are 20 integrated nodes 2720 indexed as 0 to 19. The source-node portions of the 20 integrated nodes are represented as an array 6421. The sink-node portions of the 20 integrated nodes are represented as an array 6423. There are 19 compound paths ((μ×n−1), μ=5, n=4) starting in the selected switch plane 2750 and terminating through any switch plane. As indicated in FIG. 45, destination node 2720(17) connects to an outlet of each switch 2740 of column 4. The originating node 2720(5) connects to one switch 2740 in each column. A channel 5921 connects originating node 2720(5) (i.e., source node 2712(5)) to a switch 2740(4, 3, 0) in column 4 and row 3 of switch plane 2750(0). A channel 5922 completes a simple path to the destination node 2720(17) (i.e., sink node 2718(17)).

Switch 2740(4, 3, 0) also has three (n−1) channels 5942 to respective intermediate nodes 2720(16), 2720(18) and 2720 (19) of array 6423. Four channels 5941 connect the originating node 2720(5) to respective switches 2740(0, 1, 0), 2740(1, 4, 0), 2740(2, 2, 0), and 2740(3, 0, 0). Each of the four switches has four channels 5942 to respective intermediate nodes 2720 of array 6423. Each intermediate node 2720 has Π channels 5941 to switches connecting to sink node 2718(k) (integrated node 2720(k)). Within the selected switch plane 2750(0), a total of 19 compound paths may be considered. If all of the Π switch planes 2750 are used, the total number of simple paths for a specific node pair would be Π and the total number of compound paths would be $\Pi^2 \times ((\mu \times n-2))$. Notably, data from a specific node to another node may traverse any of the (μ×ν) switches 2740. In other words, each of the (μ×ν) switches may serve data for any directed node pair. This property enables equalizing the flow rates through the switches and, hence, alleviating the effect of large variance of temporal and spatial distribution of traffic loads rendering the switching system insensitive to the nature of external data traffic.

Figure 65:
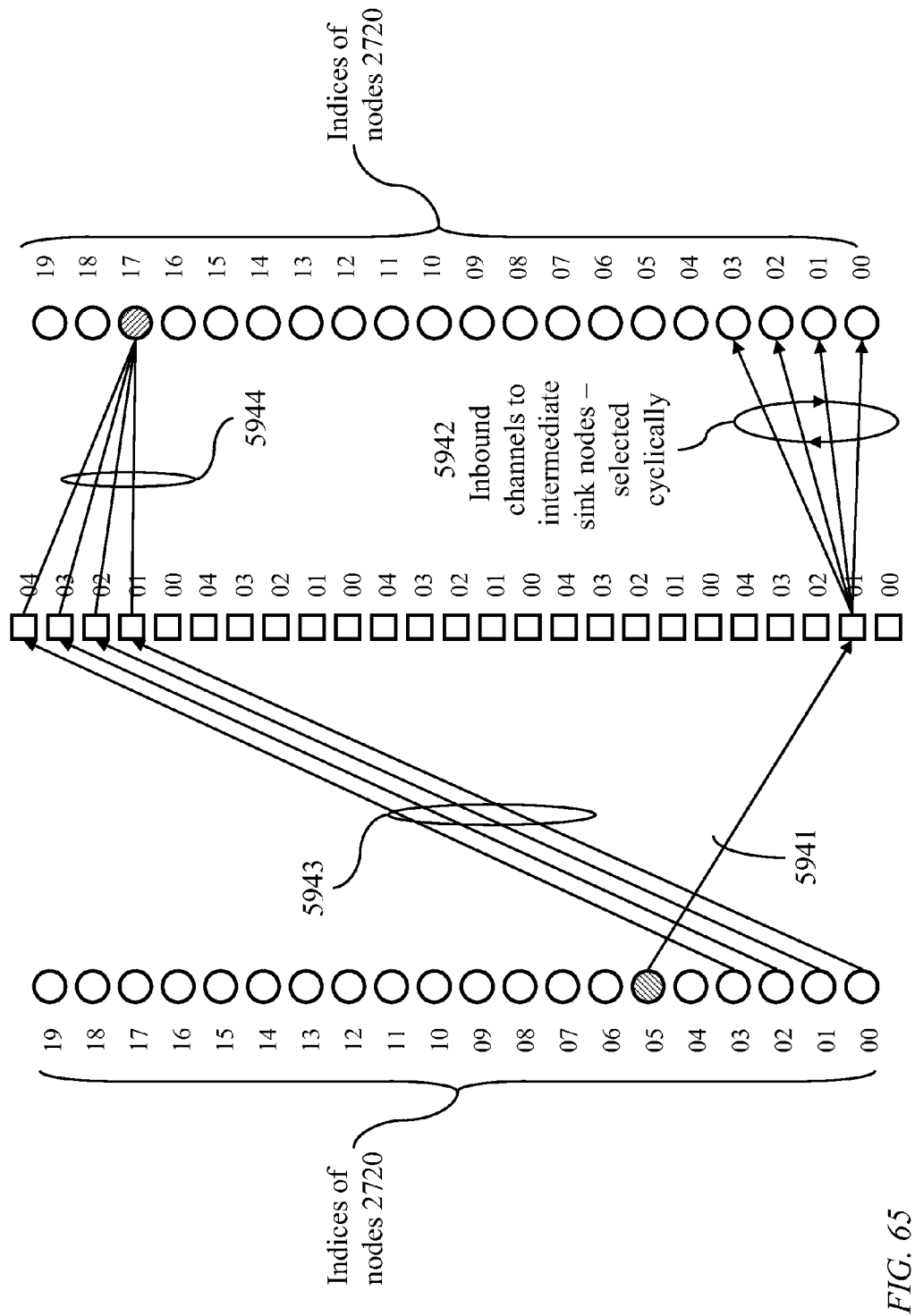
FIG. 65 illustrates a first set of intersecting compound paths through a single switch plane from an originating node to a destination node in accordance with an embodiment of the present invention.

FIG. 65 illustrates four compound paths starting and terminating in a same switch plane 2750 from an originating node 2720(5) to a destination node 2720(17) for a switch plane 2750(0) with the connectivity pattern of FIG. 45. The four compound paths traverse a common channel 5941 to a switch 2740(0, 0, 0) which may switch data to any of four channels 5942 leading to intermediate nodes 2720(0), 2720 (1), 2720(2), and 2720(3). Each intermediate node has a single path through a respective channel 5943, a switch 2740 (4,1,0), 2740(4, 2, 0), 2740(4, 3, 0), or 4740(4, 4, 0), and a respective channel 5944 to destination node 2720(17). The completing paths from the intermediate nodes to the destination node may be selected to traverse any of the switch planes 2750.

Figure 66:
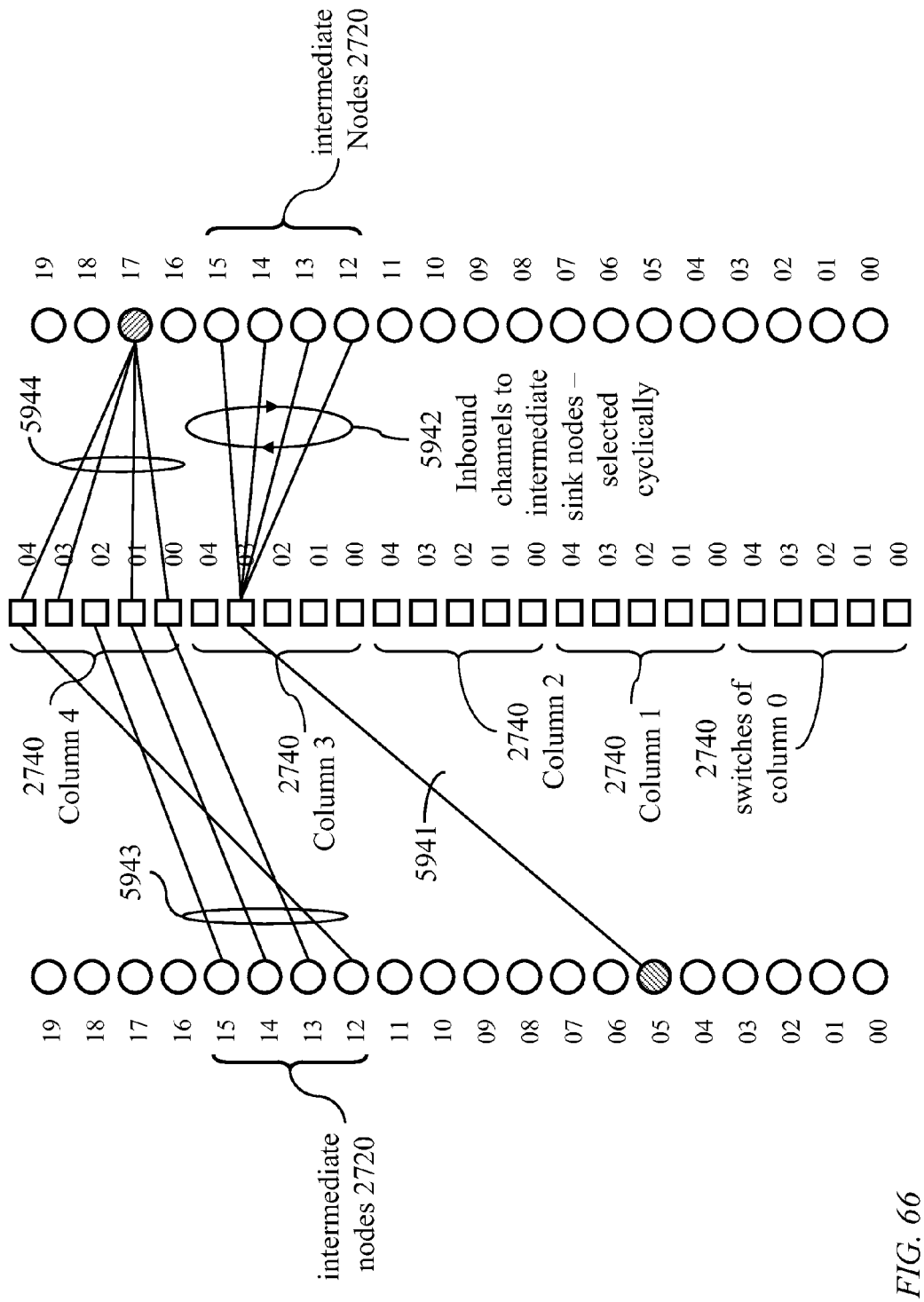
FIG. 66 illustrates a second set of intersecting compound paths through a single switch plane from an originating node to a destination node in accordance with an embodiment of the present invention.

FIG. 66 illustrates a second set of four compound paths from node 2720(5) to node 2720(17) for a switch plane 2750 (0) having the connectivity pattern of FIG. 45. The four compound paths traverse a common channel 5941 to a switch 2740(3, 0, 0) which may switch data to any of four channels 5942 connecting to four intermediate nodes 2720(12), 2720 (13), 2720(14), and 2720(15), with each intermediate node having a completing path to the destination node through a respective channel 5943 to a switch 2740(4, 4, 0), 2740(4,0, 0), 2740(4,2,0), or 2740(4,2,0), and a respective channel 5944.

Figure 67:
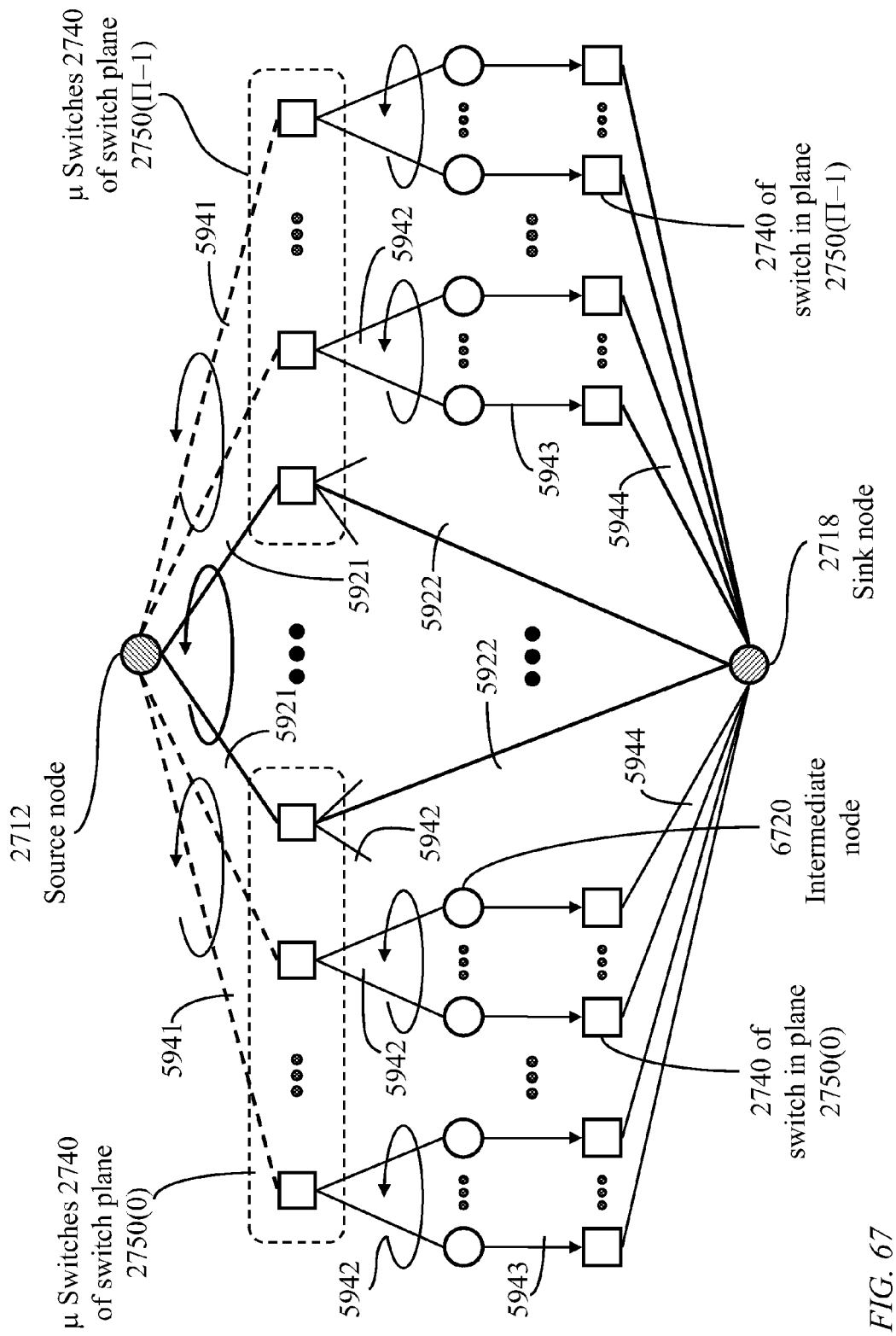
FIG. 67 illustrates simple paths and compound paths from an originating node to a destination node through multiple switch planes in accordance with an embodiment of the present invention.

FIG. 67 illustrates simple paths and compound paths from an originating node 2720 (from a source node 2712) to a destination node 2720 (to a sink node 2718) through Π switch planes, Π≥1. The originating node has a channel 5941 to each of μ switches 2740 of each switch plane 2750. Each switch 2740 has a channel 5942 to each of n intermediate nodes 2720 (referenced as 6720) with each intermediate node having Π completing simple paths to the destination node 2720 (sink node 2718). A simple path from intermediate node 6720 to the destination node traverses a channel 5943 to a second switch 2740 and a channel 5944 from the second switch to the destination node. One of the μ channels 5941 connecting to switches of a switch plane connects to an inlet of a switch 2740 which has an outlet connecting to a channel 5922 completing a simple path to the destination node. The channels forming a simple path are referenced as 5921 and 5922 as indicated in FIG. 59. Each of the other (μ−1) channels may be a part of a compound path.

There are Π simple paths for each directed node pair. Naturally, a simple path is completed within a single switch plane 2750. If each compound path is to be completed within one of the Π switch planes 2750, the number of compound paths per switch plane would be (μ×n−2) and the total number of compound paths would be Π×(μ×n−2). A compound path includes two simple paths. The two simple paths need not be completed within a same switch plane. Thus, the total number of compound paths for a directed node pair is $\Pi^2 \times (\mu \times n-2)$. The compound paths of a same directed node pair traverse common channels. The set of compound paths includes subsets of Π×(μ−1) non-intersecting paths.

Path Setup

Figure 68:
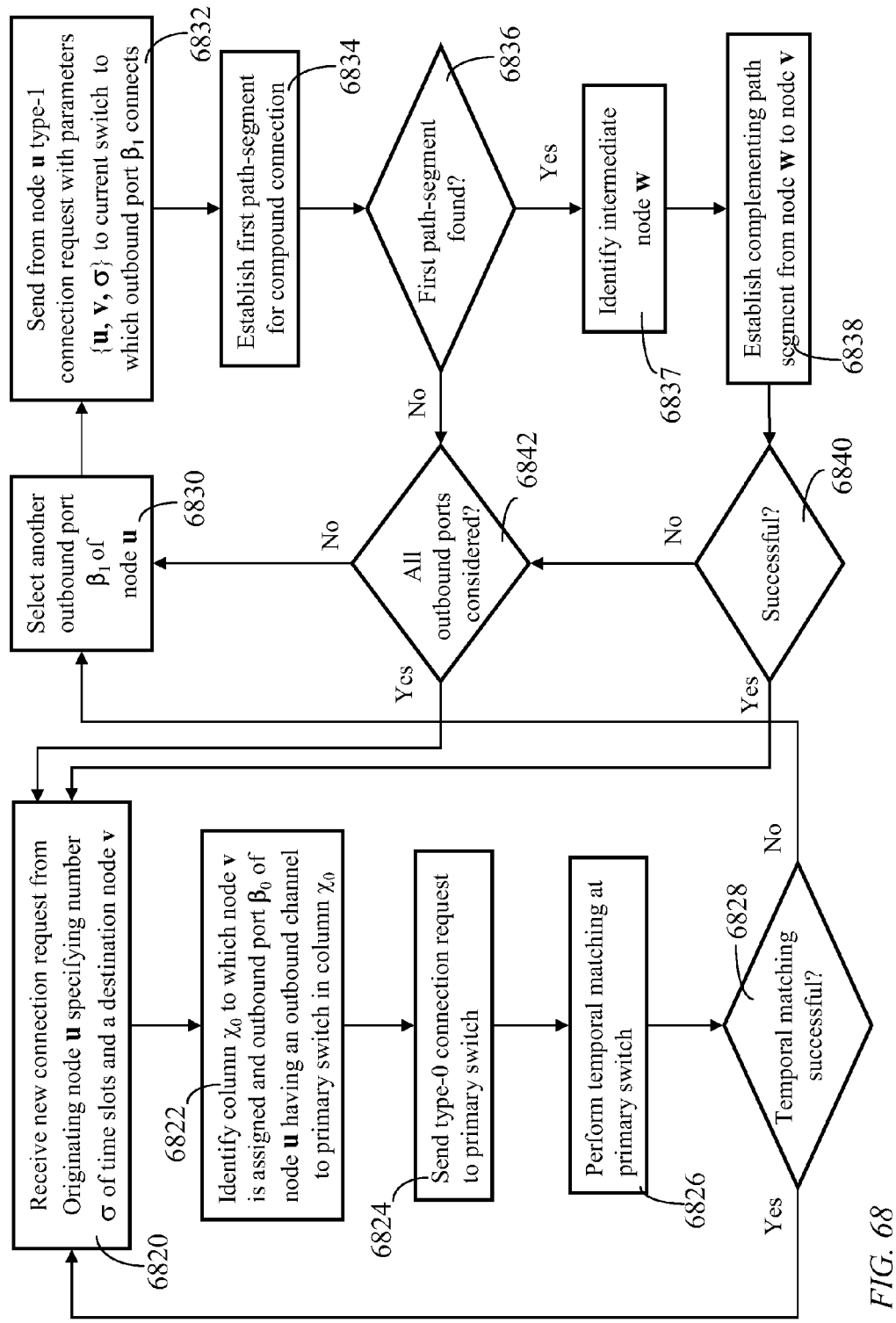
FIG. 68 is a flow chart illustrating a method used by a controller of a node for setting up a connection according to an embodiment of the present invention.
Figure 69:
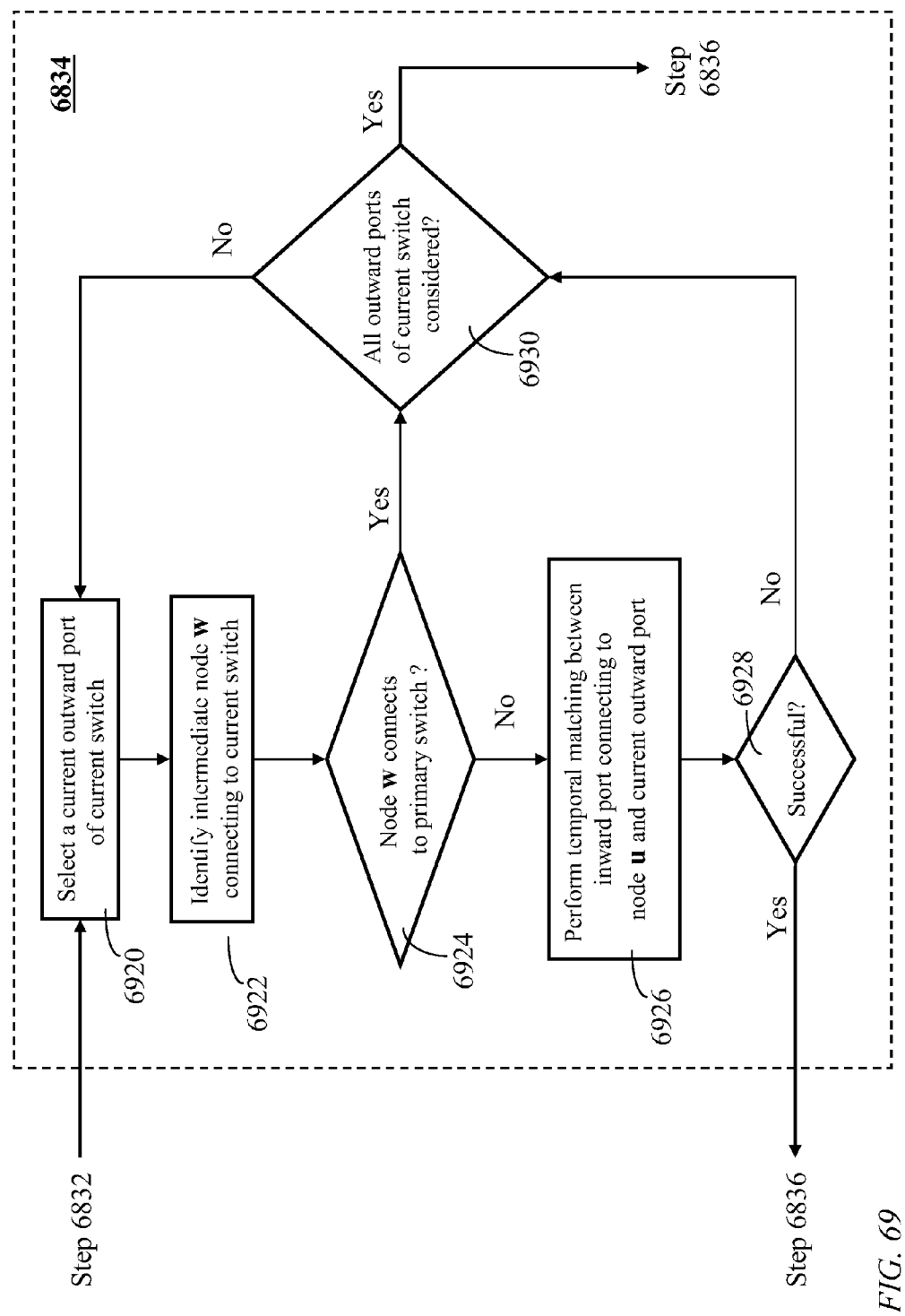
FIG. 69 is a flow chart detailing a step illustrated in the flow chart of FIG. 68 of establishing a first path-segment for a compound path.
Figure 70:
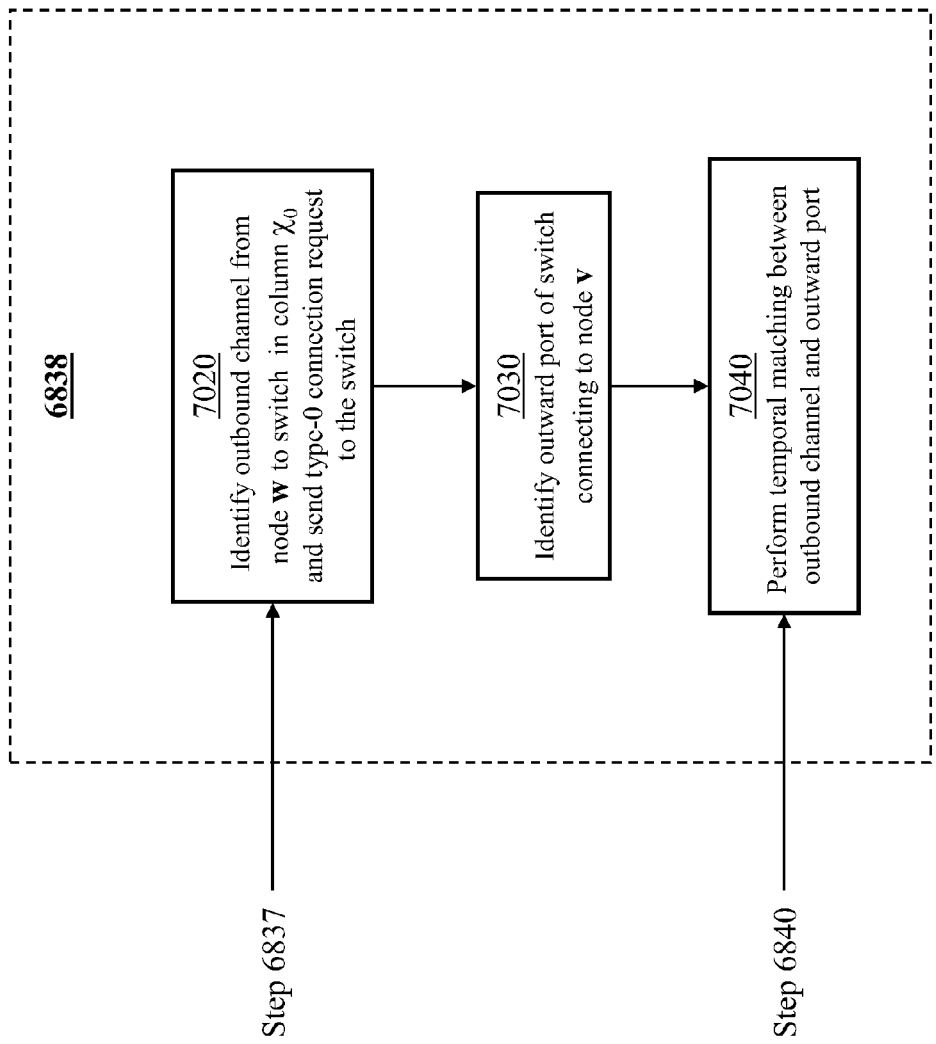
FIG. 70 is a flow chart detailing a step illustrated in the flow chart of FIG. 68 of establishing a complementing path-segment for a compound path.

A process of path setup in a switching node 2300 is illustrated in FIGS. 68-70. The process is described herein for switching node 2300 which may be adapted for use in switching node 2700 by adding a step of selecting a switch plane 2750 from among the plurality of switch planes. The flow chart of FIG. 68 illustrates the part of the process initiated at a node controller of an originating node 2320(u). The process starts in step 6820 where the node controller of the originating node 2320(u) receives a request to setup a path to a designated destination node 2320(v). The request may explicitly specify a number σ of time slots per time frame. Alternatively, the node controller may determine an appropriate number of time slots per time frame for the requested connection based on starting with an initial number which may be modified according to observed usage.

Figure 36:
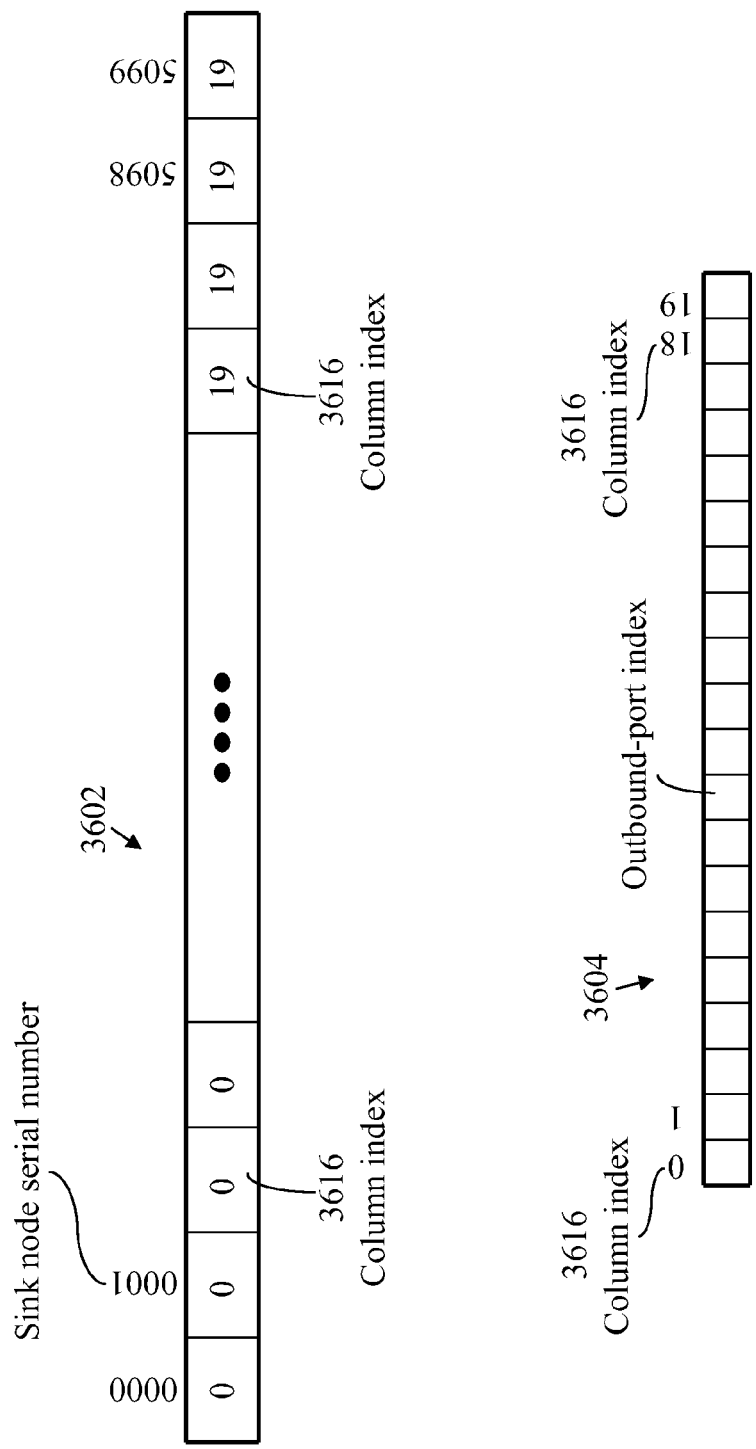
FIG. 36 illustrates control-data arrays for use in scheduling connections in the switching node of the present invention.

The process described below is based on the exemplary connectivity pattern of FIG. 25 where switches 2340 of a same column connect at outlet to a same set of nodes 2320 (a same set of sink nodes 2318). In step 6822, the column $\chi_0$, $0 \leq \chi_0 < \mu$, to which the destination node 2320(v) is assigned, and the outbound port $\beta_0$ of the source node leading to column $\chi_0$ are determined. If the nodes are numbered sequentially, starting from 0, the column number may be determined directly as $\chi_0 = \lfloor v/\mu \rfloor$, where v is the serial number of node 2320(v) and the notation $\lfloor y \rfloor$ denotes the integer part of a real number y. However, if an arbitrary numbering system is used, then the column $\chi_0$ corresponding to destination node 2320(v) may be determined from a lookup array 3602 (FIG. 36). The outbound port $\beta_0$ of the source node may also be determined directly ($\pi_0 = \chi_0$), or from a lookup array 3604 (FIG. 36). Each switch in column $\chi_0$ has a channel to destination node 2320(v) and a switch, herein referenced as a primary switch, that connects to both the originating node 2320(u) and destination node 2320(v) may be selected for establishing a simple path.

In step 6824, an attempt is made to setup a connection over a simple path from the originating node to destination node 2320(v) traversing the primary switch 2340. A "type-0" connection request is then sent to the controller of the primary switch during a reserved control time slot. The type-0 connection request specifies both the index (serial number) v of the destination node 2318 and the required number σ of time slots per time frame. In step 6826, the primary switch 2340 then performs a temporal matching process, as will be described with reference to FIG. 71. The result of the temporal matching process is then communicated by the controller of the primary switch to the destination node 2320(v). Destination node 2320(v) then communicates the result to the originating node 2320(u). If the result indicates acceptance (step 6828), the primary switch 2340 also communicates information identifying the reserved time slots for the connection to the originating node via a return path.

If the result indicates that a simple path through the primary switch is available, the connection is setup, and the time slots allocated to the connection are reserved. The process then returns to step 6820 to process a new connection request. If a simple path is not available, step 6828 directs the process to step 6830 where another outbound port, $\beta_1$, of the originating node 2320(u) is used to start a compound path. Thus, in step 6832, a request for a compound path, herein referenced as a "type-1 connection request", is send to a controller of a switch, herein called the "current switch" 2340, to which outbound port $\beta_1$ connects through an outbound channel 2314. In step 6834, the controller of the current switch attempts to establish a first path segment of a compound path. Details of step 6834 are provided in FIG. 69.

If the result of step 6834 indicates that a path starting from outbound port $\beta_1$ is not available (step 6836), step 6830 is revisited to select another outbound port $\beta_1$ if it is determined in step 6842 that at least one outbound port of the originating node has not yet been considered. If step 6842 indicates that all outbound ports have been considered, a rejection message is communicated and step 6820 is revisited to process a new request. Otherwise, if the result of step 6834 indicates that a path starting from outbound port $\beta_1$ is available (step 6836), step 6834 would provide an identifier of an intermediate node 2320(w) and identifiers of corresponding a time slots. In step 6837, the intermediate node 2320(w) is identified. Like any other source node, the intermediate node 2320(w) has a control path to each other node 2320. In step 6838, detailed in FIG. 70, the intermediate node 2320(w) attempts to establish a complementing path-segment through a switch 2340 in column $\chi_0$.

If in step 6838 it is determined that the complementing path is available (step 6840), an acceptance message is communicated to the originating node and a new connection request may be processed (step 6820). It is noted that the process described in FIG. 68 may be pipelined in a manner which permits concurrent processing of two or more connection requests.

FIG. 69 details step 6834. In step 6920, the controller of the current switch selects a current outlet and step 6922 identifies an intermediate node 2320(w) (i.e., a sink node 2318(w)) to which the current outlet connects. If it is determined in step 6924 that the node 2318(w) (i.e., the source node 2312(w)) connects to the primary switch, and if step 6930 determines that at least one outlet of the current switch has not yet been considered, step 6920 is revisited to select a new outlet. If it is determined in step 6924 that the source node 2312(w) does not connect to the primary switch, the controller of the current switch performs a temporal matching process to allocate σ time slots through the current switch between an inlet connecting to originating node 2320(u) and the current outlet. If successful, step 6834 is considered complete and the process continues to step 6836 of FIG. 68. If the temporal matching process of step 6926 fails to allocate σ time slots for the connection, and if step 6930 determines that another outlet may be tried, step 6920 is revisited; otherwise an indication of unavailability of a first-path segment is returned to step 6836 of FIG. 68.

FIG. 70 details step 6838. In step 7020, a controller of the intermediate node 2320(w) (the source node 2312(w)) identifies an outbound channel to a switch in column $\chi_0$ and sends a type-0 to the switch. The type-0 connection request identifies the destination node 2320(v) and indicates the required number σ of time slots per time frame. In step 7030, the controller of the switch identifies an outlet connecting to the destination node 2320(v). In step 7040, controller of the switch performs a time-slot matching process to allocate σ time slots along an internal path within the switch connecting the outbound channel of the intermediate node (intermediate source node) to the outlet leading to the destination node 2320(v).

Figure 71:
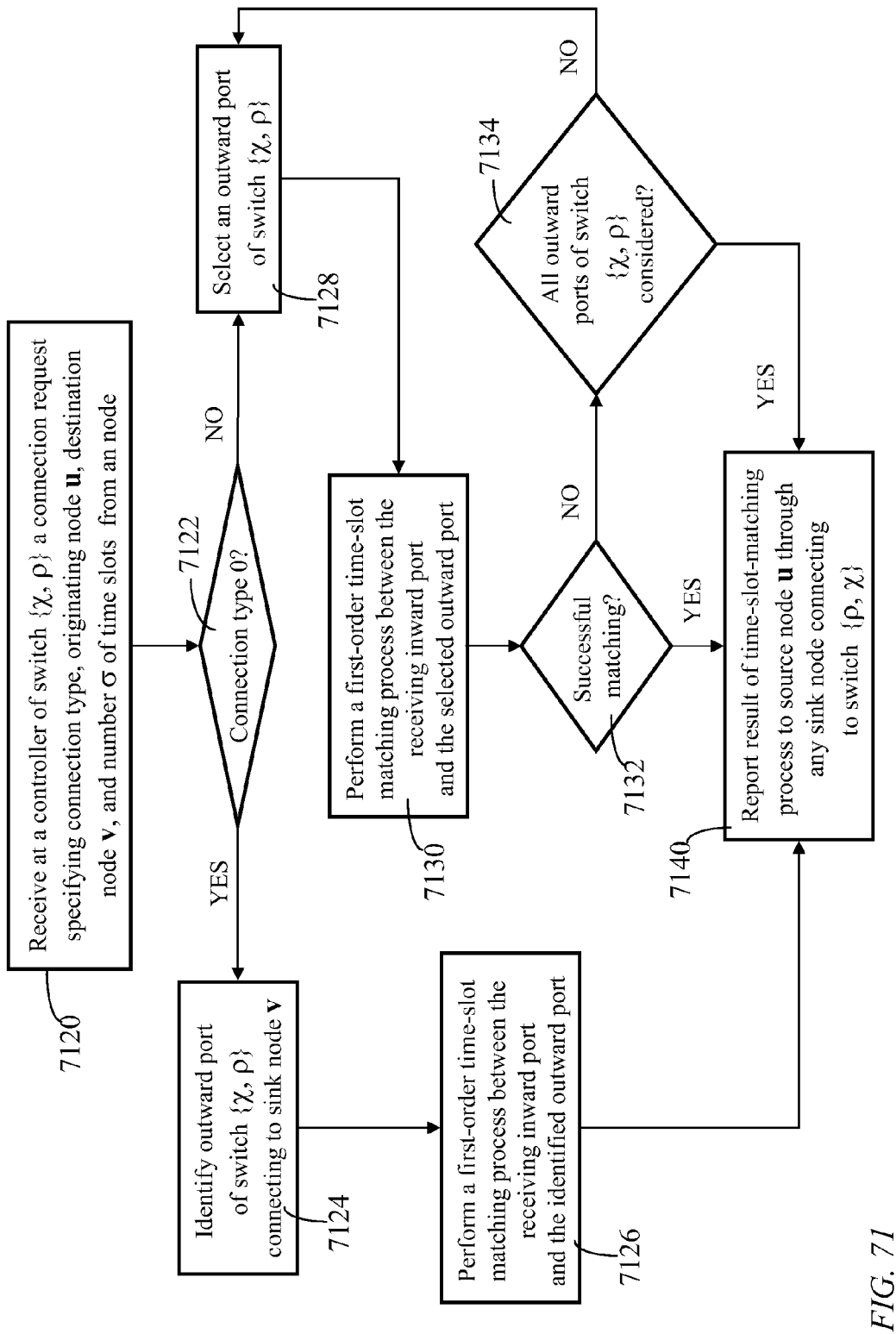
FIG. 71 is a flow chart illustrating steps of connection setup implemented by a controller of a switch in accordance with an embodiment of the present invention.

FIG. 71 illustrates steps of a temporal matching process performed by a controller of a switch 2340($\chi,\rho$) identified by the coordinates $\chi$ and $\rho$, respectively representing a column index and a row index in switch matrix 2310. In step 7120, the controller of switch 2340{$\chi,\rho$} receives a connection request indicating a connection type and parameters {u, v, σ} indicating an originating node 2320(u), a destination node 2320 (v), and a number of time slots σ to be reserved per time frame. In a type-0 connection, an output port of switch 2340{$\chi,\rho$} is specified or implied; the specified output port leads to the destination node. In a type-1 connection, any output port of switch 2340{$\chi,\rho$} may be selected. A type-0 connection applies to a simple path from the originating node 2320(u) node to the destination node 2320(v), or to the second part of a compound path from an intermediate node to the destination node. A type-1 connection applies to the first part of a compound path where any node (any sink node) connecting to an outlet of switch 2340{$\chi,\rho$} may be used as an intermediate node (intermediate sink node).

Step 7122 directs a type-0 connection request to step 7124 and directs a type-1 connection request to step 7128. In step 7124, the switch controller identifies an outlet of the switch 2340{$\chi,\rho$} which has an outward channel to destination node 2320(v). In step 7126, a temporal matching process is performed between an inlet connecting to the originating node and the identified outlet connecting to the destination node. The result is reported to the originating node 2320(u) in step 7140. In step 7128, the switch controller selects a candidate outlet and in step 7130, a temporal matching process is performed in a manner similar to that of step 7126. If the temporal-matching process is successful, the result is reported in step 7140; otherwise, step 7132 directs the computation to step 7134 which determines whether another outlet may be considered. If all outlets have been considered, step 7134 directs the procedure to step 7140; otherwise, step 7134 directs the procedure to step 7128 which selects another outlet and repeat steps 7130 and 7132. A connection from a data source to a data sink, where both connect to a common node, is switched through the common node without traversing a switch 2340 (or 2740).

FIG. 72 illustrates a process of selecting simple paths and compound paths in a switching node 2700. In step 7210, a node controller of an originating node 2720(η), 0≤η<(μ×n) receives a request for a connection of a specified flow rate to a destination node 2720(h), 0≤h<(μ×n). The node controller determines a number of time slots corresponding to the specified flow rate to be allocated within a cyclic slotted time frame. The node controller selects a switch plane, π, 0≤π<Π, to start the connection (step 7220) and communicates with a switch controller of a switch directly connected to the destination node to determine availability of a simple path through the switch (step 7240) as illustrated in FIG. 73. If the sought simple path is found (step 7250), the switch controller informs the node controller of the simple-path availability (step 7290). Otherwise, the node controller selects another switch plane 2750 (steps 7260, 7270). If a simple path is not found when all switch planes have been considered, the node controller of the originating node starts a search for a compound path (step 7280) as illustrated in FIG. 74.

FIG. 73 details step 7240 of allocating a simple path through a selected switch plane from an originating node 2720 of index η, 0≤η<(μ×n), to a destination node of index h, 0≤h<(μ×n), In step 7310, the node controller of the originating node acquires the requisite connection parameters. In step 7320, the node controller of the originating node locates a connecting switch 2740 of the selected switch plane, π, which has a channel to the destination node. Considering the exemplary connectivity pattern illustrated in FIG. 45, for example, the connecting switch is located in column c and row r determined as:

$$c=\{\lfloor h/n \rfloor + \pi\}_{modulo\,\mu};$$

and $$r=\{\lfloor \eta/m \rfloor - c - c \times (\eta)_{modulo\,m}\}_{modulo\,\nu}.$$

In step 7360, the node controller of the originating node determines availability of a path to the located switch and, where a path is found, communicates with the switch controller of the located switch to request a connection to the destination node. There is a control path from each switch 2740 having n outlets to a respective node controller of each node 2720 of n nodes connecting to the n outlets. The switch controller communicates with a node controller of the destination node to confirm availability, or otherwise, of a simple path and indicate any allocated time slots.

As described above, each node 2720 has a control path to each other node 2720 traversing a respective single switch. Thus, the node controller of the destination node communicates with the controller of the originating node to confirm availability, or otherwise of the sought simple path and indicate allocated time slots, if any. In step 7380, the node controller of the originating node receives the availability information and determines in step 7250 (FIG. 72) whether to: accept an allocated simple path (step 7290); seek another simple path (steps 7260, 7270); or seek a compound path (steps 7260, 7280).

FIG. 74 details step 7280 of finding compound paths. The node controller of the originating node 2720 selects a candidate switch plane 2750 (step 7410) and a channel to a switch 2740 of the candidate switch plane (step 7420). The node controller of the originating node communicates with a switch controller of the candidate switch to convey the requisite connection parameters and request a connection to an intermediate node 2320 through the candidate switch.

In step 7430, a switch controller of the candidate switch seeks a path to a candidate intermediate node 2720 connecting to one of the n outlets of the candidate switch and conveys the requisite connection parameters as well as allocated time slots to a node controller of the candidate intermediate node 2720. The switch controller of the candidate switch may seek more than one intermediate node 2720 and may instruct a controller of an intermediate node to inform the controller of the originating node to select another switch 2740.

In step 7440, the node controller of a candidate intermediate node 2720 determines availability of a simple path to the destination node 2720 in a process similar too the process of FIG. 73. The node controller of the destination node 2720 informs the controller of the originating node of allocated time slots (steps 7450, 7490). If the intermediate node 2720 determines that a simple path (second simple path of a compound path) to the destination node is not available, another candidate node 2720 may be considered (steps 7450 and 7460). Another candidate switch 2740 may also be considered (steps 7450, 7460, and 7470) or another switch plane 2750 may be considered (steps 7450, 7460, 7470, 7480).

Figure 75:
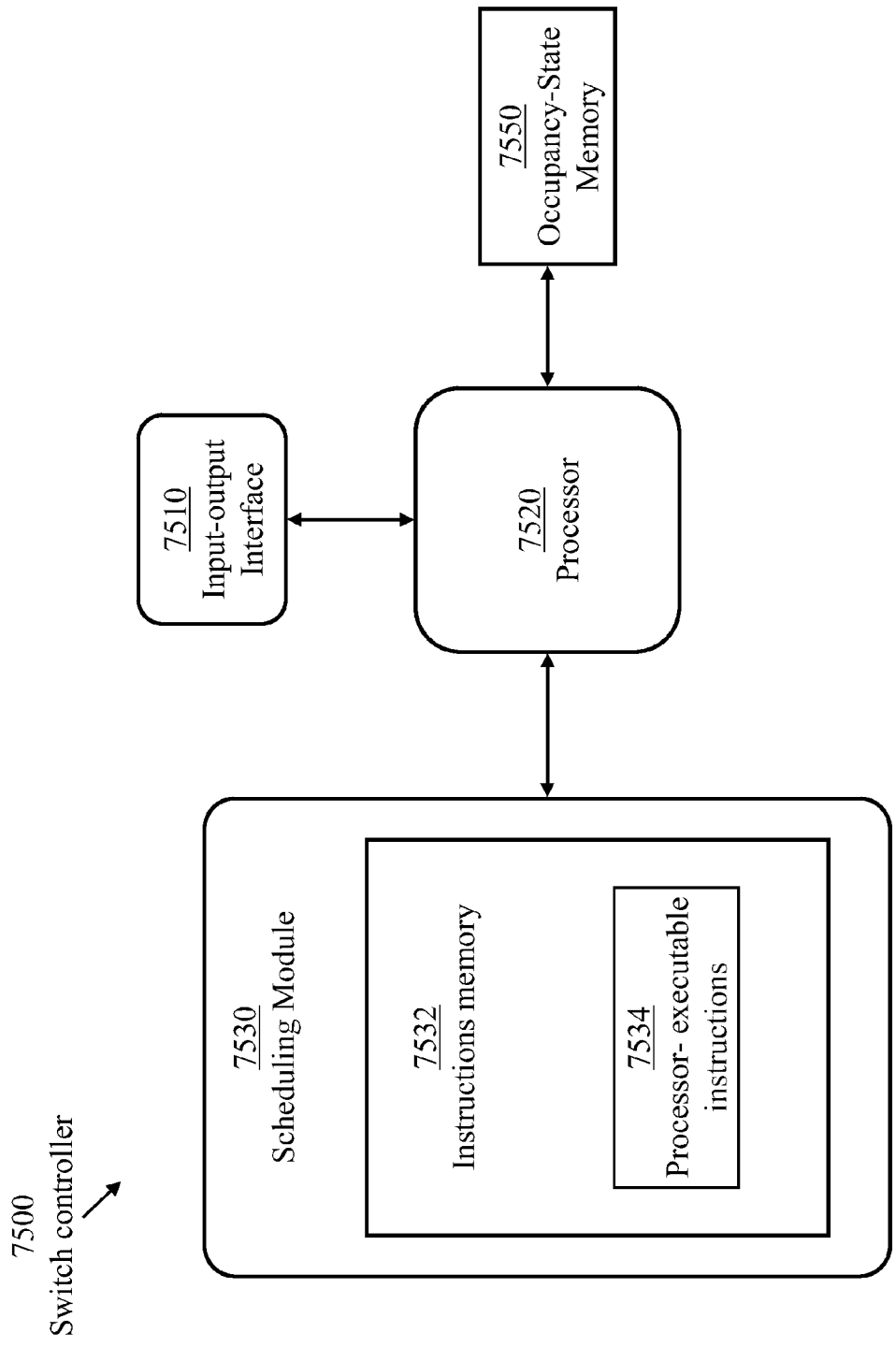
FIG. 75 illustrates a switch controller in accordance with an embodiment of the present invention.

FIG. 75 illustrates an exemplary switch controller 7500 for a switch 2740 configured as an instantaneous space switch or a latent space switch. The switch controller 7500 has a processor 7520 (generally an assembly of processors which may be pipelined) coupled to an input-output interface 7510 accessing relevant components of the switch 2740.

A scheduling module 7530, coupled to processor 7520 includes an instructions memory device 7532 storing processor executable instructions 7534 which cause processor 7520 to implement relevant scheduling algorithms. A memory device 7550 coupled to processor 7520 stores indication of current occupancy states of inlets and outlets of the switch 2740 during each time slot of a scheduling time frame.

Optical Switches

The nodes (integrated source nodes and sink nodes) are considered to be electronic based. The switches are space switches which may be electronic or photonic based. If a switch is a photonic space switch, electrical-optical interfaces and optical-electrical interfaces may be needed. The selection of an electronic or photonic switching fabric depends on several considerations including scalability and cost of interfaces. A single-stage electronic space switch of very large dimension, 4096×4096 for example, is realizable with the present state of the art. A single-stage fast switching photonic space switch may be limited to a relatively small dimension, 64×64 for example. A switch based on electronic switches and in which all the nodes and switches are collocated may not require internal Electrical-optical (E-O) or optical-electrical (O-E) interfaces. However, if the nodes are not collocated with the electronic switches, and with the use of conventional optical transmission, such interfaces would be needed.

Switching-Node Layout

Figure 76:
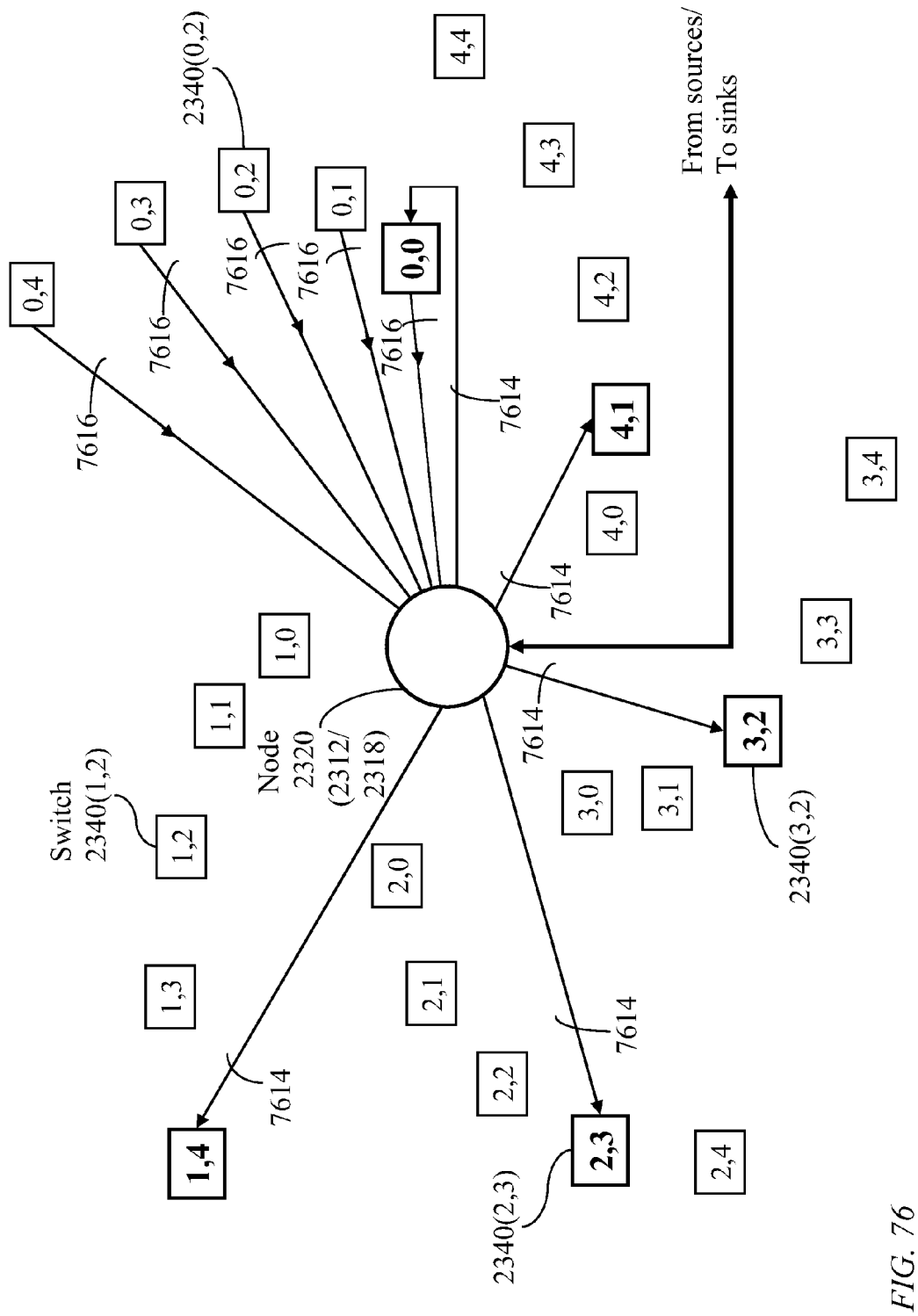
FIG. 76 illustrates connectivity of a node to switches of the switch of FIG. 23 according to the arrangement of FIG. 25.

The core 2310 of switching node 2300 and each switch plane 2750 of multi-plane switching node 2700 comprises switches logically arranged in a matrix form. The physical layout of the switches may be influenced by design and packaging considerations, and the logical matrix representation is used mainly for ease of addressing and distribution of control signals. FIG. 76 illustrates switches 2340 in an arbitrary layout, though individually indexed according to their column number and row number in the matrix structure of FIG. 23. The connectivity of nodes 2320 to switches 2340 in FIG. 76 corresponds to the connectivity pattern of FIG. 25. Channels 7614 and 7616 correspond to channels 2314 and 2316, respectively, of FIG. 23. Node 2320 of index 1 (source node 2312 of index 1) has upstream channels 7614 to switches 2340(0,0), 2340(1,4), 2340(2,3), 2340(3,2) and 2340(4,1). Switches 2340(0,0), 2340(0,1), 2340(0,2), 2340(0,3), and 2340(0,4) have downstream channels 7616 to node 2320(1) (i.e., to sink node 2318(1) integrated with the source node 2312(1)). According to the switching method of the present invention, each node has a switched simple path to each other node and any logical arrangement of the independent switches 2340 (or 2740) which facilitates creation of simple paths from each node to each other node may be employed.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A switching node comprising:
   a plurality of switches arranged into a number of switch planes, each switch plane comprising a respective set of switches of said plurality of switches arranged in a matrix of a number of rows and a number of columns, each switch having a number of inlets and a number of outlets; and
   a plurality of nodes, each node connecting to an inlet of a respective switch in each column in said each switch plane and an outlet of a respective switch in each row in said each switch plane;
   wherein all simple paths leading to any node traverse switches which receive data from mutually orthogonal sets of nodes, with any two sets of said mutually orthogonal sets of nodes having a number of common nodes not exceeding a predefined upper bound, where a simple path traverses a single switch of said plurality of switches.

2. The switching node of claim 1 wherein said respective switch in each row belongs to a preselected column specific to said each switch plane.

3. The switching node of claim 1 wherein all sets of nodes connecting to inlets of respective switches of a specific switch plane are mutually orthogonal so that any set of nodes connecting to inlets of any switch of said specific switch plane and any other set of nodes connecting to inlets of any other switch of said specific switch plane have a number of nodes in common not exceeding said predefined upper bound.

4. The switching node of claim 3 wherein said number of columns equals said number of rows and is a prime number and said predefined upper bound equals $\lceil m/\mu \rceil$, m being said number of inlets and $\mu$ being said number of columns, $m>1$, $\mu>1$.

5. The switching node of claim 1 wherein all switches of a same row collectively connect in the upstream direction to all nodes of said plurality of nodes and wherein all switches of a same column collectively connect in the upstream direction to said all nodes.

6. The switching node of claim 1 further comprising:
   a plurality of node controllers, each node controller coupled to a respective node of said plurality of nodes and having at least one processor; and
   a plurality of switch controllers, each switch controller coupled to a respective switch of said plurality of switches and having at least one processor.

7. The switching node of claim 1 wherein said number of columns, denoted $\mu$, said number of rows, denoted $\nu$, said number of inlets, denoted m, and said number of outlets, denoted n, are selected so that $\mu \times n = \nu \times m$.

8. The switching node of claim 1 wherein said number of columns, denoted $\mu$, said number of rows, denoted $\nu$, said number of inlets, denoted m, and said number of outlets, denoted n, are selected so that $\nu = \mu$ and $n = m$.

9. The switching node of claim 8 wherein a node of index $\eta$, $0 \leq \eta < (\mu \times n)$, connects to:
   an inlet of a switch in each column c, $0 \leq c < \mu$, in each switch plane $0 \leq \pi < \Pi$, in row r determined as $r = \{\lfloor \eta/m \rfloor - c - c \times (\eta)_{modulo\ m}\}_{modulo\ \nu}$, and
   an outlet of a switch in each row $\rho$, $0 \leq \rho < \nu$, in each switch plane $0 \leq \pi < \Pi$, in column $\kappa$, determined as $\kappa = \{\lfloor \eta/n \rfloor + \pi\}_{modulo\ \mu}$;

$\Pi$ being said number of switch planes, indexed as 0 to $(\Pi-1)$, said number of columns being indexed as 0 to $(\mu-1)$ said number of rows being indexed as 0 to $(\nu-1)$, and said nodes being indexed as 0 to $(\nu \times m - 1)$.

10. The switching node of claim 8 wherein a node of index $\eta$, $0 \leq \eta < (\mu \times n)$, connects to:
    an inlet of a switch in each column c, $0 \leq c < \mu$, in each switch plane $\pi$, $0 \leq \pi < \Pi$, in row r determined as $r = \{\lfloor \eta/m \rfloor - (c + \pi) \times (1 + (\eta)_{modulo\ m})\}_{modulo\ \nu}$, and
    an outlet of a switch in each row $\rho$, $0 \leq \rho < \nu$, in each switch plane $0 \leq \pi < \Pi$, in column $\kappa$, determined as $\kappa = \lfloor \eta/n \rfloor$;

$\Pi$ being said number of switch planes, indexed as 0 to $(\Pi-1)$, said number of columns being indexed as 0 to $(\mu-1)$ said number of rows being indexed as 0 to $(\nu-1)$, and said nodes being indexed as 0 to $(\nu \times m - 1)$.

11. The switching node of claim 8 wherein a switch in column c, $0 \leq c < \mu$, row r, $0 \leq r < \nu$, and switch plane $\pi$, $0 \leq \pi < \Pi$ connects to:
    upstream channels from a set of m nodes of indices:

$\{j \times (1 + m \times c) + m \times (r + c)\}_{modulo\ S}$, $0 \leq j < m$, and
    downstream channels to a set of n nodes of indices:

$(n \times (c + \pi) + j)_{modulo\ S}$, $0 \leq j < n$;

$\Pi$ being said number of switch planes, indexed as 0 to $(\Pi-1)$, said $\mu$ columns being indexed as 0 to $(\mu-1)$, and S being a number of nodes, indexed as 0 to $(S-1)$, in said plurality of nodes, $S = \nu \times m$.

12. The switching node of claim 8 wherein a switch in column c, $0 \leq c < \mu$, row r, $0 \leq r < \nu$, and switch plane $\pi$, $0 \leq \pi < \Pi$ connects to:
    upstream channels from a set of m nodes of indices:

$\{j \times (1 + m \times \kappa) + m \times (r + \kappa)\}_{modulo\ S}$, $0 \leq j < m$, $\kappa = (c + \pi)_{modulo\ \mu}$;

and
    downstream channels to a set of n nodes of indices:

$(n \times c + j)$, $0 \leq j < n$;

$\Pi$ being said number of switch planes, indexed as 0 to $(\Pi-1)$, said $\mu$ columns being indexed as 0 to $(\mu-1)$, and S being a number of nodes, indexed as 0 to $(S-1)$, in said plurality of nodes, $S = \nu \times m$.

13. The switching node of claim 8 wherein each node of said plurality of nodes comprises a nodal switching fabric having Q input ports and Q output ports, $Q > 2$, wherein said Q input ports are configured as:
    $\mu^*$ ingress ports for receiving data from external data sources; and
    $\Pi \times \mu$ inbound ports each connecting to an inbound channel from a respective switch of a column in each switch plane;
    and wherein said Q output ports are configured as:
    $\mu^*$ egress ports for transmitting data to external data sinks; and
    $\Pi \times \mu$ outbound ports each connecting to an outbound channel to a switch in each column in each switch plane.

14. The switching node of claim 1 wherein each switch of said plurality of switches is a latent space switch having m inlets and m outlets, each latent space switch comprising:
    a bank of memory devices;

an input rotator cyclically connecting each inlet of said m inlets to each memory device of said bank of memory devices during a rotation cycle; and an output rotator cyclically connecting said each memory device to each outlet of said m outlets during said rotation cycle;

where one of said input rotator and output rotator is an ascending rotator and the other is a descending rotator.

15. The switching node of claim 14 wherein each node connects to inlets of different indices in different switch planes and outlets of identical indices in all switch planes so that Π simple paths from any node to any other node through said plurality of switch planes have switching delays staggered during said rotation cycle, Π being a number of switch planes.

16. The switching node of claim 14 wherein each source node connects to inlets of identical indices in all switch planes and each sink node connects to outlets of different indices in different switch planes so that Π simple paths from any source node to any sink node through said plurality of switch planes have switching delays staggered within said rotation cycle, Π being a number of switch planes.

17. The switching node of claim 14 wherein a node of index $\eta$, $0 \le \eta < S$, connects to:

an inlet of index $\{\eta + \lceil (m \times p)/\Pi \rceil\}_{modulo\ m}$, of a respective latent space switch in a switch plane of index p, $0 \le j < m$; and an outlet of index $k = \eta_{modulo\ m}$ of a respective latent space switch in each switch plane, $0 \le k < n$;

where $0 \le p < \Pi$, Π being a number of switch planes, indexed as 0 to (Π−1), said inlets being indexed as 0 to (m−1), said outlets being indexed as 0 to (m−1), and said nodes being indexed as 0 to (S−1), $S = \mu \times m$.

18. The switching node of claim 14 wherein a node of index $\eta$, $0 \le \eta < S$, connects to:

an inlet of index $j = \eta_{modulo\ m}$ of a respective latent space switch in each switch plane, $0 \le j < m$; and an outlet of index $\{\eta + \lceil (m \times p)/\Pi \rceil\}_{modulo\ m}$, of a respective latent space switch in a switch plane of index p, $0 \le j < m$;

where $0 \le p < \Pi$, Π being a number of switch planes, indexed as 0 to (Π−1), said inlets being indexed as 0 to (m−1), said outlets being indexed as 0 to (m−1), and said nodes being indexed as 0 to (S−1), $S = \mu \times m$.

19. The switching node of claim 14 wherein:

each switch of at least one switch plane is an ascending switch having an ascending input rotator and each switch of at least one other switch plane has a descending input rotator;

each node of said plurality of nodes connects to likewise indexed inlets of a first set of switches and likewise indexed outlets of a second set of switches; and a connection from a first node connecting to an inlet of index j to a second node connecting to an outlet of index k, is established through one of:

a switch having an ascending input rotator, subject to a determination that $(j-k)_{modulo\ m} \le (m/2)$; and a switch having a descending input rotator, otherwise.

20. A switching node comprising:

a plurality of switches arranged into a number of switch planes each switch plane comprising a respective set of switches of said plurality of switches arranged in a matrix of a number of rows and a number of columns, each switch having a number of inlets and a number of outlets; and a plurality of nodes each node connecting to an inlet of a respective switch in each row in said each switch plane and an outlet of a respective switch in each column in said each switch plane;

wherein all simple paths originating from any node traverse switches which transmit data to mutually orthogonal sets of nodes, with any two sets of said mutually orthogonal sets of nodes having a number of common nodes not exceeding a predefined upper bound, where a simple path traverses a single switch of said plurality of switches.

21. The switching node of claim 1 wherein said predefined upper bound equals a ratio of said number of rows to said number of outlets rounded up to nearest integer.

22. A switching node comprising:

a plurality of switches arranged into a number of switch planes each switch plane comprising a respective set of switches of said plurality of switches arranged in a matrix of a number of columns and a number of rows;

a plurality of source nodes, each source node connecting to each switch of a respective row in said each switch plane; and a plurality of sink nodes, each sink node connecting to a respective switch in each row in said each switch plane; wherein a first set of sink nodes connecting to any switch in a specific switch plane is orthogonal to a second set of sink nodes connecting to any other switch in said specific switch plane, so that said first set of sink nodes and said second set of sink nodes have a number of sink nodes in common not exceeding a predefined upper bound.

23. The switching node of claim 22 wherein said predefined upper bound is equal to $\lceil n/v \rceil$, v being said number of rows, $v > 1$, and n being a number of outlets of said each switch.

24. The switching node of claim 22 wherein:

each switch has m input ports and n output ports selected so that $v \times m = \mu \times n$, μ being said number of columns and v being said number of rows; and each source node of said plurality of source node is integrated with a respective sink node of said plurality of sink nodes to form a plurality of integrated nodes indexed as 0 to $\{(\mu \times n)-1\}$.

25. The switching node of claim 24 wherein:

a source node of index $\eta$, $0 \le \eta < S$, $S = \mu \times n$, connects to a row of index $\{\lfloor \eta/m \rfloor + \pi\}_{modulo\ v}$, in switch plane $\pi$, $0 \le \pi < \Pi$; and a sink node of index h, $0 \le h < S$, connects to a switch in each row $\rho$, $0 \le \rho < v$, in each switch plane, in a column c determined as $c = \{\lfloor h/n \rfloor - \rho - \rho \times (h_{modulo\ n})\}_{modulo\ \mu}$, $0 \le \rho < v$, Π being said number of switch planes, $\Pi \ge 1$.

26. The switching node of claim 24 wherein:

a source node of index $\eta$, $0 \le \eta < S$, $S = \mu \times n$, connects to a row of index $\lfloor \eta/m \rfloor$ in each switch plane; and a sink node of index h, $0 \le h < S$, connects to a switch in each row $\rho$, $0 \le \rho < v$, in switch plane, $\pi$, $0 \le \pi < \Pi$, in a column c determined as $c = \{\lfloor h/n \rfloor - (\rho + \pi) \times (1 + (h_{modulo\ n}))\}_{modulo\ \mu}$, $0 \le \rho < v$, Π being said number of switch planes, $\Pi \ge 1$.

27. The switching node of claim 24 wherein a switch in column c, $0 \le c < \mu$, row r, $0 \le r < v$, and switch plane $\pi$, $0 \le \pi < \Pi$ connects to:

a set of m source nodes of indices:

$(m \times (r+\pi)+j)_{modulo\ S}$, $0 \leq j < m$;

and a set of n sink nodes of indices:

$\{j \times (1+n \times r)+n \times (c+r)\}_{modulo\ S}$, $0 \leq j < n$,

Π being a number of switch planes, indexed as 0 to (Π−1), of said plurality of switch planes, Π≥1, μ being said number of columns, indexed as 0 to (μ−1), and S being a number of sink nodes, indexed as 0 to (S−1), in said plurality of sink nodes, S=μ×n.

28. The switching node of claim 24 wherein a switch in column c, 0≤c<μ, row r, 0≤r<ν, and switch plane π, 0≤π<Π connects to:

a set of m source nodes of indices:

$(m \times r+j)$, $0 \leq j < m$;

and a set of n sink nodes of indices:

$\{j \times (1+n \times \rho)+n \times (c+\rho)\}_{modulo\ S}$, $0 \leq j < n$, $\rho = (r+\pi)_{modulo\ \nu}$;

Π being a number of switch planes, indexed as 0 to (Π−1), of said plurality of switch planes, Π≥1, μ being said number of columns, indexed as 0 to (μ−1), and S being a number of sink nodes, indexed as 0 to (S−1), in said plurality of sink nodes, S=μ×n.

* * * * *